(12) United States Patent
Miyakawa et al.

(10) Patent No.: US 9,389,468 B2
(45) Date of Patent: Jul. 12, 2016

(54) LIQUID CRYSTAL DISPLAY DEVICE

(71) Applicant: Sony Corporation, Tokyo (JP)

(72) Inventors: Masashi Miyakawa, Kanagawa (JP); Chikashi Kobayashi, Kanagawa (JP); Shunichi Suwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 14/310,342

(22) Filed: Jun. 20, 2014

(65) Prior Publication Data

US 2015/0002798 A1   Jan. 1, 2015

(30) Foreign Application Priority Data

Jun. 28, 2013   (JP) .................. 2013-136080

(51) Int. Cl.
*G02F 1/1337*   (2006.01)
*G02F 1/1343*   (2006.01)

(52) U.S. Cl.
CPC .... *G02F 1/134309* (2013.01); *G02F 1/133707* (2013.01); *G02F 2001/133776* (2013.01)

(58) Field of Classification Search
CPC ................ G02F 1/133707; G02F 1/134309
See application file for complete search history.

(56) References Cited

U.S. PATENT DOCUMENTS

2003/0043336 A1*   3/2003   Sasaki .............. G02F 1/133788
                                                                     349/187
2012/0038855 A1*   2/2012   Tasaka .............. G02F 1/134309
                                                                     349/96

FOREIGN PATENT DOCUMENTS

JP   05-232473 A   9/1993
JP   2002-357830 A   12/2002
JP   2011-232736 A   11/2011

* cited by examiner

*Primary Examiner* — James Dudek
(74) *Attorney, Agent, or Firm* — Wolf, Greenfield & Sacks, P.C.

(57) ABSTRACT

A liquid crystal display device includes multiple pixels which are arrayed. Each pixel includes a first substrate, a second substrate, a first electrode formed on an opposing face of the first substrate which faces the second substrate, a second electrode formed on an opposing face of the second substrate which faces the first substrate, a liquid crystal layer which includes liquid crystal molecules, situated between the first electrode and the second electrode, and a planarization layer. The liquid crystal molecules are pretilted. Multiple ridge-and-groove portions are formed at the first electrode. At least the grooves of the first electrode are filled in by the planarization layer.

19 Claims, 85 Drawing Sheets

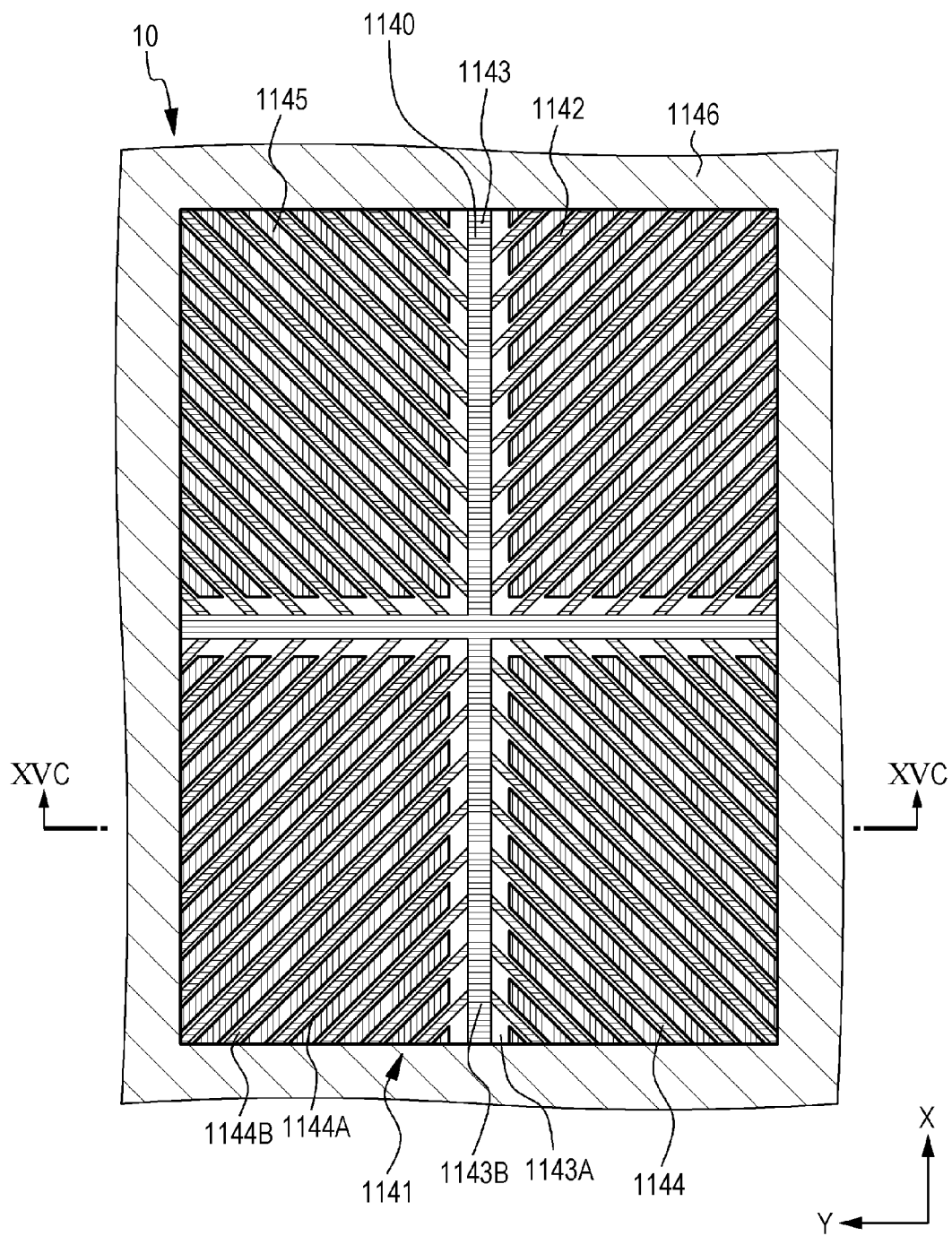

LIQUID CRYSTAL DISPLAY DEVICE

CROSS REFERENCE TO RELATED APPLICATIONS

This application claims the benefit of Japanese Priority Patent Application JP 2013-136080 filed Jun. 28, 2013, the entire contents of which are incorporated herein by reference.

BACKGROUND

The present disclosure relates to a liquid crystal display device including a liquid crystal display element, in which a liquid crystal layer is sealed between a pair of substrates.

As of recent, liquid crystal display (also simply "LCD") devices have come to be widely used as display monitors in liquid crystal television receivers, laptop computers, automotive navigation devices, and so forth. Such liquid crystal display devices are classified into several display modes (formats) depending on the molecular array (alignment) of liquid crystal molecules included in a liquid crystal layer held between substrates. An example of a common display mode is the twisted nematic (TN) mode, in which the liquid crystal molecules are arrayed in a twisted state with no voltage applied. In the TN mode, the liquid crystal molecules exhibit positive dielectric constant anisotropy. That is to say, the liquid crystal molecules have a nature that the dielectric constant in the longitudinal axis direction is greater than that in the lateral axis direction. Accordingly, a TN mode liquid crystal display device has a structure where the liquid crystal molecules are ordered in a direction perpendicular to a substrate face, having sequentially rotated the alignment orientation thereof within a plane parallel to the substrate face.

On the other hand, there is increased interest in a vertical alignment (VA) mode, where the liquid crystal molecules are aligned perpendicular to the substrate face with no voltage applied. In the VA mode, the liquid crystal molecules exhibit negative dielectric constant anisotropy. That is to say, the liquid crystal molecules have a nature that the dielectric constant in the longitudinal axis direction is smaller than that in the lateral axis direction. This allows a boarder view angle to be realized as compared to the TN mode.

This VA mode liquid crystal display device is configured such that applying voltage causes the liquid crystal molecules aligned perpendicular to the substrate to respond by tilting in the parallel direction as to the substrate due to the negative dielectric constant anisotropy, thus transmitting light. However, the direction in which the liquid crystal molecules aligned perpendicular to the substrate tilt is unprescribed, so applying voltage disturbs the alignment of the liquid crystal molecules. This has been a factor in poor responsivity to voltage.

Accordingly, various proposals have been made as techniques to restrict the alignment of the liquid crystal molecules when voltage is applied. Examples include a multi-domain vertical alignment (MVA) format, a patterned vertical alignment (PVA) format, and a technique using a photo-alignment film (see Japanese Unexamined Patent Application Publication No. 5-232473, for example). The MVA format realizes a wide view angle while controlling alignment using slits and ribs (protruding portions). As of recent, there has also been proposed what is called a fine-slit structure, where multiple fine slits are formed in electrodes formed at one substrate (specifically, pixel electrodes) and a slit-less solid electrode (specifically, the common electrode) formed on the other substrate. See Japanese Unexamined Patent Application Publication No. 2002-357830, for example. However, the fine-slit structure has a problem in that there are portions of slits formed of fine line-and-space patterns where the electrical field is not applied, and further, the liquid crystal molecules are in a twisted aligned state near the edges of the lines when voltage is applied, which has resulted in lower light transmittance.

Japanese Unexamined Patent Application Publication No. 2011-232736 discloses a technology in which a portion with ridges and grooves are formed is provided to the pixel electrodes instead of the multiple fine slits, as a technology aiming to solve this problem. The multiple ridge-and-groove portions in one pixel are formed of trunk ridges extending on the X axis and the Y axis, and multiple branch ridges extending from the longitudinal sides of the trunk ridges toward the perimeter of the pixel. The longitudinal side portions of the trunk ridges where branch grooves are not joined are parallel with the X axis or Y axis. An alignment film, fashioned after the ridges and grooves, is formed threabove.

SUMMARY

The technology disclosed in Japanese Unexamined Patent Application Publication No. 2011-232736 is capable of effectively suppressing the above-described problem with the fine-slit structure from occurring. However, there may be variances in light transmittance of the liquid crystal display device when the liquid crystal molecules are arrayed as to the ridges and grooves provided to the pixel electrodes. This is a result of the state of array of the liquid crystal molecules at the tops of the ridges and within the grooves, and the state of array of the liquid crystal molecules at the sides of the ridges and within the grooves, not being the same.

It has been found desirable to provide a liquid crystal display device where uniform light transmittance can be realized.

A liquid crystal display device according to an embodiment includes multiple pixels which are arrayed. Each pixel includes a first substrate, a second substrate, a first electrode formed on an opposing face of the first substrate which faces the second substrate, a second electrode formed on an opposing face of the second substrate which faces the first substrate, and a liquid crystal layer which includes liquid crystal molecules, situated between the first electrode and the second electrode. The liquid crystal molecules are pretilted. Multiple ridge-and-groove portions are formed at the first electrode. At least the grooves of the first electrode are filled in by the planarization layer.

The planarization layer of the liquid crystal display device according to the present disclosure fills in at least the grooves of the first electrode. Accordingly, the portions where the liquid crystal molecules come into contact with the first electrode side are smooth or generally smooth. Thus, the alignment state of the liquid crystal molecules can be made uniform, and as a result thereof the light transmittance of the liquid crystal display device can be made uniform. Note that the advantages described in the present specification are only exemplary and not restrictive. There may also be additional advantages.

BRIEF DESCRIPTION OF THE DRAWINGS

FIG. 14 is a schematic plan view of a first electrode for one pixel making up a liquid crystal display device according to a seventh exemplary embodiment;

FIG. 53C illustrates a ridge and groove portion and the slit portion overlaid;

FIG. 53C illustrates a ridge and groove portion and the slit portion overlaid;

FIG. 53C illustrates a ridge and groove portion and the slit portion overlaid;

FIG. 53C illustrates a ridge and groove portion and the slit portion overlaid;

FIG. 58B is a schematic cross-sectional view of the first electrode taken along arrow LVIIIB-LVIIIB in FIG. 58A;

FIG. 59B is a schematic cross-sectional view of the first electrode taken along arrow LIXB-LIXB in FIG. 59A;

DETAILED DESCRIPTION OF EMBODIMENTS

Figure 1:
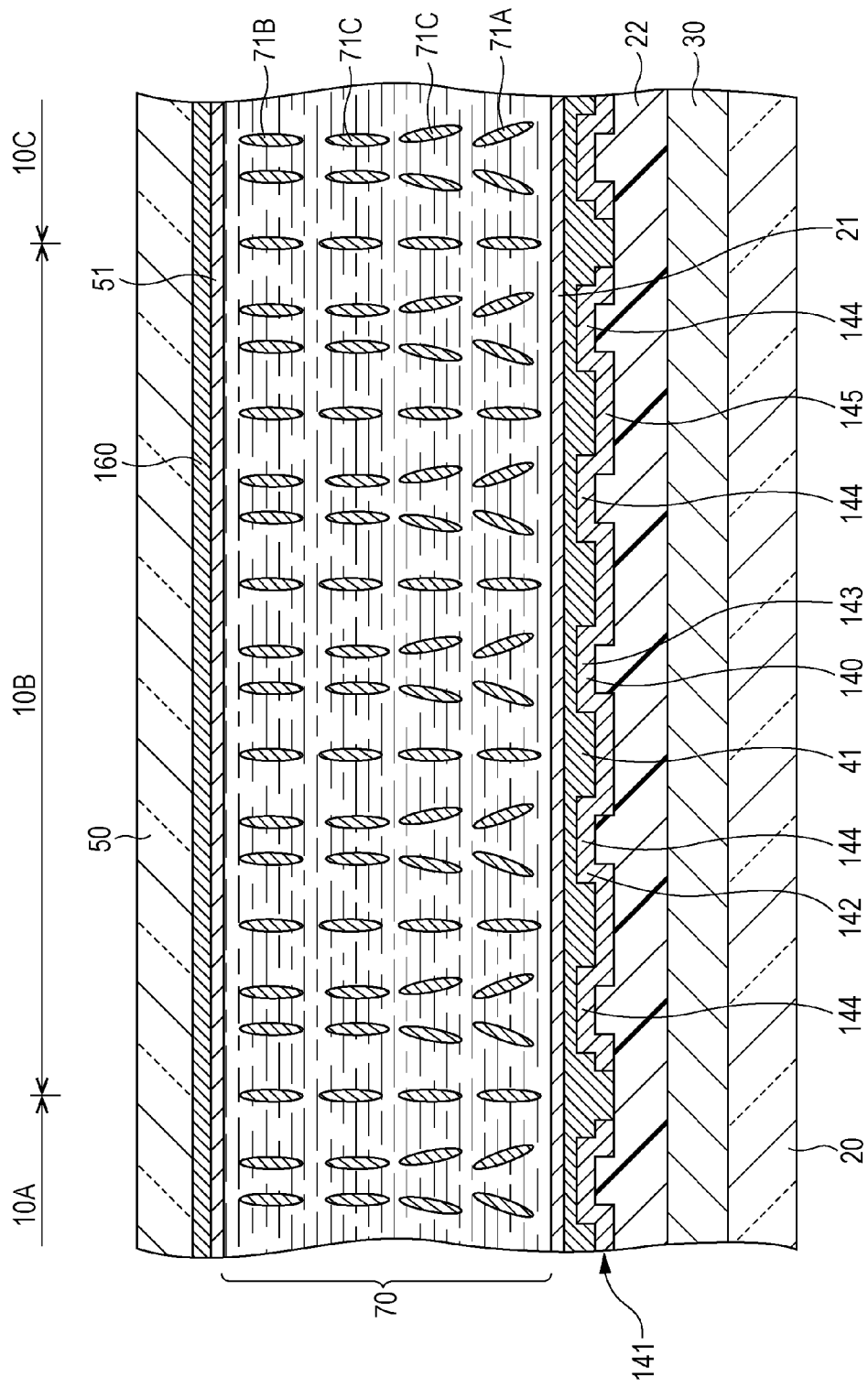
FIG. 1 is a schematic partial end view of a liquid crystal display device according to a first exemplary embodiment.

The present disclosure will be described by way of embodiments with reference to the drawings. It should be noted, however, that the present disclosure is not restricted to the embodiments, and that the various numerical values and materials in the embodiments are exemplary. Description will be made in the following order.

1. Overall Description of Liquid Crystal Display Device According to Present Disclosure 2. First Exemplary Embodiment (Liquid Crystal Display Device According to Present Disclosure. Liquid Crystal Display Device According to Embodiment 1-1 of Present Disclosure, Liquid Crystal Display Device According to First Form)

3. Second Exemplary Embodiment (Modification of First Exemplary Embodiment. Liquid Crystal Display Device According to Second Form)

4. Third Exemplary Embodiment (Another Modification of First Exemplary Embodiment. Liquid Crystal Display Device According to Third Form)

5. Fourth Exemplary Embodiment (Modification of First through Third Exemplary Embodiments. Liquid Crystal Display Device According to Embodiment 1-2 of Present Disclosure, and Liquid Crystal Display Device According to Embodiment 1-3 of Present Disclosure)

6. Fifth Exemplary Embodiment (Liquid Crystal Display Device According to Embodiment 2A-1 of Present Disclosure)

7. Sixth Exemplary Embodiment (Modification of Fifth Exemplary Embodiment)

8. Seventh Exemplary Embodiment (Another Modification of Fifth Exemplary Embodiment)

9. Eighth Exemplary Embodiment (Liquid Crystal Display Device According to Embodiment 2A-2 of Present Disclosure)

10. Ninth Exemplary Embodiment (Modification of Eighth Exemplary Embodiment)

11. Tenth Exemplary Embodiment (Another Modification of Eighth Exemplary Embodiment)

12. Eleventh Exemplary Embodiment (Liquid Crystal Display Device According to Embodiment 2B of Present Disclosure, including the Fifth through Tenth Exemplary Embodiments)

13. Twelfth Exemplary Embodiment (Liquid Crystal Display Device According to Embodiment 2C of Present Disclosure, Including the Embodiment 2A-1 and Embodiment 2-A)

14. Thirteenth Exemplary Embodiment (Liquid Crystal Display Device According to Embodiment 2D of Present Disclosure, Including the Liquid Crystal Display Device According to Embodiment 2A-2 and Embodiment 2-B)

15. Fourteenth Exemplary Embodiment (Liquid Crystal Display Device According to Embodiment 3 of Present Disclosure, Liquid Crystal Display Device According to Embodiment 3A of Present Disclosure)

16. Fifteenth Exemplary Embodiment (Modification of Fourteenth Exemplary Embodiment, Liquid Crystal Display Device According to Embodiment 3B of Present Disclosure)

17. Sixteenth Exemplary Embodiment (Another Modification of Fourteenth Exemplary Embodiment, Liquid Crystal Display Device According to Embodiment 3C-1 of Present Disclosure)

18. Seventeenth Exemplary Embodiment (Modification of Sixteenth Exemplary Embodiment)

19. Eighteenth Exemplary Embodiment (Another Modification of Sixteenth Exemplary Embodiment)

20. Nineteenth Exemplary Embodiment (Another Modification of Sixteenth Exemplary Embodiment, Liquid Crystal Display Device According to Embodiment 3C-2 of Present Disclosure)

21. Twentieth Exemplary Embodiment (Modification of Nineteenth Exemplary Embodiment)

22. Twenty-first Exemplary Embodiment (Modification of Twentieth Exemplary Embodiment)

23. Twenty-second Exemplary Embodiment (Liquid Crystal Display Device According to Embodiment 4A of Present Disclosure)

24. Twenty-third Exemplary Embodiment (Modification of Twenty-second Exemplary Embodiment)

25. Twenty-fourth Exemplary Embodiment (Another Modification of Twenty-second Exemplary Embodiment)

26. Twenty-fifth Exemplary Embodiment (Yet Another Modification of Twenty-second Exemplary Embodiment)

27. Twenty-sixth Exemplary Embodiment (Yet Another Modification of Twenty-second Exemplary Embodiment, Liquid Crystal Display Device According to Embodiment 4A-1 of Present Disclosure, Liquid Crystal Display Device According to Embodiment 4C of Present Disclosure)

28. Twenty-seventh Exemplary Embodiment (Yet Another Modification of Twenty-second Exemplary Embodiment, Liquid Crystal Display Device According to Embodiment 4A-2 of Present Disclosure, Liquid Crystal Display Device According to Embodiment 4C-2 of Present Disclosure, and Liquid Crystal Display Device According to Embodiment 4D of Present Disclosure)

29. Twenty-eighth Exemplary Embodiment (Yet Another Modification of Twenty-second Exemplary Embodiment, Liquid Crystal Display Device According to Embodiment 4A-3 of Present Disclosure, Liquid Crystal Display Device According to Embodiment 4C-3 of Present Disclosure, Liquid Crystal Display Device According to Embodiment 4D-3 of Present Disclosure, and Liquid Crystal Display Device According to Embodiment 4E of Present Disclosure)

30. Twenty-ninth Exemplary Embodiment (Liquid Crystal Display Device According to Embodiment 4B of Present Disclosure, Liquid Crystal Display Device According to Embodiment 4B-1 of Present Disclosure, Liquid Crystal Display Device According to Embodiment 4B-2 of Present Disclosure, Liquid Crystal Display Device According to Embodiment 4B-3 of Present Disclosure, Liquid Crystal Display Device According to Embodiment 4C of Present Disclosure, Liquid Crystal Display Device According to Embodiment 4C-2 of Present Disclosure, Liquid Crystal Display Device According to Embodiment 4C-3 of Present Disclosure, Liquid Crystal Display Device According to Embodiment 4D of Present Disclosure, Liquid Crystal Display Device According to Embodiment 4D-3 of Present Disclosure, and Liquid Crystal Display Device According to Embodiment 4E of Present Disclosure)

31. Thirtieth Exemplary Embodiment (Another Modification of Twenty-ninth Exemplary Embodiment)

32. Thirty-first Exemplary Embodiment (Modification of Thirtieth Exemplary Embodiment)

33. Thirty-second Exemplary Embodiment (Another Modification of Thirtieth Exemplary Embodiment)

34. Thirty-third Exemplary Embodiment (Liquid Crystal Display Device According to Embodiment 4E of Present Disclosure), Others 1. Overall Description of Liquid Crystal Display Device According to Present Disclosure A liquid crystal display device according to the present disclosure preferably satisfies the condition of $$0.5 \leq H_L/H_H \leq 1$$

and more preferably $$0.8 \leq H_L/H_H \leq 1$$

where the highest height of a top face of a planarization layer, with the bottom face of a groove as a reference, is represented by $H_H$ and the lowest height of a top face of the planarization layer is represented by $H_L$.

The liquid crystal display device according to the present disclosure, including the above preferred arrangement, preferably satisfies the condition of $$0.5 \leq H_H/H_C \leq 5$$

and more preferably $$0.75 \leq H_H/H_C \leq 1.5$$

where the height of a ridge, with the bottom face of a groove as a reference, is represented by $H_C$.

The liquid crystal display device according to the present disclosure, including the above preferred arrangement, may further include a first alignment film covering the first electrode; and a second alignment film covering the second electrode; wherein the planarization layer covers the first electrode; and wherein the liquid crystal molecules are pretilted by at least the first alignment film.

The liquid crystal display device of such a form will be, for brevity, referred to as "liquid crystal display device according to first form".

Alternatively, the liquid crystal display device may further include a first alignment film covering the first electrode; and a second alignment film covering the second electrode; wherein the planarization layer covers the first electrode; wherein the liquid crystal molecules are pretilted by at least the first alignment film, and wherein the first alignment film is equivalent to the planarization layer.

The liquid crystal display device of such a form will be, for brevity, referred to as "liquid crystal display device according to second form".

Alternatively, the liquid crystal display device may further include a first alignment film covering the first electrode and the planarization layer; and a second alignment film covering the second electrode; wherein the planarization layer fills in the grooves of the first electrode; and wherein the liquid crystal molecules are pretilted by at least the first alignment film.

The liquid crystal display device of such a form will be, for brevity, referred to as "liquid crystal display device according to third form".

Examples of materials forming the planarization layer in the liquid crystal display device according to the first form or the liquid crystal display device according to the third form include resist material, polymers such as photosensitive polyimide resins, acrylic resins, and so forth, and inorganic materials such as $SiO_2$, SiN, SiON, and so forth. Examples of materials forming the planarization layer in the liquid crystal display device according to the second form include polyimide resins.

Depending on the material used, the planarization layer may be formed by various types of application methods, various types of physical vapor deposition (PVD) methods such as vacuum deposition or sputtering, or various types of chemical vapor deposition (CVD) methods. Whether the grooves of the first electrode are filled in by the planarization layer, or the first electrode is covered by the planarization layer, depends on the material forming the planarization layer, the makeup and properties of compositions including the material forming the planarization layer (e.g., concentration of solid content, viscosity, solvent used, and so forth) method used to form the planarization layer, forming conditions, and so forth. The alignment films may also be formed by various types of application methods.

Examples of application methods include various types of printing methods, spin coating, various types of coating methods, spraying, methods using a dispenser, and stamping, as methods to apply a liquid material. Examples of printing methods include screen printing, ink-jet printing, offset printing, reverse offset printing, gravure printing, gravure offset printing, relief printing, flexographic printing, and microcontact printing. Examples of coating methods include air doctor coating, blade coating, rod coating, knife coating, squeeze coating, reverse roll coating, transfer roll coating, gravure coating, kiss coating, caster coating, spray coating, slit coating, slit orifice coating, cap coating, calendar coating, casting, capillary coating, bar coating, and dipping.

The liquid crystal molecules in the liquid crystal display devices of the first through third forms may be pretilted by applying a predetermined electric field to the liquid crystal layer and causing reaction in polymers making up at least the first alignment film.

The liquid crystal molecules in the liquid crystal display devices of such first through third forms preferably satisfies the conditions of $$0.5 \leq T_2/T_1 \leq 1.5$$

and preferably $$0.8 \leq T_2/T_1 \leq 1.2$$

where $T_1$ represents the average thickness of the first alignment film, and $T_2$ represents the average thickness of the second alignment film.

The average thickness of an alignment film is obtained by dividing the volume of the alignment film occupying one pixel (or one sub-pixel) by the area of one pixel (or one sub-pixel). Stipulating $T_2/T_1$ in this way so that the average thickness of the first alignment film and the average thickness of the second alignment film is equal or generally the same enables burn-in and the like to be prevented in a sure manner.

The liquid crystal display device according to the present disclosure including the above-described preferred arrangements may be hereinafter referred to as "liquid crystal display device according to Embodiment 1 of the present disclosure" for brevity.

The liquid crystal display device according to Embodiment 1 of the present disclosure may have multiple stepped portions formed at ridges provided to the first electrode. The liquid crystal display device having such a configuration may be hereinafter referred to as "liquid crystal display device according to Embodiment 2A of the present disclosure" for brevity.

The liquid crystal display device according to Embodiment 2A has multiple stepped portions (differences in height) formed at the ridges, causing difference in intensity at the ridges, or transverse electric field, to occur. This enables the force to restrict the alignment of the liquid crystal molecules at the ridges to be increased, and accordingly restrict the tilted state of the liquid crystal molecules at the ridges in a sure manner. Thus, the problem where dark lines occur at portions of the image corresponding to the ridges when displaying images can be suppressed in a sure manner. Accordingly, a liquid crystal display device can be provided which realizes even better light transmittance while maintaining good voltage responsivity, reduction in cost of the light source making up the backlight and reduction in electric power consumption can be realized, and reliability of thin-film transistors (TFT) can be improved.

The liquid crystal display device according to Embodiment 1 of the present disclosure or the liquid crystal display device according to Embodiment 2A of the present disclosure may have a ridge-and-groove portion including a trunk ridge passing through the center of a pixel and extending in a cross shape, and multiple branch ridges extending toward the perimeter of the pixel from the trunk ridge. The liquid crystal display device having such a configuration may be hereinafter referred to as "liquid crystal display device according to Embodiment 1-1" and "liquid crystal display device according to Embodiment 2A-1 of the present disclosure" for brevity.

The liquid crystal display device according to Embodiment 1-1 of the present disclosure and the liquid crystal display device according to Embodiment 2A-1 of the present disclosure may be formed as follows. When assuming an X axis and Y axis in accordance with the trunk ridge portions extending in a cross shape, multiple branch ridges occupying a first quadrant extend in parallel in a direction where the value of the Y coordinate increases when the value of the X coordinates increases, and multiple branch ridges occupying a second quadrant extend in parallel in a direction where the value of the Y coordinate increases when the value of the X coordinates decreases. Also, multiple branch ridges occupying a third quadrant extend in parallel in a direction where the value of the Y coordinate decreases when the value of the X coordinates decreases, and multiple branch ridges occupying a fourth quadrant extend in parallel in a direction where the value of the Y coordinate decreases when the value of the X coordinates increases.

This sort of arrangement of branch ridges is called a multi-domain electrode structure. Improved view angle properties can be realized since regions with different directions in which the branch ridges extend are formed in a single pixel.

Preferably, the multiple branch ridges occupying the first quadrant extend with the axial line thereof at 45 degrees to the X axis, the multiple branch ridges occupying the second quadrant extend with the axial line thereof at 135 degrees to the X axis, the multiple branch ridges occupying the third quadrant extend with the axial line thereof at 225 degrees to the X axis, and the multiple branch ridges occupying the fourth quadrant extend with the axial line thereof at 315 degrees to the X axis. However, these values (angles) are not restrictive here or in the following description.

The liquid crystal display device according to Embodiment 2A-1 of the present disclosure including the above-described preferred arrangements may be configured such that the cross-sectional shape of the trunk ridge when cut along an imaginary perpendicular plane orthogonal to the direction in which the trunk ridge extends is a shape stepping down from the center of the cross-sectional shape of the trunk ridge towards the edges thereof. The liquid crystal display device according to Embodiment 2A-1 of the present disclosure including the above-described preferred arrangements may be configured such that the cross-sectional shape of the trunk ridge when cut along an imaginary perpendicular plane parallel to the direction in which the trunk ridge extends is a shape stepping down from the middle of the cross-sectional shape of the trunk ridge towards the ends thereof.

Further, the liquid crystal display device according to Embodiment 2A-1 of the present disclosure including the above-described preferred arrangements may be configured such that the cross-sectional shape of the branch ridges when cut along an imaginary perpendicular plane orthogonal to the direction in which the branch ridges extend is a shape stepping down from the center of the cross-sectional shape of the branch ridges towards the edges thereof. Also, the liquid crystal display device according to Embodiment 2A-1 of the present disclosure including the above-described preferred arrangements may be configured such that the cross-sectional shape of the branch ridges when cut along an imaginary perpendicular plane parallel to the direction in which the branch ridges extend is a shape stepping down from the trunk ridge side of the cross-sectional shape of the branch ridges towards the tip of the cross-sectional shape of the branch ridges.

The liquid crystal display device according to Embodiment 1-1 of the present disclosure or the liquid crystal display device according to Embodiment 2A-1 of the present disclosure including the above-described preferred arrangements may have an alignment restricting portion formed at the portion of the second electrode which corresponds to the trunk ridge. An arrangement may be made where the alignment restricting portion is formed of a slit portion provided to the second electrode, or is formed of a protruding portion provided to the second electrode, or from a protruding portion of the second electrode. The protrusion is formed of a resist material for example, and the second electrode is not formed thereupon. A portion of the second electrode formed into a protruding portion may be formed by forming a ridge portion beneath the second electrode, or protruding portion of the second electrode may be formed by a method similar to the method by which the ridge-and-groove portions are formed at the first electrode. The slit portions, protruding portions, or portions of the second electrode that are protruding, are preferably formed so as to be narrower than the width of the trunk ridge. The same can be applied to the later-described liquid crystal display device according to Embodiment 2B-1 of the present disclosure and liquid crystal display device according to Embodiment 2C of the present disclosure.

Alternatively, the liquid crystal display device according to Embodiment 1 of the present disclosure and the liquid crystal display device according to Embodiment 2A of the present disclosure may be configured such that the ridge-and-groove portion is configured including a trunk ridge formed on the perimeter portion of a pixel in a frame shape, and multiple branch ridges extending inward in the pixel from the trunk ridge. Such a configuration will be referred to as "liquid crystal display device according to Embodiment 1-2 of the present disclosure" and "liquid crystal display device according to Embodiment 2A-2 of the present disclosure" for brevity.

The liquid crystal display device according to Embodiment 2A-1 of the present disclosure and the liquid crystal display device according to Embodiment 2A-2 of the present disclosure including the above-described preferred arrangements may be formed as follows. When assuming an X-Y coordinate system in which the directions in which lines, which pass through the center of the pixel and are parallel to the edges of the perimeter of the pixel, extend, are the X axis and Y axis, and the multiple branch ridges occupying the first quadrant extend in parallel in a direction where the value of the Y coordinate increases when the value of the X coordinates increases. Also, the multiple branch ridges occupying the second quadrant extend in parallel in a direction where the value of the Y coordinate increases when the value of the X coordinates decreases, and the multiple branch ridges occupying the third quadrant extend in parallel in a direction where the value of the Y coordinate decreases when the value of the X coordinates decreases, and the multiple branch ridges occupying the fourth quadrant extend in parallel in a direction where the value of the Y coordinate decreases when the value of the X coordinates increases.

The liquid crystal display device according to Embodiment 2A-2 of the present disclosure including the above-described preferred arrangements may be configured such that the cross-sectional shape of the trunk ridge, when cut along an imaginary perpendicular plane orthogonal to the direction in which the trunk ridge extends, is a shape stepping down from the outer edge of the cross-sectional shape of the trunk ridge towards the inner side of the cross-sectional shape of the trunk ridge.

Further, the liquid crystal display device according to Embodiment 2A-2 of the present disclosure including the above-described preferred arrangements may be configured such that the cross-sectional shape of the branch ridges, when cut along an imaginary perpendicular plane orthogonal to the direction in which the branch ridges extend is a shape stepping down from the center of the cross-sectional shape of the branch ridges towards the edges thereof. The liquid crystal display device according to Embodiment 2A-2 of the present disclosure including the above-described preferred arrangements may also be configured such that the cross-sectional shape of the branch ridges when cut along an imaginary perpendicular plane parallel to the direction in which the branch ridges extend is a shape stepping down from the portions of the cross-sectional shape of the branch ridges closer to the trunk ridge toward the ends of the cross-sectional shape of the branch ridges.

Moreover, the liquid crystal display device according to Embodiment 1-2 of the present disclosure, and the liquid crystal display device according to Embodiment 2A-2 of the present disclosure including the above-described preferred arrangements, may be configured such that a slit portion or a protrusion, passing through the center of the pixel in parallel to the perimeter of the pixel, is formed on the first electrode. The protrusion is formed of a resist material for example, and the first electrode is not formed thereupon. Alternately, the first electrode may be arranged so that a cross-shaped ridge passing through the center of the pixel is surrounded by grooves. Such a cross-shaped ridge may be formed by forming a cross-shaped ridge beneath the first electrode, or may be formed by a method similar to the method by which the ridge-and-groove portions are formed at the first electrode. Alternately, a cross-shaped groove passing through the center of the pixel may be provided instead of providing the slit portion or protrusion (rib). This can be similarly applied to the later-described liquid crystal display device according to Embodiment 2B-2 of the present disclosure and liquid crystal display device according to Embodiment 2D of the present disclosure.

Furthermore, the liquid crystal display device according to Embodiment 1-1 of the present disclosure or Embodiment 1-2 of the present disclosure, and the liquid crystal display device according to Embodiment 2A-1 of the present disclosure or Embodiment 2A-2 of the present disclosure including the above-described preferred arrangements, may be configured as follows. A ridge structure is formed from portions of the first substrate between pixels, to portions of the first substrate corresponding to the peripheral portion of the pixels, and peripheral portions of the ridge-and-groove portions are formed on the ridge structure. Note that the ridge structure may be formed based on a black matrix formed of a material according to the related art.

Embodiment 1-1 of the present disclosure and Embodiment 1-2 of the present disclosure may be combined. That is to say, an arrangement may be made in which the ridge-and-groove portion includes a trunk ridge passing through the center of the pixel and extending in a cross shape, multiple branch ridges extending from the trunk ridge toward the perimeter of the pixel, and a trunk ridge which is formed in a frame shape at the perimeter of the pixel and comes into contact with the multiple branch ridges. Such a configuration will be referred to as "liquid crystal display device according to Embodiment 1-3 of the present disclosure" for brevity.

The liquid crystal display device according to Embodiment 1-3 of the present disclosure may be formed as follows. When assuming an X-Y coordinate system of an X axis and Y axis in accordance with the trunk ridge portions extending in a cross shape, the multiple branch ridges occupying the first quadrant extend in parallel in a direction where the value of the Y coordinate increases when the value of the X coordinates increases, and the multiple branch ridges occupying the second quadrant extend in parallel in a direction where the value of the Y coordinate increases when the value of the X coordinates decreases. Also, the multiple branch ridges occupying the third quadrant extend in parallel in a direction where the value of the Y coordinate decreases when the value of the X coordinates decreases, and the multiple branch ridges occupying the fourth quadrant extend in parallel in a direction where the value of the Y coordinate decreases when the value of the X coordinates increases.

Also, the liquid crystal display device according to Embodiment 1 of the present disclosure may be configured such that a ridge structure is formed on portions of the first substrate between pixels, corresponding to the peripheral portion of the pixels, and peripheral portions of the ridge-and-groove portions are formed on the ridge structure. A liquid crystal display device of such a configuration will be referred to as "liquid crystal display device according to Embodiment 2B of the present disclosure" for brevity.

The liquid crystal display device according to Embodiment 2B of the present disclosure has the peripheral portions of the ridge-and-groove portions formed on the ridge structure, so the electric field generated around the ridge-and-groove portions is even greater than an arrangement where the peripheral portions of the ridge-and-groove portions are flat. This enables the force to restrict the alignment of the liquid crystal molecules at the peripheral portions of the ridge-and-groove portions to be increased, and accordingly restrict the tilted state of the liquid crystal molecules at the peripheral portions of the ridge-and-groove portions in a sure manner, thus maintaining good voltage responsivity. Note that the configuration and structure of the liquid crystal display device according to Embodiment 2B of the present disclosure may be applied to the liquid crystal display devices according to Embodiment 1 of the present disclosure, including Embodiment 1-1 of the present disclosure, Embodiment 1-2 of the present disclosure, and Embodiment 1-3 of the present disclosure.

The liquid crystal display device according to Embodiment 2B of the present disclosure may be configured such that the ridge-and-groove portion includes a trunk ridge passing through the center of the pixel and extending in a cross shape, and multiple branch ridges extending from the trunk ridge toward the perimeter of the pixel. Such a configuration will be referred to as "liquid crystal display device according to Embodiment 2B-1 of the present disclosure" for brevity.

The liquid crystal display device according to Embodiment 2B-1 of the present disclosure may be formed as follows. When assuming an X-Y coordinate system of an X axis and Y axis in accordance with the trunk ridge extending in a cross shape, the multiple branch ridges occupying the first quadrant extend in parallel in a direction where the value of the Y coordinate increases when the value of the X coordinates increases, and the multiple branch ridges occupying the second quadrant extend in parallel in a direction where the value of the Y coordinate increases when the value of the X coordinates decreases. Also, the multiple branch ridges occupying the third quadrant extend in parallel in a direction where the value of the Y coordinate decreases when the value of the X coordinates decreases, and the multiple branch ridges occupying the fourth quadrant extend in parallel in a direction where the value of the Y coordinate decreases when the value of the X coordinates increases.

The liquid crystal display device according to Embodiment 2B-1 of the present disclosure including the above-described preferred arrangements may have an alignment restricting portion formed at the portion of the second electrode which corresponds to the trunk ridge. An arrangement may be made where the alignment restricting portion is formed of a slit portion provided to the second electrode, or is formed of a protruding portion provided to the second electrode.

The liquid crystal display device according to Embodiment 2B of the present disclosure may be configured such that the ridge-and-groove portion includes a trunk ridge formed in a frame shape on the perimeter of the pixel, and multiple branch ridges extending from the trunk ridge toward the inside of the pixel. Such a configuration will be referred to as "liquid crystal display device according to Embodiment 2B-2 of the present disclosure" for brevity.

The liquid crystal display device according to Embodiment 2B-2 of the present disclosure may be formed as follows. When assuming an X-Y coordinate system in which the directions in which lines, which pass through the center of the pixel and are parallel to the edges of the perimeter of the pixel, extend, are the X axis and Y axis, the multiple branch ridges occupying the first quadrant extend in parallel in a direction where the value of the Y coordinate increases when the value of the X coordinates increases, and the multiple branch ridges occupying the second quadrant extend in parallel in a direction where the value of the Y coordinate increases when the value of the X coordinates decreases. Also, the multiple branch ridges occupying the third quadrant extend in parallel in a direction where the value of the Y coordinate decreases when the value of the X coordinates decreases, and the multiple branch ridges occupying the fourth quadrant extend in parallel in a direction where the value of the Y coordinate decreases when the value of the X coordinates increases.

The liquid crystal display device according to Embodiment 2B-2 of the present disclosure including the above-described preferred arrangements may have a slit portion or protrusion passing through the center of the pixel and parallel to the perimeter of the pixel, provided to the first electrode.

The liquid crystal display device according to Embodiment 2B of the present disclosure including the above-described preferred arrangements may be configured such that the ridge structure is formed based on a black matrix formed of a material according to the related art.

Alternatively, the liquid crystal display device according to Embodiment 1 of the present disclosure may be configured such that the ridge-and-groove portion includes a trunk ridge passing through the center of a pixel and extending in a cross shape, and multiple branch ridges extending toward the perimeter of the pixel from the trunk ridge, wherein an alignment restricting portion is formed at the portions of the second electrode corresponding to the trunk ridge. The liquid crystal display device of this configuration will be referred to as "liquid crystal display device according to Embodiment 2C of the present disclosure" for brevity.

The liquid crystal display device according to Embodiment 2C of the present disclosure is configured such that an alignment restricting portion is formed at the portions of the second electrode corresponding to the trunk ridge. This causes an electric field generated by the second electrode to be distorted near the alignment restricting portion, and/or for the direction in which the liquid crystal molecules tilt to be restricted near the alignment restricting portion. As a result, the force to restrict the alignment of the liquid crystal molecules near the alignment restricting portion can be increased, and accordingly the tilted state of the liquid crystal molecules near the alignment restricting portion can be restricted in a sure manner. Thus, the problem where dark lines occur at portions of the image corresponding to the trunk ridge when displaying images can be suppressed in a sure manner. Accordingly, a liquid crystal display device can be provided which realizes better light transmittance which is even more uniform while maintaining good voltage responsivity, reduction in cost of the light source making up the backlight and reduction in electric power consumption can be realized, and reliability of TFTs can be improved.

The alignment restricting portion of the liquid crystal display device according to Embodiment 2C of the present disclosure may be formed of a slit portion provided to the second electrode, or may be formed of a protrusion provided to the second electrode.

Alternatively, the liquid crystal display device according to Embodiment 1 of the present disclosure may be configured such that the ridge-and-groove portion includes a trunk ridge formed in a frame shape on the perimeter of the pixel, and multiple branch ridges extending from the trunk ridge toward the inside of the pixel, wherein a slit portion or protrusion passing through the center of the pixel and parallel to the perimeter of the pixel is provided to the first electrode. The liquid crystal display device of this configuration will be referred to as "liquid crystal display device according to Embodiment 2D of the present disclosure" for brevity.

The liquid crystal display device according to Embodiment 2D of the present disclosure is configured such that a slit portion or protrusion passing through the center of the pixel and parallel to the perimeter of the pixel is provided to the first electrode. This causes an electric field generated by the first electrode to be distorted near the slit portion, and/or for the direction in which the liquid crystal molecules tilt to be restricted near the protrusion, as compared to a case where smooth grooves without slits or protrusions are formed at the first electrode. As a result, the force to restrict the alignment of the liquid crystal molecules near the slit portion or protrusion can be increased, and accordingly the tilted state of the liquid crystal molecules near the slit portions or protrusions can be restricted in a sure manner. Thus, the problem where dark lines occur at portions of the image corresponding to the trunk ridge when displaying images can be suppressed in a sure manner. Accordingly, a liquid crystal display device can be provided which realizes better light transmittance which is even more uniform while maintaining good voltage responsivity, reduction in cost of the light source making up the backlight and reduction in electric power consumption can be realized, and reliability of TFTs can be improved.

Also, the liquid crystal display device according to Embodiment 2D of the present disclosure may be configured such that a black matrix is formed so that the projected image of the black matrix overlaps with the projected image of the portion of the first substrate which is situated between pixels, or such that a black matrix is formed so that the projected image of the black matrix overlaps with the projected image of a region from the portion of the first substrate which is situated between pixels up to the edge of the ridge-and-groove portion.

Exemplary values for the width of the branch ridges and grooves may be 1 µm to 20 µm, and more preferably 2 µm to 10 µm. In a case where the width of the branch ridges and grooves is smaller than 1 µm, formation of the branch ridges and grooves becomes difficult, making it harder to secure sufficient manufacturing yield. On the other hand, if the width of the branch ridges and grooves exceeds 20 µm, there may be cases where a good oblique electric field is not readily generated between the first electrode and second electrode when driving voltage is applied at the first electrode and second electrode.

Exemplary values for the width of the trunk ridge may be $2 \times 10^{-6}$ m to $2 \times 10^{-5}$ m, and more preferably $4 \times 10^{-6}$ m to $1.5 \times 10^{-5}$ m. Exemplary values for the height from a groove to the ridge closest to the groove may be $5 \times 10^{-8}$ m to $1 \times 10^{-6}$ m, and more preferably $1 \times 10^{-7}$ m to $5 \times 10^{-7}$ m. Exemplary values for the height of each step of a ridge (difference in height between adjacent top faces in a ridge having a stepped portion) may be $5 \times 10^{-8}$ m to $1 \times 10^{-6}$ m, and more preferably $1 \times 10^{-7}$ m to $5 \times 10^{-7}$ m. This enables good alignment control, and sufficient manufacturing yield can be secured, while preventing deterioration in light transmittance and longer process times.

Also, the liquid crystal display device according to Embodiment 1 of the present disclosure may be configured such that the width of a part of ridges provided to the first electrode is narrowed toward the tips thereof. The liquid crystal display device of this configuration will be referred to as "liquid crystal display device according to Embodiment 3 of the present disclosure" for brevity.

The liquid crystal display device according to Embodiment 3 of the present disclosure is configured such that multiple ridge-and-groove portions are formed at the first electrode, and the width of part of the ridges provided at the first electrode narrow toward the tip. Accordingly, occurrence of dark lines can be further reduced. That is to say, higher light transmittance which is even more uniform can be realized, and occurrence of dark lines can be suppressed.

The liquid crystal display device according to Embodiment 3 of the present disclosure may be configured such that a ridge-and-groove portion includes a trunk ridge passing through the center of a pixel and extending in a cross shape, and multiple branch ridges extending toward the perimeter of the pixel from the trunk ridge. Multiple branch ridges may correspond to a part of ridges provided to the first electrode, and the width of the branch ridges may be such that the portion of the branch ridges is widest where joining the trunk ridge, and narrowing therefrom toward the tips thereof. The liquid crystal display device of this configuration will be referred to as "liquid crystal display device according to Embodiment 3A of the present disclosure" for brevity. Also, the two sides of a branch ridge extending from the portion of contact with the trunk ridge to the tip portion will be referred to as "longitudinal sides" for brevity.

The liquid crystal display device according to Embodiment 3A of the present disclosure may be formed as follows. When assuming an X-Y coordinate system in accordance with the trunk ridge portions extending in a cross shape, multiple branch ridges occupying a first quadrant extend in parallel in a direction where the value of the Y coordinate increases when the value of the X coordinates increases, and multiple branch ridges occupying a second quadrant extend in parallel in a direction where the value of the Y coordinate increases when the value of the X coordinates decreases. Also, multiple branch ridges occupying a third quadrant extend in parallel in a direction where the value of the Y coordinate decreases when the value of the X coordinates decreases, and multiple branch ridges occupying a fourth quadrant extend in parallel in a direction where the value of the Y coordinate decreases when the value of the X coordinates increases. The same can be applied to the later-described liquid crystal display device according to Embodiment 3C-1 of the present disclosure and liquid crystal display device according to Embodiment 3D-1 of the present disclosure.

The liquid crystal display device according to Embodiment 3 of the present disclosure may be configured such that a ridge-and-groove portion includes a trunk ridge formed on the perimeter portion of a pixel in a frame shape, and multiple branch ridges extending inward in the pixel from the trunk ridge. Multiple branch ridges may correspond to a part of ridges provided to the first electrode, the width of the branch ridges being such that the portion of the branch ridges is widest where joining the trunk ridge, and narrows therefrom toward the tips thereof. The liquid crystal display device of this configuration will be referred to as "liquid crystal display device according to Embodiment 3B of the present disclosure" for brevity.

The liquid crystal display device according to Embodiment 3B of the present disclosure may be configured such that, assuming a coordinate system where lines passing through the center of the pixel and are parallel to the perimeter of the pixel are the X axis and Y axis, multiple branch ridges occupying a first quadrant extend in parallel in a direction where the value of the Y coordinate increases when the value of the X coordinates increases, and multiple branch ridges occupying a second quadrant extend in parallel in a direction where the value of the Y coordinate increases when the value of the X coordinates decreases. Also, multiple branch ridges occupying a third quadrant extend in parallel in a direction where the value of the Y coordinate decreases when the value of the X coordinates decreases, and multiple branch ridges occupying a fourth quadrant extend in parallel in a direction where the value of the Y coordinate decreases when the value of the X coordinates increases. The same can be applied to the later-described liquid crystal display device according to Embodiment 3C-2 of the present disclosure and liquid crystal display device according to Embodiment 3D-2 of the present disclosure.

The liquid crystal display device according to Embodiment 3A of the present disclosure or Embodiment 3B of the present disclosure may be configured such that the width of the branch ridges grown narrower from the portion joining the trunk ridge to the tips linearly narrows (an arrangement where the longitudinal sides making up a branch ridge are each one line segment and the change in width is constant), but is not restricted to this. An arrangement may be made where the width of the branch ridges narrows in a curved manner (an arrangement where the longitudinal sides making up a branch ridge are each one smooth curve, and the change in width varies). Another arrangement may be made where the longitudinal sides making up a branch ridge are formed of two or more line segments or curves, and an arrangement may be made where the width of the branch ridges narrows in a stepped manner (an arrangement where the longitudinal sides making up a branch ridge are stepped).

The liquid crystal display device according to Embodiment 3A of the present disclosure including the above-described preferred arrangements may be configured such that an alignment restricting portion is formed at portions of the second electrode corresponding to the trunk ridge. Forming such an alignment restricting portion at portions of the second electrode corresponding to the trunk ridge causes an electric field generated by the second electrode to be distorted near the alignment restricting portion, and/or for the direction in which the liquid crystal molecules near the alignment restricting portion tilt to be restricted. As a result, the force to restrict the alignment of the liquid crystal molecules near the alignment restricting portion can be increased, and accordingly the tilted state of the liquid crystal molecules near the alignment restricting portion can be restricted in a sure manner. Thus, the problem where dark lines occur at portions of the image corresponding to the trunk ridge when displaying images can be suppressed in a sure manner. Accordingly, a liquid crystal display device can be provided which realizes better light transmittance which is even more uniform while maintaining good voltage responsivity, reduction in cost of the light source making up the backlight and reduction in electric power consumption can be realized, and reliability of TFTs can be improved.

The liquid crystal display device according to Embodiment 3B of the present disclosure including the above-described preferred arrangements may be configured such that a slit portion or protrusion passing through the center of the pixel parallel to the perimeter portions of the pixel is formed at the first electrode. Electrodes are not formed at the slit portions or protrusions. Forming a slit portion or protrusion at the first electrode, passing through the center of the pixel parallel to the perimeter portions of the pixel, causes an electric field generated by the first electrode to be distorted near the slit portion, or the direction in which the liquid crystal molecules tilt to be restricted near the protrusion, in comparison with a case where a smooth groove having no slit portion or protrusion formed thereat is formed at the first electrode. This enables the force to restrict the alignment of the liquid crystal molecules near the slit portion or protrusion to be increased, and accordingly restrict the tilted state of the liquid crystal molecules near the slit portion or protrusion in a sure manner. Thus, the problem where dark lines occur at portions of the image corresponding to the trunk ridge when displaying images can be suppressed in a sure manner. Accordingly, a liquid crystal display device can be provided which realizes better light transmittance which is even more uniform while maintaining good voltage responsivity, reduction in cost of the light source making up the backlight and reduction in electric power consumption can be realized, and reliability of TFTs can be improved.

Also, the liquid crystal display device according to Embodiment 3 of the present disclosure may be configured such that multiple stepped portions are formed in the ridges provided to the first electrode. This arrangement will be referred to as "liquid crystal display device according to Embodiment 3C of the present disclosure" for brevity. Forming multiple stepped portions (difference in height) at the ridges causes difference in intensity of the electric field at the ridges, or transverse electric field, to occur. This enables the force to restrict the alignment of the liquid crystal molecules at the ridges to be increased, and accordingly restrict the tilted state of the liquid crystal molecules at the ridges in a sure manner. Thus, the problem where dark lines occur at portions of the image corresponding to the trunk ridge when displaying images can be suppressed in a sure manner. Accordingly, a liquid crystal display device can be provided which realizes even better light transmittance while maintaining good voltage responsivity, reduction in cost of the light source making up the backlight and reduction in electric power consumption can be realized, and reliability of TFTs can be improved.

Alternatively, the liquid crystal display device according to Embodiment 3 of the present disclosure may be configured such that a ridge structure is formed from portions of the first substrate between pixels, to portions of the first substrate corresponding to the peripheral portion of the pixels, and peripheral portions of the ridge-and-groove portions are formed on the ridge structure. The liquid crystal display device of this configuration will be referred to as "liquid crystal display device according to Embodiment 3D of the present disclosure" for brevity.

Forming the peripheral portions of the ridge-and-groove portions on the ridge structure in this way generates an even greater electric field at the perimeter portions of the ridge-and-groove portion, than an arrangement where the peripheral portions of the ridge-and-groove portions are flat. This enables the force to restrict the alignment of the liquid crystal molecules at the peripheral portions of the ridge-and-groove portions to be increased, and accordingly restrict the tilted state of the liquid crystal molecules at the peripheral portions of the ridge-and-groove portions in a sure manner, thus maintaining good voltage responsivity.

The liquid crystal display device according to Embodiment 3C of the present disclosure may be configured such that the ridge-and-groove portion includes a trunk ridge passing through the center of a pixel and extending in a cross shape, and multiple branch ridges extending toward the perimeter of the pixel from the trunk ridge. The liquid crystal display device of this configuration will be referred to as "liquid crystal display device according to Embodiment 3C-1 of the present disclosure" for brevity. Note that the liquid crystal display device according to Embodiment 3C-1 of the present disclosure is essentially a combination of the liquid crystal display device according to Embodiment 3A of the present disclosure and the liquid crystal display device according to Embodiment 3C of the present disclosure.

The liquid crystal display device according to Embodiment 3C-1 of the present disclosure including the above-described preferred arrangements may be configured such that the cross-sectional shape of the trunk ridge, when cut along an imaginary perpendicular plane orthogonal to the direction in which the trunk ridge extends is a shape stepping down from the center of the cross-sectional shape of the trunk ridge towards the edges thereof. The liquid crystal display device according to Embodiment 3C-1 of the present disclosure including the above-described preferred arrangements may also be configured such that the cross-sectional shape of the trunk ridge when cut along an imaginary perpendicular plane parallel to the direction in which the trunk ridge extends is a shape stepping down from the portions of the cross-sectional shape of the trunk ridge closer to the middle portion of the cross-sectional shape of the trunk ridge toward the ends of the cross-sectional shape of the trunk ridge.

Further, the liquid crystal display device according to Embodiment 3C-1 of the present disclosure including the above-described preferred arrangements may be configured such that the cross-sectional shape of the branch ridges, when cut along an imaginary perpendicular plane orthogonal to the direction in which the branch ridges extend is a shape stepping down from the center of the cross-sectional shape of the branch ridges towards the edges thereof. The liquid crystal display device according to Embodiment 3C-1 of the present disclosure including the above-described preferred arrangements may also be configured such that the cross-sectional shape of the branch ridges when cut along an imaginary perpendicular plane parallel to the direction in which the branch ridges extend is a shape stepping down from the portions of the cross-sectional shape of the branch ridges closer to the trunk ridge toward the ends of the cross-sectional shape of the branch ridges.

Further, the liquid crystal display device according to Embodiment 3C-1 of the present disclosure including the above-described preferred arrangements may have an alignment restricting portion formed at the portion of the second electrode which corresponds to the trunk ridge. The liquid crystal display device according to Embodiment 3A of the present disclosure or Embodiment 3C-1 of the present disclosure may be configured such that the alignment restricting portion is formed of a slit portion provided to the second electrode, or is formed of a protruding portion provided to the second electrode, or from a protruding portion of the second electrode. The protrusion is formed of a resist material for example, and the second electrode is not formed thereupon. A portion of the second electrode formed into a protruding portion may be formed by forming a ridge portion beneath the second electrode, or protruding portion of the second electrode may be formed by a method similar to the method by which the ridge-and-groove portions are formed at the first electrode. The slit portions, protruding portions, or portions of the second electrode that are protruding, in the liquid crystal display device according to Embodiment 3C-1 of the present disclosure, are preferably formed so as to be narrower than the width of the trunk ridge. The same can be applied to the later-described liquid crystal display device according to Embodiment 3D-1 of the present disclosure.

Alternatively, the liquid crystal display device according to Embodiment 3C of the present disclosure may be configured such that the ridge-and-groove portion includes a trunk ridge formed in a frame shape on the perimeter of the pixel, and multiple branch ridges extending from the trunk ridge toward the inside of the pixel. The liquid crystal display device of this configuration will be referred to as "liquid crystal display device according to Embodiment 3C-2 of the present disclosure" for brevity. Note that the liquid crystal display device according to Embodiment 3C-2 of the present disclosure is essentially a combination of the liquid crystal display device according to Embodiment 3B of the present disclosure and the liquid crystal display device according to Embodiment 3C of the present disclosure.

The liquid crystal display device according to Embodiment 3C-2 of the present disclosure including the above-described preferred arrangements may be configured such that the cross-sectional shape of the trunk ridge, when cut along an imaginary perpendicular plane orthogonal to the direction in which the trunk ridge extends, is a shape stepping down from the outer edge of the cross-sectional shape of the trunk ridge towards the inner side of the cross-sectional shape of the trunk ridge.

Further, the liquid crystal display device according to Embodiment 3C-2 of the present disclosure including the above-described preferred arrangements may be configured such that the cross-sectional shape of the branch ridges, when cut along an imaginary perpendicular plane orthogonal to the direction in which the branch ridges extend is a shape stepping down from the center of the cross-sectional shape of the branch ridges towards the edges thereof. The liquid crystal display device according to Embodiment 2C-2 of the present disclosure including the above-described preferred arrangements may also be configured such that the cross-sectional shape of the branch ridges when cut along an imaginary perpendicular plane parallel to the direction in which the branch ridges extend is a shape stepping down from the portions of the cross-sectional shape of the branch ridges closer to the trunk ridge toward the ends of the cross-sectional shape of the branch ridges.

Moreover, the liquid crystal display device according to Embodiment 3C-2 of the present disclosure including the above-described preferred arrangements may be configured such that a slit portion or a protrusion, passing through the center of the pixel in parallel to the perimeter of the pixel, is formed on the first electrode. No electrode is formed on the slit portion or protrusion. The protrusion is formed of a resist material for example, in the liquid crystal display device according to Embodiment 3B of the present disclosure or liquid crystal display device according to Embodiment 3C-2 of the present disclosure.

Alternately, the first electrode may be arranged so that a cross-shaped ridge passing through the center of the pixel is surrounded by grooves. Such a cross-shaped ridge may be formed by forming a cross-shaped ridge beneath the first electrode, or may be formed by a method similar to the method by which the ridge-and-groove portions are formed at the first electrode. Alternately, a cross-shaped groove passing through the center of the pixel may be provided instead of providing the slit portion or protrusion (rib). This can be similarly applied to the later-described liquid crystal display device according to Embodiment 3D-2 of the present disclosure.

Furthermore, the liquid crystal display device according to Embodiment 3C of the present disclosure including the above-described preferred arrangements, may be configured such that the ridge structure is formed from portions of the first substrate between pixels, to portions of the first substrate corresponding to the peripheral portion of the pixels, and peripheral portions of the ridge-and-groove portions are formed on the ridge structure. Note that the ridge structure may be formed based on a black matrix formed of a material according to the related art. This can be similarly applied to the liquid crystal display device according to Embodiment 3D of the present disclosure including the above-described preferred arrangements.

The liquid crystal display device according to Embodiment 3D of the present disclosure may be configured such that the ridge-and-groove portion includes a trunk ridge passing through the center of a pixel and extending in a cross shape, and multiple branch ridges extending toward the perimeter of the pixel from the trunk ridge. The liquid crystal display device of this configuration will be referred to as "liquid crystal display device according to Embodiment 3D-1 of the present disclosure" for brevity. Note that the liquid crystal display device according to Embodiment 3D-1 of the present disclosure is essentially a combination of the liquid crystal display device according to Embodiment 3A of the present disclosure, the liquid crystal display device according to Embodiment 3C of the present disclosure, and the liquid crystal display device according to Embodiment 3D of the present disclosure.

The liquid crystal display device according to Embodiment 3D-1 of the present disclosure including the above-described preferred arrangements may have an alignment restricting portion formed at the portion of the second electrode which corresponds to the trunk ridge. An arrangement may be made where the alignment restricting portion is formed of a slit portion provided to the second electrode, or is formed of a protruding portion provided to the second electrode.

The liquid crystal display device according to Embodiment 3D of the present disclosure may be configured such that the ridge-and-groove portion includes a trunk ridge formed in a frame shape on the perimeter of the pixel, and multiple branch ridges extending from the trunk ridge toward the inside of the pixel. Such a configuration will be referred to as "liquid crystal display device according to Embodiment 3D-2 of the present disclosure" for brevity. Note that the liquid crystal display device according to Embodiment 3D-2 of the present disclosure is essentially a combination of the liquid crystal display device according to Embodiment 3B of the present disclosure, the liquid crystal display device according to Embodiment 3C of the present disclosure, and the liquid crystal display device according to Embodiment 3D of the present disclosure.

The liquid crystal display device according to Embodiment 3D-2 of the present disclosure including the above-described preferred arrangements may be configured such that a slit portion or protrusion passing through the center of the pixel parallel to the perimeter portions of the pixel is formed at the first electrode.

Also, the liquid crystal display device according to Embodiment 3 of the present disclosure may be configured such that a black matrix is formed so that the projected image of the black matrix overlaps with the projected image of the portion of the first substrate which is situated between pixels, or such that a black matrix is formed so that the projected image of the black matrix overlaps with the projected image of a region from the portion of the first substrate which is situated between pixels up to the edge of the ridge-and-groove portion.

Exemplary values for the average smallest width and average greatest width of the branch ridges and grooves may be 1 μm to 25 μm, and more preferably 2 μm to 20 μm. In a case where the average smallest width of the branch ridges and grooves is smaller than 1 μm, formation of the branch ridges and grooves becomes difficult, making it harder to secure sufficient manufacturing yield. On the other hand, if the average greatest width of the branch ridges and grooves exceeds 25 μm, there may be cases where a good oblique electric field is not readily generated between the first electrode and second electrode when driving voltage is applied at the first electrode and second electrode.

Exemplary values for the width of the trunk ridge may be $2 \times 10^{-6}$ m to $2 \times 10^{-5}$ m, and more preferably $4 \times 10^{-6}$ m to $1.5 \times 10^{-5}$ m. Exemplary values for the height from a groove to the ridge closest to the groove may be $5 \times 10^{-8}$ m to $1 \times 10^{-6}$ m, preferably $1 \times 10^{-7}$ m to $5 \times 10^{-6}$ m, and more preferably $2 \times 10^{-7}$ m to $6 \times 10^{-7}$ m. Exemplary values for the height of each step of a ridge (difference in height between adjacent top faces in a ridge having a stepped portion) may be $5 \times 10^{-8}$ m to $1 \times 10^{-6}$ m, and more preferably $1 \times 10^{-7}$ m to $5 \times 10^{-7}$ m. This enables good alignment control, and sufficient manufacturing yield can be secured, while preventing deterioration in light transmittance and longer process times. The above can also be applied to liquid crystal display devices according to Embodiment 4A of the present disclosure through Embodiment 4E of the present disclosure, by substituting later-described "branch ridges, etc." for "branch ridges".

Alternatively, the liquid crystal display device according to Embodiment 1 of the present disclosure is configured such that, assuming an X axis and Y axis passing through the center of the pixel, multiple branch ridges occupying a first quadrant extend in parallel in a direction where the value of the Y coordinate increases when the value of the X coordinates increases, and multiple branch ridges occupying a second quadrant extend in parallel in a direction where the value of the Y coordinate increases when the value of the X coordinates decreases. Also, multiple branch ridges occupying a third quadrant extend in parallel in a direction where the value of the Y coordinate decreases when the value of the X coordinates decreases, and multiple branch ridges occupying a fourth quadrant extend in parallel in a direction where the value of the Y coordinate decreases when the value of the X coordinates increases. Such a configuration will be referred to as "liquid crystal display device according to Embodiment 4A of the present disclosure" for brevity.

The liquid crystal display device according to Embodiment 4A of the present disclosure is configured such that multiple ridges occupying a first quadrant extend in parallel in a direction where the value of the Y coordinate increases when the value of the X coordinates increases. Also, multiple ridges occupying a second quadrant extend in parallel in a direction where the value of the Y coordinate increases when the value of the X coordinates decreases. Further, multiple ridges occupying a third quadrant extend in parallel in a direction where the value of the Y coordinate decreases when the value of the X coordinates decreases. Moreover, multiple ridges occupying a fourth quadrant extend in parallel in a direction where the value of the Y coordinate decreases when the value of the X coordinates increases. Thus, there are absolutely no ridges extending in parallel with the X axis or ridges extending in parallel with the Y axis, or even if there are, the length thereof is extremely minute. Accordingly, the direction of alignment of the liquid crystal molecules can be made to maximally match the direction in which the ridges extend, and occurrence of dark lines in regions corresponding to the X axis and Y axis can be suppressed. Consequently, a liquid crystal display device capable of high light transmittance which is even more uniform can be realized. Additionally, a liquid crystal display device having a configuration and structure can be provided whereby the liquid crystal molecules can be pretilted in a short amount of time.

Alternatively, the liquid crystal display device according to Embodiment 1 of the present disclosure may be configured such that, assuming an X axis and Y axis passing through the center of the pixel, multiple ridge-and-groove portions include a trunk ridge extending along the X axis and Y axis, and multiple branch ridges extending from the longitudinal sides of the trunk ridge towards the perimeter of the pixel. The direction in which longitudinal side portions of the trunk ridge where branch ridges are not joined extend is parallel with neither the X axis nor the Y axis. Also, a liquid crystal display device having a configuration and structure enabling the liquid crystal molecules to be pretilted in a short amount of time can be provided.

The liquid crystal display device according to Embodiment 4B of the present disclosure is configured such that multiple ridge-and-groove portions include a trunk ridge extending along the X axis and Y axis, and multiple branch ridges extending from the longitudinal sides of the trunk ridge towards the perimeter of the pixel. The direction in which longitudinal side portions of the trunk ridge where branch ridges are not joined extend is parallel with neither the X axis nor the Y axis. Thus, there are no trunk ridge portions extending in parallel with the X axis or trunk ridge portions extending in parallel with the Y axis. Accordingly, occurrence of dark lines in regions corresponding to the X axis and Y axis can be suppressed. Consequently, a liquid crystal display device capable of high light transmittance which is even more uniform can be realized. Additionally, a liquid crystal display device having a configuration and structure can be provided whereby the liquid crystal molecules can be pretilted in a short amount of time.

Alternatively, the liquid crystal display device according to Embodiment 1 of the present disclosure may be configured such that slit portions are further formed at the first electrode. That is to say, ridge-and-groove portions and slit portions are formed at the first electrode. No transparent electroconductive material layer making up the first electrode is formed at the slit portions. Such a configuration will be referred to as "liquid crystal display device according to Embodiment 4C of the present disclosure" for brevity.

Alternatively, the liquid crystal display device according to Embodiment 1 of the present disclosure may be configured such that an indentation is further formed at the first electrode, in the center region of the pixel. That is to say, ridge-and-groove portions and an indentation are formed at the first electrode. A transparent electroconductive material layer making up the first electrode is formed at the indentation. Such a configuration will be referred to as "liquid crystal display device according to Embodiment 4D of the present disclosure" for brevity.

Alternatively, the liquid crystal display device according to Embodiment 1 of the present disclosure may be configured such that, assuming an X axis and Y axis passing through the center of the pixel, the multiple ridge-and-groove portions are configured including trunk ridges extending on the X axis and the Y axis, and multiple branch ridges extending from a longitudinal side of the trunk ridges toward the perimeter of the pixel. Multiple branch ridges occupying a first quadrant extend in parallel in a direction where the value of the Y coordinate increases when the value of the X coordinates increases. Also, multiple branch ridges occupying a second quadrant extend in parallel in a direction where the value of the Y coordinate increases when the value of the X coordinates decreases. Further, multiple branch ridges occupying a third quadrant extend in parallel in a direction where the value of the Y coordinate decreases when the value of the X coordinates decreases. Moreover, multiple branch ridges occupying a fourth quadrant extend in parallel in a direction where the value of the Y coordinate decreases when the value of the X coordinates increases. Branch ridges extending from a trunk ridge on the X axis and occupying the first quadrant, and branch ridges extending from a trunk ridge on the X axis and occupying the fourth quadrant, are formed in a mutually offset state. Branch ridges extending from a trunk ridge on the Y axis and occupying the first quadrant, and branch ridges extending from a trunk ridge on the Y axis and occupying the second quadrant, are formed in a mutually offset state. Branch ridges extending from a trunk ridge on the X axis and occupying the second quadrant, and branch ridges extending from a trunk ridge on the X axis and occupying the third quadrant, are formed in a mutually offset state. Also, branch ridges extending from a trunk ridge on the Y axis and occupying the third quadrant, and branch ridges extending from a trunk ridge on the Y axis and occupying the fourth quadrant, are formed in a mutually offset state. Such a configuration will be referred to as "liquid crystal display device according to Embodiment 4E of the present disclosure" for brevity.

Slit portions are formed at the first electrode of the liquid crystal display device according to Embodiment 4C of the present disclosure, besides the ridge-and-groove portions. Providing the slit portions causes an electric field generated by the first electrode to be distorted near the slit portions, and the direction in which the liquid crystal molecules tilt is strongly restricted. This consequently enables the force to restrict the alignment of the liquid crystal molecules near the slit portions to be increased, and accordingly restrict the tilted state of the liquid crystal molecules near the slit portions in a sure manner. Note that the ridge-and-groove portions are also provided besides the slit portions, so the problems with fine-slit structures according to the related art do not occur.

Also, the liquid crystal display device according to Embodiment 4D of the present disclosure is configured having an indentation formed to the first electrode at the center region of the pixel. Providing the indentation causes the liquid crystal molecules situated near the indentation to be tilted toward the center of the pixel.

Moreover, the liquid crystal display device according to Embodiment 4E of the present disclosure is configured such that ridges are mutually offset. Forming the ridges mutually offset causes the electric field generated by the first electrode to be distorted in a desired manner near the center of the pixel, and the direction in which the liquid crystal molecules tilt is restricted. As a result, the force to restrict the alignment of the liquid crystal molecules near the center of the pixel can be increased, and accordingly the tilted state of the liquid crystal molecules near the center of the pixel can be restricted in a sure manner. The liquid crystal layer where the liquid crystal molecules are to be pretilted are exposed to a desired electric field for a predetermined amount of time when manufacturing the liquid crystal display device, and the amount of time it takes for the alignment of the liquid crystal molecules exposed to the desired electric field to stabilize can thus be reduced. That is to say, the liquid crystal molecules can be pretilted in a short amount of time, and the manufacturing time of the liquid crystal display device can be reduced.

Such an array state of the ridges and branch ridges (hereinafter also collectively referred to as "branch ridges, etc.) of the liquid crystal display devices according to Embodiment 4A of the present disclosure through Embodiment 4E of the present disclosure is called a multi-domain electrode structure, as mentioned earlier. Improved view angle properties can be realized since regions with different directions in which the branch ridges extend are formed in a single pixel.

Preferably, in the same way as described above, the multiple branch ridges occupying the first quadrant extend with the axial line thereof at 45 degrees to the X axis, the multiple branch ridges occupying the second quadrant extend with the axial line thereof at 135 degrees to the X axis. Also, the multiple branch ridges occupying the third quadrant extend with the axial line thereof at 225 degrees to the X axis, and the multiple branch ridges occupying the fourth quadrant extend with the axial line thereof at 315 degrees to the X axis, but it should be noted that these values (angles) are not restrictive.

The phrase "assuming an X axis and Y axis passing through the center of the pixel" in more detail means assuming an X-Y coordinate system in which straight lines that pass through the center of the pixel and that are parallel to the perimeters of the pixel are the X axis and Y axis. With the exception of the liquid crystal display device according to Embodiment 4E of the present disclosure, the branch ridges, etc., are preferably in line symmetry to the X axis and also the Y axis. Alternatively, the branch ridges, etc., of the liquid crystal display device according to Embodiment 4A of the present disclosure through Embodiment 4E of the present disclosure are preferably in 180 degrees rotational symmetry (point symmetry) as to the center of the pixel.

Unlike the case of the liquid crystal display device according to Embodiment 4B of the present disclosure, the liquid crystal display device according to Embodiment 4A of the present disclosure is not provided with the trunk ridges. An arrangement may be made where the ridges in the liquid crystal display device according to Embodiment 4A of the present disclosure are essentially equivalent to the branch ridges in the liquid crystal display device according to Embodiment 4B of the present disclosure. Further, ridges extending from the X axis and occupying the first quadrant connect to respective ridges extending from the X axis and occupying the fourth quadrant, and ridges extending from the Y axis and occupying the first quadrant connect to respective ridges extending from the Y axis and occupying the second quadrant. Also, ridges extending from the X axis and occupying the second quadrant connect to respective ridges extending from the X axis and occupying the third quadrant, and ridges extending from the Y axis and occupying the third quadrant connect to respective ridges extending from the Y axis and occupying the fourth quadrant.

Protruding portions which extend in planar view toward the perimeter of the pixel are provided at joining portions where two ridges join, in an arrangement such as that of the liquid crystal display device according to Embodiment 4A of the present disclosure. The protruding portions may each be defined by multiple line segments, or by a single curve, or by multiple curves, or by a combination of one or more line segments and one or more curves. The tip of the protruding portion may be in contact with the joining portion of the two ridges adjacent toward the perimeter of the pixel. Note however, that a liquid crystal display device in which the joining portion is long is essentially the liquid crystal display device according to Embodiment 4B of the present disclosure.

Alternatively, the liquid crystal display device according to Embodiment 4A of the present disclosure may be configured such that ridges extending from the X axis or nearby the X axis and occupying the first quadrant do not connect to respective ridges extending from the X axis or nearby the X axis and occupying the fourth quadrant. Also, ridges extending from the Y axis or nearby the Y axis and occupying the first quadrant do not connect to respective ridges extending from the Y axis or nearby the Y axis and occupying the second quadrant. Further, ridges extending from the X axis or nearby the X axis and occupying the second quadrant do not connect to respective ridges extending from the X axis or nearby the X axis and occupying the third quadrant. Moreover, ridges extending from the Y axis or nearby the Y axis and occupying the third quadrant do not connect to respective ridges extending from the Y axis or nearby the Y axis and occupying the fourth quadrant.

The liquid crystal display device according to Embodiment 4A of the present disclosure, including the above-described various preferred arrangements and configurations, may be configured such that the width of the ridges grow narrower toward the perimeter of the pixel. The liquid crystal display device according to Embodiment 4A of the present disclosure, including the above-described various preferred arrangements and configurations, may also be configured such that slit portions are formed at the first electrode. This arrangement will be referred to as "liquid crystal display device according to Embodiment 4A-1 of the present disclosure" for brevity.

Slit portions may be formed in groove regions of the liquid crystal display device according to Embodiment 4A-1 of the present disclosure. However, a configuration where the slit portions are formed to ridge regions is more preferable. In such a configuration, slit portions may be formed at ridge regions including the center region (middle portion) of the pixel, or may be formed at ridge regions extending toward the center region of the pixel, or may be formed at ridge regions between ridges extending toward the center region of the pixel and the Y axis. Exemplary values of the width of the slit portions are 1 μm to 4 μm, and preferably 2 μm to 3 μm. This holds true for description of slit portions in the following as well.

Alternatively, slit portions may be formed on the top of ridges, extending in parallel with the ridges, or slit portions may be formed on the bottom of grooves, extending in parallel with the grooves. In these cases, slit portions may be formed to all ridges, or to a part of the ridges. In a case where the slit portions are to be formed to a part of the ridges, the slit portions are preferably formed at and nearby the center region (middle portion) of the pixel. Also, slit portions may be formed to all grooves, or to a part of the grooves. In a case where the slit portions are to be formed to a part of the grooves, the slit portions are preferably formed at and nearby the center region (middle portion) of the pixel. Further, slit portions may be formed on the top of ridges extending in parallel with the ridges, and on the bottom of grooves extending in parallel with the grooves. In these cases, slit portions may be formed to all ridges, or to a part of the ridges, and slit portions may be formed to all grooves, or to a part of the grooves.

Note that the first electrode is formed at top face of the ridges where no slit portion is provided, and also the first electrode is formed at the bottom of the grooves where no slit portion is provided. The slit portions have to be formed such that there are no ridges isolated from other ridges by slit portions, and such that there are no grooves isolated from other grooves by slit portions. In doing so in a display device according to the so-called "multi-pixel drive" method where each pixel is divided into multiple regions and each region is independently driven, the slit portions only have to be formed such that there are no ridges isolated from other ridges and no grooves isolated from other grooves by slit portions in each region.

Exemplary values of the width of ridges and slit portions when providing slit portions on the top face of ridges may be as expressed by $$0.2 \leq (\text{width of slit portion}/\text{width of ridge}) \leq 0.8.$$

Exemplary values of the width of grooves and slit portions when providing slit portions at the bottom of grooves may be as expressed by $$0.2 \leq (\text{width of slit portion}/\text{width of groove}) \leq 0.8.$$

This holds true for description of slit portions in the following as well.

Further, an indentation may be provided to the first electrode at the center region of the pixel in the liquid crystal display devices according to Embodiment 4A-1 of the present disclosure, and Embodiment 4A of the present disclosure including the above-described various preferred arrangements and configurations. Such an arrangement will be referred to as "liquid crystal display device according to Embodiment 4A-2 of the present disclosure" for brevity.

The liquid crystal display device according to Embodiment 4A-2 of the present disclosure may be configured such that the indentation is narrowed toward the first substrate. That is to say, the indentation may have a forward-tapered inclination, but is not restricted to this, and may have a perpendicular face. In a configuration where the indentation is narrowed toward the first substrate, the inclination angle of the indentation may be 5 degrees to 60 degrees, more preferably 20 degrees to 30 degrees. Further, in the liquid crystal display device according to Embodiment 4A-2 of the present disclosure including these preferred configurations, the shape of the edge of the indentation may be circular, or may be rectangular. In the case of the latter, the angle between the outer edge of the rectangular indentation and the direction in which the ridges extend (the angle between the outer edge of the rectangular groove and the direction in which ridges of which extensions intersect this outer edge) may be 90 degrees, or may be an acute angle. Note that the shape of the outer edge of the indentation is not restricted to theses, and any shape may be used as long as the structure causes the liquid crystal molecules to tilt toward the center of the pixel.

Further, the liquid crystal display device according to Embodiment 4A-2 of the present disclosure including the above-described preferred configurations may be configured such that the center portion of the indentation forms part of a contact hole.

The stipulations relating to the above-described liquid crystal display device according to Embodiment 4A-2 of the present disclosure can also be applied to the later-described liquid crystal display device according to Embodiment 4B-2 of the present disclosure and the liquid crystal display device according to Embodiment 4C-2 of the present disclosure as well.

Further, the liquid crystal display device according to Embodiment 4A-1 of the present disclosure, Embodiment 4A-2 of the present disclosure, and Embodiment 4A of the present disclosure including the above-described various preferred arrangements and configurations, may be configured as follows. Ridges extending from or nearby the X axis and occupying the first quadrant, and ridges extending from or nearby the X axis and occupying the fourth quadrant, are formed in a mutually offset state. Also, ridges extending from or nearby the Y axis and occupying the first quadrant, and ridges extending from or nearby the Y axis and occupying the second quadrant, are formed in a mutually offset state. Further, ridges extending from or nearby the X axis and occupying the second quadrant, and ridges extending from or nearby the X axis and occupying the third quadrant, are formed in a mutually offset state. Moreover, ridges extending from or nearby the Y axis and occupying the third quadrant, and ridges extending from or nearby the Y axis and occupying the fourth quadrant, are formed in a mutually offset state. Such an arrangement will be referred to as "liquid crystal display device according to Embodiment 4A-3 of the present disclosure" for brevity.

Preferably, ridges extending from or nearby the X axis and occupying the first quadrant, and ridges extending from or nearby the X axis and occupying the fourth quadrant, are formed in a mutually offset state by ($P_X/2$), where $P_X$ represents the formation pitch of the ridges following the X axis, and $P_Y$ represents the formation pitch of the ridges following the Y axis. Also, ridges extending from or nearby the Y axis and occupying the first quadrant, and ridges extending from or nearby the Y axis and occupying the second quadrant, are formed in a mutually offset state by ($P_Y/2$). Further, ridges extending from or nearby the X axis and occupying the second quadrant, and ridges extending from or nearby the X axis and occupying the third quadrant, are formed in a mutually offset state by ($P_X/2$). Moreover, ridges extending from or nearby the Y axis and occupying the third quadrant, and ridges extending from or nearby the Y axis and occupying the fourth quadrant, are formed in a mutually offset state by ($P_Y/2$). This holds true of the latter described liquid crystal display device according to Embodiment 4B-3 of the present disclosure, liquid crystal display device according to Embodiment 4C-3 of the present disclosure, and liquid crystal display device according to Embodiment 4D-3 of the present disclosure.

In the same way, the liquid crystal display device according to Embodiment 4E of the present disclosure may be configured such that branch ridges extending from a trunk ridge on the X axis and occupying the first quadrant, and branch ridges extending from a trunk ridge on the X axis and occupying the fourth quadrant, are formed in a mutually offset state by ($P_X/2$), where $P_X$ represents the formation pitch of the branch ridges following the X axis, and $P_Y$ represents the formation pitch of the branch ridges following the Y axis. Also, branch ridges extending from a trunk ridge on the Y axis and occupying the first quadrant, and branch ridges extending from a trunk ridge on the Y axis and occupying the second quadrant, are formed in a mutually offset state by ($P_Y/2$). Further, branch ridges extending from a trunk ridge on the X axis and occupying the second quadrant, and branch ridges extending from a trunk ridge on the X axis and occupying the third quadrant, are formed in a mutually offset state by ($P_X/2$). Moreover, branch ridges extending from a trunk ridge on the Y axis and occupying the third quadrant, and branch ridges extending from a trunk ridge on the Y axis and occupying the fourth quadrant, are formed in a mutually offset state by ($P_Y/2$).

The liquid crystal display device according to Embodiment 4B of the present disclosure including the preferred arrangements may be configured having an arrangement where the longitudinal side portions of the trunk ridges not joining the ridge portions are straight lines and/or curves. Alternatively, and arrangement may be made where these longitudinal side portions are straight lines, or an arrangement where these longitudinal side portions are curves, or an arrangement where these longitudinal side portions are combinations of straight lines and curves.

The liquid crystal display device according to Embodiment 4B of the present disclosure including the preferred arrangements may be configured such that the width of the portions of a trunk ridge which are not in contact with the branch ridges narrows toward the end of the trunk ridge. Further, The liquid crystal display device according to Embodiment 4B of the present disclosure including the preferred arrangements may be configured such that the width of the branch ridges narrows toward the perimeter of the pixel.

Further, slit portions may be formed at the first electrode in the liquid crystal display device according to Embodiment 4B of the present disclosure including the above-described various preferred arrangements. Such an arrangement will be referred to as "liquid crystal display device according to Embodiment 4B-1 of the present disclosure" for brevity.

Slit portions may be formed in groove regions of the liquid crystal display device according to Embodiment 4B-1 of the present disclosure. However, a configuration where the slit portions are formed to ridge regions is more preferable. In such a configuration, slit portions may be formed at ridge regions including the center region (middle portion) of the pixel, or may be formed at ridge regions extending toward the center region of the pixel, or may be formed at ridge regions between branch ridges extending toward the center region of the pixel and the Y axis. Alternatively, slit portions may be formed on the top of ridges, extending in parallel with the ridges, or slit portions may be formed on the bottom of grooves, extending in parallel with the grooves. The slit portions have to be formed such that there are no ridges isolated from other ridges by slit portions, and such that there are no grooves isolated from other grooves by slit portions, but the slit portions can be formed as described above in a display device according to the multi-pixel drive method.

Further, an indentation may be provided to the first electrode at the center region of the pixel in the liquid crystal display devices according to Embodiment 4B-1 of the present disclosure, and Embodiment 4B of the present disclosure including the above-described various preferred arrangements and configurations. Such an arrangement will be referred to as "liquid crystal display device according to Embodiment 4B-2 of the present disclosure" for brevity.

The liquid crystal display device according to Embodiment 4B-1 of the present disclosure, Embodiment 4B-2 of the present disclosure, and Embodiment 4B of the present disclosure including the above described various preferred arrangements and configurations, may be configured as follows. Multiple branch ridges occupying a first quadrant extend in parallel in a direction where the value of the Y coordinate increases when the value of the X coordinates increases. Also, multiple branch ridges occupying a second quadrant extend in parallel in a direction where the value of the Y coordinate increases when the value of the X coordinates decreases. Further, multiple branch ridges occupying a third quadrant extend in parallel in a direction where the value of the Y coordinate decreases when the value of the X coordinates decreases. Moreover, multiple branch ridges occupying a fourth quadrant extend in parallel in a direction where the value of the Y coordinate decreases when the value of the X coordinates increases.

The liquid crystal display device according to Embodiment 4B-1 of the present disclosure, Embodiment 4B-2 of the present disclosure, and Embodiment 4B of the present disclosure including the above described various preferred arrangements and configurations, may further be configured as follows. Branch ridges extending from a trunk ridge on the X axis and occupying the first quadrant, and branch ridges extending from a trunk ridge on the X axis and occupying the fourth quadrant, are formed in a mutually offset state. Branch ridges extending from a trunk ridge on the Y axis and occupying the first quadrant, and branch ridges extending from a trunk ridge on the Y axis and occupying the second quadrant, are formed in a mutually offset state. Branch ridges extending from a trunk ridge on the X axis and occupying the second quadrant, and branch ridges extending from a trunk ridge on the X axis and occupying the third quadrant, are formed in a mutually offset state. Also, branch ridges extending from a trunk ridge on the Y axis and occupying the third quadrant, and branch ridges extending from a trunk ridge on the Y axis and occupying the fourth quadrant, are formed in a mutually offset state. Such an arrangement will be referred to as "liquid crystal display device according to Embodiment 4B-3 of the present disclosure" for brevity.

Slit portions may be formed in groove regions of the liquid crystal display device according to Embodiment 4C of the present disclosure. However, a configuration where the slit portions are formed to ridge regions is more preferable. In such a configuration, slit portions may be formed at ridge regions including the center region (middle portion) of the pixel, or may be formed at ridge regions extending toward the center region of the pixel, or may be formed at ridge regions between ridges extending toward the center region of the pixel and the Y axis. Alternatively, slit portions may be formed on the top of ridges, extending in parallel with the ridges, or slit portions may be formed on the bottom of grooves, extending in parallel with the grooves. The slit portions have to be formed such that there are no ridges isolated from other ridges by slit portions, and such that there are no grooves isolated from other grooves by slit portions, but the slit portions can be formed as described above in a display device according to the multi-pixel drive method.

The liquid crystal display device according to Embodiment 4C of the present disclosure including the above-described preferred arrangements and configurations may be configured such that the width of ridges grows narrower toward the perimeter of the pixel.

Further, an indentation may be provided to the first electrode at the center region of the pixel in the liquid crystal display device according to Embodiment 4C of the present disclosure including the above-described preferred arrangements and configurations. Such an arrangement will be referred to as "liquid crystal display device according to Embodiment 4C-2 of the present disclosure" for brevity.

Further, the liquid crystal display device according to Embodiment 4C-2 of the present disclosure, and Embodiment 4C of the present disclosure including the above-described various preferred arrangements and configurations may be configured as follows. Assuming an X axis and Y axis passing through the center of the pixel, the multiple ridge-and-groove portions may be configured including trunk ridges extending on the X axis and the Y axis, and multiple branch ridges extending from a longitudinal side of the trunk ridges toward the perimeter of the pixel. In this case, multiple branch ridges occupying a first quadrant may extend in parallel in a direction where the value of the Y coordinate increases when the value of the X coordinates increases. Also, multiple branch ridges occupying a second quadrant extend in parallel in a direction where the value of the Y coordinate increases when the value of the X coordinates decreases. Further, multiple branch ridges occupying a third quadrant extend in parallel in a direction where the value of the Y coordinate decreases when the value of the X coordinates decreases. Moreover, multiple branch ridges occupying a fourth quadrant extend in parallel in a direction where the value of the Y coordinate decreases when the value of the X coordinates increases. Branch ridges extending from a trunk ridge on the X axis and occupying the first quadrant, and branch ridges extending from a trunk ridge on the X axis and occupying the fourth quadrant, are formed in a mutually offset state. Branch ridges extending from a trunk ridge on the Y axis and occupying the first quadrant, and branch ridges extending from a trunk ridge on the Y axis and occupying the second quadrant, are formed in a mutually offset state. Branch ridges extending from a trunk ridge on the X axis and occupying the second quadrant, and branch ridges extending a trunk ridge on nearby the X axis and occupying the third quadrant, are formed in a mutually offset state. Also, ridges extending from a trunk ridge on the Y axis and occupying the third quadrant, and branch ridges extending from a trunk ridge on the Y axis and occupying the fourth quadrant, are formed in a mutually offset state. Such an arrangement will be referred to as "liquid crystal display device according to Embodiment 4C-3 of the present disclosure" for brevity.

The liquid crystal display device according to Embodiment 4D of the present disclosure including the above-described preferred configurations may be configured such that the center portion of the indentation forms part of a contact hole. The stipulations relating to the above-described liquid crystal display device according to Embodiment 4A-2 of the present disclosure can also be applied to the liquid crystal display device according to Embodiment 4D of the present disclosure.

Further, the stipulations relating to the above-described liquid crystal display device according to Embodiment 4C-3 of the present disclosure can also be applied to the liquid crystal display device according to Embodiment 4D of the present disclosure including the above-described preferred arrangements. Such an arrangement will be referred to as "liquid crystal display device according to Embodiment 4D-3 of the present disclosure" for brevity.

The liquid crystal display device according to Embodiment 4A of the present disclosure through Embodiment 4E of the present disclosure including the above-described preferred arrangements and configurations may be configured as follows. The width of the branch ridges, etc., may grow linearly narrower toward the perimeter of the pixel (an arrangement where the longitudinal sides making up a branch ridge are each one line segment and the change in width is constant), but is not restricted to this. An arrangement may be made where the width of the branch ridges narrows in a curved manner (an arrangement where the longitudinal sides making up a branch ridge are each one smooth curve, and the change in width varies). Another arrangement may be made where the longitudinal sides making up a branch ridge are formed of two or more line segments or curves, and an arrangement may be made where the width of the branch ridges narrows in a stepped manner (an arrangement where the longitudinal sides making up a branch ridge are stepped).

The liquid crystal display device according to Embodiment 4A of the present disclosure through Embodiment 4E of the present disclosure including the above-described preferred arrangements and configurations may be configured such that an alignment restricting portion is formed at portions of the second electrode corresponding to the trunk ridge extending in the X axis and Y axis directions. Forming such an alignment restricting portion at portions of the second electrode corresponding to the trunk ridge causes an electric field generated by the second electrode to be distorted near the alignment restricting portion, and/or for the direction in which the liquid crystal molecules near the alignment restricting portion tilt to be restricted. As a result, the force to restrict the alignment of the liquid crystal molecules near the alignment restricting portion can be increased, and accordingly the tilted state of the liquid crystal molecules near the slit portions or protrusions can be restricted in a sure manner. Thus, the problem where dark lines occur at portions of the image corresponding to the X axis and Y axis when displaying images can be suppressed in a sure manner. Accordingly, a liquid crystal display device can be provided which realizes even better light transmittance while maintaining good voltage responsivity, reduction in cost of the light source making up the backlight and reduction in electric power consumption can be realized, and reliability of TFTs can be improved.

The alignment restricting portion may be formed of a second electrode slit portion provided to the second electrode, or formed of a second electrode protruding portion provided to the second electrode, or from a protruding portion of the second electrode. The second electrode protrusion is formed of a resist material for example, and the second electrode is not formed thereupon. A portion of the second electrode formed into a protruding portion may be formed by forming a ridge portion beneath the second electrode, or a protruding portion of the second electrode may be formed by a method similar to the method by which the ridge-and-groove portions are formed at the first electrode.

The liquid crystal display device according to Embodiment 4A of the present disclosure through Embodiment 4E of the present disclosure including the above-described preferred arrangements and configurations may be configured such that multiple stepped portions are formed at the ridges provided to the first electrode. The cross-sectional shape of a ridge, when cut along an imaginary perpendicular plane orthogonal to the direction in which the ridge extends, may be a shape stepping down from the center of the cross-sectional shape of the ridge towards the edge of the cross-sectional shape of the ridge. Also, the cross-sectional shape of a ridge, when cut along an imaginary perpendicular plane orthogonal to the direction in which the ridge extends may be a shape stepping down from the center of the cross-sectional shape of the ridge towards the end thereof.

Forming such multiple stepped portions (difference in height) at the ridges causes difference in intensity of the electric field at the ridges, or transverse electric field, to occur. This enables the force to restrict the alignment of the liquid crystal molecules at the ridges to be increased, and accordingly restrict the tilted state of the liquid crystal molecules at the ridges in a sure manner. Thus, the problem where dark lines occur at portions of the image corresponding to the ridges when displaying images can be suppressed in a sure manner. Accordingly, a liquid crystal display device can be provided which realizes better light transmittance which is even more uniform while maintaining good voltage responsivity, reduction in cost of the light source making up the backlight and reduction in electric power consumption can be realized, and reliability of TFTs can be improved.

Figure 84:
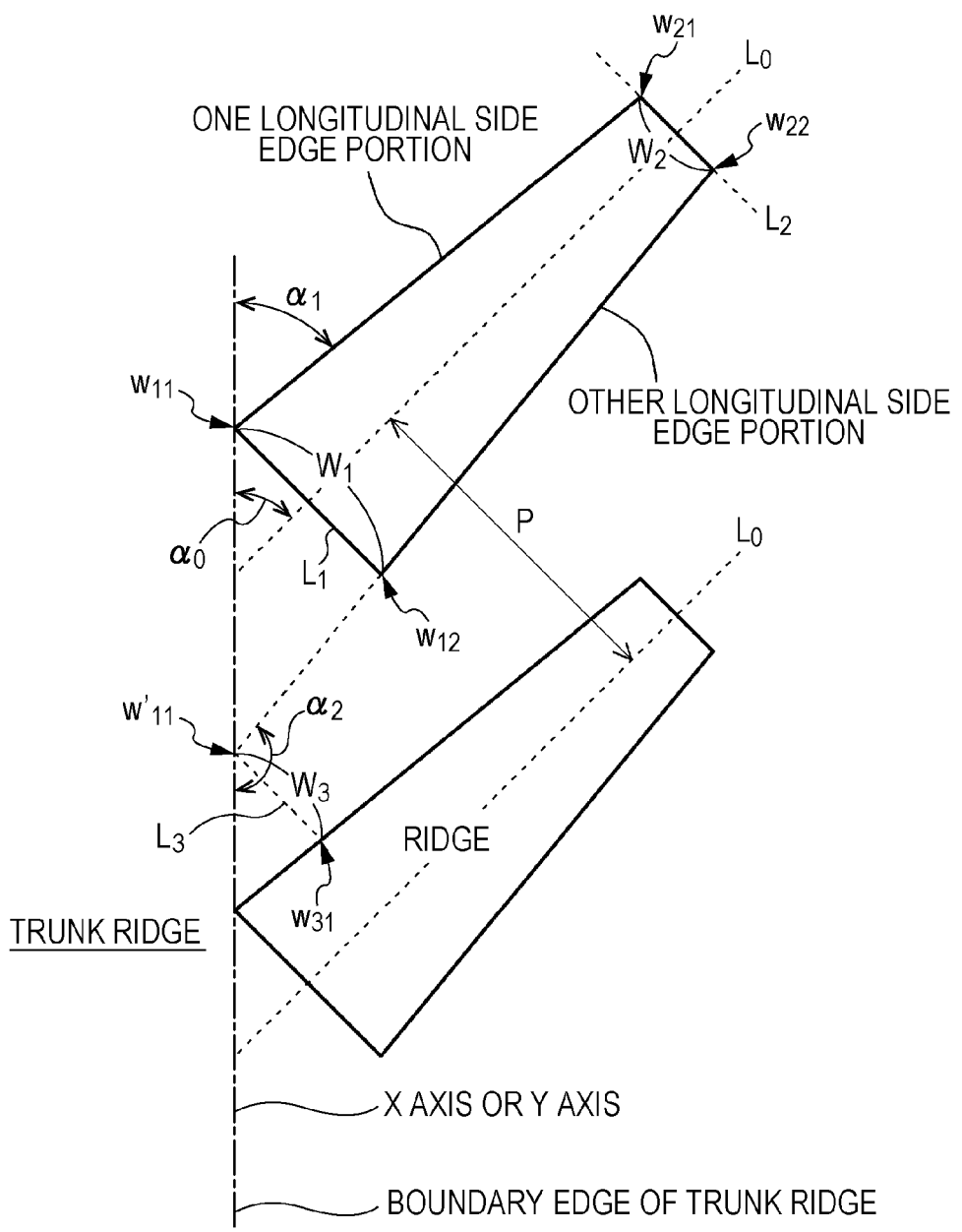
FIG. 84 is a schematic plan view of a part of ridges, to describe pitch of ridge formation, ridge width, width of tip portion of ridge, and so forth.
Figure 85:
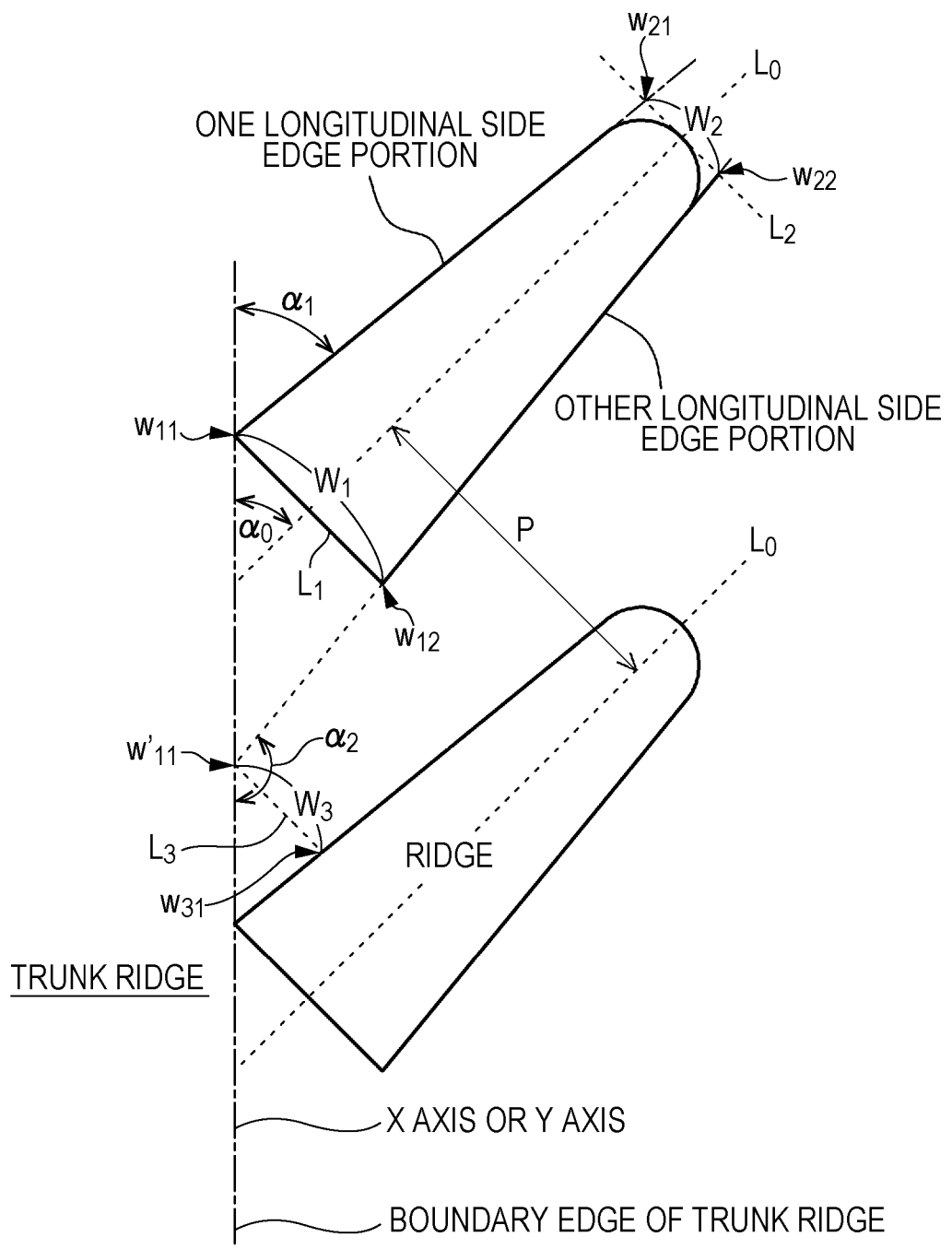
FIG. 85 is a schematic plan view of a part of ridges, to describe pitch of ridge formation, ridge width, width of tip portion of ridge, and so forth.

The liquid crystal display device according to Embodiment 3A of the present disclosure, Embodiment 3B of the present disclosure, and Embodiment 4A of the present disclosure through Embodiment 4E of the present disclosure, including the above-described preferred arrangements and configurations may be configured as follows. As described above, the width of the branch ridges, etc., may be the widest at the portion of the branch ridge where it joins the trunk ridge, or at or nearby the X axis, or at or nearby the Y axis (hereinafter referred to as "base portion of branch ridges, etc." for brevity), and narrow down toward the perimeter of the pixel, i.e., toward the tip of the branch ridges, etc. In the following description, "P" represents the pitch at which the branch ridges, etc., are formed, "$W_1$" represents the width of the base portion of the branch ridges, etc., and "$W_2$" represents the width of the tip of the branch ridges, etc. "$\alpha_1$" represents the angle formed between the boundary edge of the trunk ridge and one edge portion (longitudinal side edge portion) of a branch ridge, where the trunk ridge and branch ridge join (or the angle formed between one edge portion (longitudinal side edge portion)) of a branch ridge, etc., and the X axis or Y axis, as illustrated in FIGS. 84 and 85. "$\alpha_2$" represents the angle formed between the boundary edge of the trunk ridge and the other longitudinal side edge portion of the branch ridge, where the trunk ridge and branch ridge join (or the angle formed between the other longitudinal side edge portion of a branch ridge, etc., and the X axis or Y axis). Now, an angle $\alpha_0$ between an axial line $L_0$ of the branch ridge and the outer boundary of the trunk ridge, near the outer boundary of the trunk ridge (or an angle between an axial line $L_0$ of a branch ridge, etc., and the X axis or Y axis) can be represented as $$\alpha_0 = \{\alpha_1 + (180 - \alpha_2)\}/2$$

where $0 < \alpha_1 \leq 90$ degrees, and $90 \leq \alpha_2 < 180$ degrees.

Further, $w_{11}$ represents an intersection point between the outer boundary of the trunk ridge and one longitudinal side edge portion of the branch ridge (or an intersection point between one longitudinal side edge portion of a branch ridge or the like and the X axis or Y axis). Also, $w'_{11}$ represents an intersection point between the other longitudinal side edge portion of the branch ridge, etc., and the X axis or Y axis. Further, $w_{12}$ represents an intersection point between a line $L_1$ which passes through the intersection point $w_{11}$ and is orthogonal to the axial line $L_0$ of a branch ridge, etc., and the other longitudinal side edge portion of the branch ridge, etc. With this understanding, the distance from the intersection point $w_{11}$ to the intersection point $w_{12}$ is defined as $W_1$, representing the width of the base portion of the branch ridge, etc.

Also, $w_{21}$ represents an intersection point between a line $L_2$ which is orthogonal to the axial line $L_0$ of a branch ridge, etc. and comes into contact with the tip portion of the branch ridge, etc., and one longitudinal side edge portion of the branch ridge (or an intersection point with an extension of one longitudinal side edge portion of the branch ridge, etc.). Further, $w_{22}$ represents an intersection point between a line $L_2$ and the other longitudinal side edge portion of the branch ridge (or an intersection point with the other longitudinal side edge portion of the branch ridge, etc.). With this understanding, the distance from the intersection point $w_{21}$ to the intersection point $w_{22}$ is defined as $W_2$, representing the width of the tip of the branch ridge, etc.

In FIG. 85, extensions of the longitudinal side edge portions are indicated by single-dot dashed lines. Further, the distance between axial lines $L_0$ of adjacent branch ridges, etc. are defined as the pitch P of formation of branch ridges, etc. Also, $w_{31}$ represents a point where a line $L_3$ which passes through the intersection point $w'_{11}$ and is parallel to the line $L_1$ intersects with one longitudinal side edge portion of a branch ridge, etc. facing the other longitudinal side edge portion of the adjacent branch ridge, etc. With this understanding, the distance from intersection point $w'_{11}$ to intersection point $w_{31}$ is defined as distance $W_3$ between branch ridges, etc.

The overall taper width TP of branch ridges, etc., can be defined as follows.

$$TP = W_1 - W_2$$

Also, the average width of branch ridges, etc. $W_{ave1}$ and the average width of grooves $W_{ave2}$ can be expressed as follows.

$$W_{ave1} = (W_1 + W_2)/2$$

$$W_{ave2} = P - W_{ave1}$$

The value of $W_3$ may be 1 μm to 10 μm, more preferably 2 μm to 5 μm. The value of $W_2$ may be 1 μm to 10 μm, more preferably 2 μm to 5 μm. The value of P may be 2 μm to 20 μm, more preferably 2 μm to 10 μm. An exemplary value of TP is 0.1 times to 10 times the value of $W_3$. These values may be applied to the longest branch ridges, etc.

The liquid crystal display device according to the present disclosure including the above-described various preferred arrangements and configurations (hereinafter may be simply referred to as "liquid crystal display device according to the present disclosure, etc.") may be configured such that the liquid crystal molecules have negative dielectric constant anisotropy.

The liquid crystal display device or liquid crystal element according to the present disclosure can be obtained by a liquid crystal display device or liquid crystal element manufacturing method including:

forming a first electrode on a first substrate, forming a planarization layer on an opposing face of the first electrode which faces a second substrate and on the first electrode, and further forming a first alignment film on the planarization layer, or alternatively forming a first electrode on a first substrate, and forming the first alignment film also serving as the planarization layer on the opposing face of the first electrode which faces the second substrate and on the first electrode;

forming a second electrode on the second substrate, and forming a second alignment film on the opposing face of the second substrate which faces the first substrate and on the second electrode;

situating the first substrate and second substrate so that the first alignment film and the second alignment film face each other, and sealing a liquid crystal layer between the first alignment film and the second alignment film; and applying a predetermined electric field so as to align the liquid crystal molecules.

An electrical field is preferably applied so that liquid crystal molecules near at least one substrate of the pair of substrates are tilted as to the surface. Basically, the angle of orientation (angle of deviation) of the liquid crystal molecules when being pretilted is governed by the intensity and direction of the electrical field, and the polar angle (zenith angle) of the liquid crystal molecules is governed by the intensity of the electrical field. In some cases, the angle of orientation (angle of deviation) and polar angle (zenith angle) of the liquid crystal molecules when being pretilted is further governed by the molecular structure of the alignment film material as well.

Applying a predetermined electric field to align the liquid crystal molecules includes causing an alignment control material to react while applying the predetermined electric field to the liquid crystal layer including the liquid crystal molecules and the alignment control material, thereby aligning and pretilting the liquid crystal molecules. This method of manufacturing liquid crystal display devices is called the polymer-stabilized alignment (PSA) method. Alternatively, applying a predetermined electric field to align the liquid crystal molecules may include forming an alignment film including an alignment control material on the opposing face and electrodes on at least one substrate, and in this state, causing the alignment control material to react while applying the predetermined electric field to the liquid crystal layer, thereby aligning and pretilting the liquid crystal molecules. This method of manufacturing liquid crystal display devices is called the field-induced photo-reactive alignment (FPA) method.

The pair of substrates include a substrate having pixel electrodes and a substrate having a common electrode. For example, the first substrate may be the substrate having the pixel electrodes, and the second substrate may be the substrate having the common electrode. A color filter layer may be formed on the substrate having the common electrode (second substrate), or the color filter layer may be formed on the substrate having the pixel electrodes (first substrate). The substrate having the pixel electrodes (first substrate) is provided with circuits to drive pixels, such as TFTs or the like. Note that the layer including circuits for driving the pixels, such as the TFTs or the like, may be referred to as a "TFT layer". In a case where the color filter layer is to be formed on the substrate having the common electrode (second substrate), a planarization film is formed upon the TFT layer, and the second electrode is formed on the planarization film. On the other hand, in a case where the color filter layer is to be formed on the substrate having the pixel electrodes (first substrate), the color filter layer is formed on the TFT layer, and the first electrodes are formed on the color filter layer, or on an overcoat layer formed over the color filter layer, or on a passivation film formed of an inorganic material. In a liquid crystal display device where each pixel is made up of multiple sub-pixels, the term "pixel" should simply be substituted with "sub-pixel". The first and second electrodes may be configured including a transparent electroconductive material such as indium tin oxide (ITO), indium zinc oxide (IZO), ZnO, SnO, or the like, which are transparent. The second electrode may be a solid electrode (non-patterned electrode). A first polarization plate is applied to the outer face of the first substrate, and a second polarization plate is applied to the outer face of the second substrate, for example. The first polarization plate and second polarization plate are each disposed so that the absorption axes are orthogonal. The absorption axis of the first polarization plate is preferably parallel to the X axis or the Y axis, and the absorption axis of the second polarization plate to the X axis or the Y axis, but this is not restrictive.

The liquid crystal display device is illuminated by a planar illumination device (backlight) according to the related art. A direct planar illumination device may be used, or an edge-light type planar illumination light source device (also called sidelight) may be used. A direct planar illumination device includes, for example, a light source disposed within a housing, a reflecting member which is disposed at a position of the housing below the light source so as to reflect light emitted from the light source upwards, and a diffusion plate, attached at an opening of the housing above the light source, which transmits the light emitted from the light source and the reflected light from the reflecting member while diffusing. On the other hand, the edge-light type planar illumination device includes, for example, a waveguide, and a light source disposed to the side of the waveguide. A reflecting member is disposed below the waveguide, with a diffusion sheet or prism sheet disposed above the waveguide. The light source is a cold cathode fluorescent lamp for example, which emits white light. Alternatively, the light source may be a light-emitting element such as a light-emitting diode (LED) or semiconductor laser element. Controlling transmission of light from the planar illumination device (backlight) enables images to be displayed on the liquid crystal display device.

2. First Exemplary Embodiment

Figure 4:
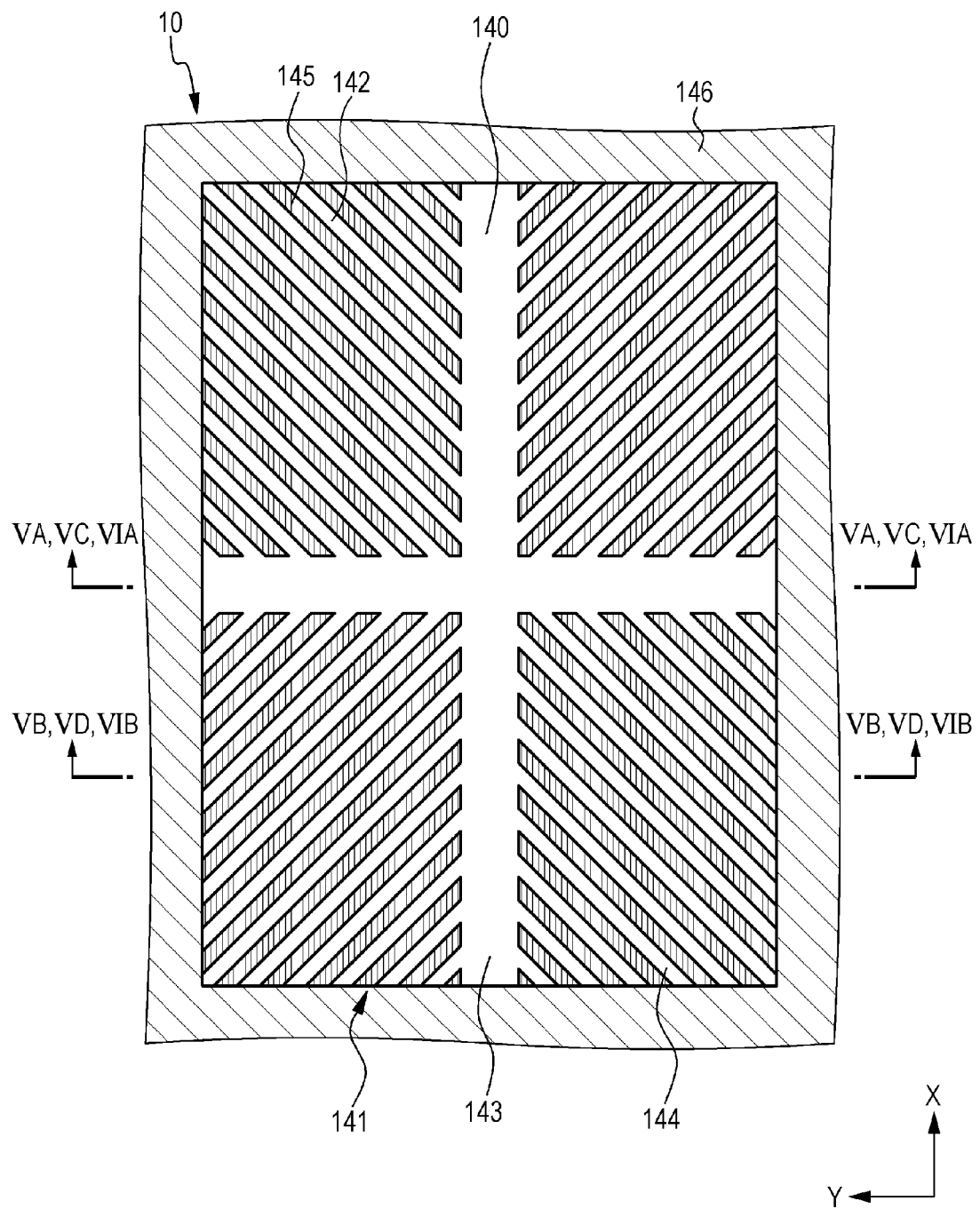
FIG. 4 is a schematic plan view of a first electrode for one pixel making up the liquid crystal display device according to the first through third exemplary embodiments.
Figure 5A:
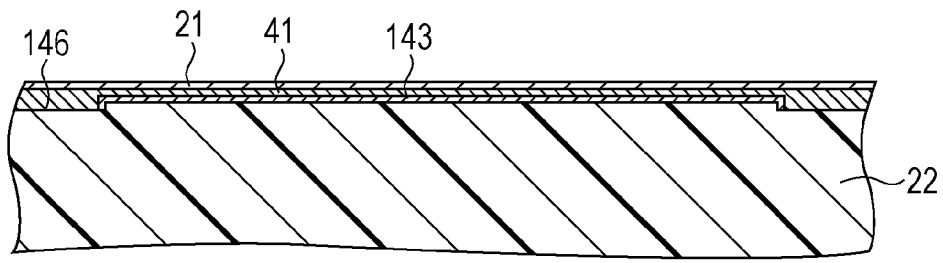
FIGS. 5A and 5B are schematic partial cross-sectional views of the first electrode and other components of the liquid crystal display device according to the first exemplary embodiment, taken in FIG. 4 along arrow VA-VA and arrow VB-VB respectively.
Figure 5B:
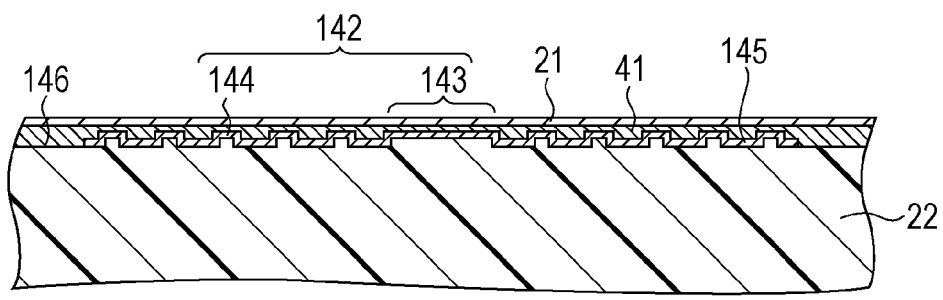

The first exemplary embodiment relates to a liquid crystal display device according to the present disclosure, and specifically relates to a liquid crystal display device according to Embodiment 1 of the present disclosure. More specifically, the first exemplary embodiment relates to a liquid crystal display device according to Embodiment 1-1 of the present disclosure, and further relates to a liquid crystal display device according to a first form. FIG. 1 illustrates a schematic partial end view of the liquid crystal display device according to the first exemplary embodiment. FIG. 4 illustrates a schematic plan view of a first electrode for one pixel making up the liquid crystal display device according to the first exemplary embodiment. FIGS. 5A and 5B are schematic partial cross-sectional views of the first electrode and other components of the liquid crystal display device according to the first exemplary embodiment, taken in FIG. 4 along arrow VA-VA and arrow VB-VB respectively.

The liquid crystal display device according to the first exemplary embodiment, as well as the liquid crystal display devices according to the later-described second through thirty-third exemplary embodiments are configured including multiple pixels 10 which are arrayed. The pixels include a first substrate 20 and a second substrate 50, first electrodes (pixel electrodes) formed on an opposing face of the first substrate 20 facing the second substrate 50, a second electrode (common electrode) formed on an opposing face of the second substrate 50 which faces the first substrate 20, and a liquid crystal layer 70 which is disposed between the first electrode and second electrode, and includes liquid crystal molecules 71A, 71B, and 71C.

The liquid crystal molecules are pretilted. More specifically, at least the liquid crystal molecules closer to the first electrodes are pretilted. The liquid crystal molecules have negative dielectric constant anisotropy.

Multiple ridges and grooves are formed on the first electrodes, and at least the grooves of the first electrode are filled in with a planarization layer 41, 42, or 43.

Specifically, the planarization layer 41 of the liquid crystal display device according to the first exemplary embodiment covers first electrodes denoted by reference numeral 140. Further included are a first alignment film 21 covering the planarization layer 41, and a second alignment film 51 covering the second electrode denoted by reference numeral 160. The liquid crystal molecules are pretilted by at least the first alignment film 21. The planarization layer 41 is formed of a resist material, and the first alignment film 21 and second alignment film 51 are formed of a polyimide resin. The planarization layer 41, first alignment film 21, and second alignment film 51 may be formed by spin coating, for example.

Liquid crystal molecules denoted by reference numeral 71 can be classified into liquid crystal molecules 71A which are held at the first alignment film 21 near the boundary between the liquid crystal layer 70 and the first alignment film 21, liquid crystal molecules 71B which are held at the first alignment film 21 near the boundary between the liquid crystal layer 70 and the second alignment film 51, and other liquid crystal molecules 71C. The liquid crystal molecules 71C are situated at an intermediate region in the thickness direction of the liquid crystal layer 70, and are arrayed such that the longitudinal axis direction (director) of the liquid crystal molecules 71C of each is approximately perpendicular to the first substrate 20 and the second substrate 50 when driving voltage is off.

Upon the driving voltage being turned on, the liquid crystal molecules 71C tilt and are aligned such that the director of each is parallel to the first substrate 20 and second substrate 50. This behavior is due to the dielectric constant of the liquid crystal molecules 71C in the longitudinal axis direction being smaller than that in the lateral axis direction.

The liquid crystal molecules 71A and 71B also have the same nature, and accordingly behave basically in the same way as with the liquid crystal molecules 71C in accordance with the state of the driving voltage changing between on and off. However, when driving voltage is off the liquid crystal molecules 71A are pretilted by the first alignment film 21 by a pretilt of $\theta_1$, or pretilted by a monomer mixed into the liquid crystal beforehand by a pretilt of $\theta_1$, so the director of each assumes an attitude tilted from the normal direction of the first substrate 20 and second substrate 50. In the same way, the liquid crystal molecules 71B are pretilted by the second alignment film 51 by a pretilt of $\theta_2$, or pretilted by a monomer mixed into the liquid crystal beforehand by a pretilt of $\theta_2$, so the director of each assumes an attitude tilted from the normal direction of the first substrate 20 and second substrate 50.

Figure 81A:
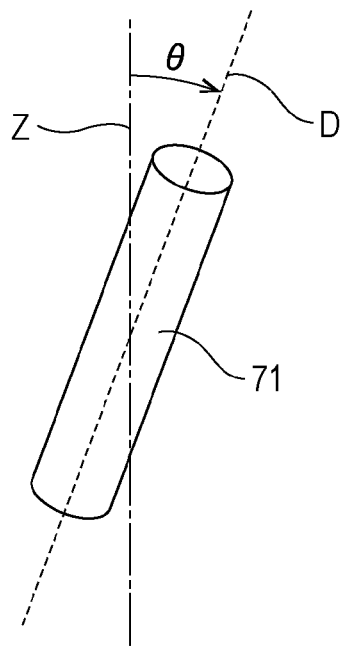
FIG. 81A is a schematic diagram for describing pretilting of liquid crystal molecules.

Note that the term "held at" as used here does not mean that the first alignment film 21 and the liquid crystal molecules 71A are fixed, or that the second alignment film 51 and the liquid crystal molecules 71B are fixed; rather, this means that the alignment of the liquid crystal molecules 71 is restricted. Also, the term "pretilt of θ ($\theta_1$, $\theta_2$)" refers to, as illustrated in FIG. 81A, the tilt angle of the director D of liquid crystal molecules 71 (71A and 71B) in the Z direction which is a direction perpendicular to the faces of the first substrate 20 and the second substrate 50 (normal direction) when driving voltage is off. These definitions are the same in the various exemplary embodiments described below.

Both the pretilts $\theta_1$ and $\theta_2$ of the liquid crystal layer 70 are greater than 0 degrees. The pretilts $\theta_1$ and $\theta_2$ of the liquid crystal layer 70 may be the same angle ($\theta_1=\theta_2$), or may be different angles ($\theta_1 \neq \theta_2$). However, an arrangement where the pretilts $\theta_1$ and $\theta_2$ are different angles is more preferable. This arrangement enables response speed as to application of driving voltage to be improved over a case where both pretilts $\theta_1$ and $\theta_2$ are 0 degrees, while obtaining approximately equivalent contrast. Thus, the amount of light transmitting when displaying black can be reduced while improving response properties, thereby improving contrast. In a case where the pretilts $\theta_1$ and $\theta_2$ are different angles, The greater pretilt θ of pretilts $\theta_1$ and $\theta_2$ is preferably 1 degree or greater but 4 degrees or smaller. Setting the greater pretilt θ within this range allows particularly high advantages to be obtained. This is the same in the various exemplary embodiments described below.

A TFT layer 30, described in detail later, is formed on the first substrate 20. A planarization film 22 formed of an organic insulating material, such as photosensitive polyimide or acrylic resin or the like, is formed on the TFT layer 30, and the first electrodes 140 are formed on the planarization film 22 The planarization film 22 may be formed of an inorganic insulating material such as $SiO_2$, Sin, SiON, or the like. This is the same in the various exemplary embodiments described below. Reference numerals 146, 246, 346, 1146, 1246, 2146, 2246, 2345, 2446, 3146, 3246, 3346, and 3446 represent parts of the first substrate situated between pixels.

Multiple ridge-and-groove portions 141 (ridges 142 and grooves 145) are formed on the first electrode 140 of the liquid crystal display device according to the first exemplary embodiment. Specifically, the liquid crystal display device according to the first exemplary embodiment is configured such that each ridge-and-groove portion 141 is formed of a trunk ridge (primary ridge) 143 passing through the center of a pixel and extending in a cross shape, and multiple branch ridges (sub ridges) 144 extending toward the perimeter of the pixel from the trunk ridge 143. More specifically, assuming an X-Y coordinate system in which the directions in which the cross-shape trunk ridge 143 extend are the X axis and Y axis, the multiple branch ridges 144 occupying the first quadrant extend in parallel in a direction where the value of the Y coordinate increases when the value of the X coordinates increases, and the multiple branch ridges 144 occupying the second quadrant extend in parallel in a direction where the value of the Y coordinate increases when the value of the X coordinates decreases. Also, the multiple branch ridges 144 occupying the third quadrant extend in parallel in a direction where the value of the Y coordinate decreases when the value of the X coordinates decreases, and the multiple branch ridges 144 occupying the fourth quadrant extend in parallel in a direction where the value of the Y coordinate decreases when the value of the X coordinates increases. The grooves 145 are indicated by vertical hatching in the drawings.

A ridge-and-groove portion may be formed by, for example, (a) forming a resist material layer upon a planarization film (or color filter layer) serving as a base (hereinafter, the planarization film and color filter layer will be collectively referred to as "planarization film, etc.", (b) forming a ridge-and-groove portion in the resist material layer by exposure and developing, (c) forming a ridge-and-groove portion in the planarization film, etc., by etch-back of the resist material layer and planarization film, etc., and (d) formation and patterning of a transparent electroconductive material layer above the planarization film, etc.

Alternatively, a ridge-and-groove portion may be formed by, for example, (a) forming a resist material layer upon a base film formed upon a planarization film, etc., (b) forming a ridge-and-groove portion in the resist material layer by exposure and developing, (c) forming a ridge-and-groove portion in the base layer, etc., by etch-back of the resist material layer and planarization film, etc., and (d) formation and patterning of a transparent electroconductive material layer above the base layer.

Alternatively, a ridge-and-groove portion may be formed by, for example, (a) forming a patterned insulating material layer upon a planarization film, etc., serving as a base, and (b) formation and patterning of a transparent electroconductive material layer upon the planarization film, etc. and insulating material layer.

Alternatively, a ridge-and-groove portion may be formed by, for example, (a) forming a transparent electroconductive material layer on a planarization film, etc., serving as a base, (b) forming a resist material layer upon the transparent electroconductive material layer, (c) forming a ridge-and-groove portion in the resist material layer by exposure and developing, and (d) etch-back of the resist material layer and transparent electroconductive material layer.

Alternatively, a ridge-and-groove portion may be formed by, for example, (a) forming and patterning a first transparent electroconductive material layer on a planarization film, etc., serving as a base, and (b) forming and patterning a second transparent electroconductive material layer having etching selectivity as to the first transparent electroconductive material layer, upon the first transparent electroconductive material layer.

Alternatively, a ridge-and-groove portion may be formed by, for example, optimizing the thickness of the planarization film, so that ridges are formed in the planarization film due to the thickness of liquid crystal display device components (e.g., various types of signal lines and auxiliary capacitance electrodes, gate electrodes, source/drain electrodes, and various types of wiring) formed above the first substrate.

The side faces (side walls) of the ridges (trunk ridges and branch ridges) may be vertical faces, normal-tapered, or inverse-tapered.

The above description regarding the ridge-and-groove portion is also applicable to the various exemplary embodiments described below. Further, this may be applied to stepped portions at the trunk ridges or branch ridges, which will be described later.

A first polarization plate (not illustrated) is applied to the outer face of the first substrate 20, and a second polarization plate (not illustrated) is applied to the outer face of the second substrate 50. The first polarization plate and second polarization plate are each disposed so that the absorption axes are orthogonal. The absorption axis of the first polarization plate is parallel to the X axis or Y axis, and the absorption axis of the second polarization plate is parallel to the X axis or Y axis. This holds true in the following exemplary embodiments as well.

Figure 82:
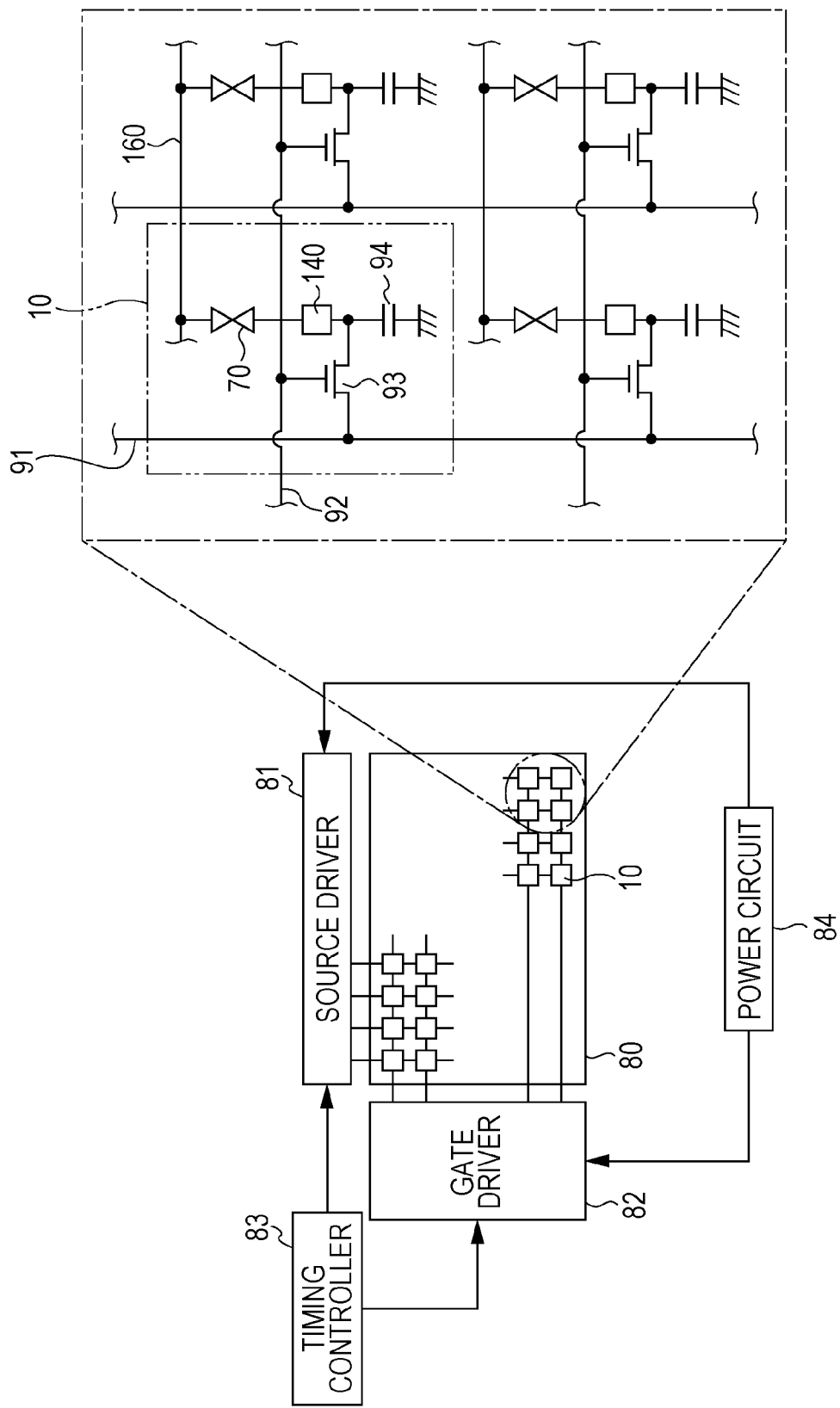
FIG. 82 is a circuit configuration diagram of the liquid crystal display device illustrated in FIG. 1.

FIG. 82 illustrates a circuit configuration in the liquid crystal display device illustrated in FIG. 1 or in any of the liquid crystal display devices according to the various exemplary embodiments described later.

As illustrated in FIG. 82, a liquid crystal display device is configured including a liquid crystal display element which has multiple pixels 10 provided within a display region 80. Provided around the display region 80 are a source driver 81 and gate driver 82, a timing controller 83 which controls the source driver 81 and gate driver 82, and a power source circuit 84 which supplies electric power to the source driver 81 and gate driver 82.

The display region 80 is a region where video images are displayed. Multiple pixels 10 are arrayed in matrix fashion to configure a region capable of displaying video. Note that FIG. 82 illustrates the display region 80 including multiple pixels 10, and also separately illustrates a region corresponding to four pixels 10, in an enlarged manner.

Multiple source lines 91 are arrayed in the row direction in the display region 80, and multiple gate lines 92 are arrayed in the column direction. A pixel 10 is situated at each intersection between source lines 91 and gate lines 92. Each pixel 10 includes, in addition to a first electrode 140 and liquid crystal layer 70, a TFT 93 and a capacitor 94. The source electrode of each TFT 93 is connected to a source line 91, the gate electrode is connected to a gate line 92, and the drain electrode is connected to the capacitor 94 and first electrode 140. The source lines 91 are each connected to the source driver 81 so that image signals are supplied from the source driver 81. The gate lines 92 are each connected to the gate driver 82, so as to be sequentially supplied with scanning signals from the gate driver 82. The source driver 81 and gate driver 82 select one particular pixel 10 from out of the multiple pixels 10.

The timing controller 83 outputs, for example, image signals (e.g., RGB video signals corresponding to the red, green, and blue colors), and source driver control signals for controlling operations of the source driver 81, to the source driver 81. The timing controller 83 also outputs, for example, gate driver control signals for controlling operations of the gate driver 82, to the gate driver 82. Examples of source driver control signals include horizontal synchronizing signals, start pulse signals, clock signals for the source driver, and so forth. Examples of gate driver control signals include vertical synchronizing signals, clock signals for the gate driver, and so forth.

To manufacture the liquid crystal display device according to the first exemplary embodiment, first, TFTs are formed according to the method described next, and then a transparent electroconductive material layer is formed of ITO on the opposing face of the first substrate 20 to which the planarization film 22 has been formed. The first substrate 20 is a glass substrate 0.7 mm thick.

Figure 83A:
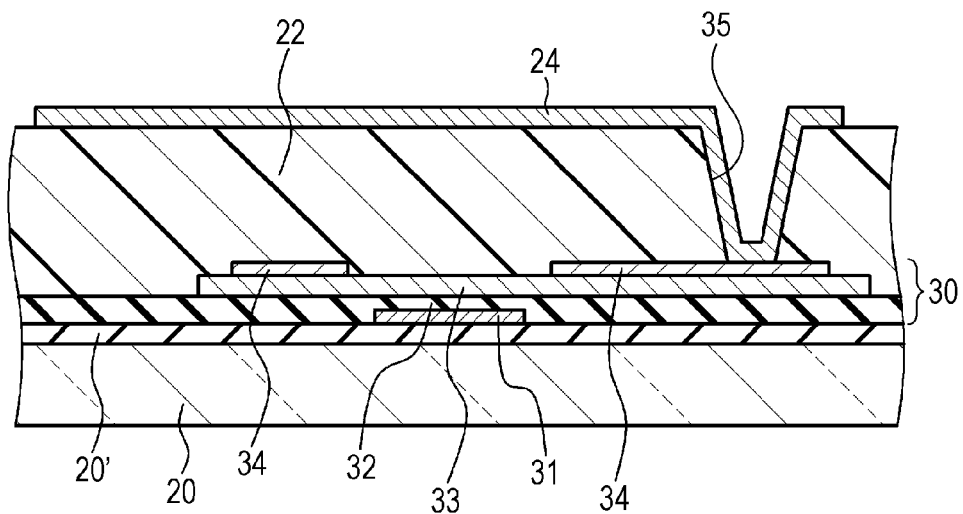
FIGS. 83A and 83B are schematic partial end views of a first substrate where thin-film transistors and the like have been formed, but before formation of ridges and grooves to the first electrode.

As illustrated in FIG. 83A, a gate electrode 31 is formed on an insulating film 20' which has been formed on the first substrate 20. A gate electrode layer 32 is formed upon the gate electrode 31 and insulating film 20'. The gate electrode layer 32 is formed of $SiO_2$, SiN, SiON, or a metal oxide, for example. Once a semiconductor layer 33 to serve as a channel formation region is formed upon the gate electrode layer 32, source/drain electrodes 34 are formed on the semiconductor layer 33. The semiconductor layer 33 are formed of polysilicon or amorphous silicon for example, and the source/drain electrodes 34 are formed of metal films of metals such as titanium, chromium, aluminum, molybdenum, tantalum, tungsten, copper or the like or alloys thereof, or of laminated films thereof, for example. Thus, a TFT layer 30 is formed. Note that TFTs can be formed by methods according to the related art. Note that the TFTs are not restricted to so-called bottom-gate/top-contact types, and may be bottom-gate/bottom-contact types, or may be top-gate/top-contact types. Next, a planarization film 22 is formed on the entire face to a thickness of 2.5 μm, following which a contact hole 35 is formed on the planarization film 22 above one of the source/drain electrodes 34.

A resist material layer is formed on the planarization film 22, which is then exposed and developed, thereby forming a ridge-and-groove portion having a predetermined depth on the resist material layer. The resist material layer and planarization film 22 are then etched back, so as to form the ridge-and-groove portion in the planarization film 22. Subsequently, a transparent electroconductive material layer 24 formed of ITO on the entire face to a predetermined thickness, thus yielding the ridge-and-groove portion 141 (ridges 143 and 144, and groove 145). The transparent electroconductive material layer 24 is then patterned by a method according to the related art, whereby the first electrode 140 can be formed in matrix fashion. The specifications of the ridges 143 and 144 and groove 145 are as listed in Table 1 below.

On the other hand, an arrangement may be made wherein, after having formed the planarization film 22 and contact hole 35 above the source/drain electrodes 34, the transparent electroconductive material layer for forming the first electrode 140 is formed upon the planarization film 22 including the contact hole 35. In this case, the resist material layer is formed next upon the transparent electroconductive material layer, following which exposure and developing is performed, thus forming the ridge-and-groove portion in the resist material layer. The resist material layer and transparent electroconductive material layer are then etched back, thus forming the ridge-and-groove portion 141 (ridges 143 and 144, and groove 145).

On the other hand, a color filter layer (not illustrated) is formed on the second substrate 50 which is formed of a glass substrate 0.7 mm thick. The second electrode 160, which is a solid electrode, is formed upon the color filter layer.

TABLE 1

| | |
|---|---|
| Height of ridges: | 0.4 μm |
| Pitch of ridges: | 5.0 μm |
| Width of ridges: | 2.5 μm |
| Width of grooves: | 2.5 μm |
| Thickness of transparent electroconductive material layer: | 0.1 μm |
| Inclination angle of side face of branch ridges: | forward tapered at 70 degrees |
| Average thickness of first alignment film: | 0.1 μm |
| Average thickness of second alignment film: | 0.1 μm |
| $T_2/T_1$: | 1 |
| $H_L/H_H$: | approximately 1 |
| $H_H/H_C$: | approximately 1.25 |

Thereafter, a planarization layer 41 to cover the first electrode 140 is formed by spin coating, and dried. Next, the first alignment film 21 is formed upon the planarization layer 41, and the second alignment film 51 is formed upon the second electrode 160. More specifically, an alignment film material is coated or printed on the planarization layer 41 and the second electrode 160, and then treated with heat. JALS2131-R6, which is a vertical alignment film manufactured by JSR Corporation, was used as the alignment film material. The temperature for heat treating is preferably 80° C. or higher, and more preferably between 150° C. to 200° C. The heat treatment may also be performed with the heating temperature being changed in stages. Thus, the solvent included in the alignment film material that has been coated or printed is evaporated, and the alignment films 21 and 51 which include polymer compounds are formed. These may be subjected to rubbing or the like thereafter, as appropriate.

In more detail, a vertical alignment film material to become the first alignment film 21 and second alignment film 51 was coated on the planarization layer 41 and second electrode 160 by spin coating. The article was dried on a hot plate at 80° C. for 80 seconds, and then baked in a clean oven in a nitrogen atmosphere at 200° C. for 60 minutes. Thus, the first alignment film 21 and second alignment film 51 were obtained.

Next, the first substrate 20 and second substrate 50 are disposed such that the first alignment film 21 and the second alignment film 51 face one another. The liquid crystal layer 70 including liquid crystal molecules 71 is sealed between the first alignment film 21 and second alignment film 51. Specifically, spacer protrusions to ensure cell gap, such as plastic beads 3.0 μm in diameter for example, are scattered on one of the first substrate 20 and second substrate 50, or more precisely, on the alignment films 21 or 51 formed thereupon. Also, an ultraviolet curing resin including silica particles 3.5 μm in diameter is coated on the edges of the second substrate 50 by screen printing, for example, thereby forming a seal portion. A liquid crystal material obtained by mixing 0.3% by mass of a polymerizable monomer (specifically, A-BP-2E which is an acrylic monomer manufactured by Shin-Nakamura Chemical Co., Ltd.) into a negative liquid crystal, is instilled into the area surrounded by the seal portion. This method of manufacturing a liquid crystal display device is called polymer-stabilized alignment (PSA).

Thereafter, the first substrate 20 and second substrate 50 are applied to each other, and the seal portion is hardened under conditions such as 120° C. for one hour. This seals the liquid crystal layer 70 in. Next, voltage is applied between the first electrode 140 and second electrode 160 using as a voltage applying device. The voltage is 3 volts to 30 volts for example, and more specifically is an alternating (60 Hz) square-wave pulse electric field of which the effective value is 7 volts. At the same time, heating is performed or infrared light is irradiated (e.g., uniform infrared light of 10 J (measured at wavelength of 360 nm)), depending on the polymerizable monomer being used. This is performed to cause the polymerizable monomer to react. This generates an electric field having a direction of a predetermined angle as to the surface of the first substrate 20 and second substrate 50. Accordingly, the liquid crystal molecules 71 are aligned tilting in a predetermined direction from the perpendicular direction as to the first substrate 20 and second substrate 50. At this time, the angle of orientation (angle of deviation) of the liquid crystal molecules 71 is governed by the intensity and direction of the electrical field, and the polymerizable monomer mixed into the liquid crystal. Thus, the values of pretilt $\theta_1$ and $\theta_2$ of the liquid crystal molecules 71A and 71B can be controlled by appropriately adjusting the value of voltage.

Note that an oblique electric field is applied between the first substrate 20 and the second substrate 50 due to the ridge-and-groove portion 141 formed to the first electrode 140. Also, a layer of polymers is formed near the opposing faces of the substrates by reaction of the polymerizable monomer mixed into the liquid crystal. The layer of polymers thus formed restrict the liquid crystal molecules 71 regarding the direction in which they should respond, and the pretilt state of the liquid crystal molecules 71 near the first substrate 20 and second substrate 50 is fixed by reactive products of the polymerizable monomer. Thus the liquid crystal cell can be completed.

On the other hand, manufacturing a liquid crystal display device using the field-induced photo-reactive alignment (FPA) method, where an alignment film having functions of remembering a pretilt angle is coated on at least one of the first electrode 140 and second electrode 160, is performed as follows. The seal portion is formed, and the liquid crystal material made up of a negative liquid crystal, is instilled into the area surrounded by the seal portion.

The first substrate 20 and second substrate 50 are then applied to each other, and the seal portion is hardened under using ultraviolet light of a wavelength of 410 nm. Next, voltage is applied between the first electrode 140 and second electrode 160 using as a voltage applying device. The voltage is 3 volts to 30 volts for example, and more specifically is an alternating (60 Hz) square-wave pulse electric field of which the effective value is 7 volts. This generates an electric field having a direction of a predetermined angle as to the surface of the first substrate 20 and second substrate 50. Accordingly, the liquid crystal molecules 71 are aligned tilting in a predetermined direction from the perpendicular direction as to the first substrate 20 and second substrate 50. At this time, the angle of orientation (angle of deviation) of the liquid crystal molecules 71 is governed by the intensity and direction of the electrical field, and the molecular structure of the alignment film material. Also, and the polar angle (zenith angle) of the liquid crystal molecules 71 is governed by the intensity of the electrical field, and the molecular structure of the alignment film material. Thus, the values of pretilt $\theta_1$ and $\theta_2$ of the liquid crystal molecules 71A and 71B can be controlled by appropriately adjusting the value of voltage.

In a state with voltage still being applied, an energy beam (specifically, ultraviolet light UV), which is uniform infrared light of 10 J (measured at wavelength of 360 nm) for example, is irradiated onto the alignment films 21 and 51 from the outside of the first substrate 20, for example. In other words, ultraviolet light is irradiated while applying an electric field or magnetic filed, such that the liquid crystal molecules 71 are arrayed in an oblique direction as to the surfaces of the pair of substrates 20 and 50. This causes the cross-linkable functional groups or polymerizable functional groups included in the alignment films 21 and 51 to react and cross-link.

Note that the ridge-and-groove portion 141 formed on the first electrode 140 causes an oblique electric field to be applied between the first substrate 20 and the second substrate 50. Thus, the polymers "remember" the direction in which the liquid crystal molecules 71 should respond, thereby pretilting the liquid crystal molecules 71 near the alignment films 21 and 51. As a result, the liquid crystal molecules 71A and 71B situated near the boundaries between the liquid crystal layer 70 and the alignment films 21 and 51 are pretilted with pretilt angles $\theta_1$ and $\theta_2$ in a non-driven state.

Ultraviolet light including a great amount of light components around wavelengths 295 nm to 365 nm is preferably used for the ultraviolet light UV. The reason for this range is that ultraviolet light of a shorter wavelength may cause of the liquid crystal molecules 71 to photodegrade and deteriorate. While the ultraviolet light UV has been described as being applied from the outside of the first substrate 20, it may be applied from the outside of the second substrate 50, or from the outside of both the first substrate 20 and second substrate 50. In this case, the ultraviolet light UV is preferably irradiated from the side of the substrate which has higher light transmittance. Also, in a case where the ultraviolet light UV is irradiated from the outside of the second substrate 50, ultraviolet light UV at some wavelengths may be absorbed by the color filter layer, which may impede cross-link reaction. For this reason, the ultraviolet light UV is preferably irradiated from the outside of the first substrate 20 (the substrate which has the pixel electrodes).

These steps complete the liquid crystal display device illustrated in FIG. 1, where the liquid crystal molecules 71A next to the first substrate 20 and second substrate 50 are pretilted. Finally, a pair of polarization plates (not illustrated) are disposed on the outer side of the liquid crystal display device, so that the absorption axes are orthogonal. The liquid crystal display devices according to the various exemplary embodiments which are described below can be manufactured according to generally the same method.

The liquid crystal display device (liquid crystal display element) operates as follows. Upon driving voltage being applied to a selected pixel 10, the orientation state of the liquid crystal molecules 71 included in the liquid crystal layer 70 changes in accordance to the potential difference between the first electrode 140 and the second electrode 160. More specifically, applying driving voltage to the liquid crystal layer 70 causes the liquid crystal molecules 71A and 71B situated nearby the alignment films 21 and 51 to tilt while rotating, from the state before voltage is applied as illustrated in FIG. 1, in their own tilt directions. This action is propagated to the other liquid crystal molecules 71C as well. As a result, the liquid crystal molecules 71 respond by assuming an attitude approximately parallel to the first substrate 20 and second substrate 50. This causes the optical properties of the liquid crystal layer 70 to change, and incident light to the liquid crystal display element becomes modulated outgoing light. This outgoing light is expressed in gradients, which enables video to be displayed.

Video is displayed on the liquid crystal display device by applying driving voltage between first electrodes (pixel electrodes) 140 and the second electrode (common electrode) 160 as follows. Specifically, the source driver 81 supplies individual image signals to certain source lines 91 based on image signals input from the timing controller 83, in accordance with input of source driver control signals also from the timing controller 83. At the same time, the gate driver 82 sequentially supplies scan signals to the gate lines 92 at predetermined timings, in accordance with gate driver control signals from the timing controller 83. Thus, pixels 10 situated at intersections between source lines 91 to which image signals have been supplied and gate lines 92 to which scanning signals have been supplied, thereby applying driving voltage to the pixels 10.

Light transmittance of the liquid crystal display devices according to the first exemplary embodiment and the later-described second and third exemplary embodiments was evaluated based on simulation using 3-dimensional liquid crystal director/electric field/optics calculating software (LCD Master 3D FEM Version 7.31, manufactured by Shintech, Inc.) The average height of ridges, the formation pitch of ridges, the width of ridges, the width of grooves, and the thickness of the transparent electroconductive material layer, of the liquid crystal display device, were all as illustrated in Table 1. Table 2 illustrates the results of light transmittance simulation. Note that "Height of ridges" in Table 2 means the height from the bottom faces of the grooves to the top faces of the ridges, and "Inclination angle" means the inclination angle of the side faces of the branch ridges (forward taper angle). Potential difference between the first electrodes and second electrode was assumed to be 7.5 volts. The values represent the results of improvement of light transmittance of each arrangement in terms of percent, against a reference value of 100% which is the light transmittance simulation results in a comparative example 1-A.

Figure 80A:
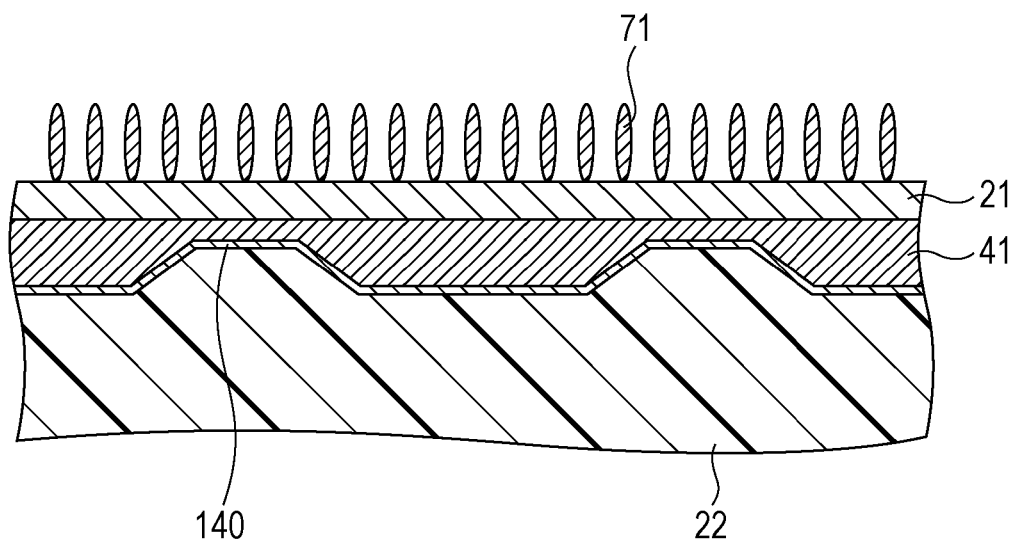
FIGS. 80A and 80B are diagrams which schematically illustrate states of alignment of liquid crystal molecules in the liquid crystal display device according to the first exemplary embodiment and a liquid crystal display device according to a first comparative example.
Figure 80B:
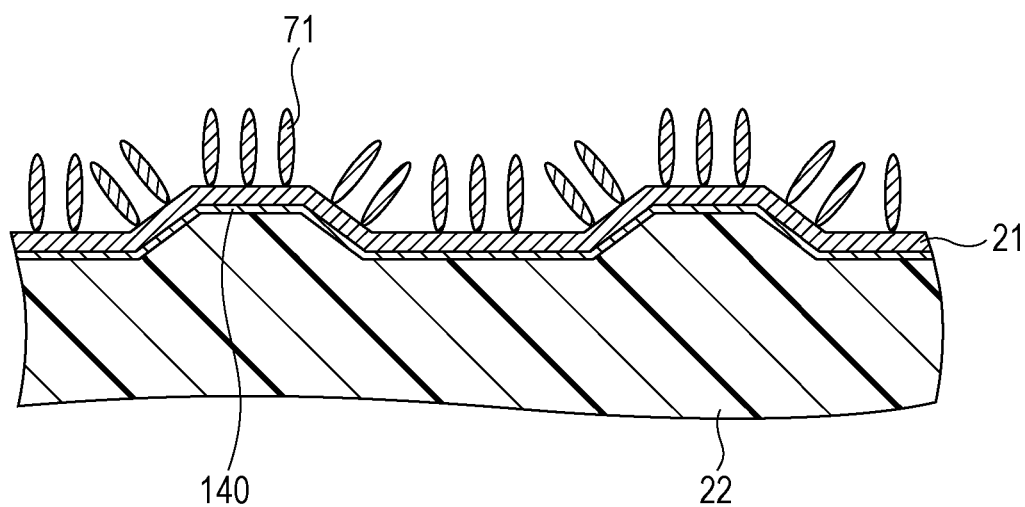

Comparative examples 1-A through 1-D were fabricated in the same way as variations of the first exemplary embodiment, other than that no planarization layer was formed. FIGS. 80A and 80B schematically illustrate the alignment state of liquid crystal molecules in the liquid crystal display device according to the first exemplary embodiment and the liquid crystal display device according to comparative example 1-A. The first exemplary embodiment is configured such that the planarization layer 41 covers the first electrode 140, so that the top face of the planarization layer 41 is smooth or generally smooth. Accordingly, the state of array of the liquid crystal molecules 71 can be made to be uniform. On the other hand, in the comparative example 1-A, the alignment state of liquid crystal molecules differs between the liquid crystal molecules at the top face of the ridges and the bottom of the grooves, and the liquid crystal molecules on the side faces of the ridges.

TABLE 2

| Unit | Height of ridges μm | Inclination angle degrees | Material of planarization layer | $H_H$ μm | $H_L$ μm | Improvement in light transmittance % |
|---|---|---|---|---|---|---|
| Exemplary embodiments ||||||||
| 1-A | 0.4 | 75 | Resist material | 0.5 | 0.5 | 104 |
| 1-B | 0.4 | 60 | Resist material | 0.5 | 0.5 | 103 |
| 1-C | 0.4 | 45 | Resist material | 0.5 | 0.5 | 103 |
| 1-D | 0.4 | 30 | Resist material | 0.5 | 0.5 | 103 |
| 2-A | 0.4 | 60 | Alignment film material A | 0.5 | 0.5 | 103 |
| 3-A | 0.4 | 60 | Alignment film material B | 0.5 | 0.4 | 103 |
| 3-B | 0.4 | 60 | Alignment film material C | 0.5 | 0.3 | 102 |
| Comparative examples ||||||||
| 1-A | 0.4 | 75 | None | | | 100 |
| 1-B | 0.4 | 60 | None | | | 99 |
| 1-C | 0.4 | 45 | None | | | 97 |
| 1-D | 0.4 | 30 | None | | | 94 |

We can see from Table 2 that the transmittance properties of the liquid crystal molecules are greatly dependent on the inclination angle in the comparative examples 1-A through 1-D, since the alignment state of the liquid crystal molecules is affected by the inclination angle. On the other hand, variations 1-A through 1-D of the first exemplary embodiment, variation 2-A of the second exemplary embodiment, and variations 3-A and 3-B of the third exemplary embodiment are not dependent of the inclination angle, and exhibit stable light transmittance properties and improved light transmittance.

At least the grooves of the first electrode are filled in with a planarization layer in the liquid crystal display device according to the first exemplary embodiment. That is to say, portions where liquid crystal molecules come into contact with the first electrode side (more specifically, the first alignment film) are smooth or generally smooth. Accordingly, the alignment state of the liquid crystal molecules can be made uniform, and so the light transmittance of the liquid crystal display device can be made uniform. Sufficiently good black display quality can be realized, thereby realizing good contrast properties. Further, the inclination of the side faces (side walls) of the ridge-and-groove portion can be made more gentle. This allows problems such as broken lines at ridge edges of the transparent electroconductive material layer making up the ridge-and-groove portion to be avoided with more surety, and enables a process with a margin that is not so strict to be employed, which in turn can improve yield in manufacturing the liquid crystal display device.

Figure 83B:
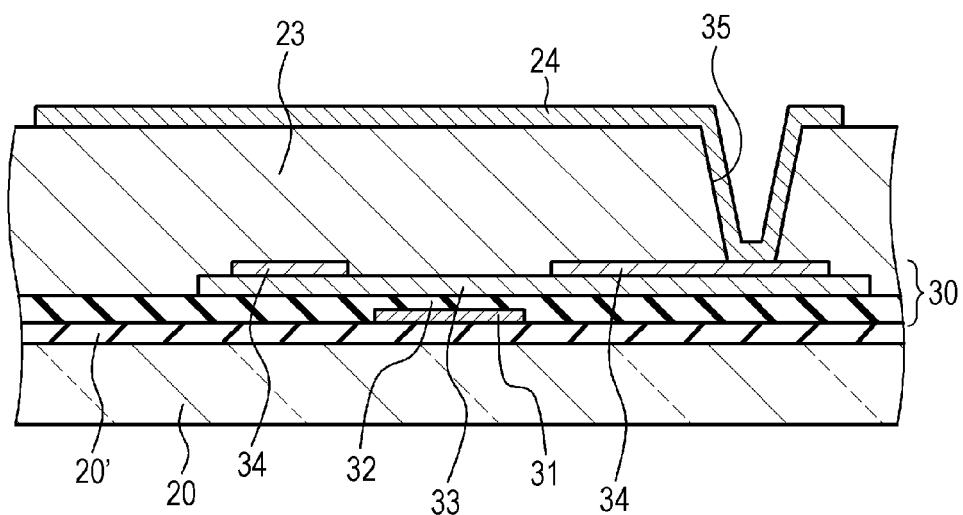

Note that a color filter layer may be formed on the first substrate 20. Specifically, the TFT layer 30 is formed on the first substrate 20 as described above, following which a color filer layer 23 is formed on the TFT layer 30 instead of the planarization film 22, by a method according to the related art. This yields a color filter on array (COA) structure. The contact hole 35 is formed in the color filter layer 23 above one of the source/drain electrodes 34, and then the transparent electroconductive material layer 24 to realize the first electrode 140 is formed on the color filter layer 23 in which the contact hole 35 has been formed (see FIG. 83B).

3. Second Exemplary Embodiment

Figure 2:
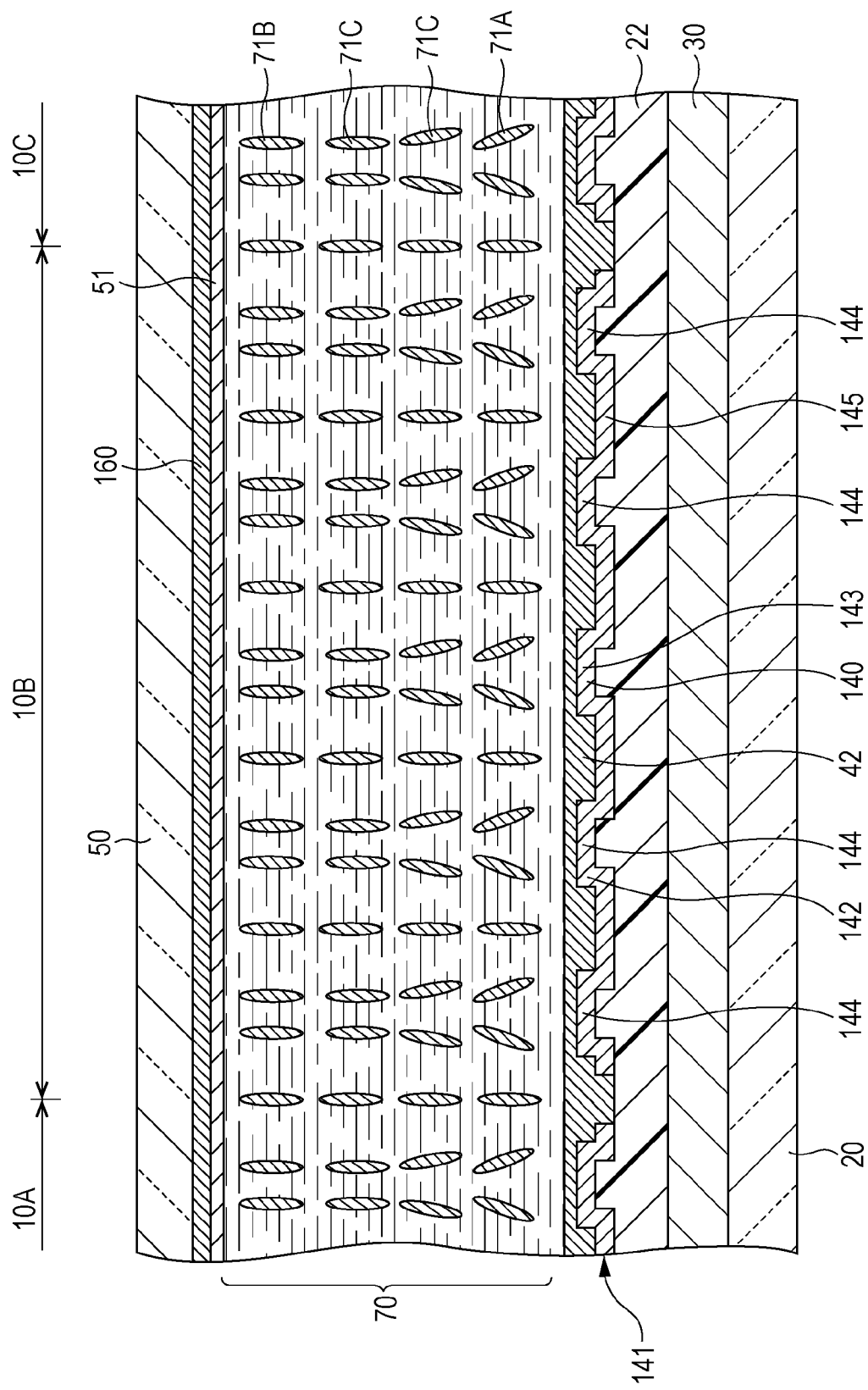
FIG. 2 is a schematic partial end view of a liquid crystal display device according to a second exemplary embodiment.
Figure 5C:
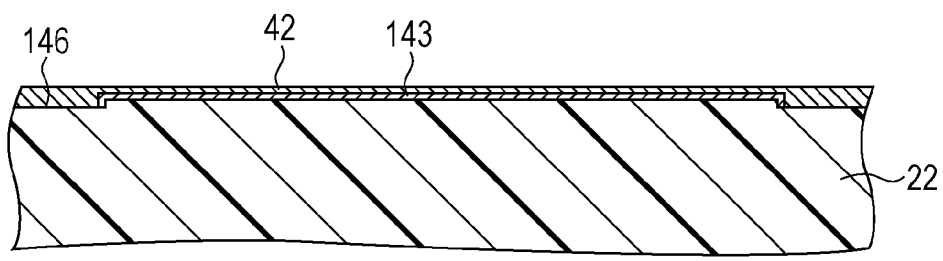
FIGS. 5C and 5D are schematic partial cross-sectional views of the first electrode and other components of the liquid crystal display device according to the second exemplary embodiment, taken in FIG. 4 along arrow VC-VC and arrow VD-VD respectively.
Figure 5D:
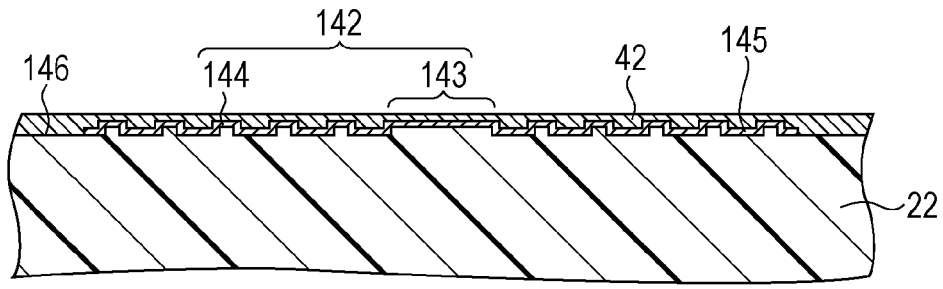

The second exemplary embodiment is a modification of the first exemplary embodiment, and specifically relates to a liquid crystal display device according to a second form. FIG. 2 illustrates a schematic partial end view of the liquid crystal display device according to the second exemplary embodiment. FIGS. 5C and 5D are schematic partial cross-sectional views of the first electrode and other components of the liquid crystal display device according to the second exemplary embodiment, taken in FIG. 4 along arrow VC-VC and arrow VD-VD respectively. Note that plan views of a first electrode for one pixel making up the liquid crystal display device according to the second exemplary embodiment and the later-described third exemplary embodiment are the same as that illustrated in FIG. 4.

The liquid crystal display device according to the second exemplary embodiment further includes a planarization layer 42 covering the first electrode 140, and a first alignment film covering the first electrode 140 and a second alignment film 51 covering the second electrode 160, wherein the liquid crystal molecules are tilted by at least the first alignment film, and wherein the first alignment film is equivalent to the planarization layer 42.

Specifications of the ridges 143 and 144, grooves 145, and so forth, are the same as in Table 1 described above. The values of $T_2/T_1$ and so forth are as illustrated in Table 3 below. The same material as that of the alignment film material in the first exemplary embodiment (vertical alignment film material) was used for the material making up the planarization layer 42 to serve as the first alignment film as well. For the variation 2-A of the second exemplary embodiment illustrated in Table 2, the concentration of solid components of the vertical alignment film material was 10% by mass, and a film was formed by spin coating.

TABLE 3

| | |
|---|---|
| Average thickness of first alignment film: | 0.3 μm |
| Average thickness of second alignment film: | 0.3 μm |
| $T_2/T_1$: | 1 |
| $H_L/H_H$: | approximately 1 |
| $H_H/H_C$: | approximately 1.25 |

Other than the above points, the configuration and structure of the liquid crystal display device according to the second exemplary embodiment can be made to be the same as the configuration and structure of the liquid crystal display device according to the first exemplary embodiment, so detailed description thereof will be omitted.

4. Third Exemplary Embodiment

Figure 3:
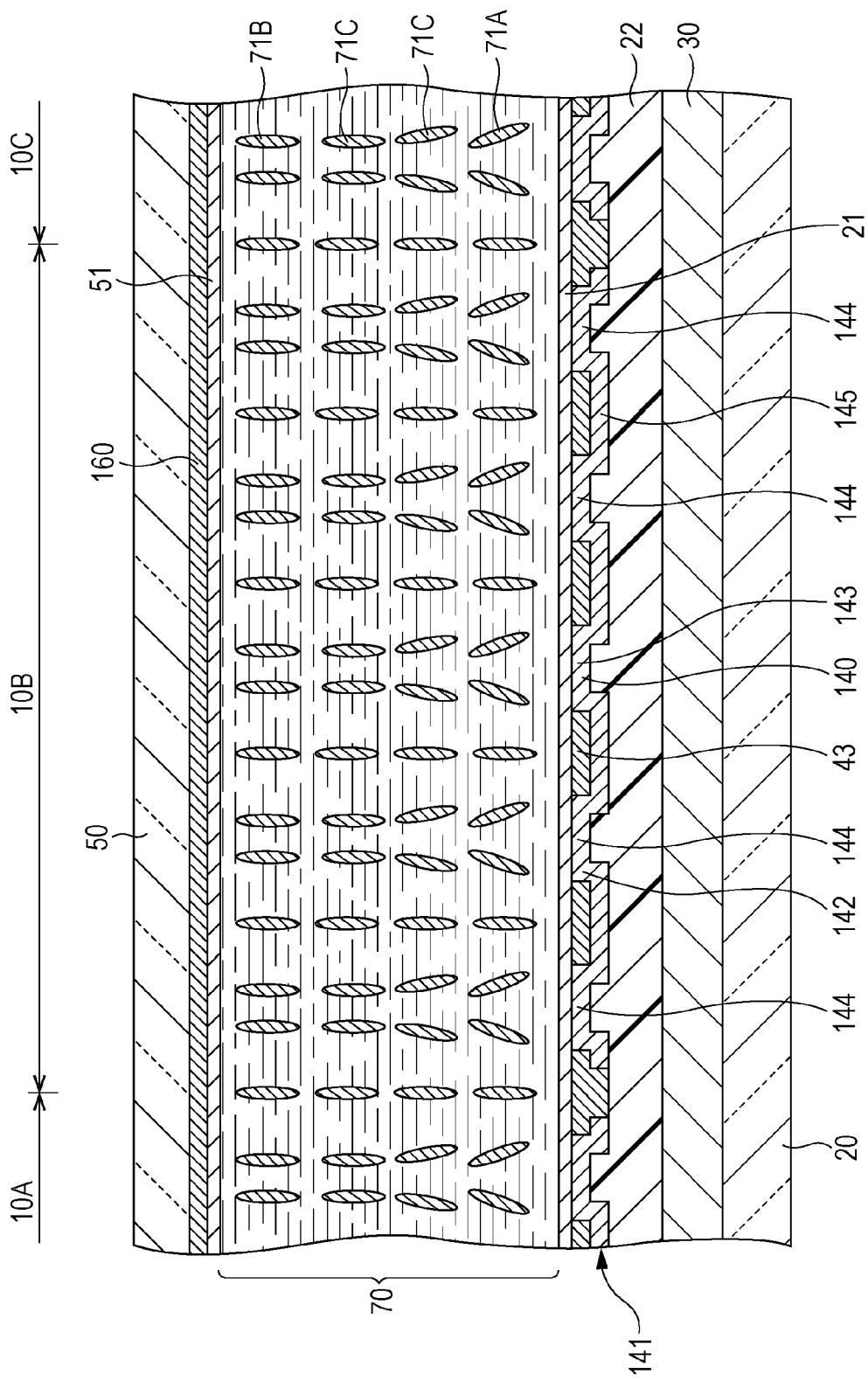
FIG. 3 is a schematic partial end view of a liquid crystal display device according to a third exemplary embodiment.
Figure 6A:
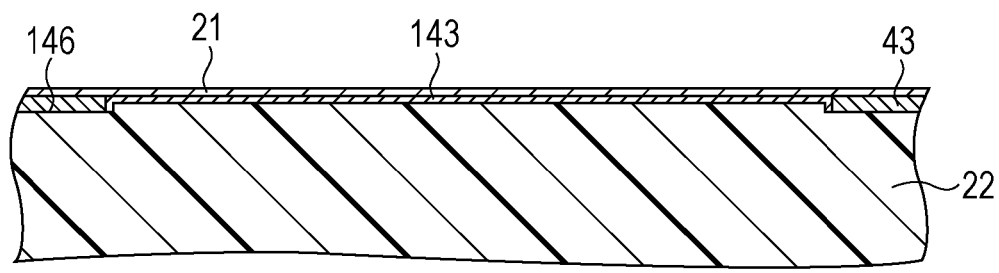
FIGS. 6A and 6B are schematic partial cross-sectional views of the first electrode and other components of the liquid crystal display device according to the third exemplary embodiment, taken in FIG. 4 along arrow VIA-VIA and arrow VIB-VIB respectively.
Figure 6B:
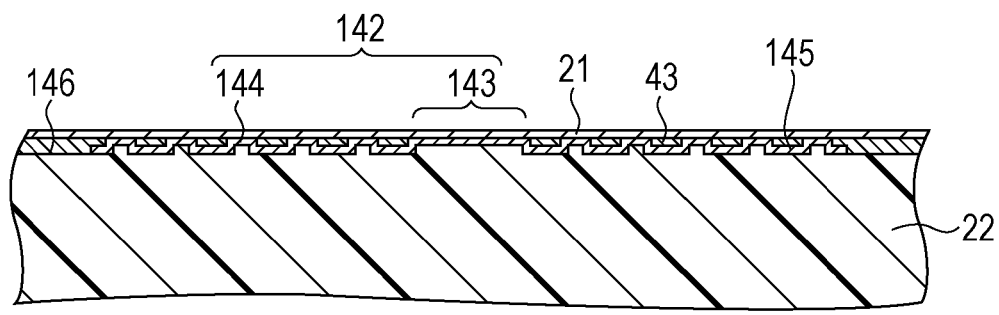

The third exemplary embodiment is a modification of the first exemplary embodiment, and specifically relates to a liquid crystal display device according to a third form. FIG. 3 illustrates a schematic partial end view of the liquid crystal display device according to the third exemplary embodiment. FIGS. 6A and 6B are schematic partial cross-sectional views of the first electrode and other components of the liquid crystal display device according to the third exemplary embodiment, taken in FIG. 4 along arrow VIA-VIA and arrow VIB-VIB respectively.

The liquid crystal display device according to the third exemplary embodiment further includes a planarization layer 43 filling in the grooves 145 of the first electrode 140, and a first alignment film 21 covering the first electrode 140 and a second alignment film 51 covering the second electrode 160, wherein the liquid crystal molecules are pretilted by at least the first alignment film 21.

The planarization layer 43 is formed of a resist material, and the first alignment film 21 and second alignment film 51 are formed of a polyimide resin. The planarization layer 43, may be formed by forming the resist material layer on the ridge-and-groove portion 141 of the first electrode 140, and etching back this resist material layer. Depending on the resist material layer, the planarization layer 43 may be formed by using an exposure mask covering the grooves 145 to expose the resist material layer which is then developed. Alternatively, the planarization layer 43 may be formed by using an exposure mask covering the ridges to expose the resist material layer which is then developed, or formed using back exposure. Alternatively, the same material as that of the alignment film material in the first exemplary embodiment (vertical alignment film material) may be used for the material making up the planarization layer 43. The grooves 145 of the first electrode 140 can be filled in with the vertical alignment film material by etching back. For the variations 3-A and 3-B of the third exemplary embodiment illustrated in Table 2, the concentration of solid components of the vertical alignment film material was 8% by mass and 6% by mass respectively, and a film was formed by spin coating. Specifications of the ridges 143 and 144, grooves 145, and so forth, are the same as in Table 1 described above. The values of $T_2/T_1$ and so forth are as illustrated in Table 4 below.

TABLE 4

| Variation 3-A of third exemplary embodiment | |
|---|---|
| Average thickness of first alignment film: | 0.25 μm |
| Average thickness of second alignment film: | 0.2 μm |
| $T_2/T_1$: | 0.8 |
| $H_L/H_H$: | approximately 0.8 |
| $H_H/H_C$: | approximately 1.25 |
| Variation 3-B of third exemplary embodiment | |
| Average thickness of first alignment film: | 0.2 μm |
| Average thickness of second alignment film: | 0.2 μm |
| $T_2/T_1$: | 1 |
| $H_L/H_H$: | approximately 0.6 |
| $H_H/H_C$: | approximately 1.25 |

Other than the above points, the configuration and structure of the liquid crystal display device according to the third exemplary embodiment can be made to be the same as the configuration and structure of the liquid crystal display device according to the first exemplary embodiment, so detailed description thereof will be omitted.

5. Fourth Exemplary Embodiment

Figure 7:
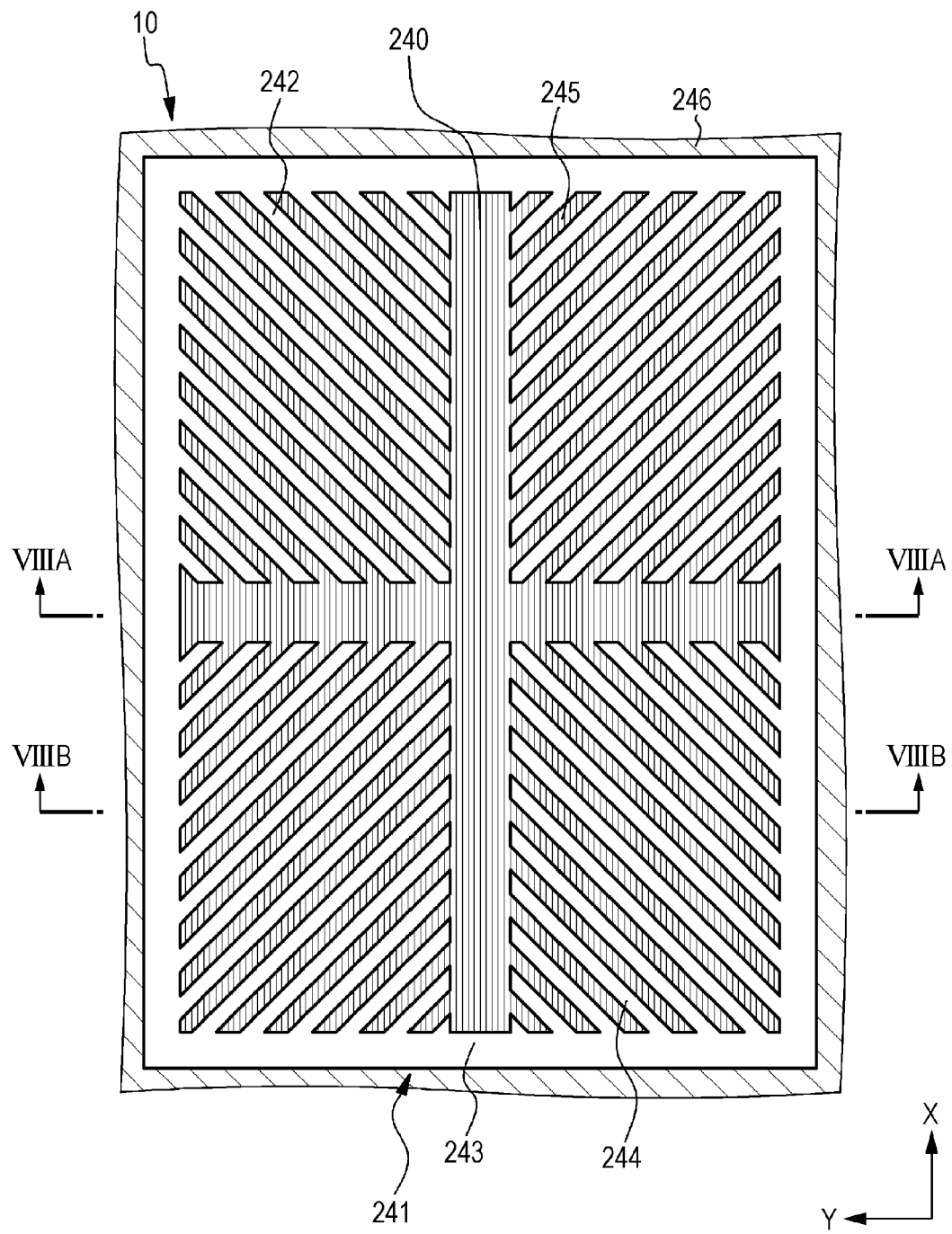
FIG. 7 is a schematic plan view a first electrode for one pixel making up a liquid crystal display device according to a fourth exemplary embodiment.
Figure 8A:
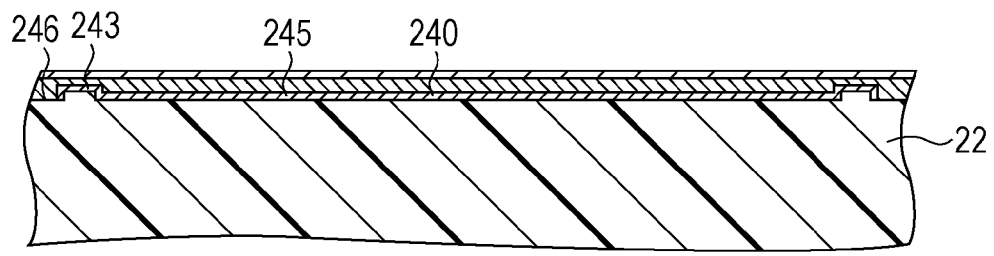
FIGS. 8A and 8B are schematic partial cross-sectional views of the first electrode and other components of the liquid crystal display device according to the fourth exemplary embodiment, taken in FIG. 7 along arrow VIIIA-VIIIA and arrow VIIIB-VIIIB respectively.
Figure 8B:
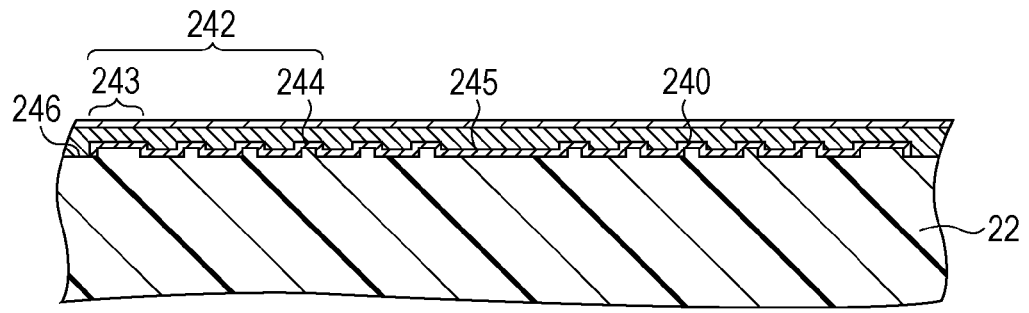

The fourth exemplary embodiment is a modification of the first through third exemplary embodiments, and relates to a liquid crystal display device according to Embodiment 1-2. FIG. 7 is a schematic plan view a first electrode for one pixel making up a liquid crystal display device according to the fourth exemplary embodiment. FIGS. 8A and 8B are schematic partial cross-sectional views of the first electrode and other components, taken in FIG. 7 along arrow VIIIA-VIIIA and arrow VIIIB-VIIIB respectively.

Multiple ridge-and-groove portions 241 (ridges 242 and grooves 245) are formed on the first electrode 240 of the liquid crystal display device according to the fourth exemplary embodiment as well. Specifically, the liquid crystal display device according to the fourth exemplary embodiment is configured such that each ridge-and-groove portion 241 is formed of a trunk ridge (primary ridge) 243 formed on the perimeter portion of a pixel and is shaped like a frame, and multiple branch ridges (sub ridges) 244 extending from the trunk ridge 243 toward the middle of the pixel. More specifically, in the liquid crystal display device according to the first exemplary embodiment, assuming an X-Y coordinate system in which the directions in which lines, passing through the center of the pixel and are parallel to the edges of the perimeter of the pixel, extend, are the X axis and Y axis, the multiple branch ridges 244 occupying the first quadrant extend in parallel in a direction where the value of the Y coordinate increases when the value of the X coordinates increases, and the multiple branch ridges 244 occupying the second quadrant extend in parallel in a direction where the value of the Y coordinate increases when the value of the X coordinates decreases. Also, the multiple branch ridges 244 occupying the third quadrant extend in parallel in a direction where the value of the Y coordinate decreases when the value of the X coordinates decreases, and the multiple branch ridges 244 occupying the fourth quadrant extend in parallel in a direction where the value of the Y coordinate decreases when the value of the X coordinates increases. The groove portion situated at the middle portion of the pixel has a general cross-shape.

Other than the above points, the configuration and structure of the liquid crystal display device according to the fourth exemplary embodiment can be made to be the same as the configuration and structure of the liquid crystal display device according to the first through third exemplary embodiments, so detailed description thereof will be omitted.

Figure 9:
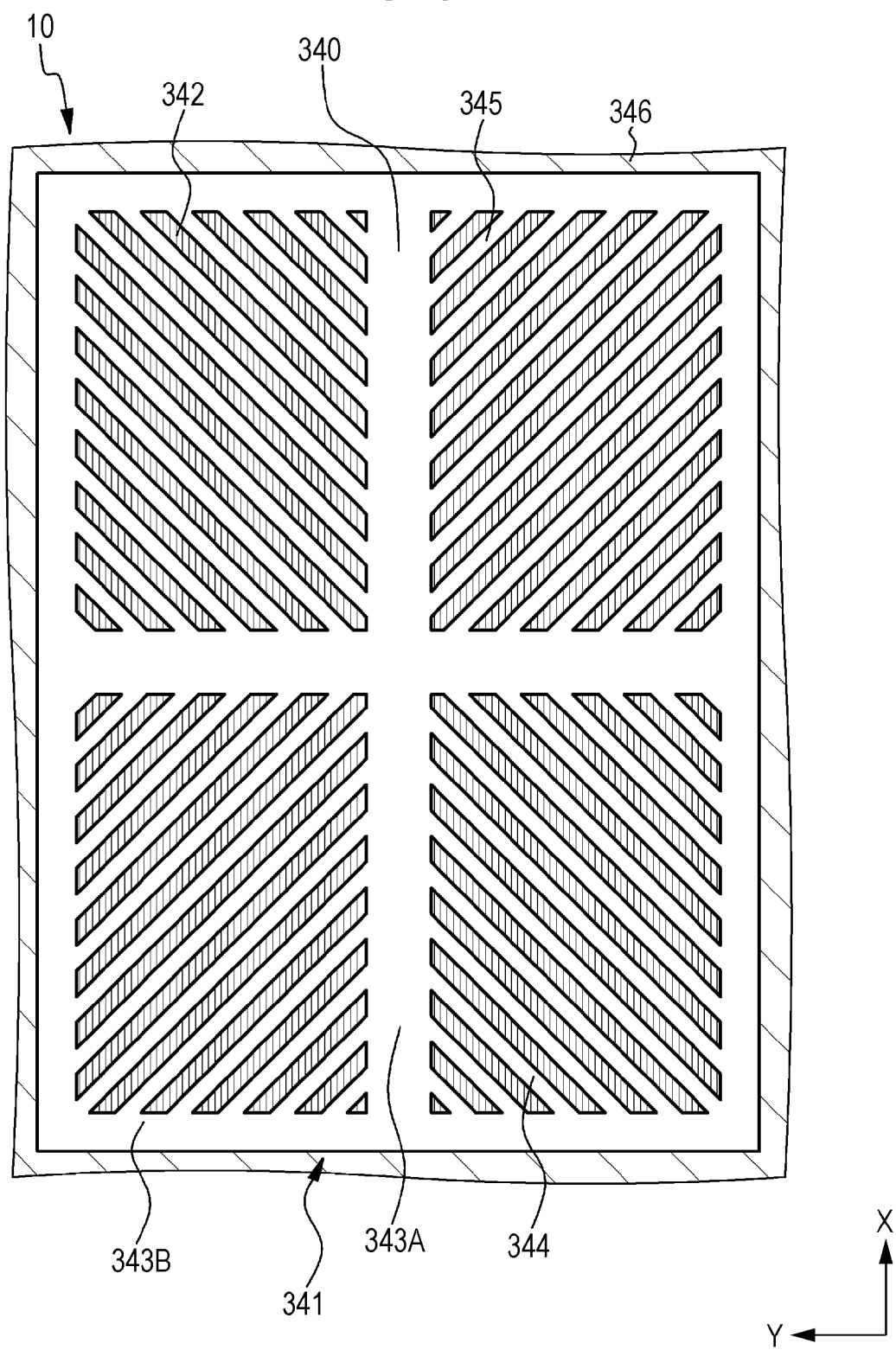
FIG. 9 is a schematic plan view a first electrode for one pixel making up a liquid crystal display device according to a modification of the fourth exemplary embodiment.

Also note that Embodiment 1-1 according to the present disclosure (the liquid crystal display device according to the first through third exemplary embodiments) and Embodiment 1-2 according to the present disclosure (the liquid crystal display device according to the fourth exemplary embodiment) may be combined (the liquid crystal display device according to Embodiment 1-3 of the present disclosure). That is to say, as illustrated in FIG. 9 which is a schematic plan view a first electrode for one pixel, where each ridge-and-groove portion 341 on the first electrode 340 is formed of a trunk ridge 343A passing through the center of the pixel and extending in a cross shape, multiple branch ridges 344 extending toward the perimeter of the pixel from the trunk ridge 343A, and a trunk ridge 343B formed on the perimeter of the pixel in the shape of a frame, and joining the multiple branch ridges 344. Note that in this arrangement, the entirety of the trunk ridge 343A, multiple branch ridges 344, and trunk ridges 344B, make up the ridges 342. In this liquid crystal display device as well, assuming an X-Y coordinate system in which the directions in which the cross-shape trunk ridge 343A extend are the X axis and Y axis, the multiple branch ridges 344 occupying the first quadrant extend in parallel in a direction where the value of the Y coordinate increases when the value of the X coordinates increases, and the multiple branch ridges 344 occupying the second quadrant extend in parallel in a direction where the value of the Y coordinate increases when the value of the X coordinates decreases/ Also, the multiple branch ridges 344 occupying the third quadrant extend in parallel in a direction where the value of the Y coordinate decreases when the value of the X coordinates decreases, and the multiple branch ridges 344 occupying the fourth quadrant extend in parallel in a direction where the value of the Y coordinate decreases when the value of the X coordinates increases. The grooves are denoted by reference numeral 345.

6. Fifth Exemplary Embodiment

Figure 10:
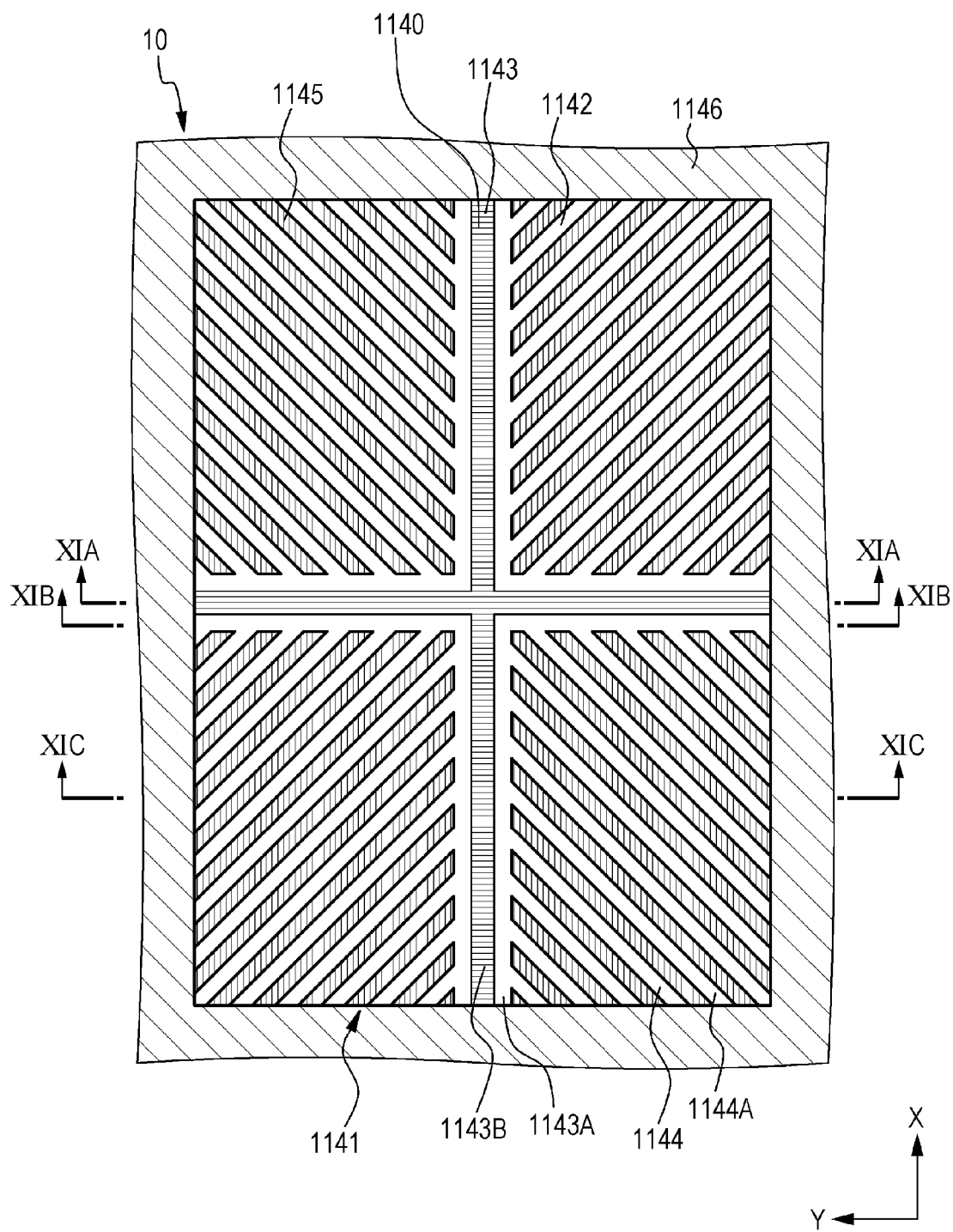
FIG. 10 is a schematic plan view of a first electrode for one pixel making up a liquid crystal display device according to a fifth exemplary embodiment.
Figure 11A:
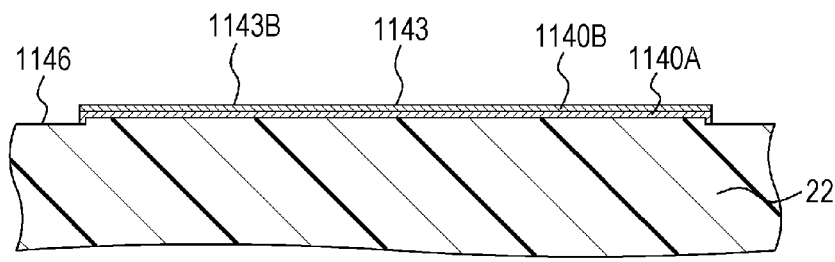
FIGS. 11A through 11C are schematic partial cross-sectional views of the first electrode and other components of the liquid crystal display device according to the fifth exemplary embodiment, taken in FIG. 10 along arrow XIA-XIA, arrow XIB-XIB, and arrow XIC-XIC, respectively.
Figure 11B:
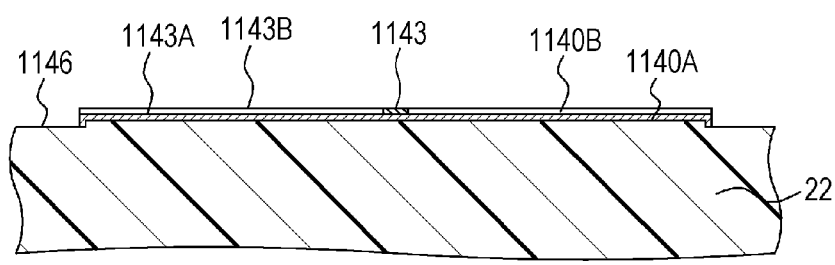
Figure 11C:
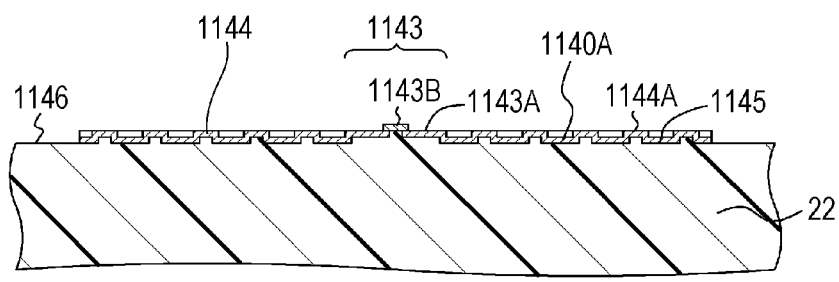
Figure 11D:
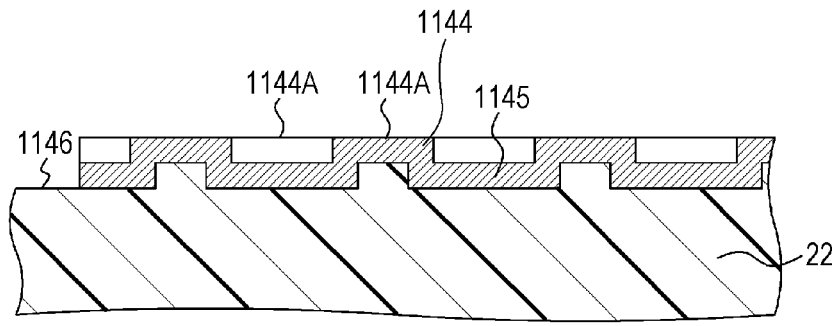
FIG. 11D is a schematic partial cross-sectional view where a portion of FIG. 11C has been enlarged.

The fifth exemplary embodiment relates to a liquid crystal display device according to Embodiment 2A of the present disclosure, and more particularly relates to a liquid crystal display device according to Embodiment 2A-1 of the present disclosure. FIG. 10 is a schematic plan view of a first electrode for one pixel making up the liquid crystal display device according to the fifth exemplary embodiment, and FIGS. 11A through 11C are schematic partial cross-sectional views of the first electrode and other components, taken in FIG. 10 along arrow XIA-XIA, arrow XIB-XIB, and arrow XIC-XIC, respectively. FIG. 11D illustrates a partial schematic cross-sectional view where a part of FIG. 11C has been enlarged. The schematic partial end view of the liquid crystal display device according to the fifth exemplary embodiment is essentially the same as illustrated in FIGS. 1 through 3.

Note that illustration of the planarization layers 41, 42, and 43, and the first alignment film 21, is omitted from the schematic partial cross-sectional views of the first electrode described hereinafter. The planarization layer 41 and first alignment film 21 according to the first exemplary embodiment, the planarization layer 42 according to the second exemplary embodiment, or the planarization layer 43 and first alignment film 21 according to the third exemplary embodiment, are applied to the fifth, sixth, and subsequent exemplary embodiments.

In the same way as with the first through third exemplary embodiments, the fifth later-described sixth through thirteenth exemplary embodiments are a liquid crystal display device configured including multiple pixels 10 (10A, 10B, 10C) which are arrayed. The pixels include a first substrate 20 and a second substrate 50, first electrodes (pixel electrodes) 1140 and 1240 formed on an opposing face of the first substrate 20 facing the second substrate 50, a second electrode (common electrode) 160 formed on an opposing face of the second substrate 50 which faces the first substrate 20, and a liquid crystal layer 70 which is disposed between the first electrodes 1140 and 1240, and second electrode 160, and includes liquid crystal molecules 71A, 71B, and 71C. The liquid crystal molecules are pretilted.

Multiple ridge-and-groove portions 1141 (ridges 1142 and grooves 1145) are formed in the liquid crystal display device according to the fifth exemplary embodiment. Multiple stepped portions are formed in the ridges 1142 provided to the first electrode 1140.

Specifically, the liquid crystal display device according to the fifth exemplary embodiment is configured such that each ridge-and-groove portion 1141 is formed of a trunk ridge (primary ridge) 1143 passing through the center of a pixel and extending in a cross shape, and multiple branch ridges (sub ridges) 1144 extending toward the perimeter of the pixel from the trunk ridge 1143. More specifically, assuming an X-Y coordinate system in which the directions in which the cross-shape trunk ridge 1143 extend are the X axis and Y axis, the multiple branch ridges 1144 occupying the first quadrant extend in parallel in a direction where the value of the Y coordinate increases when the value of the X coordinates increases, and the multiple branch ridges 1144 occupying the second quadrant extend in parallel in a direction where the value of the Y coordinate increases when the value of the X coordinates decreases. Also, the multiple branch ridges 1144 occupying the third quadrant extend in parallel in a direction where the value of the Y coordinate decreases when the value of the X coordinates decreases, and the multiple branch ridges 1144 occupying the fourth quadrant extend in parallel in a direction where the value of the Y coordinate decreases when the value of the X coordinates increases.

Stepped portions at the trunk ridge 1143 and branch ridges 1144, and at later-described trunk ridge 3343 and branch ridges 3344 may be performed by, for example, (a) forming and patterning of a first transparent electroconductive material layer 1140A (3340A) on the planarization film 22, and (b) forming and patterning a second transparent electroconductive material layer 1140B (3340B) having etching selectivity as to the first transparent electroconductive material layer 1140A (3340A), upon the first transparent electroconductive material layer 1140A (3340A), but is not restricted to this.

The cross-sectional shape of the trunk ridge 1143 when cut along an imaginary perpendicular plane orthogonal to the direction in which the trunk ridge 1143 extends is a shape stepping down from the center of the cross-sectional shape of the trunk ridge 1143 towards the edges thereof. Specifically, the trunk ridge 1143 is made up of a middle top face 1143B of the trunk ridge 1143 and top faces 1143A situated on either side thereof. Thus, the trunk ridge 1143 has two stepped portions, with the top faces 1143A being higher than the grooves 1145, and the top face 1143B being higher than the top faces 1143A. Reference symbol 1144A denotes a top face of a branch ridge 1144, the top face 1143A of the trunk ridge 1143 being the same height as the top faces 1144A of the branch ridges 1144. In the drawings, the top face 1143B of the trunk ridge 1143 is indicated by horizontal hatching, and the grooves 1145 are indicated by vertical hatching. The specifications of the trunk ridge 1143, branch ridges 1144, and grooves 1145 are as shown in Table 5 below.

TABLE 5

| | |
|---|---|
| Difference in height between top face 1143A of trunk ridge 1143 and grooves 1145: | average 0.20 µm |
| Difference in height between top face 1144A of branch ridges 1144 and grooves 1145: | average 0.20 µm |
| Width of trunk ridge 1143 (width of top face 1143A of trunk ridge 1143): | 8.0 µm |
| Width of top face 1143B of trunk ridge 1143: | 4.0 µm |
| Width of branch ridges 1144 (width of top face 1144A of branch ridges 1144): | 2.5 µm |
| Gap between branch ridges 1144 (spacing): | 2.5 µm |
| Difference in height between top face 1143B and top face 1143A of trunk ridge 1143: | average 0.2 µm |

Figure 12A:
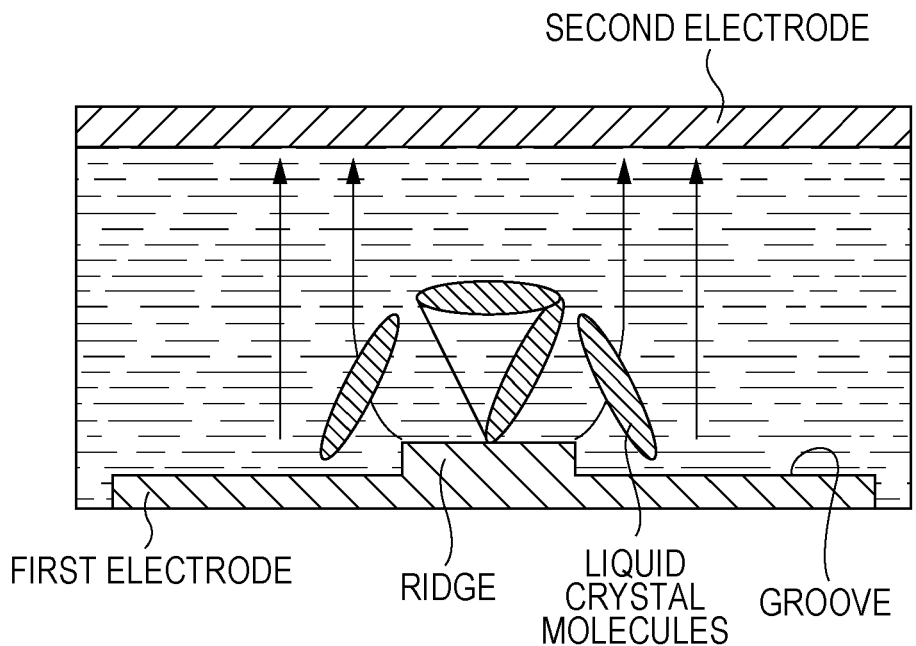
FIGS. 12A and 12B are conceptual diagrams illustrating the behavior of liquid crystal molecules in a liquid crystal display device according to the related art and the liquid crystal display device according to the fifth exemplary embodiment, respectively.
Figure 12B:
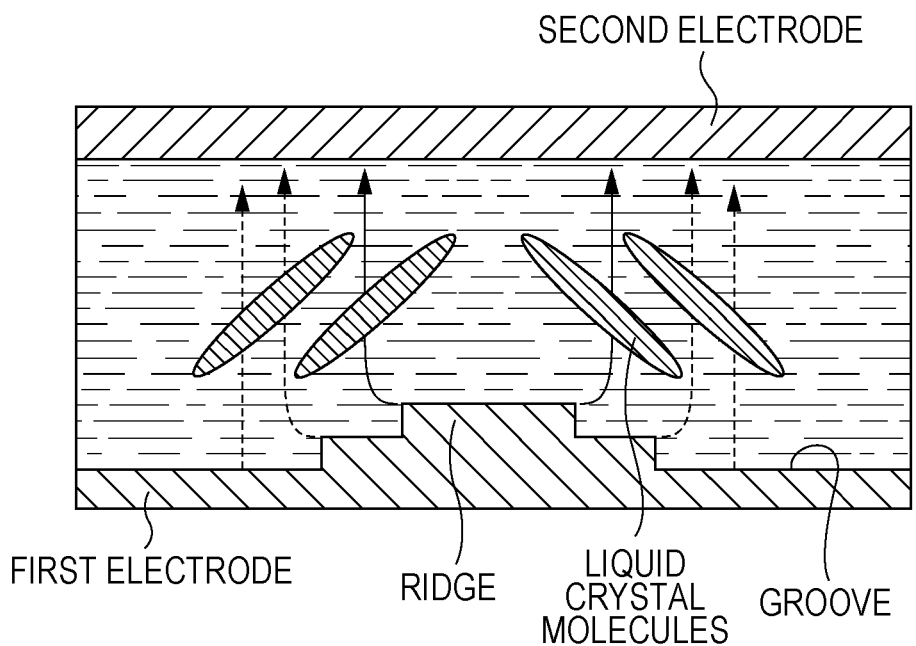

Liquid crystal display devices according to the related art do not have stepped portions formed at the trunk ridge. Accordingly, the force to restrict the alignment of the liquid crystal molecules at the middle portion of the trunk ridge is weak as illustrated in the conceptual drawing in FIG. 12A, and there may be cases where the tilted state of the liquid crystal molecules at the middle portion of the trunk ridge is unstable. On the other hand, the fifth exemplary embodiment has multiple stepped portions, which are the multiple top faces 1143A and 1143B, formed at the trunk ridge 1143, so the electric field is the greatest at the middle portion of the trunk ridge and is weaker toward the edges of the trunk ridge 1143. This enables the force to restrict the alignment of the liquid crystal molecules at the middle portion of the trunk ridge to be increased as illustrated in the conceptual drawing in FIG. 12B, and accordingly restrict the tilted state of the liquid crystal molecules at the middle portion of the trunk ridge. Thus, the problem where dark lines occur at portions of the image corresponding to the middle portion of the trunk ridge 1143 when displaying images can be suppressed in a sure manner. Accordingly, a liquid crystal display device can be provided which realizes even better light transmittance while maintaining good voltage responsivity, reduction in cost of the light source making up the backlight and reduction in electric power consumption can be realized, and reliability of TFTs can be improved.

7. Sixth Exemplary Embodiment

Figure 13:
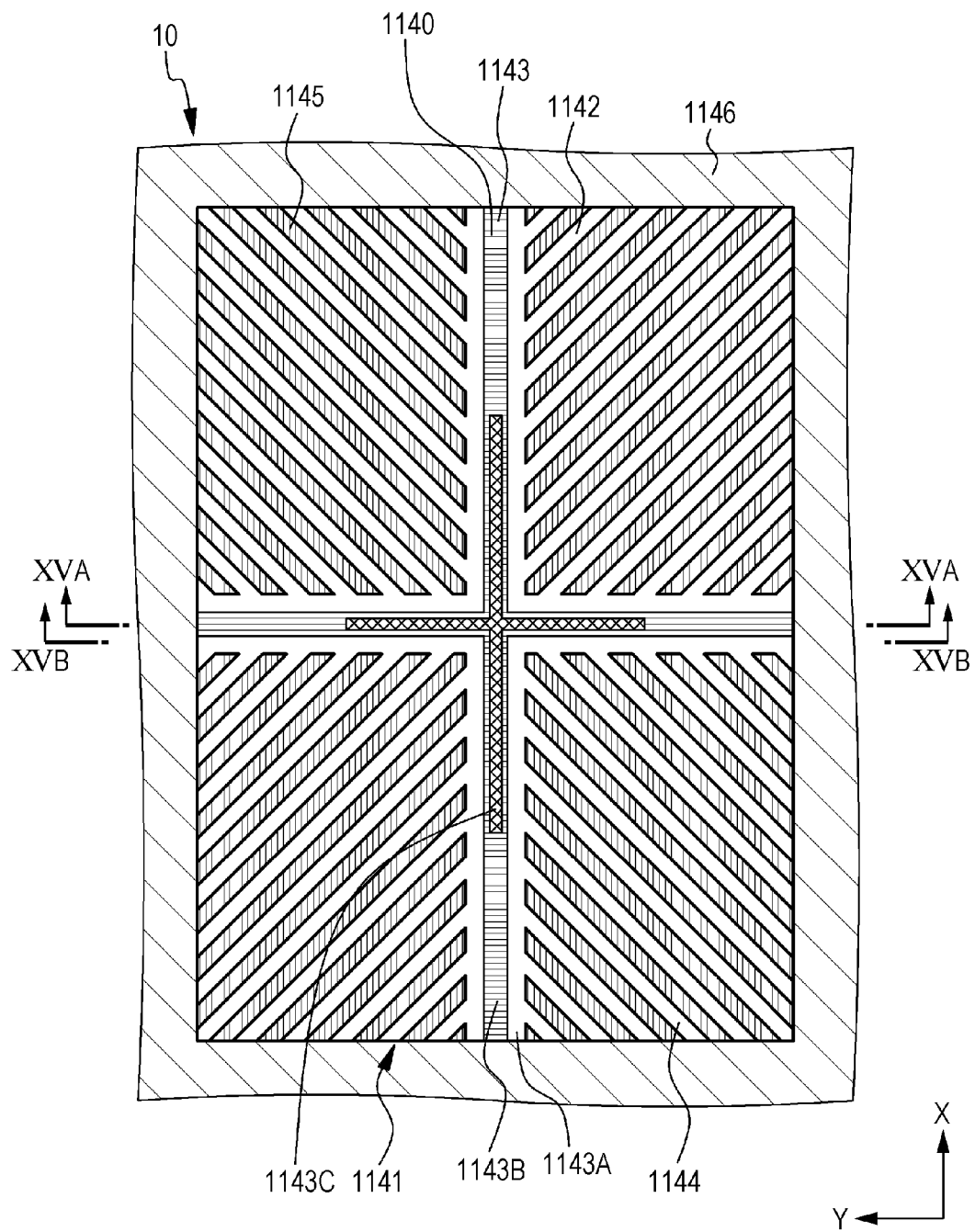
FIG. 13 is a schematic plan view of a first electrode for one pixel making up a liquid crystal display device according to a sixth exemplary embodiment.
Figure 15A:
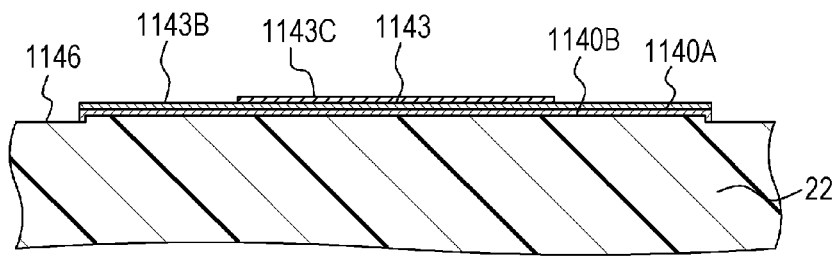
FIGS. 15A and 15B are schematic partial cross-sectional views of the first electrode and other components of the liquid crystal display device according to the sixth exemplary embodiment, taken in FIG. 13 along arrow XVA-XVA and arrow XVB-XVB respectively.
Figure 15B:
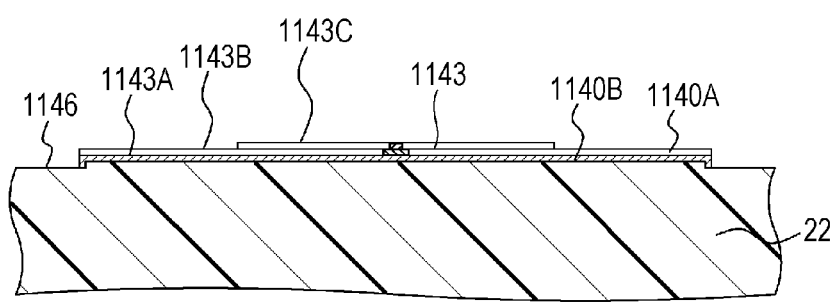

The sixth exemplary embodiment is a modification of the fifth exemplary embodiment. FIG. 13 is a schematic plan view of a first electrode for one pixel making up the liquid crystal display device according to the sixth exemplary embodiment, and FIGS. 15A and 15B are schematic partial cross-sectional views of the first electrode and other components, taken in FIG. 13 along arrow XVA-XVA and XVB-XVB, respectively.

The top faces of the trunk ridge 1143 according to the sixth exemplary embodiment include a top face 1143C at the middle portion of the trunk ridge 1143, top faces 1143B situated on both sides of the top face 1143C, and top faces 1143A situated on the outer sides of the top faces 1143B. Thus, the trunk ridge 1143 has three stepped portions, the top faces 1143A are higher than the grooves 1145, the top faces 1143B are higher than the top faces 1143A, and the top face 1143C is higher than the top faces 1143B. The cross-sectional shape of the trunk ridge 1143 when cut along an imaginary perpendicular plane orthogonal to the direction in which the trunk ridge 1143 extends is a shape stepping down from the center of the cross-sectional shape of the trunk ridge 1143 (top face 1143C) towards the edges thereof. The top face 1143C is indicated by cross-hatching in the drawings. The difference in height between the top face 1143C and top faces 1143B of the trunk ridge 1143, and the difference in height between the top faces 1143B and top faces 1143A thereof, was made to be 0.20 µm on average. Other specifications of the trunk ridge 1143, branch ridges 1144, and grooves 1145, are the same as given in Table 5.

Other than the above points, the configuration and structure of the liquid crystal display device according to the sixth exemplary embodiment can be made to be the same as the configuration and structure of the liquid crystal display device according to the fifth exemplary embodiment, so detailed description thereof will be omitted.

8. Seventh Exemplary Embodiment

Figure 15C:
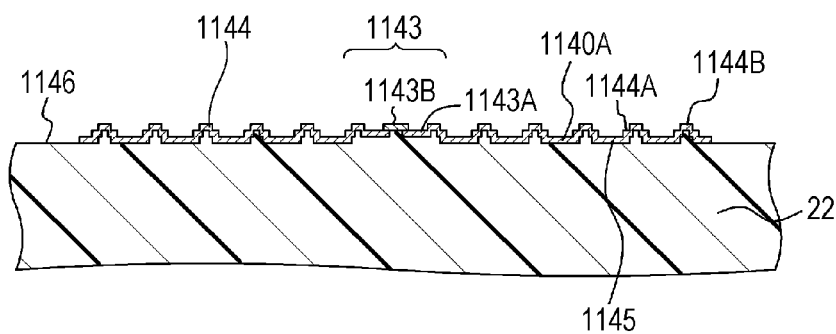
FIG. 15C is a schematic partial end view of the first electrode and other components of the liquid crystal display device according to the seventh exemplary embodiment, taken in FIG. 14 along arrow XVC-XVC.
Figure 15D:
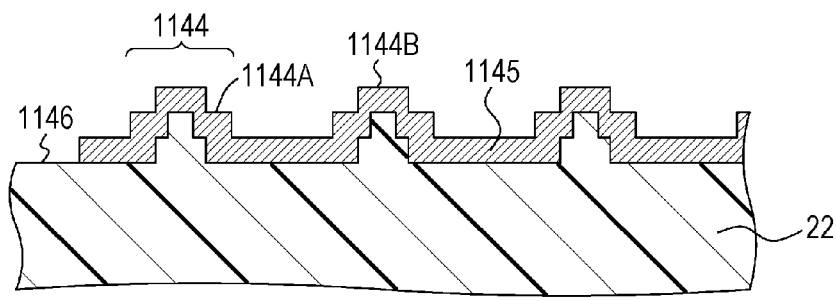
FIG. 15D is a schematic partial end view where a portion of FIG. 15C has been enlarged.

The seventh exemplary embodiment is also a modification of the fifth exemplary embodiment. FIG. 14 is a schematic plan view of a first electrode for one pixel making up the liquid crystal display device according to the seventh exemplary embodiment, FIG. 15C is a schematic partial cross-sectional view of the first electrode and other components of the liquid crystal display device according to the seventh exemplary embodiment, taken in FIG. 14 along arrow XVC-XVC, and FIG. 15D is a schematic partial cross-sectional view where a portion of FIG. 15C has been enlarged.

In the seventh exemplary embodiment, the cross-sectional shape of the branch ridges 1144 when cut along an imaginary perpendicular plane orthogonal to the direction in which the branch ridges 1144 extend, separate from the above-described cross-sectional views, is a shape stepping down from the center of the cross-sectional shape of the branch ridges 1144 towards the edges thereof. Specifically, the trunk ridge 1143 includes a top face 1144B extending from the trunk ridge 1143, top faces 1144A situated on either side thereof. Thus, the branch ridges 1144 have two stepped portions, with the top faces 1144A being higher than the grooves 1145, and the top face 1144B being higher than the top faces 1144A. The top face 1144B is indicated by horizontal hatching in the drawings. Also, the boundaries between the trunk ridge and branch ridges are indicated by solid lines in FIGS. 14, 16, and 22. The difference in height between the top face 1144B and top faces 1143A of the branch ridges 1144 was made to be 0.20 µm on average. Other specifications of the trunk ridge 1143, branch ridges 1144, and grooves 1145, are the same as given in Table 5. The top face 1143B of the trunk ridge 1143 and the top face 1144B of the branch ridges 1144 are at the same height.

Other than the above points, the configuration and structure of the liquid crystal display device according to the seventh exemplary embodiment can be made to be the same as the configuration and structure of the liquid crystal display device according to the fifth exemplary embodiment, so detailed description thereof will be omitted.

Figure 16:
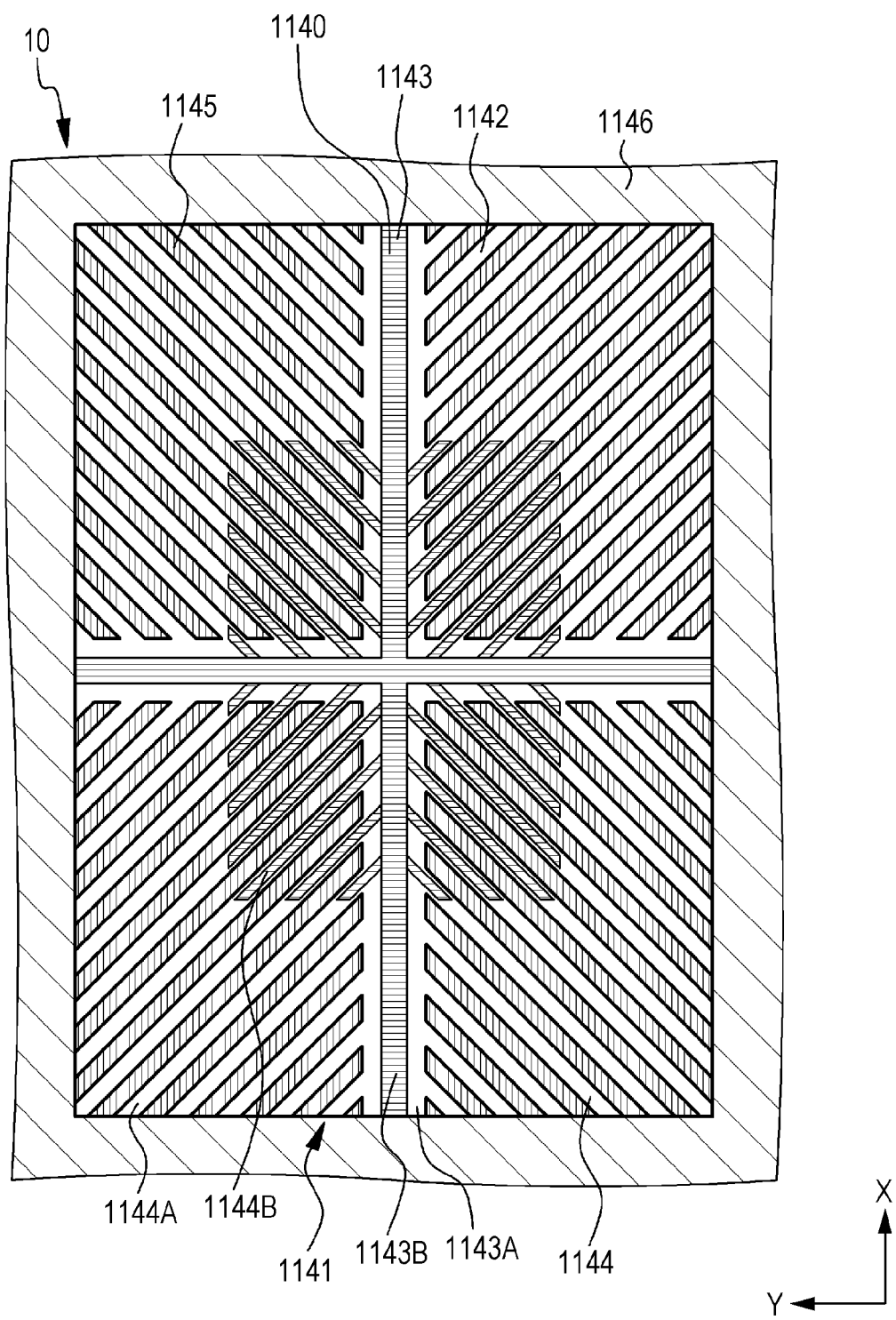
FIG. 16 is a schematic plan view of a first electrode for one pixel making up a liquid crystal display device according to a modification of the seventh exemplary embodiment.
Figure 17:
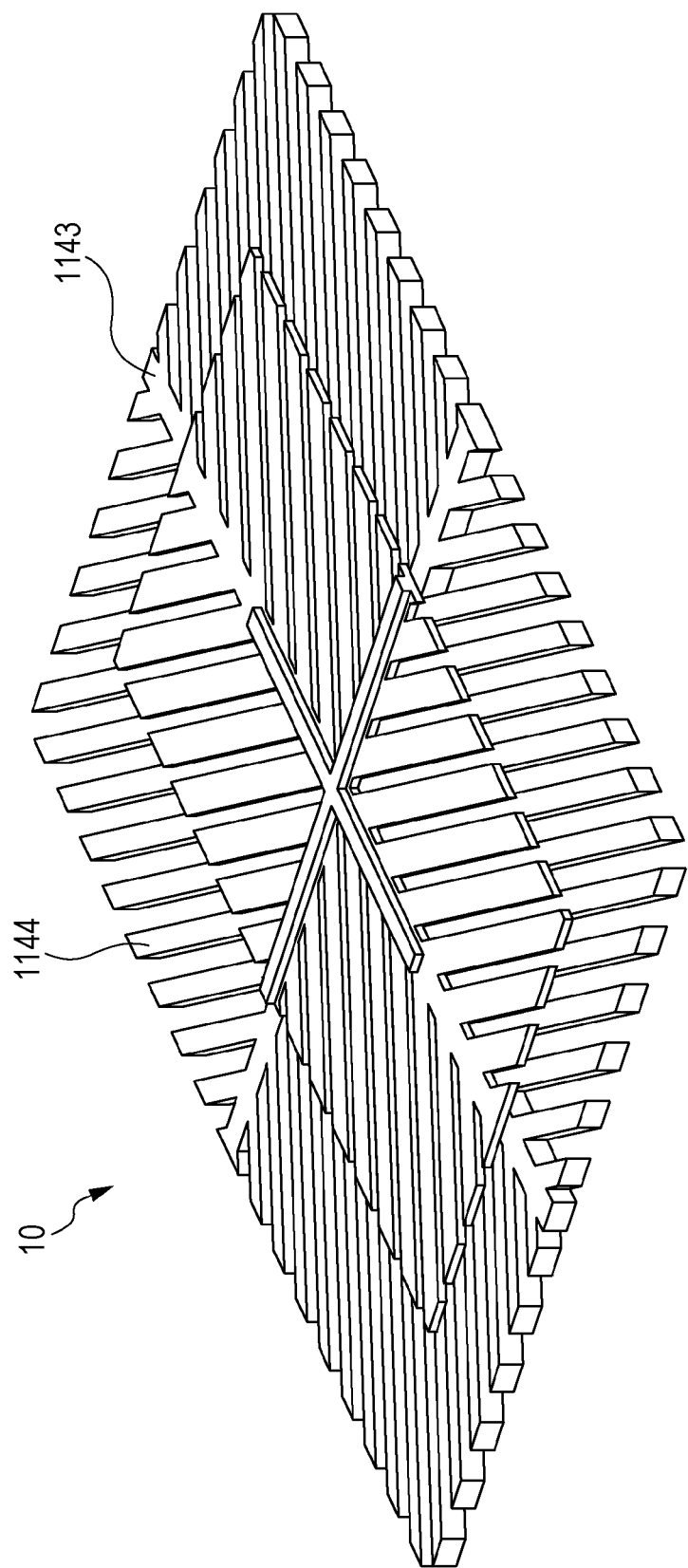
FIG. 17 is a schematic perspective view of a first electrode for one pixel making up a liquid crystal display device according to another modification of the seventh exemplary embodiment.

Alternatively, the cross-sectional shape of the branch ridges 1144 when cut along an imaginary perpendicular plane parallel to the direction in which the branch ridges 1144 extend, separate from the above-described cross-sectional views, may be a shape stepping down from the portions of the branch ridges 1144 closer to the trunk ridge 1143 toward the ends of the branch ridges 1144. Such an arrangement is illustrated in FIG. 16, which is a schematic plan view of a first electrode for one pixel making up a liquid crystal display device. Moreover, this may be combined with the trunk ridge 1143 described in the sixth exemplary embodiment, as illustrated in FIG. 17 which is a schematic perspective view of a first electrode for one pixel making up a liquid crystal display device.

9. Eighth Exemplary Embodiment

Figure 18:
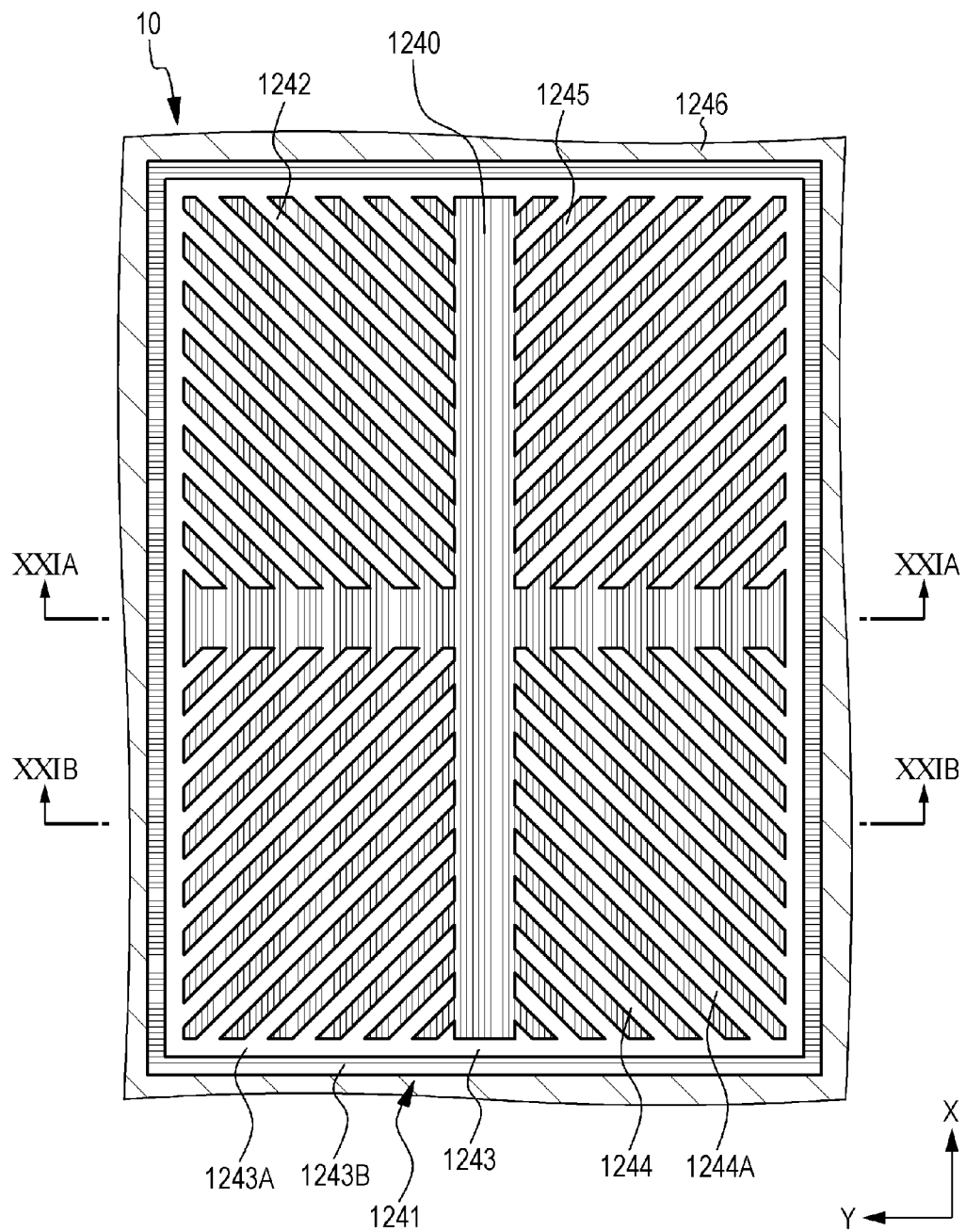
FIG. 18 is a schematic plan view of a first electrode for one pixel making up a liquid crystal display device according to an eighth exemplary embodiment.
Figure 19:
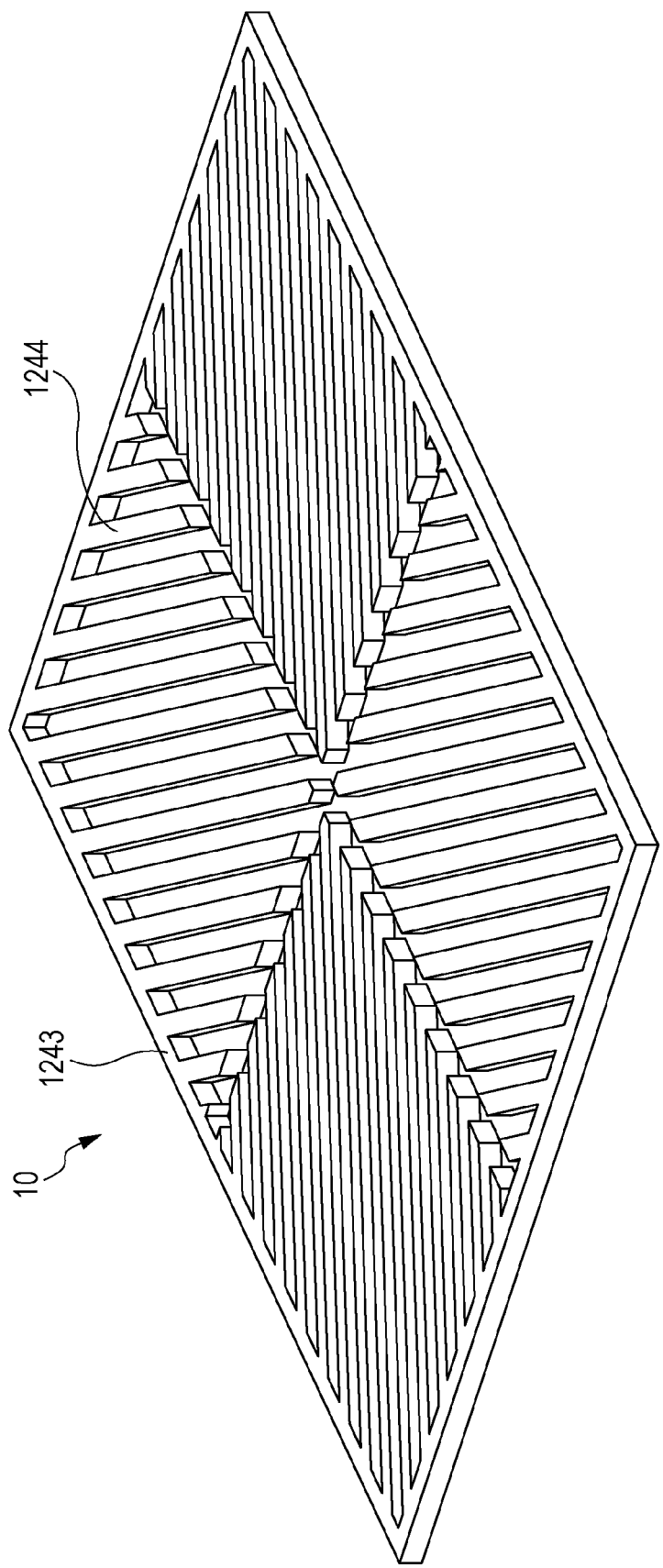
FIG. 19 is a schematic perspective view of the first electrode for one pixel making up the liquid crystal display device illustrated in FIG. 18.
Figure 21A:
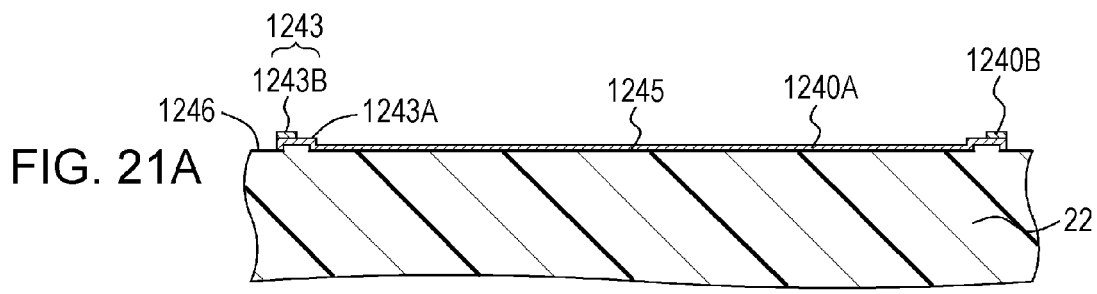
FIGS. 21A and 21B are schematic partial end views of the first electrode and other components of the liquid crystal display device according to the eighth exemplary embodiment, taken in FIG. 18 along arrow XXIA-XXIA and arrow XXIB-XXIB respectively.
Figure 21B:
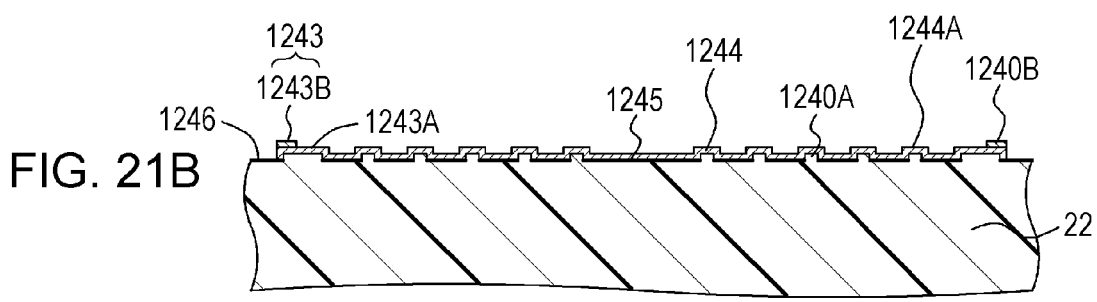
Figure 21C:
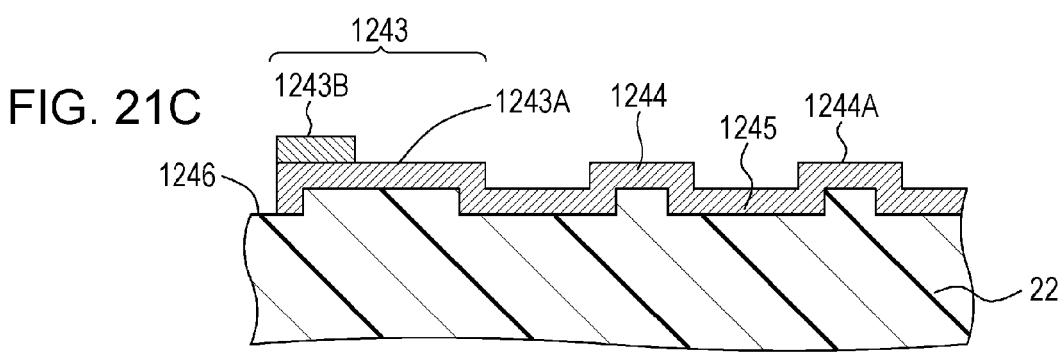
FIG. 21C is a schematic partial cross end view where a portion of FIG. 21B has been enlarged.

The eighth exemplary embodiment is also a modification of the fifth exemplary embodiment, but relates to a liquid crystal display device according to Embodiment 2A-2. FIG. 18 is a schematic plan view of a first electrode for one pixel making up a liquid crystal display device according to the eighth exemplary embodiment, FIG. 19 is a schematic perspective view, FIGS. 21A and 21B are schematic partial cross-sectional views of the first electrode and other components, taken in FIG. 18 along arrow XXIA-XXIA and arrow XXIB-XXIB respectively, and FIG. 21C is a schematic partial cross-sectional view where a portion of FIG. 21B has been enlarged.

Multiple ridge-and-groove portions 1241 (ridges 1242 and grooves 1245) are formed on the first electrode 1240 of the liquid crystal display device according to the eighth exemplary embodiment as well, and multiple stepped portions are formed to the ridges 1242 provided to the first electrode 1240. Specifically, the liquid crystal display device according to the eighth exemplary embodiment is configured such that each ridge-and-groove portion 1241 has a trunk ridge (main ridge) 1243 which is formed on the perimeter portion of a pixel and is shaped like a frame, and multiple branch ridges (sub ridges) 1244 extending from the trunk ridge 1243 toward the middle of the pixel. Assuming an X-Y coordinate system in which straight lines passing through the center of the pixel are parallel to the perimeters of the pixel are the X axis and Y axis, the multiple branch ridges 1244 occupying the first quadrant extend in parallel in a direction where the value of the Y coordinate increases when the value of the X coordinates increases, and the multiple branch ridges 1244 occupying the second quadrant extend in parallel in a direction where the value of the Y coordinate increases when the value of the X coordinates decreases. Also, the multiple branch ridges 1244 occupying the third quadrant extend in parallel in a direction where the value of the Y coordinate decreases when the value of the X coordinates decreases, and the multiple branch ridges 1244 occupying the fourth quadrant extend in parallel in a direction where the value of the Y coordinate decreases when the value of the X coordinates increases.

The cross-sectional shape of the trunk ridge 1243 when cut along an imaginary perpendicular plane orthogonal to the direction in which the trunk ridge 1243 extends is a shape stepping down from the outer edges of the cross-sectional shape of the trunk ridge 1243 towards the inner edges thereof. Specifically, the trunk ridge 1243 is made up of top faces 1243B on the outer edges of the trunk ridge 1243 and top faces 1243A situated on the inner edges. Thus, the trunk ridge 1243 has two stepped portions, with the top faces 1243A being higher than the grooves 1245, and the top faces 1243B being higher than the top faces 1243A. Reference symbol 1244A denotes top faces of branch ridges 1244, the top face 1243A of the trunk ridge 1243 being the same height as the top faces 1244A of the branch ridges 1244. In the drawings, the top faces 1243B of the trunk ridge 1243 are indicated by horizontal hatching, and the grooves 1245 are indicated by vertical hatching. The groove portion situated at the middle portion of the pixel has a general cross-shape. The specifications of the trunk ridge 1243, branch ridges 1244, and grooves 1245 are as shown in Table 6 below.

TABLE 6

| | |
|---|---|
| Difference in height between top faces 1243A and top faces 1243B of trunk ridge 1243: | average 0.20 μm |
| Difference in height between top face 1243A of trunk ridge 1243 and grooves 1245: | average 0.20 μm |
| Difference in height between top face 1244A of branch ridges 1244 and grooves 1245: | average 0.20 μm |
| Width of trunk ridge 1243 (width of top face 1243A of trunk ridge 1243): | 8.0 μm |
| Width of top face 1243B of trunk ridge 1243: | 4.0 μm |
| Width of branch ridges 1244 (width of top face 1244A of branch ridges 1244): | 2.5 μm |
| Gap between branch ridges 1244 (spacing): | 2.5 μm |
| Width of cross-shaped groove at middle of pixel: | 4.0 μm |

Other than the above points, the configuration and structure of the liquid crystal display device according to the eighth exemplary embodiment can be made to be the same as the configuration and structure of the liquid crystal display device according to the fifth exemplary embodiment, so detailed description thereof will be omitted.

The eighth exemplary embodiment has multiple stepped portions formed at the trunk ridge 1243, so the electric field is the greatest at the outer edge portion of the trunk ridge 1243 and is weaker toward the inner edges of the trunk ridge 1243. This enables the force to restrict the alignment of the liquid crystal molecules at the middle portion of the trunk ridge 1243 to be increased, and accordingly restrict the tilted state of the liquid crystal molecules at the trunk ridge 1243 in a sure manner. Thus, the problem where dark lines occur at portions of the image corresponding to the trunk ridge 1243 when displaying images can be suppressed in a sure manner. Accordingly, a liquid crystal display device can be provided which realizes even better light transmittance while maintaining good voltage responsivity, reduction in cost of the light source making up the backlight and reduction in electric power consumption can be realized, and reliability of TFTs can be improved.

10. Ninth Exemplary Embodiment

Figure 20:
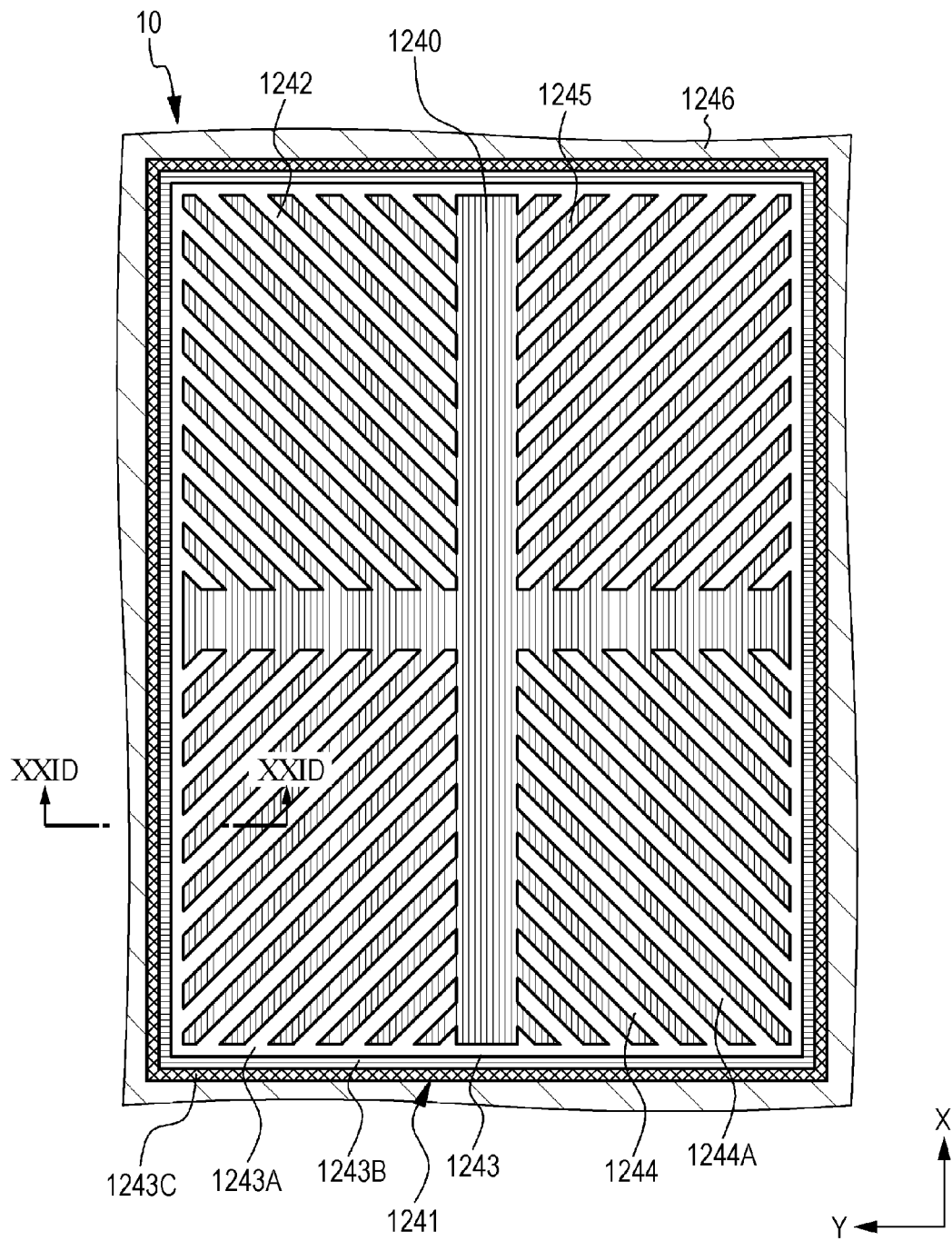
FIG. 20 is a schematic plan view of a first electrode for one pixel making up a liquid crystal display device according to a ninth exemplary embodiment.
Figure 21D:
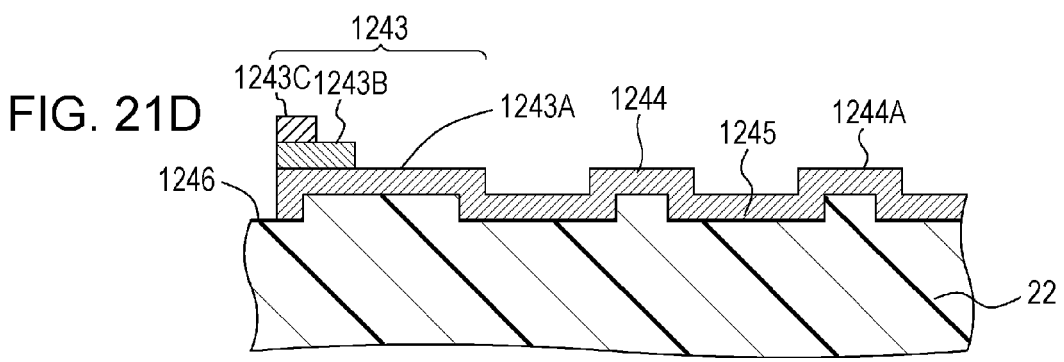
FIG. 21D is a schematic partial end view of the first electrode and other components of the liquid crystal display device according to the ninth exemplary embodiment, taken in FIG. 20 along arrow XXID-XXID.

The ninth exemplary embodiment is a modification of the eighth exemplary embodiment. FIG. 20 is a schematic plan view of a first electrode for one pixel making up a liquid crystal display device according to the ninth exemplary embodiment, and FIG. 21D is a schematic partial end view of the first electrode enlarged.

The top faces of the trunk ridge 1243 according to the ninth exemplary embodiment include a top face 1243C at the outer edge portion of the trunk ridge 1243, and top faces 1243B and top faces 1243A progressing toward the inner edge portion. Thus, the trunk ridge 1243 has three stepped portions, the top face 1243A is higher than the grooves 1245, the top face 1243B is higher than the top face 1243A, and the top face 1243C is higher than the top face 1243B. The top face 1243C is indicated by cross-hatching in the drawings. The difference in height between the top face 1243C and top face 1243B of the trunk ridge 1243, and the difference in height between the top face 1243B and top face 1243A thereof, was made to be 0.20 μm on average. Other specifications of the trunk ridge 1243, branch ridges 1244, and grooves 1245, are the same as given in Table 6.

Other than the above points, the configuration and structure of the liquid crystal display device according to the ninth exemplary embodiment can be made to be the same as the configuration and structure of the liquid crystal display device according to the eighth exemplary embodiment, so detailed description thereof will be omitted.

11. Tenth Exemplary Embodiment

Figure 22:
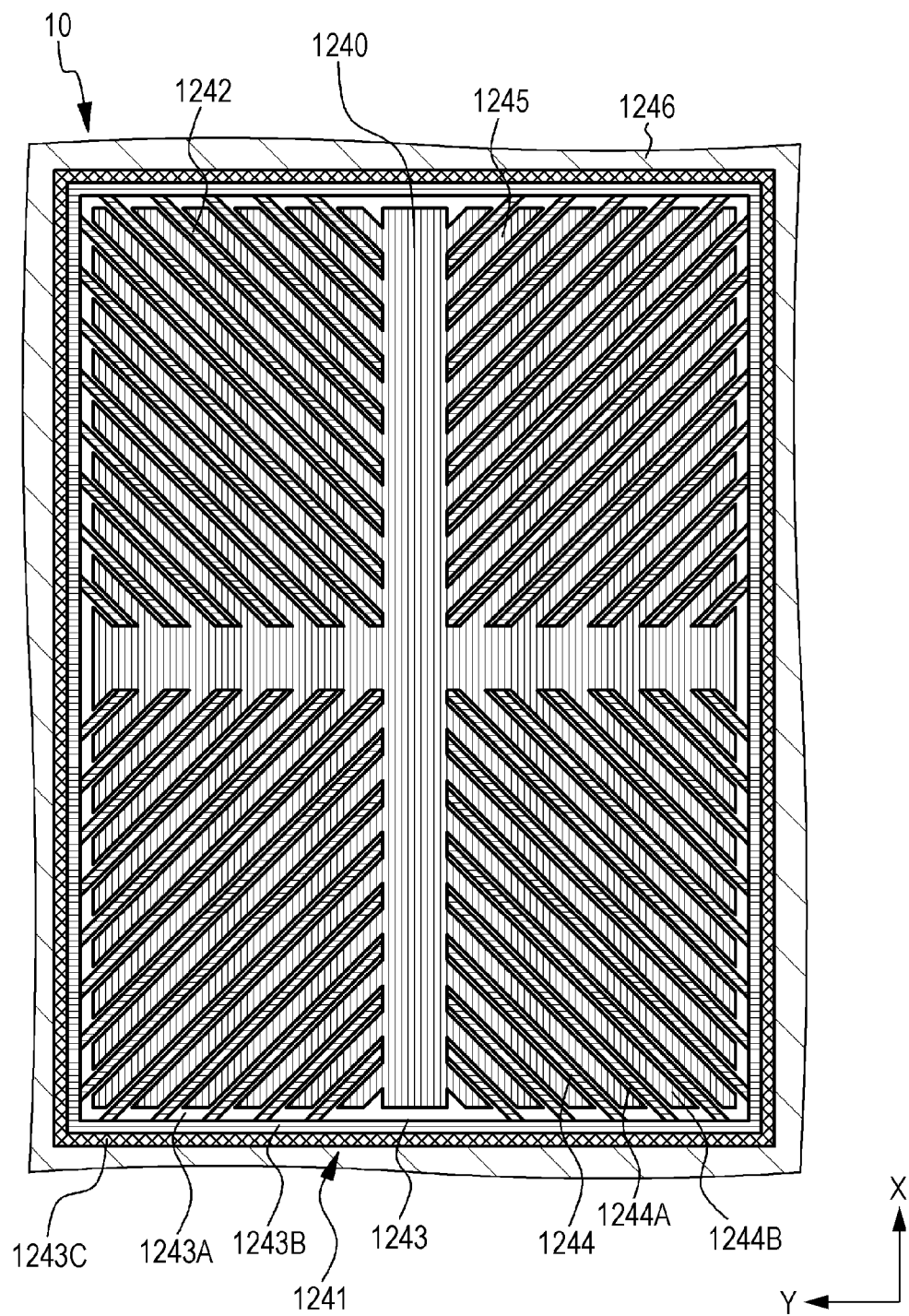
FIG. 22 is a schematic plan view of a first electrode for one pixel making up a liquid crystal display device according to a tenth exemplary embodiment.

The tenth exemplary embodiment is a modification of the ninth exemplary embodiment. FIG. 22 is a schematic plan view of a first electrode for one pixel making up a liquid crystal display device according to the tenth exemplary embodiment.

In the tenth exemplary embodiment, the cross-sectional shape of the branch ridges 1244 when cut along an imaginary perpendicular plane orthogonal to the direction in which the branch ridges 1244 extend, separate from the above-described cross-sectional views, is a shape stepping down from the center of the cross-sectional shape of the branch ridges 1244 towards the edges thereof. Specifically, the top faces of the branch ridges 1244 include top faces 1244B extending from the top face 1243B of the trunk ridge 1243, and top faces 1244A situated on either side of the top faces 1244B. Thus, the branch ridges 1244 have two stepped portions, with the top faces 1244A being higher than the grooves 1245, and the top faces 1244B being higher than the top faces 1244A. The top faces 1244B are indicated by horizontal hatching in the drawings. The difference in height between the top faces 1244B and top faces 1244A of the branch ridges 1244 was made to be 0.28 µm on average. Other specifications of the trunk ridge 1243, branch ridges 1244, and grooves 1245, are the same as given in Table 6. The top faces 1243B of the trunk ridge 1243 and the top faces 1244B of the branch ridges 1244 are at the same height.

Figure 23:
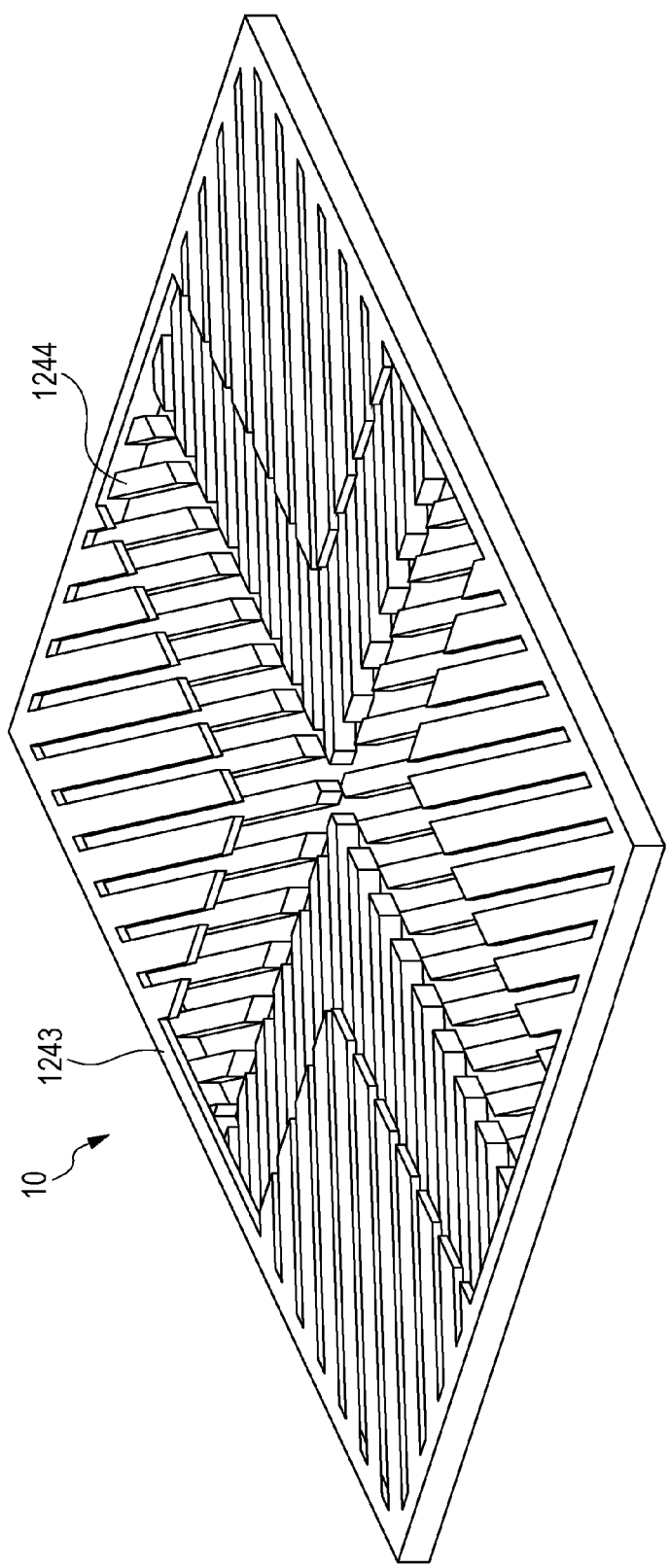
FIG. 23 is a schematic perspective view of the first electrode for one pixel making up the liquid crystal display device according to a modification of the tenth exemplary embodiment.

Alternatively, the cross-sectional shape of the branch ridges 1244 when cut along an imaginary perpendicular plane parallel to the direction in which the branch ridges 1244 extends is a shape stepping down from the portions of the branch ridges 1244 closer to the trunk ridge 1243 toward the ends of the branch ridges 1244. Such an arrangement is illustrated in FIG. 23, which is a schematic perspective view of a first electrode for one pixel making up a liquid crystal display device according to a modification of the tenth exemplary embodiment.

Other than the above points, the configuration and structure of the liquid crystal display device according to the tenth exemplary embodiment can be made to be the same as the configuration and structure of the liquid crystal display device according to the eighth exemplary embodiment, so detailed description thereof will be omitted. Also, the top faces of the trunk ridge 1243 may be configured including the top face 1243B, and the top faces 1243A situated on both sides of the top face 1243B.

12. Eleventh Exemplary Embodiment

Figure 24:
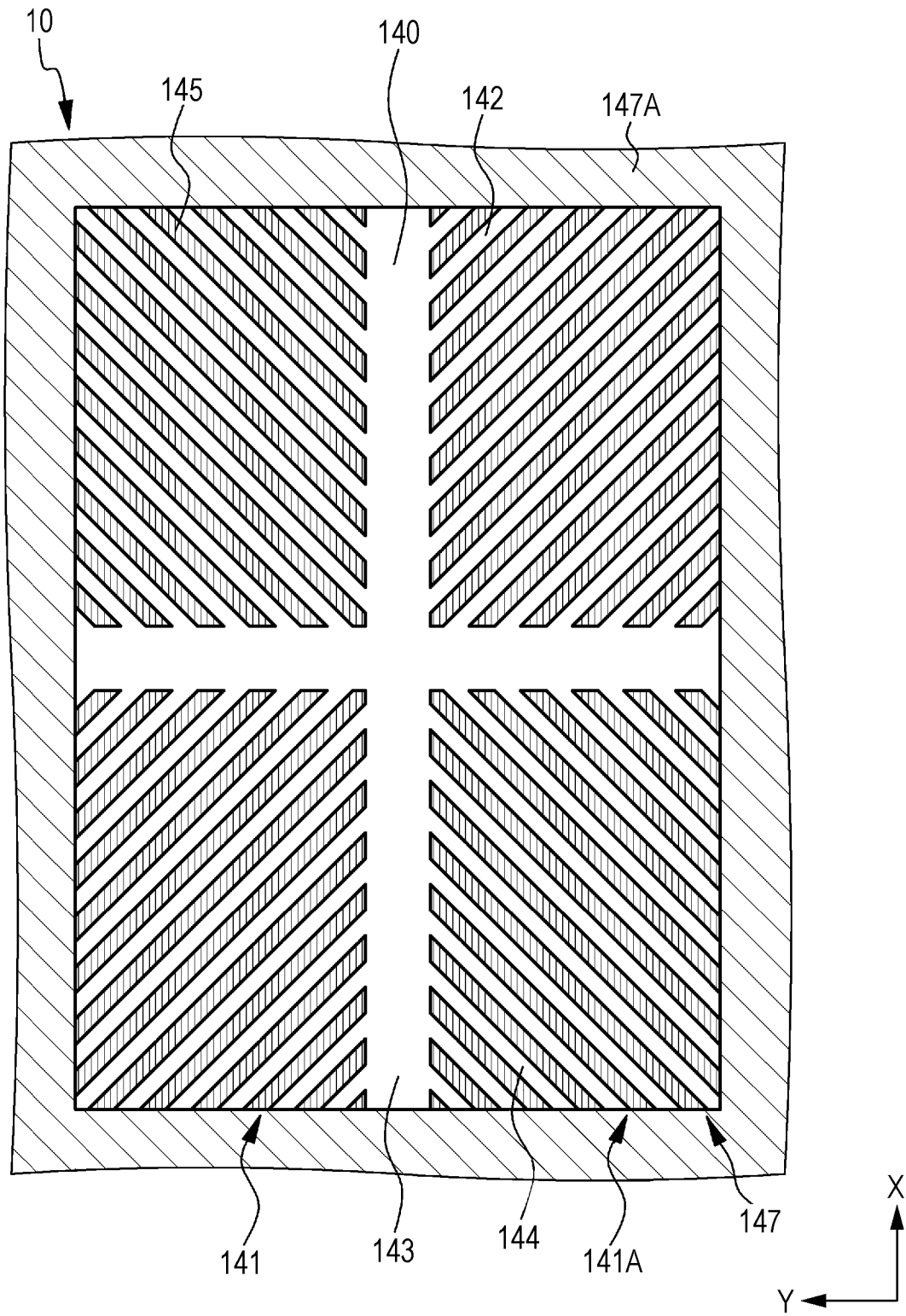
FIG. 24 is a schematic plan view of a first electrode for one pixel making up a liquid crystal display device according to an eleventh exemplary embodiment.
Figure 25:
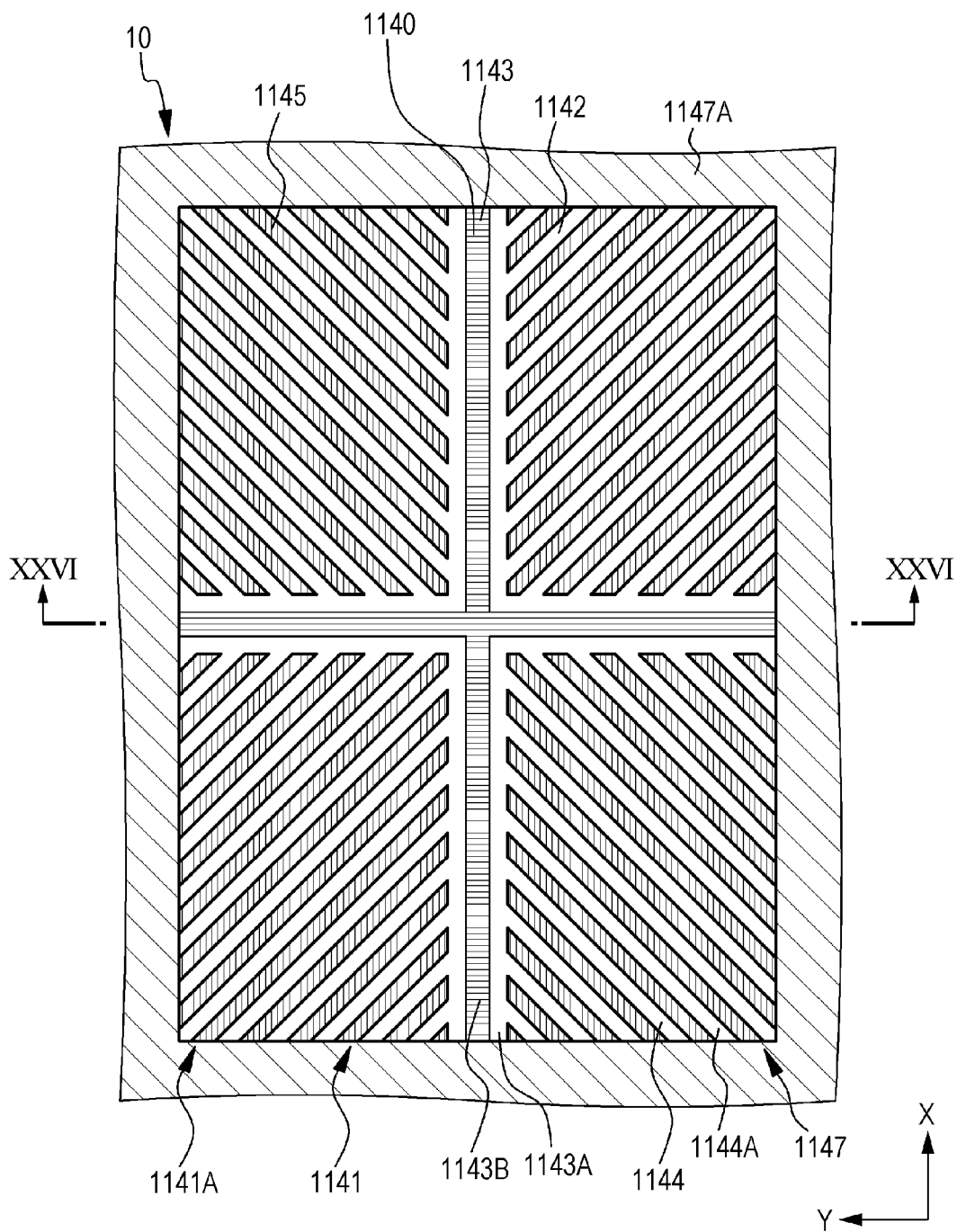
FIG. 25 is a schematic plan view of a first electrode for one pixel making up a liquid crystal display device according to a modification of the eleventh exemplary embodiment.
Figure 26:
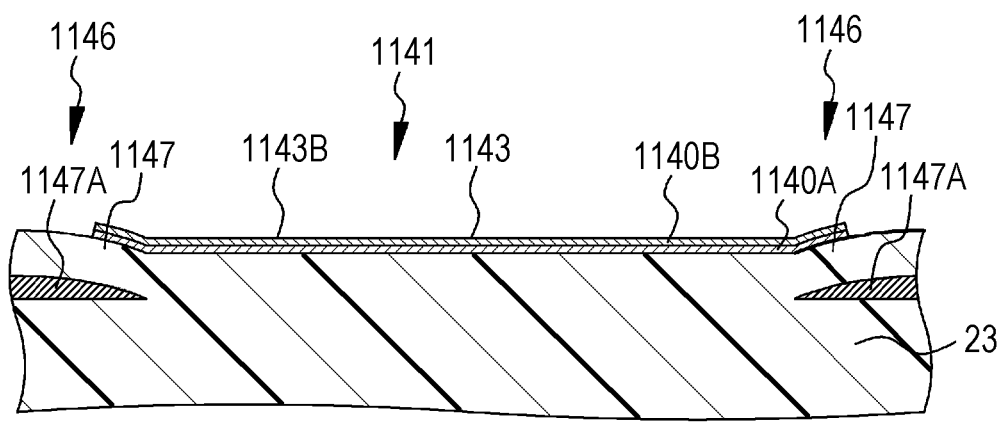
FIG. 26 is a schematic partial cross-sectional view of the first electrode and other components of the liquid crystal display device according to the eleventh exemplary embodiment, taken in FIG. 25 along arrow XXVI-XXVI.

The eleventh exemplary embodiment is a modification of the liquid crystal display device described with reference to the first through tenth exemplary embodiments, or relates to a liquid crystal display device according to Embodiment 2B of the present disclosure, and more particularly to a liquid crystal display device according to Embodiment 2B-1 of the present disclosure. FIG. 24 is a schematic plan view of a first electrode for one pixel making up a liquid crystal display device according to the eleventh exemplary embodiment. The example illustrated in FIG. 24 is a modification of the first exemplary embodiment. Also, FIG. 25 is a schematic plan view of a first electrode for one pixel making up a liquid crystal display device according to a modification of the eleventh exemplary embodiment. The example illustrated in FIG. 25 is a modification of the fifth exemplary embodiment. FIG. 26 is a schematic partial cross-sectional view of the first electrode and other components, taken in FIG. 25 along arrow XXVI-XXVI.

Multiple ridge-and-groove portions 141 (1141) are formed on the first electrode 140 (1140) of the liquid crystal display device according to the eleventh exemplary embodiment. A ridge structure 147 (1147) is formed on portions of the first substrate between pixels 10, corresponding to the peripheral portion of the pixels. Peripheral portions 141A (1141A) of the ridge-and-groove portions 141 (1140) are formed on the ridge structure 147 (1147). More particularly, the ridge structure 147 (1147) is formed based on a black matrix 1147A formed on the color filter layer 23. The black matrix 1147A is formed of a light setting resin to which carbon has been added. The specifications of the trunk ridge 143 (1143), branch ridges 144 (1144), and grooves 145 (1145) are as described in Tables 1 and 5 above, and the difference in height between the top face 1143B and the top face 1143A of the trunk ridge 1143 was made to be 0.20 µm on average, and the height from the planarization film 22 to the end of the ridge-and-groove portion 141 (1141) was made to be 0.3 µm on average.

The liquid crystal display device according to the eleventh exemplary embodiment has the peripheral portions 141A (1141A) of the ridge-and-groove portions 141 (1141) formed on the ridge structure 147 (1147), so the electric field is even greater than an arrangement where the peripheral portions of the ridge-and-groove portions are flat. This enables the force to restrict the alignment of the liquid crystal molecules at the peripheral portions 141A (1141A) of the ridge-and-groove portions 141 (1141) to be increased, and accordingly restrict the tilted state of the liquid crystal molecules at the peripheral portions 141A (1141A) of the ridge-and-groove portions 141 (1141) in a sure manner, thus maintaining good voltage responsivity.

The ridge structure is not restricted to being formed based on a black matrix, and may be formed on the first substrate 20, or on liquid crystal display device components formed above the first substrate 20 such as various types of signal lines and auxiliary capacitance electrodes, gate electrodes, source/drain electrodes, and various types of wiring. In this case, ridge structures can be formed in the planarization film 22 due to the thickness of the liquid crystal display device components, by optimizing the thickness of the planarization film 22.

Alternatively, a liquid crystal display device according to Embodiment 2B-2 of the present disclosure may be configured. It is needless to mention that the trunk ridge (main ridge) 243 (1243) formed in a frame shape at the perimeter portion of the ridge-and-groove portion 241 (1241) described in the fourth and eighth exemplary embodiments, i.e., at the pixel perimeter portions may be formed at the ridge structure 147 (1147). Also note that the ridge structure according to the eleventh exemplary embodiment may also be applied to the twelfth exemplary embodiment and subsequent exemplary embodiments.

13. Twelfth Exemplary Embodiment

Figure 27:
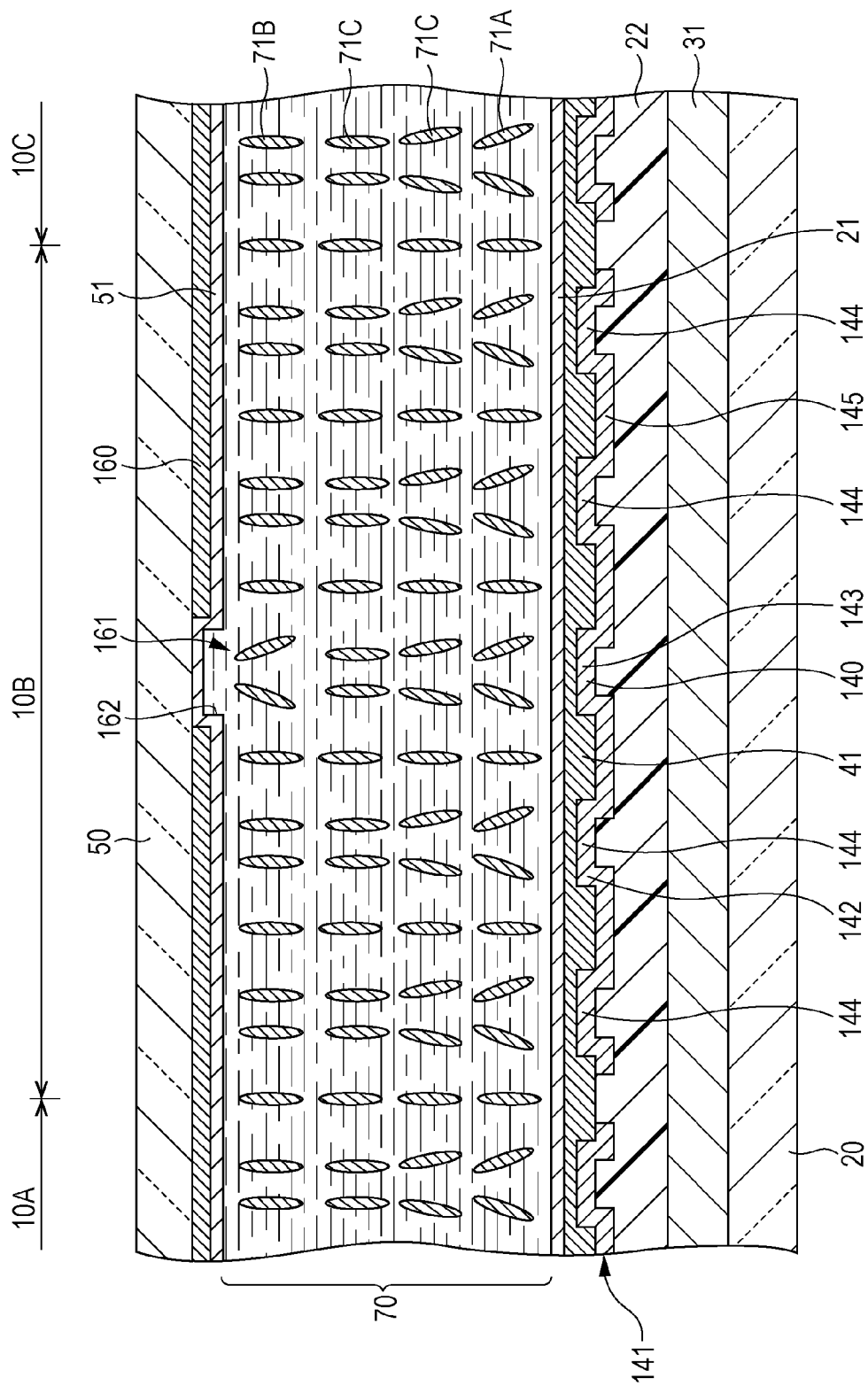
FIG. 27 is a schematic partial end view of a liquid crystal display device according to a twelfth exemplary embodiment.
Figure 28:
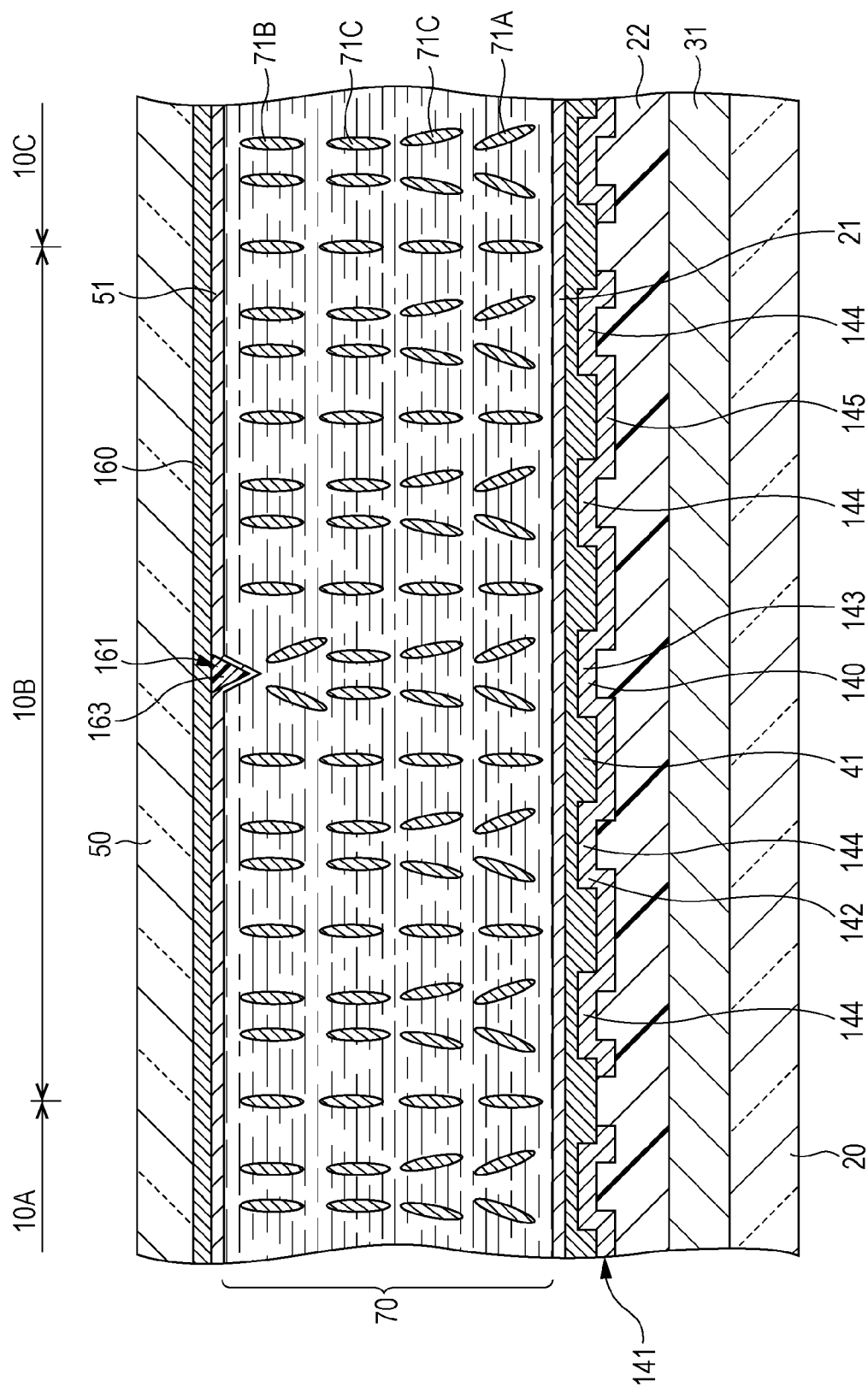
FIG. 28 is a schematic partial end view of a liquid crystal display device according to a modification of the twelfth exemplary embodiment.
Figure 81B:
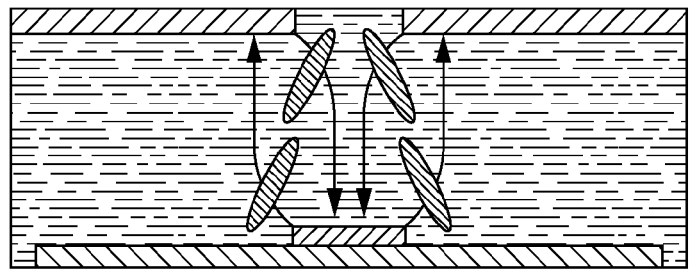
FIGS. 81B and 81C are conceptual diagrams illustrating the behavior of liquid crystal molecules in the liquid crystal display device according to the twelfth exemplary embodiment.
Figure 81C:
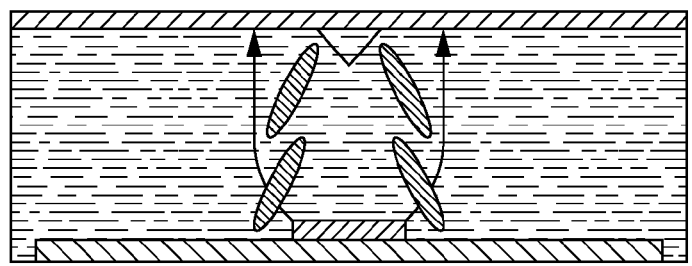

The twelfth exemplary embodiment relates to a liquid crystal display device according to Embodiment 2C of the present disclosure, a modification of the first through third exemplary embodiments (the liquid crystal display device according to Embodiment 1 of the present disclosure), a modification of the fifth through seventh exemplary embodiments (the liquid crystal display device according to Embodiment 2A-1), and a modification of the eleventh exemplary embodiment (the liquid crystal display device according to Embodiment 2B-1). FIGS. 27 and 28 are schematic partial end views of the liquid crystal display device according to the twelfth exemplary embodiment. FIGS. 81B and 81C are conceptual diagrams illustrating the behavior of liquid crystal molecules in the liquid crystal display device according to the twelfth exemplary embodiment.

Multiple ridge-and-groove portions 141 are formed on the first electrode 140 of the liquid crystal display device according to the twelfth exemplary embodiment, as illustrated in FIGS. 4, 9, and 24. The ridge-and-groove portions 141 are each formed of a trunk ridge 143 passing through the center of a pixel and extending in a cross shape, and multiple branch ridges 144 extending toward the perimeter of the pixel from the trunk ridge 143. Alternatively, multiple ridge-and-groove portions 1141 are formed on the first electrode 1140, the ridge-and-groove portions 1141 being each formed of a trunk ridge 1143 passing through the center of a pixel and extending in a cross shape, and multiple branch ridges 1144 extending toward the perimeter of the pixel from the trunk ridge 1143, as illustrated in FIGS. 10, 13, 14, 16, 17, and 25. An alignment restricting portion 161 is formed at the part of the second electrode 160 that faces the trunk ridge 143 (1143), as illustrated in FIGS. 27 and 28.

This alignment restricting portion 161 is a 4.0-μm slit portion 162 provided to the second electrode 160 (see FIGS. 27 and 81B), or a protrusion (rib) 163 provided to the second electrode 160 (see FIGS. 28 and 81C). More specifically, the protrusion 163 is formed of a negative photoresist material (Optomer AL manufactured by JSR Corporation), and is 1.4 μm wide and 1.2 μm high. The specifications of the trunk ridge 1143, branch ridges 1144, and grooves 1145, are the same as given in Table 5. The difference in height between the top faces 1143B and top faces 1143A thereof was made to be 0.20 μm on average. The planar shape of the protrusion (rib) 163 is a cross shape, and the cross-sectional form of the slit portion 162 of the protrusion 163 is an isosceles triangle. The second electrode 160 is not formed above the slit portion 162 or protrusion 163.

The alignment restricting portion 161 formed of the slit portion 162 is formed at the portion of the second electrode 160 corresponding to the trunk ridge 143 (1143) of the liquid crystal display device according to the twelfth exemplary embodiment, so an electric field generated by the second electrode 160 is distorted near the alignment restricting portion 161. Alternatively, the alignment restricting portion 161 formed of the protrusion (rib) 163 is formed, so the direction in which the liquid crystal molecules near the protrusion 163 tilt is restricted. This enables the force to restrict the alignment of the liquid crystal molecules near the alignment restricting portion 161 to be increased, and accordingly restrict the tilted state of the liquid crystal molecules near the alignment restricting portion 161 in a sure manner. Thus, the problem where dark lines occur at portions of the image corresponding to the trunk ridge 1243 when displaying images can be suppressed in a sure manner. Accordingly, a liquid crystal display device can be provided which realizes even better light transmittance while maintaining good voltage responsivity, reduction in cost of the light source making up the backlight and reduction in electric power consumption can be realized, and reliability of TFTs can be improved. Note that the near the alignment restricting portion 161 may be formed from protruding second electrode 160 portions as well.

The twelfth exemplary embodiment can be applied to the fourteenth and subsequent exemplary embodiments, as can the thirteenth exemplary embodiment as well.

14. Thirteenth Exemplary Embodiment

Figure 29:
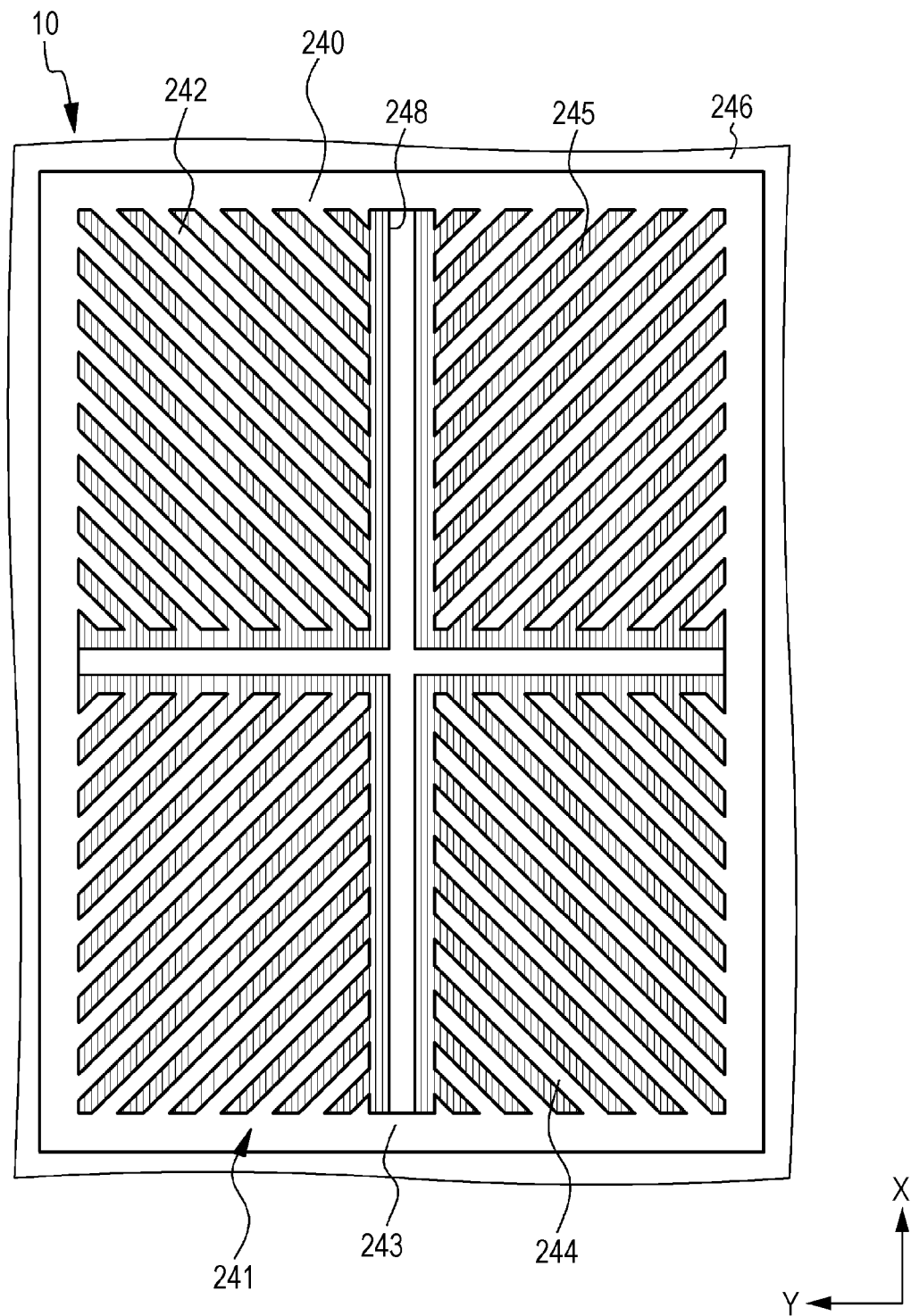
FIG. 29 is a schematic plan view of a first electrode for one pixel making up a liquid crystal display device according to a thirteenth exemplary embodiment.
Figure 30:
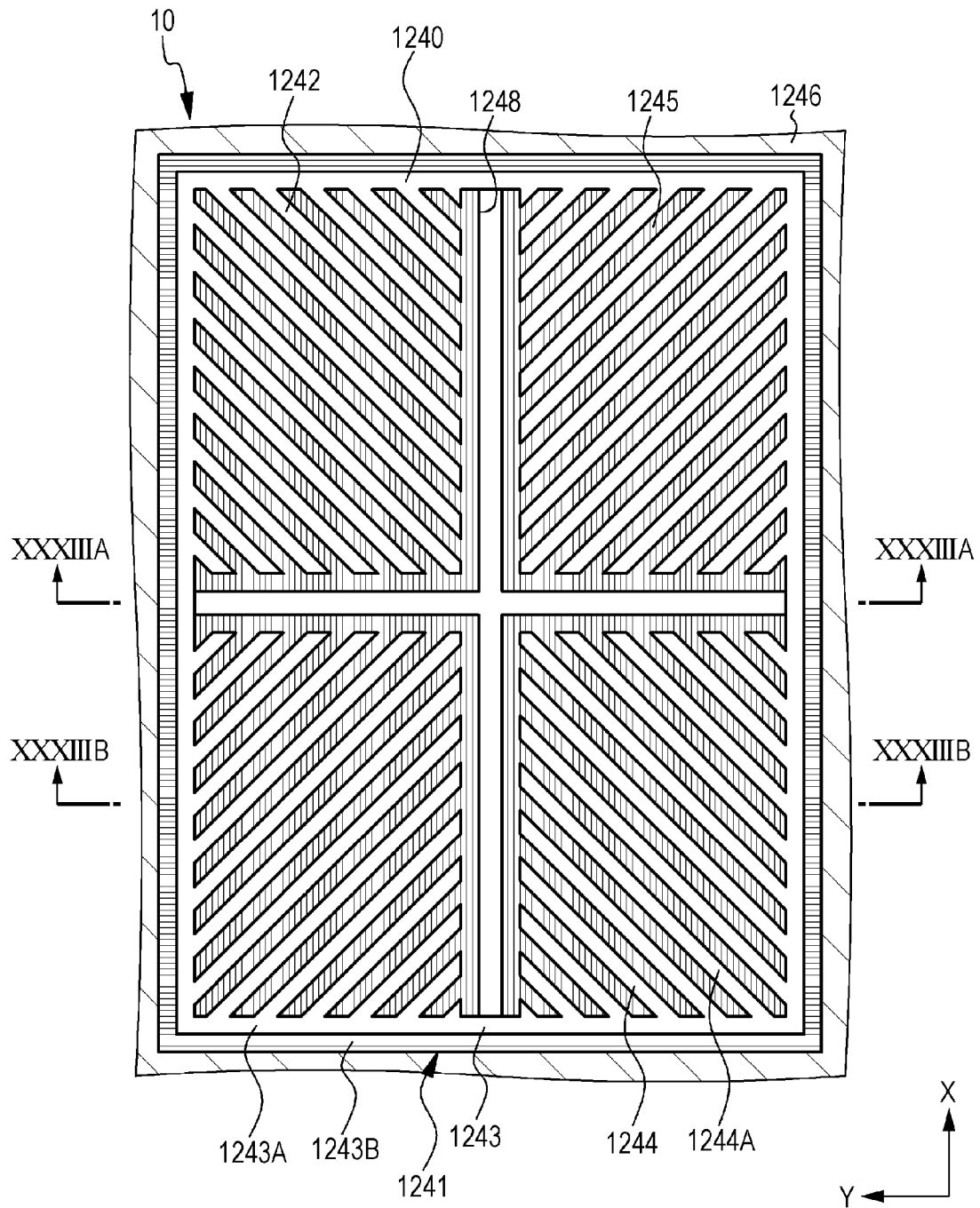
FIG. 30 is a schematic plan view of a first electrode for one pixel making up a liquid crystal display device according to a modification of the thirteenth exemplary embodiment.
Figure 31:
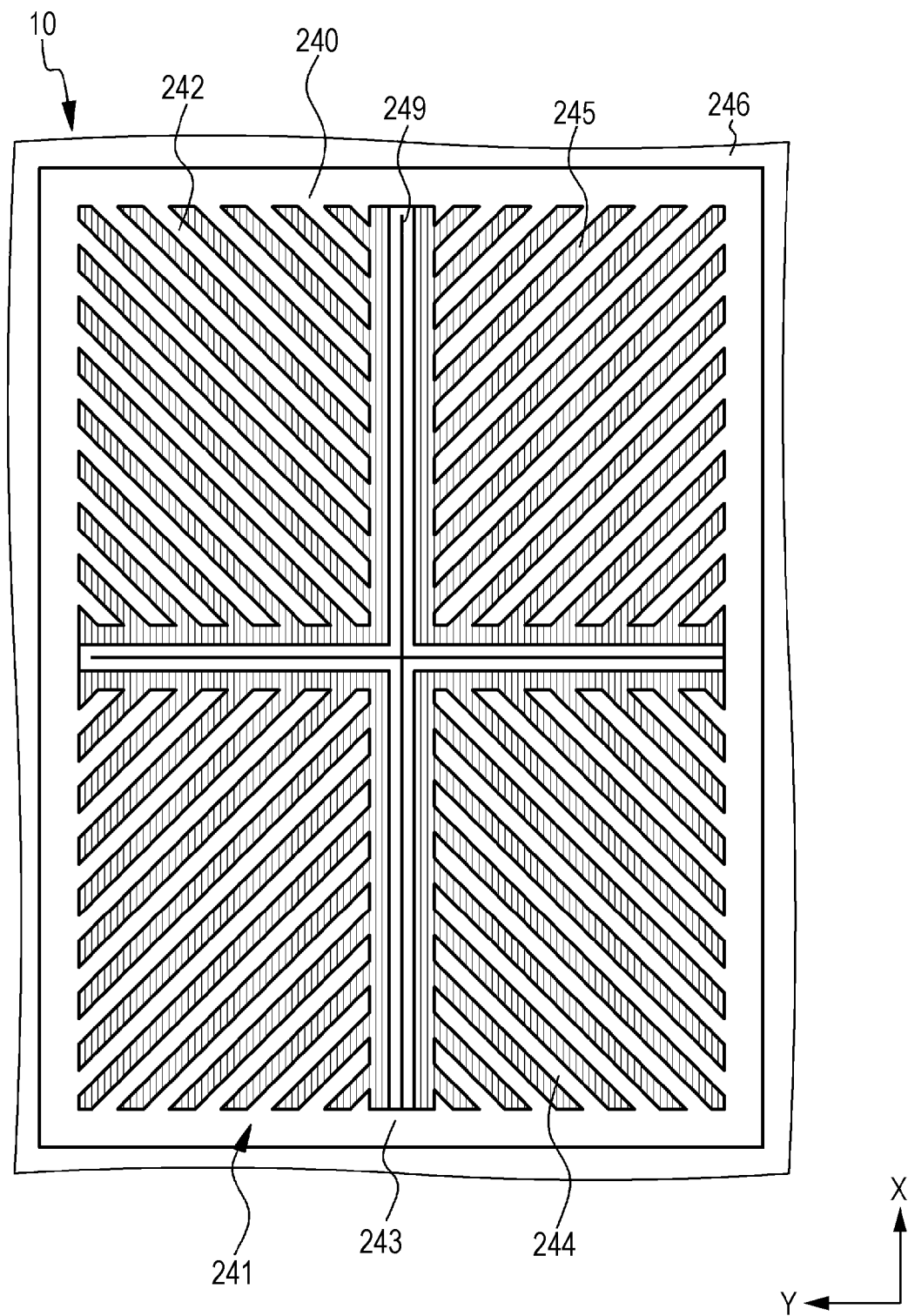
FIG. 31 is a schematic plan view of a first electrode for one pixel making up a liquid crystal display device according to another modification of the thirteenth exemplary embodiment.
Figure 32:
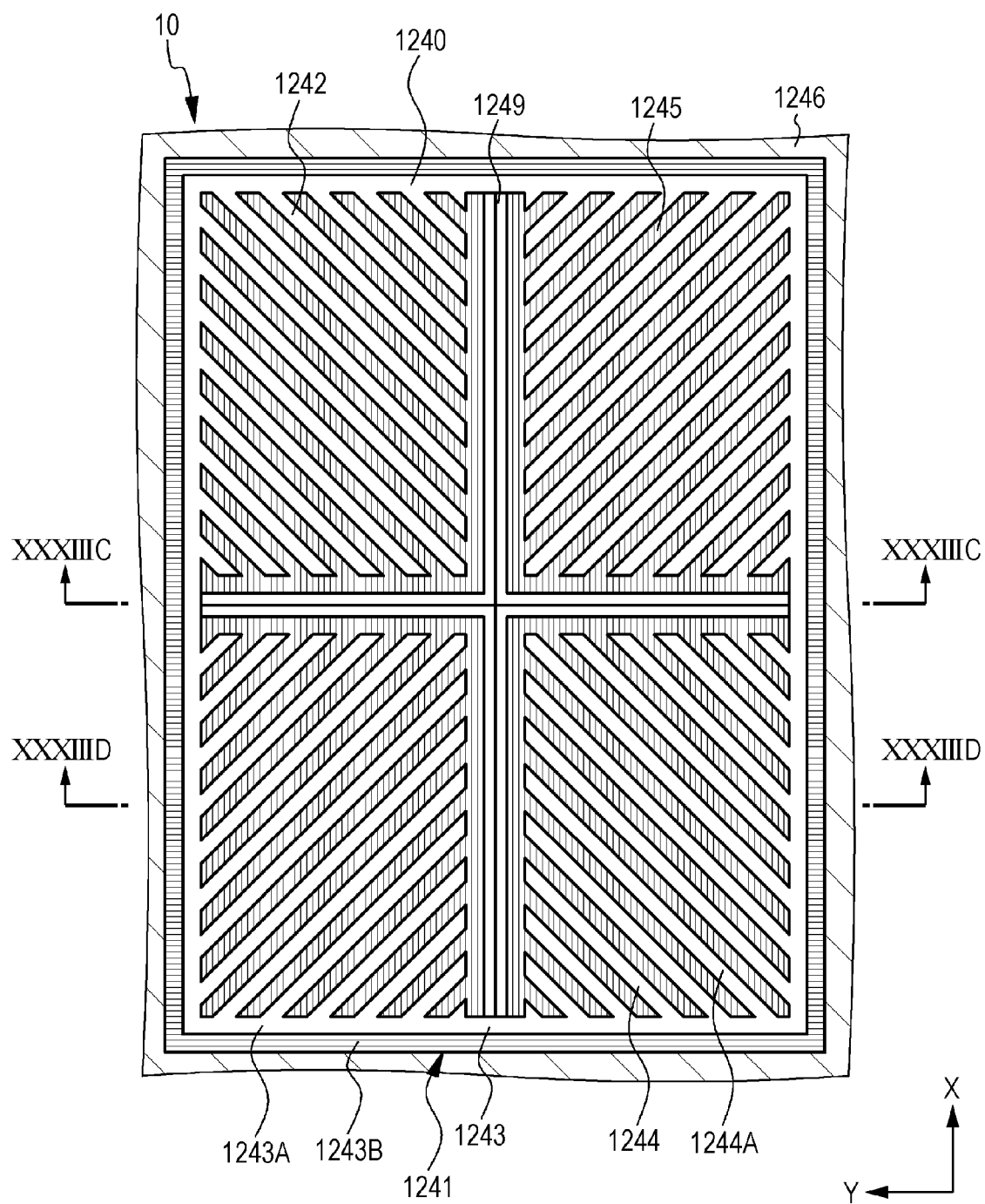
FIG. 32 is a schematic plan view of a first electrode for one pixel making up a liquid crystal display device according to yet another modification of the thirteenth exemplary embodiment.
Figure 33A:
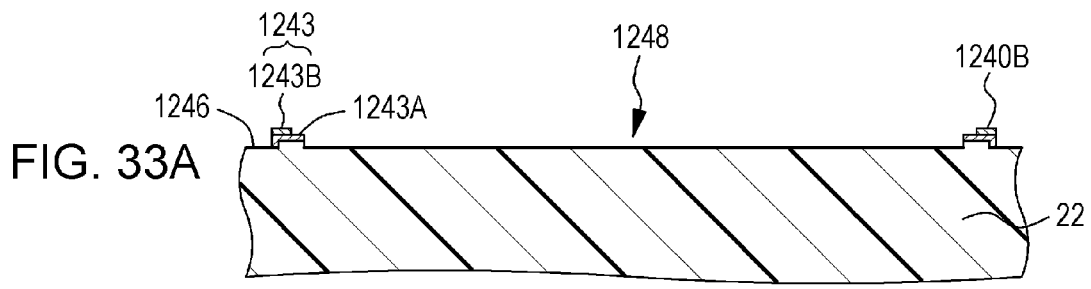
FIGS. 33A and 33B are schematic partial end views of the first electrode and other components of the liquid crystal display device according to the thirteenth exemplary embodiment, taken in FIG. 30 along arrow XXXIIIA-XXXIIIA and arrow XXXIIIB-XXXIIIB respectively.
Figure 33B:
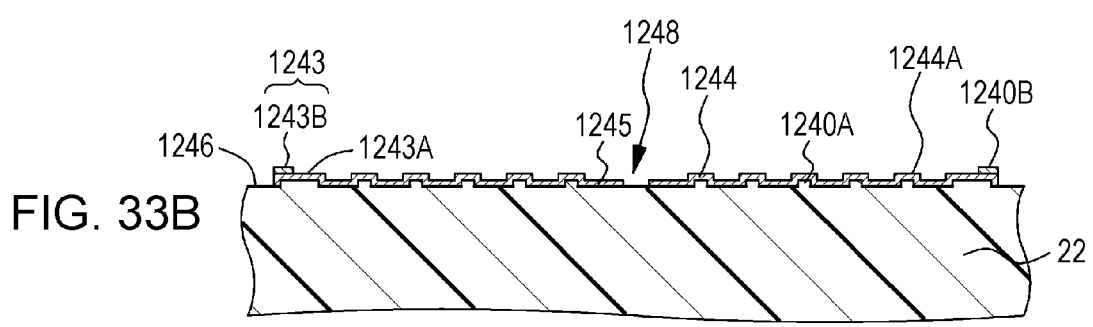
Figure 33C:
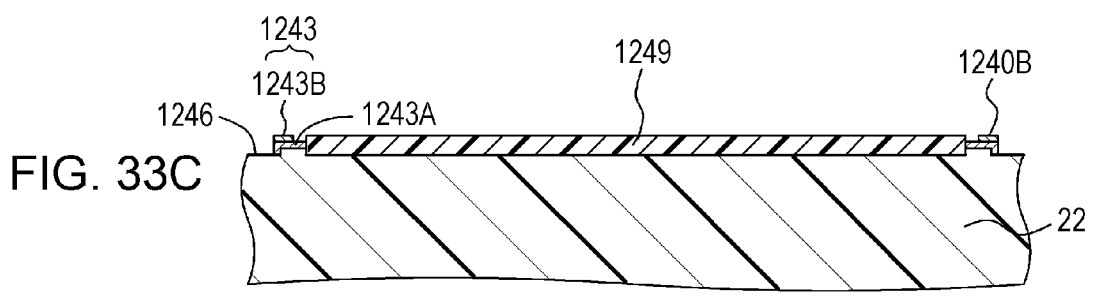
FIGS. 33C and 33D are schematic partial end views of the first electrode and other components of the liquid crystal display device according to the thirteenth exemplary embodiment, taken in FIG. 32 along arrow XXXIIIC-XXXIIIC and arrow XXXIIID-XXXIIID respectively.
Figure 33D:
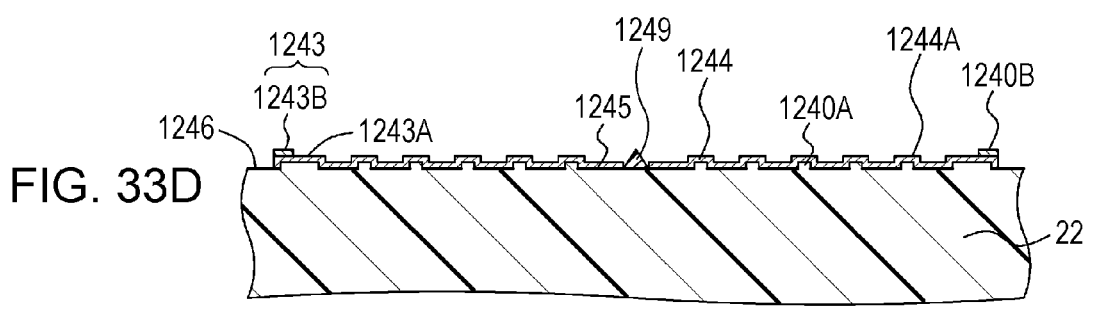

The thirteenth exemplary embodiment relates to a liquid crystal display device according to Embodiment 2D of the present disclosure, a modification of the fourth exemplary embodiment (the liquid crystal display device according to Embodiment 1-2 of the present disclosure), a modification of the eighth through tenth exemplary embodiments (the liquid crystal display device according to Embodiment 2A-2), and a modification of the eleventh exemplary embodiment (the liquid crystal display device according to Embodiment 2B-2). FIGS. 29 through 32 are schematic plan views of a first electrode for one pixel making up a liquid crystal display device according to the thirteenth exemplary embodiment. The examples illustrated in FIGS. 29 and 31 are modifications of the fourth exemplary embodiment. The examples illustrated in FIGS. 30 and 32 are modifications of the eighth exemplary embodiment, where multiple ridge-and-groove portions 1241 are formed on the first electrode 1240, and further multiple stepped portions are also formed. FIGS. 33A and 33B are schematic partial cross-sectional views of the first electrode and other components, taken in FIG. 30 along arrow XXXIIIA-XXXIIIA and arrow XXXIIIB-XXXIIIB respectively, and FIGS. 33C and 33D are schematic partial cross-sectional views of the first electrode and other components, taken in FIG. 32 along arrow XXXIIIC-XXXIIIC and arrow XXXIIID-XXXIIID respectively.

The liquid crystal display device according to the thirteenth exemplary embodiment includes multiple ridge-and-groove portions 241 (1241) formed on the first electrode 240 (1240), wherein the ridge-and-groove portions 241 (1241) are each formed of a trunk ridge 243 (1243) formed on the perimeter portion of the pixel in a frame shape, and multiple branch ridges 244 (1244) extend inward in the pixel from the trunk ridge 243 (1243). A slit portion 248 (1248) (see FIGS. 29 and 30) or a protrusion (rib) 249 (1249) (see FIGS. 31 and 32) is formed on the first electrode 240 (1240), passing through the center of the pixel and parallel to the perimeter of the pixel. That is to say, the slit portion 248 (1248) or protrusion 249 (1249) is formed in the cross-shaped groove portion formed at the middle of the pixel. The planar shape of the slit portion 248 (1248) or protrusion 249 (1249) is a cross shape.

The specifications of the trunk ridge 243 (1243), branch ridges 244 (1244), and grooves 245 (1245), are the same as given in Tables 1 and 6. The width of the slit portion 248 (1248) was set to 4.0 μm. The protrusion 249 (1249) was formed of a negative photoresist material (Optomer AL manufactured by JSR Corporation) to a width of 1.4 μm and a height of 1.2 μm. The cross-sectional form of the protrusion 249 (1249) is an isosceles triangle. The first electrode 240 (1240) is not formed above the slit portion 248 (1248) or protrusion 249 (1249).

A slit portion or protrusion passing through the center of the pixel parallel to the perimeter portions of the pixel is formed at the first electrode in the liquid crystal display device according to the thirteenth exemplary embodiment. Accordingly, an electric field generated by the first electrode is distorted near the slit portion (in the case of having formed the slit portion), or the direction in which the liquid crystal molecules tilt is restricted near the protrusion (in the case of having formed the protrusion), in comparison with a case where a smooth groove having no slit portion or protrusion formed thereat is formed at the first electrode. This enables the force to restrict the alignment of the liquid crystal molecules near the slit portion or protrusion to be increased, and accordingly restrict the tilted state of the liquid crystal molecules near the slit portion or protrusion in a sure manner. Thus, the problem where dark lines occur at portions of the image corresponding to the trunk ridge 1243 when displaying images can be suppressed in a sure manner. Accordingly, a liquid crystal display device can be provided which realizes even better light transmittance while maintaining good voltage responsivity, reduction in cost of the light source making up the backlight and reduction in electric power consumption can be realized, and reliability of TFTs can be improved.

Note that the protrusion 249 (1249) may be formed at the first electrode 240 (1240) such that a cross-shaped protrusion passing through the center of the pixel is surrounded by grooves. Such a cross-shaped protrusion may be formed by forming the cross-shaped protrusion on the lower side of the first electrode 240 (1240), or by the same formation method as with the ridge-and-groove portion at the first electrode 240 (1240). Alternatively, a cross-shaped groove may pass through the center of the pixel may be provided instead of providing the slit portion 248 (1248) or protrusion (rib) 249 (1249).

15. Fourteenth Exemplary Embodiment

Figure 34:
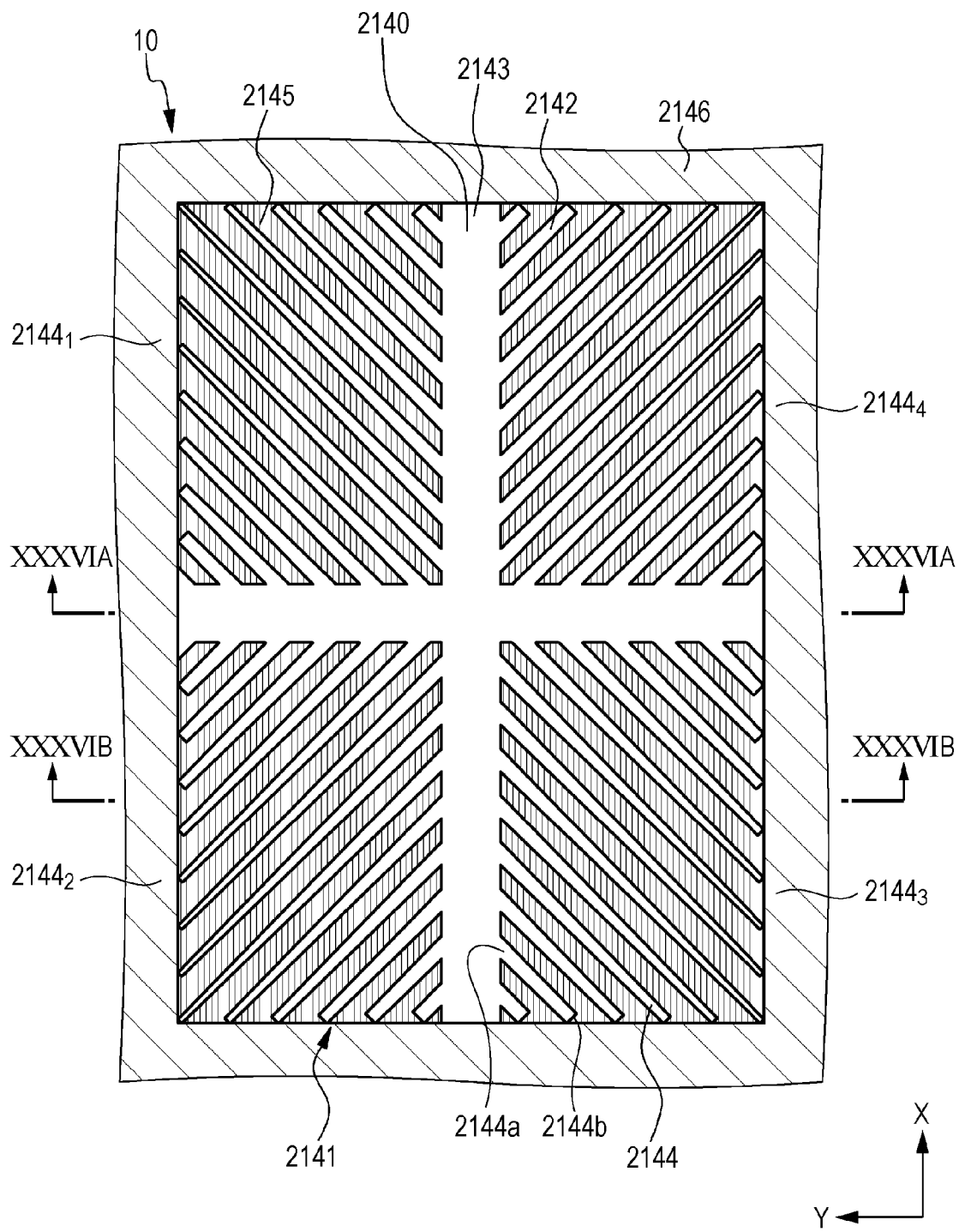
FIG. 34 is a schematic plan view of a first electrode for one pixel making up a liquid crystal display device according to a fourteenth exemplary embodiment.
Figure 35:
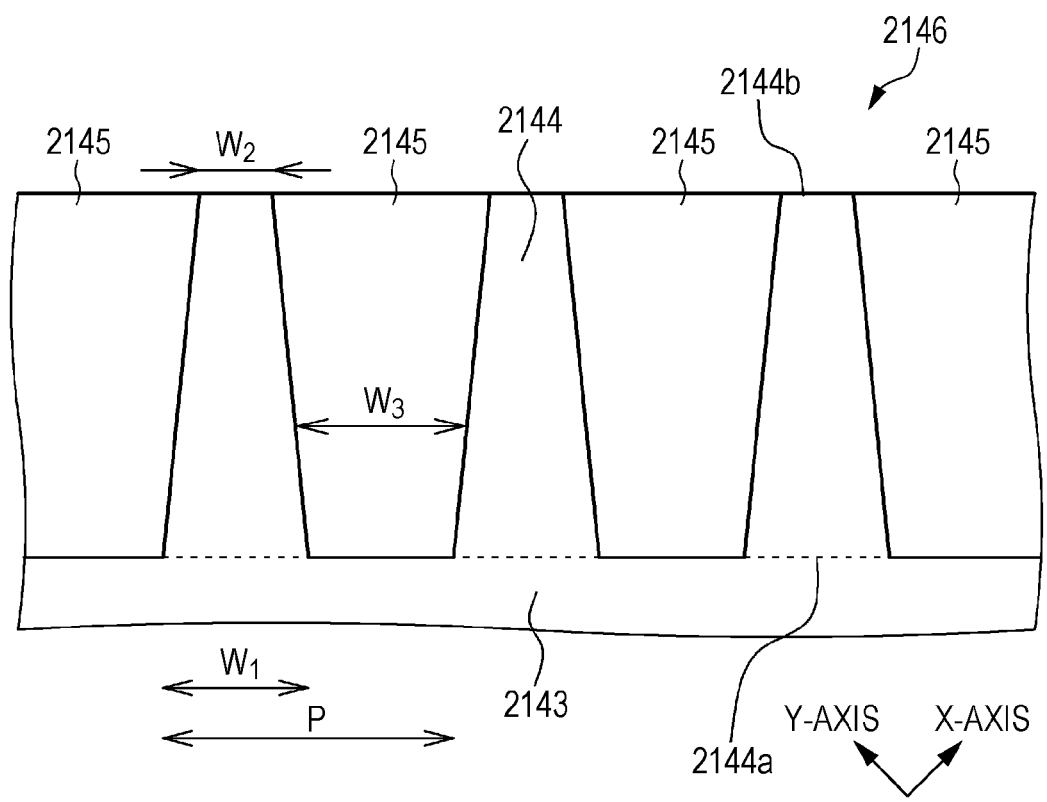
FIG. 35 is a partially enlarged schematic plan view of the first electrode for one pixel making up the liquid crystal display device according to the fourteenth exemplary embodiment.
Figure 36A:
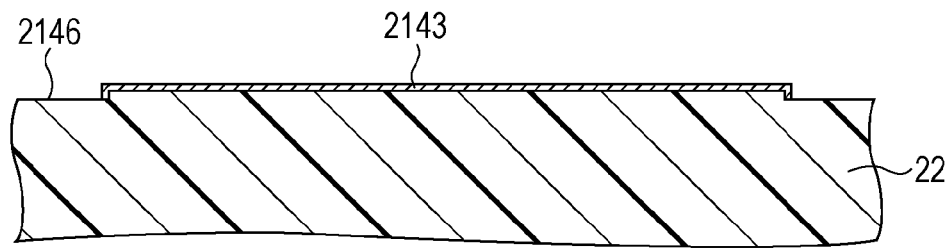
FIGS. 36A and 36B are schematic partial cross-sectional views of the first electrode and other components of the liquid crystal display device according to the fourteenth exemplary embodiment, taken in FIG. 34 along arrow XXXVIA-XXXVIA and arrow XXXVIB-XXXVIB respectively.
Figure 36B:
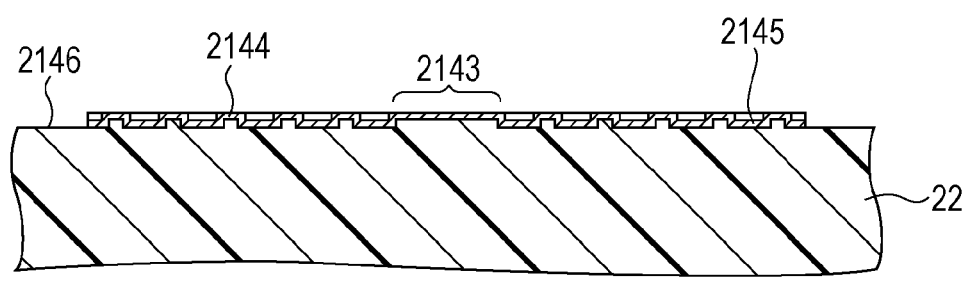
Figure 36C:
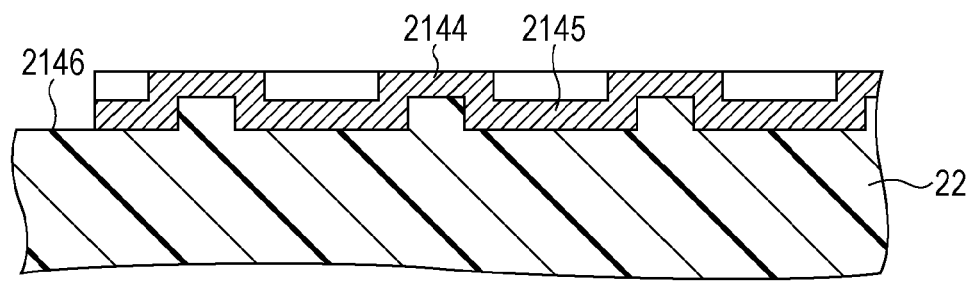
FIG. 36C is a schematic partial cross-sectional view where a portion of FIG. 36B has been enlarged.

The fourteenth exemplary embodiment relates to a liquid crystal display device according to Embodiment 3 of the present disclosure, and more particularly to Embodiment 3A of the present disclosure. FIG. 34 is a schematic plan view of a first electrode for one pixel making up a liquid crystal display device according to the fourteenth exemplary embodiment. FIG. 35 is a partially enlarged schematic plan view of the first electrode for one pixel making up the liquid crystal display device according to the fourteenth exemplary embodiment. FIGS. 36A and 36B are schematic partial cross-sectional views of the first electrode and other components, taken in FIG. 34 along arrow XXXVIA-XXXVIA and arrow XXXVIB-XXXVIB respectively, and FIG. 36C is a schematic partial cross-sectional view where a portion of FIG. 36B has been enlarged. A schematic partial end view of the liquid crystal display device according to the fourteenth exemplary embodiment is essentially the same as with FIGS. 1 through 3.

The liquid crystal display device according to the fourteenth exemplary embodiment, and the later-described fifteenth through thirty-first exemplary embodiments, are, in the same way as with the first through third exemplary embodiments, configured including multiple pixels 10 (10A, 10B, 10C) which are arrayed. The pixels include a first substrate 20 and a second substrate 50, first electrodes (pixel electrodes) 2140 (2240, 2340, 2440) formed on an opposing face of the first substrate 20 facing the second substrate 50, a second electrode (common electrode) 160 formed on an opposing face of the second substrate 50 which faces the first substrate 20, and a liquid crystal layer 70 which is disposed between the first electrode 2140 (2240, 2340, 2440) and second electrode 160, and includes liquid crystal molecules 71A, 71B, and 71C.

The liquid crystal molecules are pretilted. More specifically, at least the liquid crystal molecules closer to the first electrodes are pretilted. The liquid crystal molecules have negative dielectric constant anisotropy.

Multiple ridge-and-groove portions 2141 (2241, 2341, 2441) are formed at the first electrode 2140 (2240, 2340, 2440), and the width of a part of ridges 2142 (2242, 2342, 2442) provided at the first electrode 2140 (2240, 2340, 2440) are narrowed toward the tip. Note that grooves 2145 (2245, 2345, 2445) are indicated by vertical hatching in the drawings.

The liquid crystal display device according to the fourteenth exemplary embodiment is configured such that each ridge-and-groove portion 2141 is formed of a trunk ridge (primary ridge) 2143 passing through the center of a pixel and extending in a cross shape, and multiple branch ridges (sub ridges) 2144 extending toward the perimeter of the pixel from the trunk ridge 2143. The multiple branch ridges 2144 are part of the ridges provided to the first electrode 2140. The branch ridges 2144 are the widest at a portion 2144a joining to the trunk ridge 2143, and grow narrower toward a tip portion 2144b, being narrowed toward the tip portion 2144b from portion 2144a joining the trunk ridge 2143. More specifically, assuming an X-Y coordinate system in which the directions in which the cross-shape trunk ridge 2143 extend are the X axis and Y axis, multiple branch ridges $2144_1$ occupying the first quadrant extend in parallel in a direction where the value of the Y coordinate increases when the value of the X coordinates increases, and multiple branch ridges $2144_2$ occupying the second quadrant extend in parallel in a direction where the value of the Y coordinate increases when the value of the X coordinates decreases. Also, multiple branch ridges $2144_3$ occupying the third quadrant extend in parallel in a direction where the value of the Y coordinate decreases when the value of the X coordinates decreases, and multiple branch ridges $2144_4$ occupying the fourth quadrant extend in parallel in a direction where the value of the Y coordinate decreases when the value of the X coordinates increases.

Multiple branch ridges $2144_1$ occupying the first quadrant extend with the axial line thereof at 45 degrees to the X axis, multiple branch ridges $2144_2$ occupying the second quadrant extend with the axial line thereof at 135 degrees to the X axis, multiple branch ridges $2144_3$ occupying the third quadrant extend with the axial line thereof at 225 degrees to the X axis, and multiple branch ridges $2144_4$ occupying the fourth quadrant extend with the axial line thereof at 315 degrees to the X axis.

The specifications of the trunk ridge 2143, branch ridges 2144, and grooves 2145 are as in Table 7 below. The width of the trunk ridge 2143 was set to 8.0 μm, and the angle $\alpha_0$ between the axial line of the branch ridges and the boundary edge of the trunk ridge (e.g., see FIG. 84) was set to 45 degrees.

TABLE 7

| | |
|---|---|
| Pitch P of formation of branch ridges: | 8.0 μm |
| Width $W_2$ of tip portion of branch ridges: | 4.0 μm |
| Width $W_1$ of base portion of branch ridges: | 6.0 μm |
| Distance $W_3$ between branch ridges: | 2.0 μm |
| Average width $W_{ave1}$ of branch ridges: | 5.0 μm |
| Overall tapered width TP of branch ridges: | 2.0 μm |

Figure 37A:
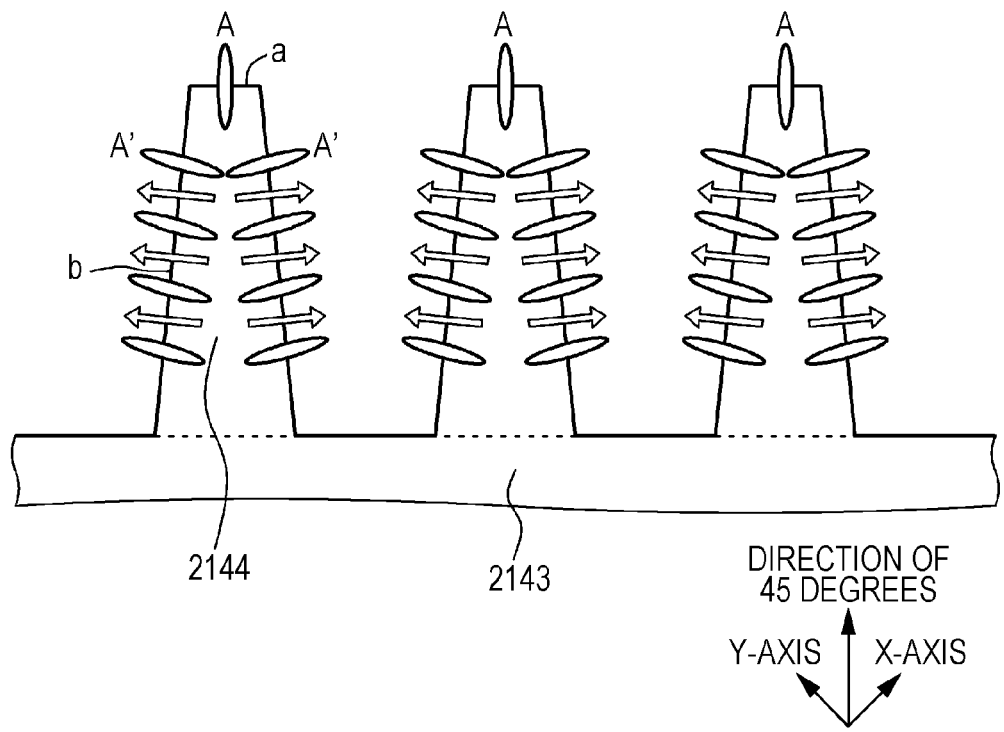
FIGS. 37A and 37B are conceptual diagrams illustrating the behavior of liquid crystal molecules at branch ridges of the fourteenth exemplary embodiment and a liquid crystal display device where the branch ridges are not tapered, respectively.
Figure 37B:
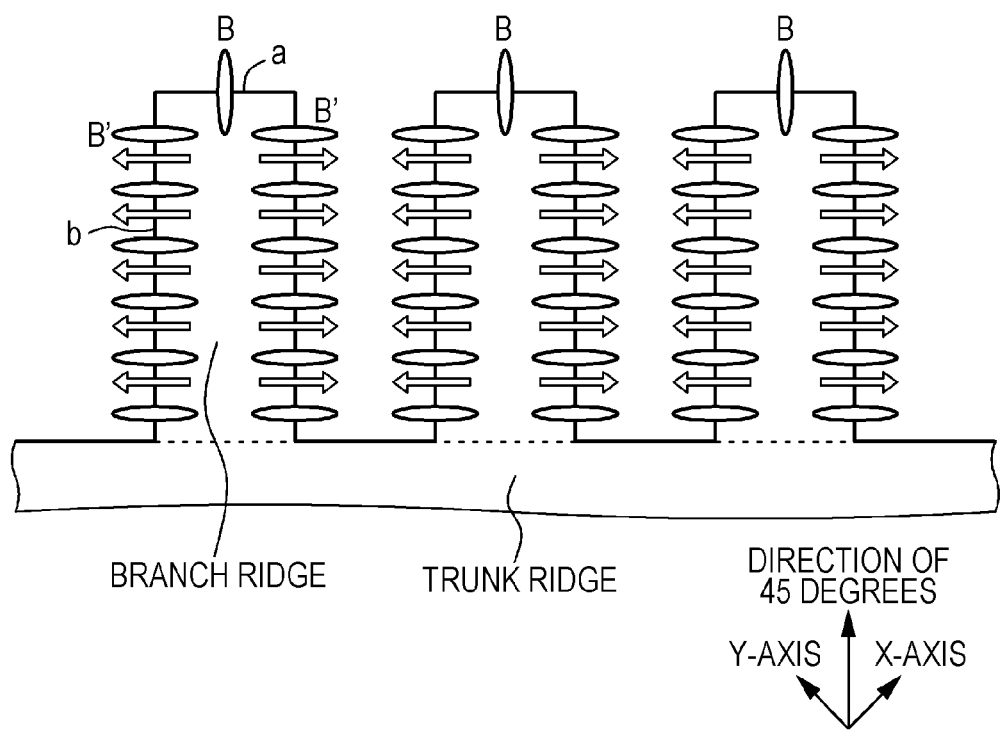

The liquid crystal molecules are pretilted when manufacturing the liquid crystal display device in a state with voltage applied to electrodes. At this time, the longitudinal axis direction (director) of liquid crystal molecules A at or near a tip edge portion a (hereinafter also referred to as "tip region" to facilitate description) tilt toward the trunk ridge, as illustrated in FIGS. 37A and 37B. The action of the liquid crystal molecules A, in a region of the liquid crystal layer in the thickness direction, spreads to the liquid crystal molecules of the entire pixel excluding those at the edge portions of branch ridges which are affected by local electric fields due to the structure (hereinafter also referred to as "liquid crystal molecules A'" to facilitate description), so the directors of the liquid crystal molecules A' tilt toward the trunk ridge. As illustrated in FIG. 37B, the action of liquid crystal molecules A do not spread to the liquid crystal molecules A' in a liquid crystal display device in which the branch ridges are not tapered, as readily as compared to the fourteenth exemplary embodiment where the branch ridges are tapered as illustrated in FIG. 37A, or it may take a longer time for the actions to spread from the liquid crystal molecules A to the liquid crystal molecules A'.

Applying voltage to electrodes when displaying an image on the liquid crystal display device causes the attitude of the directors of the liquid crystal molecules throughout the entire liquid crystal layer to change so as to be parallel to the first substrate and second substrate. The white arrows in FIGS. 37A and 37B indicate the direction of the electric fields at the longitudinal side edge portions. Assuming a cylindrical region in the thickness direction of the liquid crystal layer situated at or nearby the longitudinal side edge portions b (hereinafter referred to as "longitudinal side region" to facilitate description), rotation is generated at liquid crystal molecules B arrayed in the thickness direction in this cylindrical region. That is to say, the direction of the directors of the liquid crystal molecules B situated at the longitudinal side region, and the direction of directors of the liquid crystal molecules arrayed in the thickness direction of the cylindrical region including the liquid crystal molecules B (hereinafter referred to as "liquid crystal molecules B') are not the same. We will call the angle between the directors of the liquid crystal molecules B and the directors of the liquid crystal molecules B' "angle β". As can be seen from FIG. 37B, a liquid crystal display device in which the branch ridges are not tapered gives the liquid crystal molecules a wide range of rotational angle (i.e., a great angle β), so the percentage of liquid crystal molecules having retardation in the X-axial direction or Y-axial direction may be small. This may lead to non-uniformity of light transmittance at the branch ridges, resulting in dark lines. On the other hand, as can be seen from FIG. 37A, the fourteenth exemplary embodiment in which the branch ridges are tapered gives the liquid crystal molecules a narrower range of rotational angle (i.e., a small angle β), so the percentage of liquid crystal molecules having retardation in the X-axial direction or Y-axial direction is great. Thus, occurrence of dark lines is suppressed since non-uniformity of light transmittance at the branch ridges is suppressed.

Fine-slit structures according to the related art do not allow much influence of electric fields on liquid crystal molecules at slits where electrodes are not provided, so the liquid crystal molecules are not readily aligned (do not readily tilt) in a desired direction. This causes dark lines corresponding to the slits, and leads to lower light transmittance. On the other hand, liquid crystal molecules throughout the entire region within the pixel are influenced by electric field in the fourteenth exemplary embodiment, so the phenomenon of dark lines occurring in the fine-slit structure does not occur.

Also, the ratio of area between the electrodes and slits greatly influence the light transmittance in fine-slit structures according to the related art. On the other hand, the arrangement according to the fourteenth exemplary embodiment has not slits to begin with, so such a problem does not occur.

As described above, the liquid crystal display device according to the fourteenth exemplary embodiment is configured such that multiple ridge-and-groove portions are formed at the first electrode, and the width of part of the ridges provided at the first electrode narrow toward the tip. Accordingly, occurrence of dark lines can be further reduced. That is to say, even higher light transmittance can be realized, and even better voltage responsivity can be obtained. Also, improved initial alignment can be expected, so when irradiating the liquid crystal cell with uniform ultraviolet light in a state of applying square-wave AC electric field to pretilt the liquid crystal molecules, the time it takes for pretilting can be reduced. Also, reduction in alignment defects can be expected, so yield can be improved and manufacturing costs of the liquid crystal display device can be reduced. Moreover, improved light transmittance means that reduction in electric power consumption of the back light can be realized, and reliability of TFTs can be improved.

16. Fifteenth Exemplary Embodiment

Figure 38:
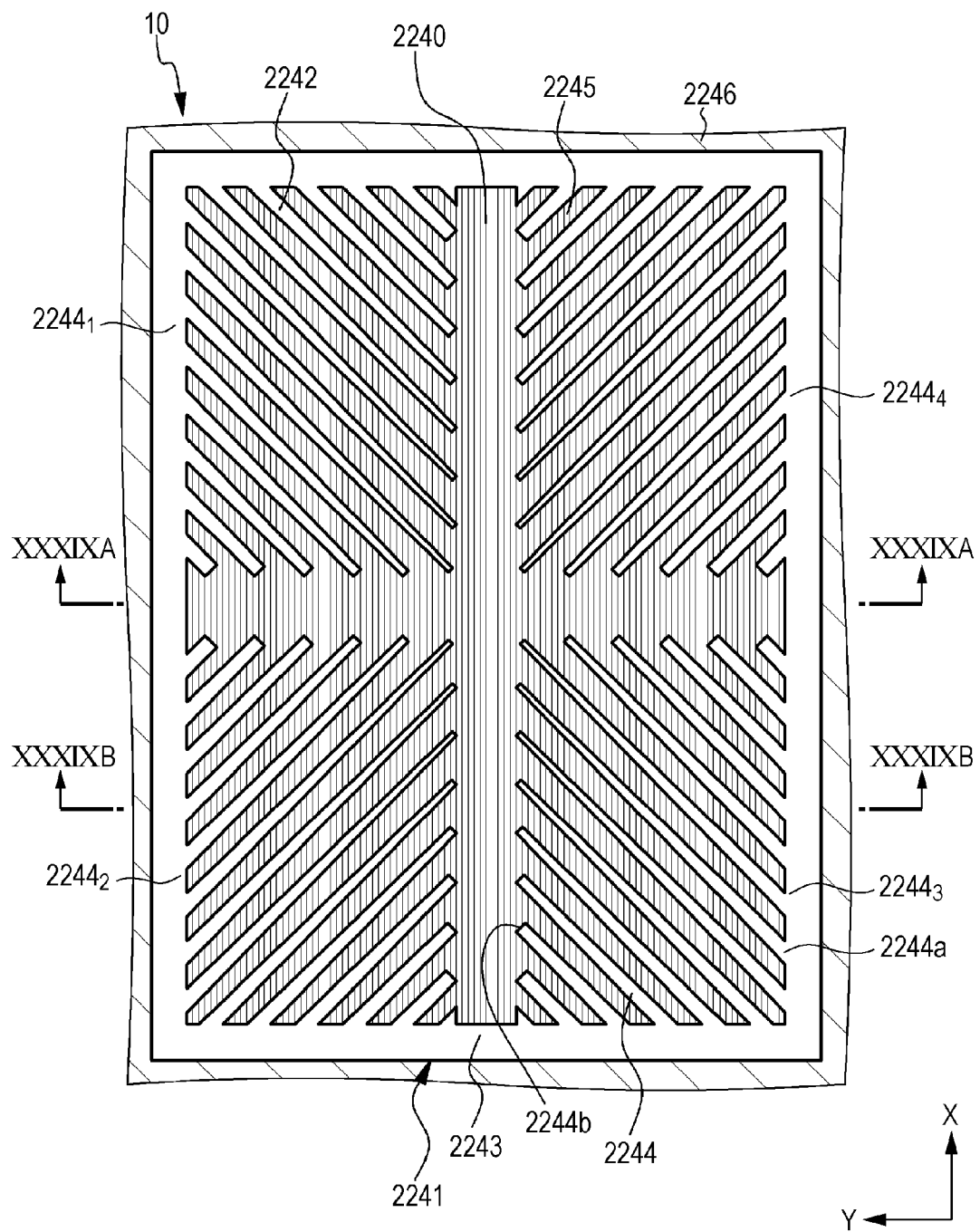
FIG. 38 is a schematic plan view of a first electrode for one pixel making up a liquid crystal display device according to a fifteenth exemplary embodiment which is a modification of a fourteenth exemplary embodiment.
Figure 39A:
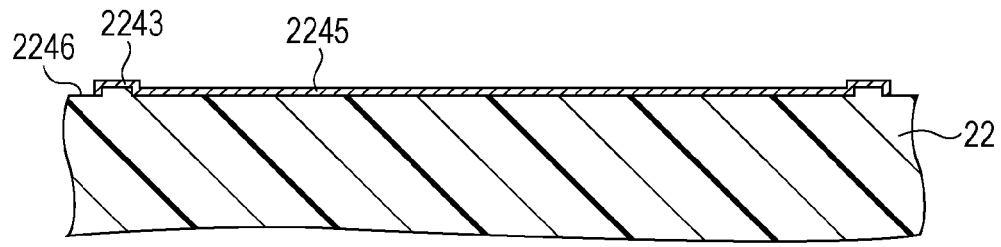
FIGS. 39A and 39B are schematic partial end views of the first electrode and other components of the liquid crystal display device according to the fifteenth exemplary embodiment, taken in FIG. 38 along arrow XXXIXA-XXXIXA and arrow XXXIXB-XXXIXB respectively.
Figure 39B:
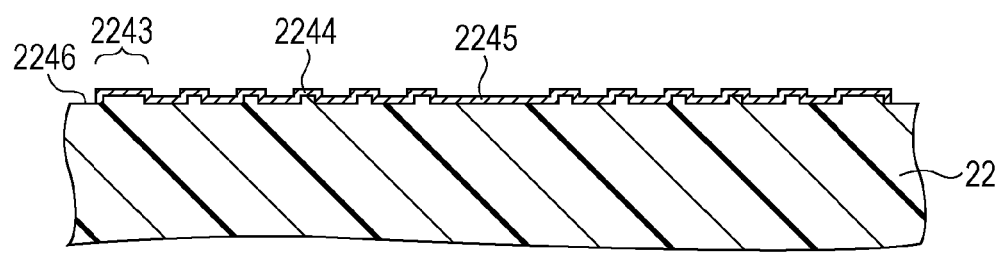
Figure 39C:
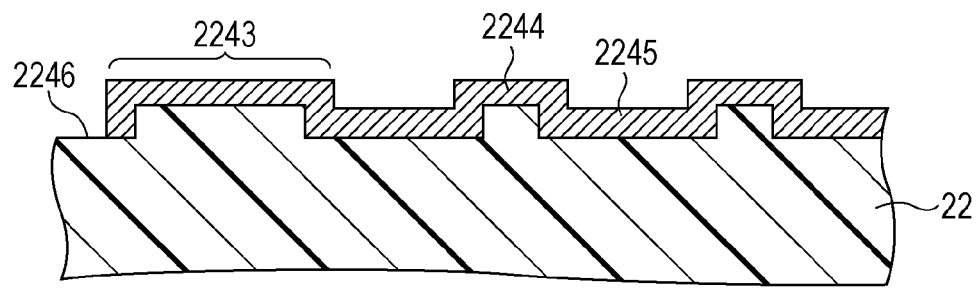
FIG. 39C is a schematic partial end view where a portion of FIG. 39B has been enlarged.

The fifteenth exemplary embodiment is a modification of the fourteenth exemplary embodiment, and relates to a liquid crystal display device according to Embodiment 3B of the present disclosure. FIG. 38 is a schematic plan view of a first electrode for one pixel making up a liquid crystal display device according to the fifteenth exemplary embodiment, FIGS. 39A and 39B are schematic partial end views of the first electrode and other components, taken in FIG. 38 along arrow XXXIXA-XXXIXA and arrow XXXIXB-XXXIXB respectively, and FIG. 39C is a schematic partial end view where a portion of FIG. 39B has been enlarged.

The liquid crystal display device according to the fifteenth exemplary embodiment is configured such that each ridge-and-groove portion 2241 is formed of a trunk ridge (primary ridge) 2243 formed in a frame shape at the perimeter portion of the pixel, and multiple branch ridges (sub ridges) 2244 extending inward in the pixel from the trunk ridge 2243. The multiple branch ridges 2244 are part of the ridges provided to the first electrode. The branch ridges 2244 are the widest at a portion 2244a joining to the trunk ridge 2243, and grow narrower toward a tip portion 2244b from the portion 2244a joining the trunk ridge 2243, being linearly narrowed toward the tip portion 2244b from the portion 2244a joining the trunk ridge 2243. Reference numeral 2245 denotes grooves.

In the liquid crystal display device according to the fifteenth exemplary embodiment, assuming an X-Y coordinate system in which straight lines passing through the center of the pixel are parallel to the perimeters of the pixel are the X axis and Y axis, multiple branch ridges $2244_1$ occupying the first quadrant extend in parallel in a direction where the value of the Y coordinate increases when the value of the X coordinates increases, and multiple branch ridges $2244_2$ occupying the second quadrant extend in parallel in a direction where the value of the Y coordinate increases when the value of the X coordinates decreases. Also, multiple branch ridges $2244_3$ occupying the third quadrant extend in parallel in a direction where the value of the Y coordinate decreases when the value of the X coordinates decreases, and multiple branch ridges $2244_4$ occupying the fourth quadrant extend in parallel in a direction where the value of the Y coordinate decreases when the value of the X coordinates increases.

Multiple branch ridges $2244_1$ occupying the first quadrant extend with the axial line thereof at 45 degrees to the X axis, multiple branch ridges $2244_2$ occupying the second quadrant extend with the axial line thereof at 135 degrees to the X axis, multiple branch ridges $2244_3$ occupying the third quadrant extend with the axial line thereof at 225 degrees to the X axis, and multiple branch ridges $2244_4$ occupying the fourth quadrant extend with the axial line thereof at 315 degrees to the X axis.

Other than the above points, the configuration and structure of the liquid crystal display device according to the fifteenth exemplary embodiment can be made to be the same as the configuration and structure of the liquid crystal display device according to the fourteenth exemplary embodiment, so detailed description thereof will be omitted.

17. Sixteenth Exemplary Embodiment

Figure 40:
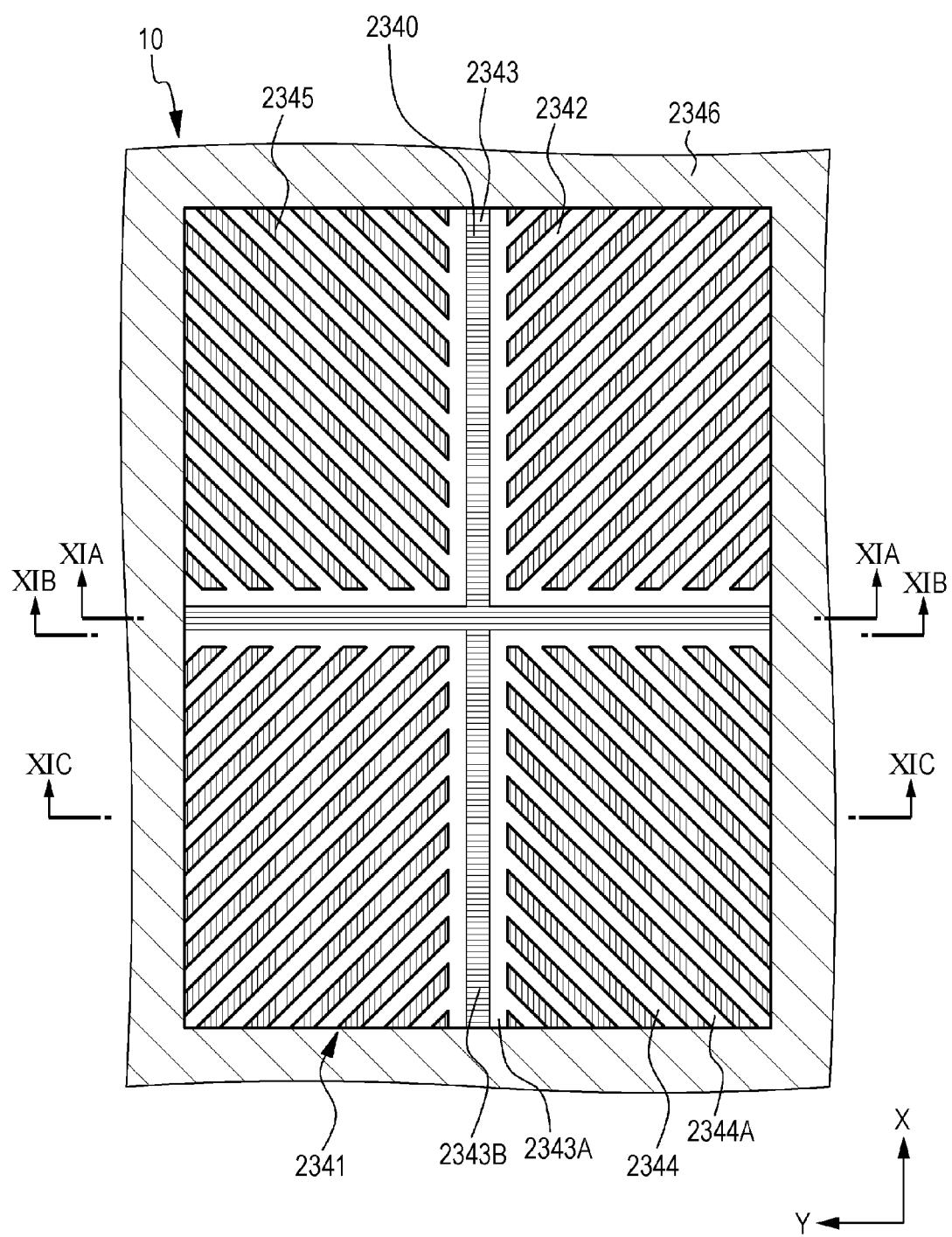
FIG. 40 is a schematic plan view of a first electrode for one pixel making up a liquid crystal display device according to a sixteenth exemplary embodiment.

The sixteenth exemplary embodiment relates to a liquid crystal display device according to Embodiment 3C of the present disclosure, and more specifically relates to a liquid crystal display device according to Embodiment 3C-1 of the present disclosure. FIG. 40 is a schematic plan view of a first electrode for one pixel making up a liquid crystal display device according to the sixteenth exemplary embodiment. The schematic partial end view of the liquid crystal display device according to the sixteenth exemplary embodiment is essentially the same as with FIGS. 1 through 3. Also, the schematic partial cross-sectional views of the first electrode and other components, taken in FIG. 40 along arrow XIA-XIA, arrow XIB-XIB, and arrow XIC-XIC, are essentially the same as those in FIGS. 11A through 11C, respectively.

Note that FIGS. 40 through 46 illustrate the width of the branch ridges as being the same to simplify the drawings, but the branch ridges are actually tapered in the same way as described with the fourteenth and fifteenth exemplary embodiments. That is to say, the width of the branch ridges is the widest at the portion where the branch ridges join the trunk ridge, and become narrower toward the tips from the portion joining the trunk ridge.

Multiple ridge-and-groove portions 2341 (ridges 2342 and grooves 2345) are formed on the first electrode 2340 of the liquid crystal display device according to the sixteenth exemplary embodiment, and multiple stepped portions are formed on the ridges 2342 provided at the first electrode 2340. Each ridge-and-groove portion 2341 is formed of a trunk ridge (primary ridge) 2343 passing through the center of a pixel and extending in a cross shape, and multiple branch ridges (sub ridges) 2344 extending toward the perimeter of the pixel from the trunk ridge 2343. The branch ridges 2344 are the widest at a portion joining to the trunk ridge 2343, and grow narrower toward a tip portion, being linearly narrowed from the base toward the tip portion.

The cross-sectional shape of the trunk ridge 2343 when cut along an imaginary perpendicular plane orthogonal to the direction in which the trunk ridge 2343 extends is a shape stepping down from the center of the cross-sectional shape of the trunk ridge 2343 towards the edges thereof. Specifically, the trunk ridge 2343 is made up of a middle top face 2343B of the trunk ridge 2343 and top faces 2343A situated on either side thereof. Thus, the trunk ridge 2343 has two stepped portions, with the top faces 2343A being higher than the grooves 2345, and the top face 2343B being higher than the top faces 2343A. Reference symbol 2344A denotes a top face of a branch ridge 2344, the top face 2343A of the trunk ridge 2343 being the same height as the top faces 2344A of the branch ridges 2344. In the drawings, the top face 2343B of the trunk ridge 2343 is indicated by horizontal hatching, and the grooves 2345 are indicated by vertical hatching.

Other than the above points, the configuration and structure of the liquid crystal display device according to the sixteenth exemplary embodiment can be made to be the same as the configuration and structure of the liquid crystal display device according to the fourteenth exemplary embodiment.

18. Seventeenth Exemplary Embodiment

Figure 41:
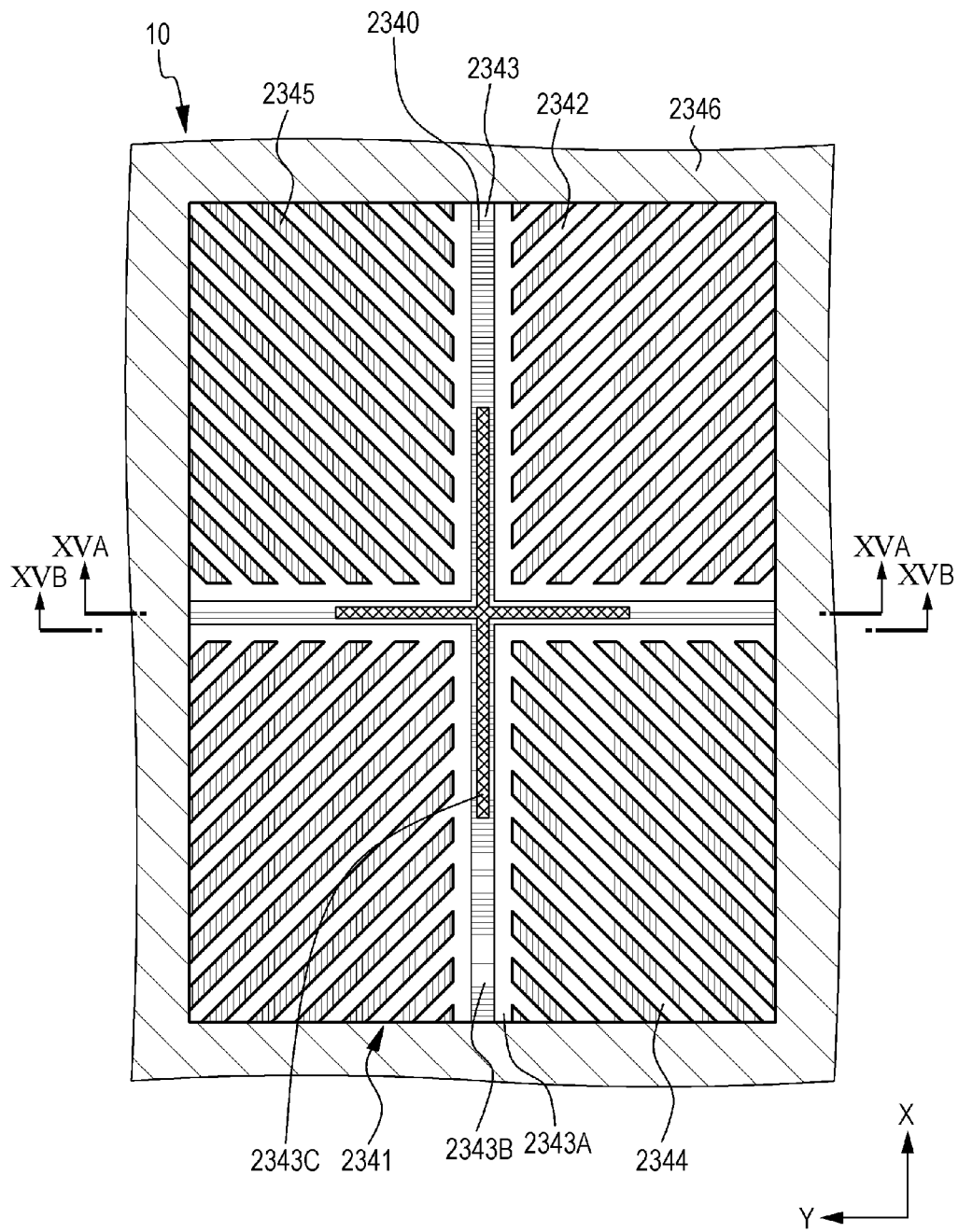
FIG. 41 is a schematic plan view of a first electrode for one pixel making up a liquid crystal display device according to a seventeenth exemplary embodiment.

The seventeenth exemplary embodiment is a modification of the sixteenth exemplary embodiment. FIG. 41 is a schematic plan view of a first electrode for one pixel making up a liquid crystal display device according to the seventeenth exemplary embodiment. The schematic partial cross-sectional views of the first electrode and other components, taken in FIG. 41 along arrow XVA-XVA and arrow XVB-XVB, are essentially the same as those in FIGS. 15A and 15B, respectively.

The top faces of the trunk ridge 2343 according to the seventeenth exemplary embodiment include a top face 2343C at the middle portion of the trunk ridge 2343, top faces 2343B situated on both sides of the top face 2343C, and top faces 2343A situated on the outer sides of the top faces 2343B. Thus, the trunk ridge 2343 has three stepped portions, the top faces 2343A are higher than the grooves 2345, the top faces 2343B are higher than the top faces 2343A, and the top face 2343C is higher than the top faces 2343B. The cross-sectional shape of the trunk ridge 2343 when cut along an imaginary perpendicular plane parallel to the direction in which the trunk ridge 2343 extends is a shape stepping down from the center of the cross-sectional shape of the trunk ridge 2343 (top face 2343C) towards the edges thereof (top faces 2343B and top faces 2343A). The top face 2343C is indicated by cross-hatching in the drawings.

Other than the above points, the configuration and structure of the liquid crystal display device according to the seventeenth exemplary embodiment can be made to be the same as the configuration and structure of the liquid crystal display device according to the sixteenth exemplary embodiment, so detailed description thereof will be omitted.

19. Eighteenth Exemplary Embodiment

Figure 42:
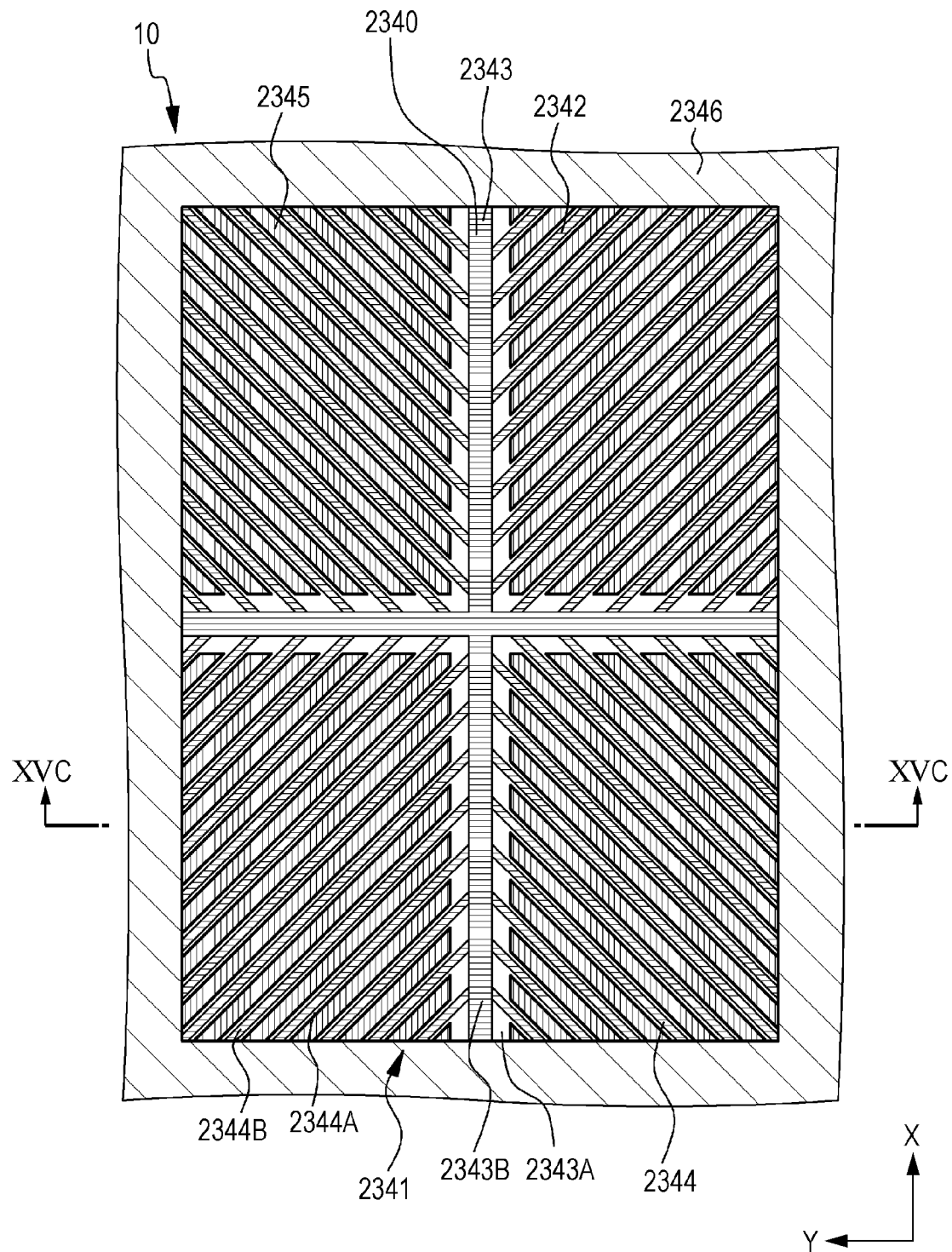
FIG. 42 is a schematic plan view of a first electrode for one pixel making up a liquid crystal display device according to an eighteenth exemplary embodiment.
Figure 43:
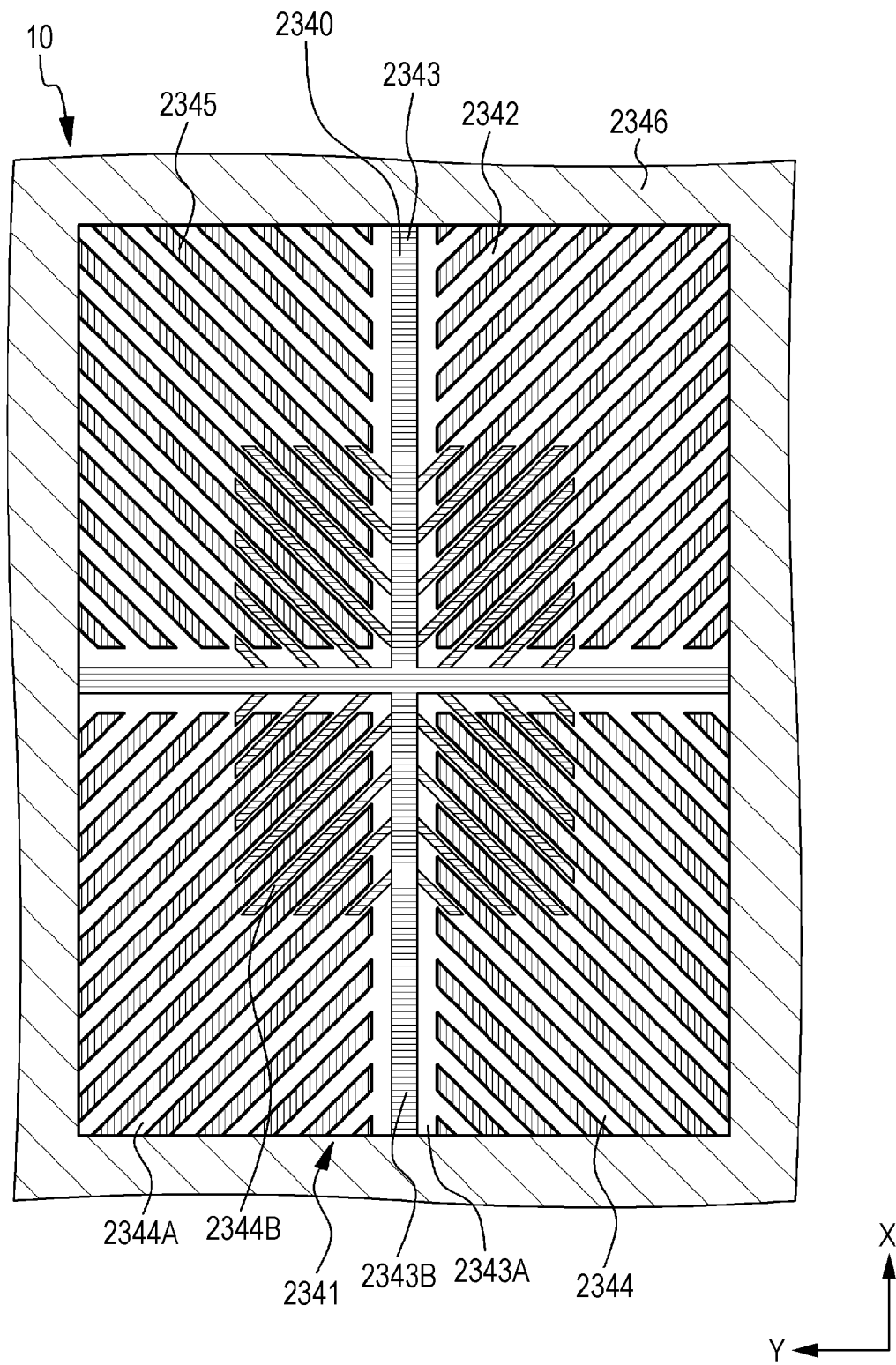
FIG. 43 is a schematic plan view of a first electrode for one pixel making up a liquid crystal display device according to a modification of the eighteenth exemplary embodiment.

The eighteenth exemplary embodiment also is a modification of the sixteenth exemplary embodiment. FIG. 42 is a schematic plan view of a first electrode for one pixel making up a liquid crystal display device according to the eighteenth exemplary embodiment. The schematic partial end view of the first electrode and other components, taken in FIG. 42 along arrow XVC-XVC is essentially the same as that in FIG. 15C, and the partial enlarged schematic end view thereof is essentially the same as that in FIG. 15D.

The cross-sectional shape of the branch ridges 2344 when cut along an imaginary perpendicular plane orthogonal to the direction in which the branch ridges 2344 extend, separate from the above-described cross-sectional views, is a shape stepping down from the center of the cross-sectional shape of the branch ridges 2344 towards the edges thereof. Specifically, the top faces of the trunk ridge 2343 include a top face 2344B extending from the trunk ridge 2343, top faces 2344A situated on either side thereof. Thus, the branch ridges 2344 have two stepped portions, with the top faces 2344A being higher than the grooves 2345, and the top face 2344B being higher than the top faces 2344A. The top face 2344B is indicated by horizontal hatching in the drawings. Also, the boundaries between the trunk ridge and branch ridges are indicated by solid lines in FIGS. 42, 43, and 46. The difference in height between the top face 2343B and top faces 2343A of the branch ridges 2344 was made to be 0.20 µm on average. The top face 2343B of the trunk ridge 2343 and the top face 2344B of the branch ridges 2344 are at the same height.

Other than the above points, the configuration and structure of the liquid crystal display device according to the eighteenth exemplary embodiment can be made to be the same as the configuration and structure of the liquid crystal display device according to the sixteenth exemplary embodiment, so detailed description thereof will be omitted.

Alternatively, the cross-sectional shape of the branch ridges 2344 when cut along an imaginary perpendicular plane parallel to the direction in which the branch ridges 2344 extend may be a shape stepping down from the portions of the branch ridges 2344 closer to the trunk ridge 1143 toward the ends of the branch ridges 2344. This may be combined with the trunk ridge 2343 described in the seventeenth exemplary embodiment.

20. Nineteenth Exemplary Embodiment

Figure 44:
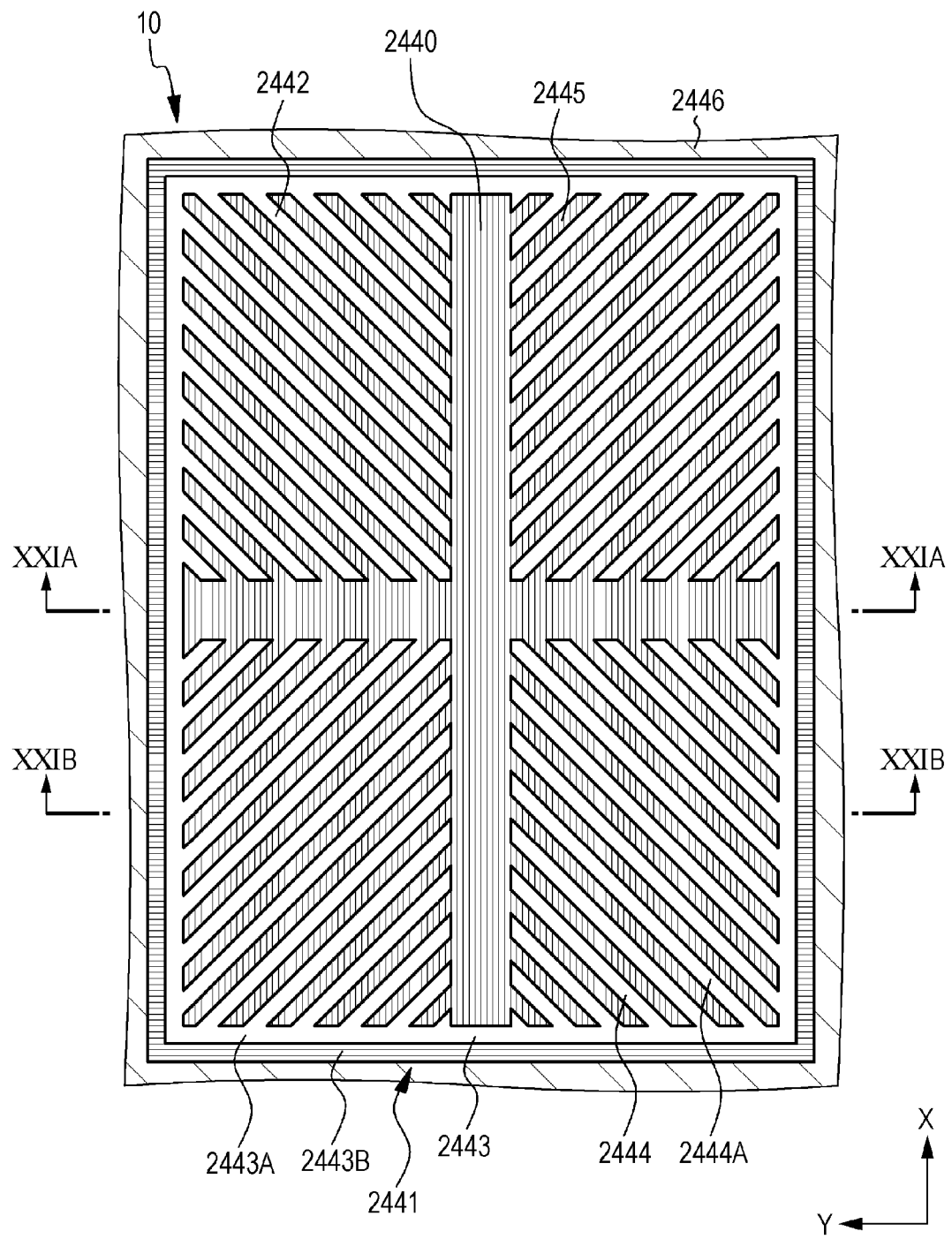
FIG. 44 is a schematic plan view of a first electrode for one pixel making up a liquid crystal display device according to a nineteenth exemplary embodiment.

The nineteenth exemplary embodiment also is a modification of the sixteenth exemplary embodiment, and relates to a liquid crystal display device according to Embodiment 3C-2 of the present disclosure. FIG. 44 is a schematic plan view of a first electrode for one pixel making up a liquid crystal display device according to the nineteenth exemplary embodiment. The schematic partial end views of the first electrode and other components, taken in FIG. 44 along arrow XVA-XVA and arrow XVB-XVB, are essentially the same as those in FIGS. 21A and 21B (and FIG. 21C which is a partial enlargement of FIG. 21B), respectively.

Multiple ridge-and-groove portions 2441 (ridges 2442 and grooves 2445) are formed on the first electrode 2440 of the liquid crystal display device according to the nineteenth exemplary embodiment as well, with multiple stepped portions formed at the ridges 2442 provided on the first electrode 2440. Specifically, the liquid crystal display device according to the nineteenth exemplary embodiment is configured such that each ridge-and-groove portion 2441 has a trunk ridge (main ridge) 2443 which is formed on the perimeter portion of a pixel and is shaped like a frame, and multiple branch ridges (sub ridges) 2444 extending from the trunk ridge 2443 toward the middle of the pixel. The branch ridges 2444 are the widest at a portion joining to the trunk ridge 2443, and grow narrower toward a tip portion, being linearly narrowed toward the tip portion.

The cross-sectional shape of the trunk ridge 2443 when cut along an imaginary perpendicular plane orthogonal to the direction in which the trunk ridge 2443 extends is a shape stepping down from the outer edges of the cross-sectional shape of the trunk ridge 2443 towards the inner edges thereof. Specifically, the top faces of the trunk ridge 2443 are made up of top faces 2443B on the outer edges of the trunk ridge 2443 and top faces 2443A situated on the inner edges. Thus, the trunk ridge 2443 has two stepped portions, with the top faces 2443A being higher than the grooves 2445, and the top faces 2443B being higher than the top faces 2443A. Reference symbol 2444A denotes top faces of branch ridges 2444, the top face 2443A of the trunk ridge 2443 being the same height as the top faces 2444A of the branch ridges 2444. In the drawings, the top faces 2443B of the trunk ridge 2443 are indicated by horizontal hatching, and the grooves 2445 are indicated by vertical hatching. The groove portion situated at the middle portion of the pixel has a general cross-shape.

Other than the above points, the configuration and structure of the liquid crystal display device according to the nineteenth exemplary embodiment can be made to be the same as the configuration and structure of the liquid crystal display device according to the fifteenth or sixteenth exemplary embodiment.

The nineteenth exemplary embodiment has multiple stepped portions formed at the trunk ridge 2443, so the electric field is the greatest at the outer edge portion of the trunk ridge 2443 and is weaker toward the inner edges of the trunk ridge 2443. This enables the force to restrict the alignment of the liquid crystal molecules at the middle portion of the trunk ridge 2443 to be increased, and accordingly restrict the tilted state of the liquid crystal molecules at the trunk ridge 2443 in a sure manner. Thus, the problem where dark lines occur at portions of the image corresponding to the trunk ridge 2443 when displaying images can be suppressed in a sure manner. Accordingly, a liquid crystal display device can be provided which realizes even better light transmittance while maintaining good voltage responsivity, reduction in cost of the light source making up the backlight and reduction in electric power consumption can be realized, and reliability of TFTs can be improved.

21. Twentieth Exemplary Embodiment

Figure 45:
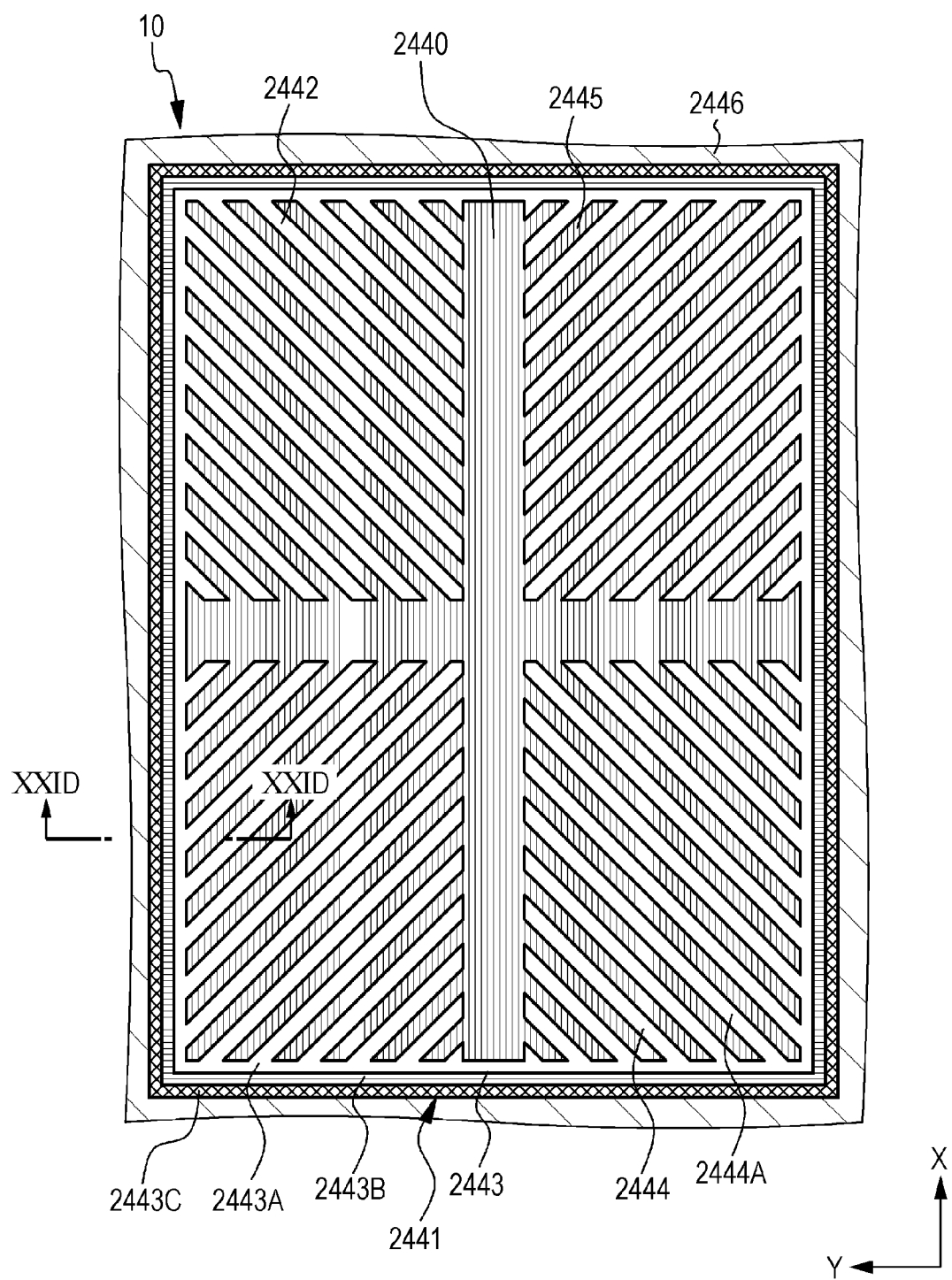
FIG. 45 is a schematic plan view of a first electrode for one pixel making up a liquid crystal display device according to a twentieth exemplary embodiment.

The twentieth exemplary embodiment is a modification of the nineteenth exemplary embodiment. FIG. 45 is a schematic plan view of a first electrode for one pixel making up a liquid crystal display device according to the twentieth exemplary embodiment. The enlarged schematic partial end view of the first electrode, taken in FIG. 45 along arrow XXID-XXID, is essentially the same as that in FIG. 21D.

The top faces of the trunk ridge 2443 according to the twentieth exemplary embodiment include a top face 2443C at the outer edge portion of the trunk ridge 2443, and top faces 2443B and top faces 2443A progressing toward the inner edge portion. Thus, the trunk ridge 2443 has three stepped portions, the top face 2443A is higher than the grooves 2445, the top face 2443B is higher than the top face 2443A, and the top face 2443C is higher than the top face 2443B. The top face 2443C is indicated by cross-hatching in the drawings. The difference in height between the top face 2443C and top face 2443B of the trunk ridge 2443, and the difference in height between the top face 2443B and top face 2443A thereof, was made to be 0.20 μm on average.

Other than the above points, the configuration and structure of the liquid crystal display device according to the twentieth exemplary embodiment can be made to be the same as the configuration and structure of the liquid crystal display device according to the nineteenth exemplary embodiment, so detailed description thereof will be omitted.

22. Twenty-First Exemplary Embodiment

Figure 46:
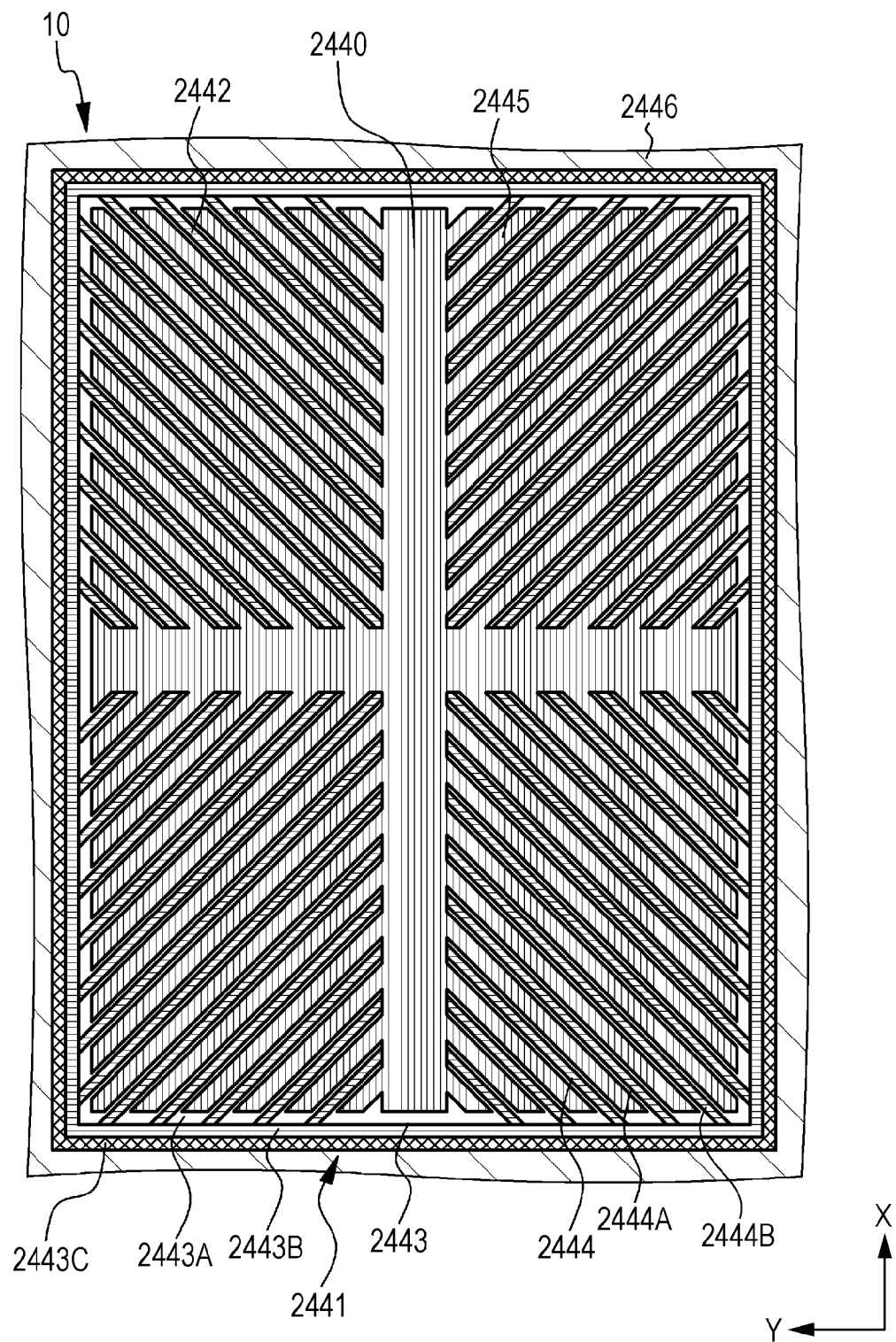
FIG. 46 is a schematic plan view of a first electrode for one pixel making up a liquid crystal display device according to a twenty-first exemplary embodiment.

The twenty-first exemplary embodiment is a modification of the twentieth exemplary embodiment. FIG. 46 is a schematic plan view of a first electrode for one pixel making up a liquid crystal display device according to the twenty-first exemplary embodiment.

In the twenty-first embodiment, the cross-sectional shape of the branch ridges 2444 when cut along an imaginary perpendicular plane orthogonal to the direction in which the branch ridges 2444 extend, separate from the above-described cross-sectional views, is a shape stepping down from the center of the cross-sectional shape of the branch ridges 2444 towards the edges thereof. Specifically, the top faces of the branch ridges 2444 include top faces 2444B extending from the top face 2443B of the trunk ridge 2443, and top faces 2444A situated on either side of the top faces 2444B. Thus, the branch ridges 2444 have two stepped portions, with the top faces 2444A being higher than the grooves 2445, and the top faces 2444B being higher than the top faces 2444A. The top faces 2444B are indicated by horizontal hatching in the drawings. The difference in height between the top faces 2444B and top faces 2444A of the branch ridges 2444 was made to be 0.28 μm on average. The top faces 2443B of the trunk ridge 2443 and the top faces 2444B of the branch ridges 2444 are at the same height.

Alternatively, the cross-sectional shape of the branch ridges 2444 when cut along an imaginary perpendicular plane parallel to the direction in which the branch ridges 2444 extend is a shape stepping down from the portions of the branch ridges 2444 closer to the trunk ridge 2443 toward the ends of the branch ridges 2444.

Other than the above points, the configuration and structure of the liquid crystal display device according to the twenty-first exemplary embodiment can be made to be the same as the configuration and structure of the liquid crystal display device according to the nineteenth exemplary embodiment, so detailed description thereof will be omitted. Also, the top faces of the trunk ridge 2443 may be configured including the top face 2443B, and the top faces 2443A situated on both sides of the top face 2443B, in the same way as with the nineteenth exemplary embodiment.

23. Twenty-Second Exemplary Embodiment

Figure 47:
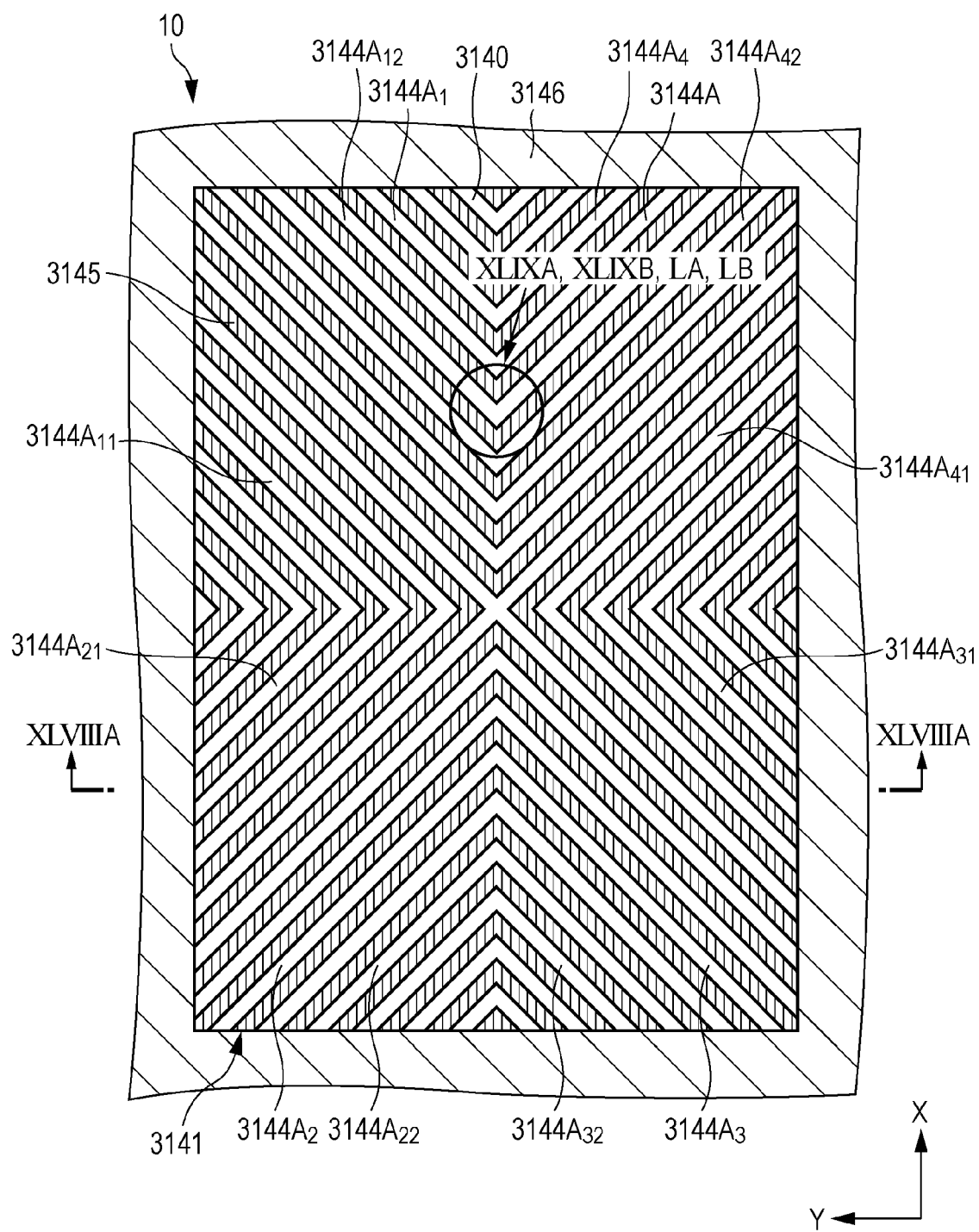
FIG. 47 is a schematic plan view of a first electrode for one pixel making up a liquid crystal display device according to a twenty-second exemplary embodiment.
Figure 48A:
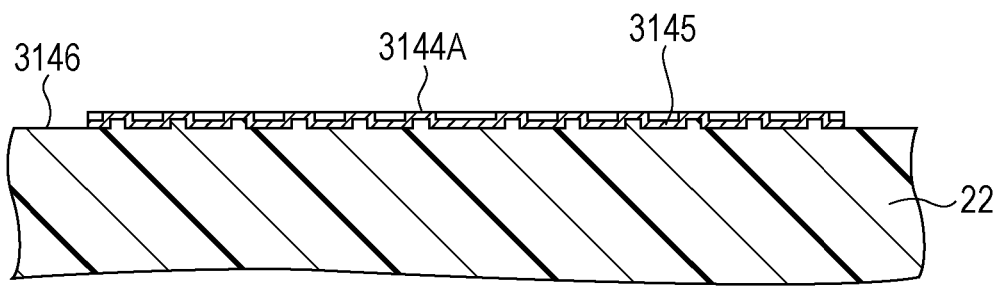
FIG. 48A is a schematic partial cross-sectional view of the first electrode and other components of the liquid crystal display device according to the twenty-second exemplary embodiment, taken in FIG. 47 along arrow XLVIIIA-XLVIIIA.
Figure 48B:
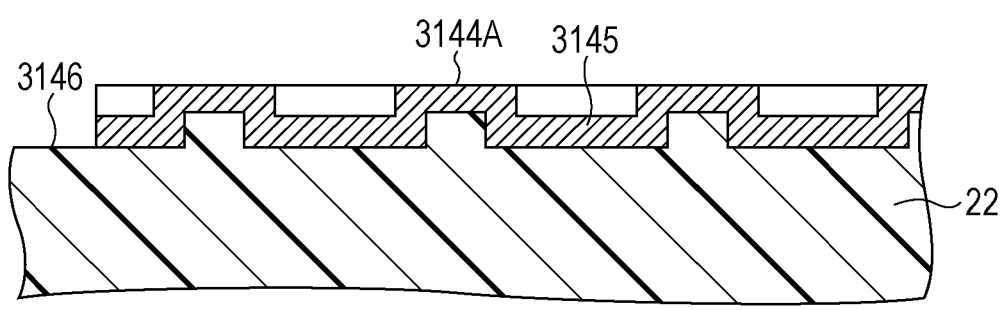
FIG. 48B is a schematic partial cross-sectional view where a portion of FIG. 48A has been enlarged.

The twenty-second exemplary embodiment relates to a liquid crystal display device according to Embodiment 4A of the present disclosure. FIG. 47 is a schematic plan view of a first electrode for one pixel making up a liquid crystal display device according to the twenty-second exemplary embodiment. FIG. 48A is a schematic partial cross-sectional view of the first electrode and other components, taken in FIG. 47 along arrow XLVIIIA-XLVIIIA, and FIG. 48B is a schematic partial cross-sectional view where a portion of FIG. 48A has been enlarged. The schematic partial cross-end view of the liquid crystal display device according to the twenty-second exemplary embodiment is essentially the same as with FIGS. 1 through 3.

The liquid crystal display device according to the twenty-second exemplary embodiment, and the later-described twenty-third through thirty-third exemplary embodiments, are, in the same way as with the first through third exemplary embodiments, configured including multiple pixels 10 (10A, 10B, 10C) which are arrayed. The pixels include a first substrate 20 and a second substrate 50, first electrodes (pixel electrodes) 3140 (3240, 3340, 3440) formed on an opposing face of the first substrate 20 facing the second substrate 50, a second electrode (common electrode) 160 formed on an opposing face of the second substrate 50 which faces the first substrate 20, and a liquid crystal layer 70 which is disposed between the first electrode 3140 (3240, 3340, 3440) and second electrode 160, and includes liquid crystal molecules 71A, 71B, and 71C. The liquid crystal molecules are pretilted.

Multiple ridge-and-groove portions 3141 (3241, 3341, 3441) are formed at the first electrode 3140 (3240, 3340, 3440). More specifically, at least the liquid crystal molecules closer to the first electrodes are pretilted. The liquid crystal molecules have negative dielectric constant anisotropy.

Assuming an X-Y coordinate system in which the directions in which lines, passing through the center of the pixel 10, and more specifically passing through the center of the pixel 10 and parallel to the edges of the perimeter of the pixel, extend, are the X axis and Y axis, multiple ridges $3144A_1$ occupying the first quadrant extend in parallel in a direction where the value of the Y coordinate increases when the value of the X coordinates increases, and multiple ridges $3144A_2$ occupying the second quadrant extend in parallel in a direction where the value of the Y coordinate increases when the value of the X coordinates decreases. Also, multiple ridges $3144A_3$ occupying the third quadrant extend in parallel in a direction where the value of the Y coordinate decreases when the value of the X coordinates decreases, and multiple ridges $3144A_4$ occupying the fourth quadrant extend in parallel in a direction where the value of the Y coordinate decreases when the value of the X coordinates increases.

Multiple ridges $3144A_1$ occupying the first quadrant extend with the axial line thereof at 45 degrees to the X axis, multiple ridges $3144A_2$ occupying the second quadrant extend with the axial line thereof at 135 degrees to the X axis, multiple ridges $3144A_3$ occupying the third quadrant extend with the axial line thereof at 225 degrees to the X axis, and multiple ridges $3144A_4$ occupying the fourth quadrant extend with the axial line thereof at 315 degrees to the X axis. The ridges 3144A are in line symmetry across the X axis, and also in line symmetry across the Y axis, and further in 180 degrees rotational symmetry (point symmetry) as to the center of the pixel.

Unlike the case of the liquid crystal display device according to the first exemplary embodiment, the liquid crystal display device according to the twenty-second exemplary embodiment is not provided with trunk ridges. The ridges 3144A in the liquid crystal display device according to the twenty-second exemplary embodiment are equivalent to the branch ridges in the liquid crystal display device according to the first exemplary embodiment. Further, ridges $3144A_{11}$ extending from the X axis and occupying the first quadrant connect to respective ridges $3144A_{41}$ extending from the X axis and occupying the fourth quadrant, ridges $3144A_{12}$ extending from the Y axis and occupying the first quadrant connect to respective ridges $3144A_{22}$ extending from the Y axis and occupying the second quadrant, ridges $3144A_{21}$ extending from the X axis and occupying the second quadrant connect to respective ridges $3144A_{31}$ extending from the X axis and occupying the third quadrant, and ridges $3144A_{32}$ extending from the Y axis and occupying the third quadrant connect to respective ridges $3144A_{42}$ extending from the Y axis and occupying the fourth quadrant.

That is to say, the planar shape of the ridges 3144A are V shapes. Note that the subscripts "11", "12", and so forth appended to the reference numerals representing ridges in this exemplary embodiment, and subscripts appended to the reference numerals representing ridges in the following exemplary embodiments, represent the same ridge portions. The specifications of the ridges 3144A and grooves 3145 are as given in Table 8.

TABLE 8

| | |
|---|---|
| Average height of ridges: | 0.2 μm |
| Pitch of ridges: | 5.0 μm |
| Width of ridges: | 2.5 μm |
| Width of grooves: | 2.5 μm |

In the liquid crystal display device according to the twenty-second exemplary embodiment, the multiple ridges $3144A_1$ occupying the first quadrant extend in parallel in a direction where the value of the Y coordinate increases when the value of the X coordinates increases, the multiple ridges $3144A_2$ occupying the second quadrant extend in parallel in a direction where the value of the Y coordinate increases when the value of the X coordinates decreases, the multiple ridges $3144A_3$ occupying the third quadrant extend in parallel in a direction where the value of the Y coordinate decreases when the value of the X coordinates decreases, and the multiple ridges $3144A_4$ occupying the fourth quadrant extend in parallel in a direction where the value of the Y coordinate decreases when the value of the X coordinates increases. That is to say, there are neither ridges extending in parallel with the X axis, nor ridges extending in parallel with the Y axis, except for the tips of the ridges 3144A. Alternatively, the tips of the ridges 3144A may be defined by lines orthogonal to the axial line of the ridges 3144A, or the tips of the ridges 3144A may be formed of curved lines, so as to obtain a configuration where there are neither ridges extending in parallel with the X axis nor ridges extending in parallel with the Y axis at all.

The absorption axis of the first polarizing plate is parallel to the X axis or Y axis, and the absorption axis of the second polarizing plate is parallel to the X axis or Y axis. Accordingly, occurrence of dark lines can be reduced even further. That is to say, even higher light transmittance can be realized, and even better voltage responsivity can be obtained. Also, improved initial alignment can be expected, so when irradiating the liquid crystal cell with uniform ultraviolet light in a state of applying square-wave AC electric field to pretilt the liquid crystal molecules, the time it takes for pretilting can be reduced. Also, reduction in alignment defects can be expected, so yield can be improved and manufacturing costs of the liquid crystal display device can be reduced. Moreover, improved light transmittance means that reduction in electric power consumption of the back light can be realized, and reliability of TFTs can be improved.

24. Twenty-Third Exemplary Embodiment

The twenty-third exemplary embodiment is a modification of the twenty-second exemplary embodiment. Partial enlarged schematic plan views of a first pixel in one pixel making up the liquid crystal display device according to the twenty-third exemplary embodiment are illustrated in FIGS. 49A through 50B. FIGS. 49A through 50B are enlarged schematic plan views of the first electrode in the encircled portion XLIXA, XLIXB, LA, LB in FIG. 47, which is a schematic plan view of the first electrode.

Figure 49A:
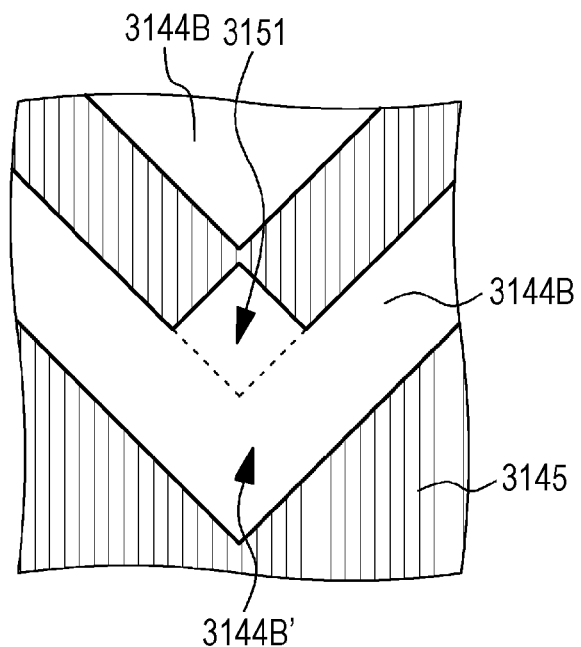
FIGS. 49A and 49B are enlarged schematic plan views of the first electrode in the encircled portion XLIXA, XLIXB in FIG. 47, which is a schematic plan view of the first electrode for one pixel making up a liquid crystal display device according to a twenty-third exemplary embodiment.
Figure 49B:
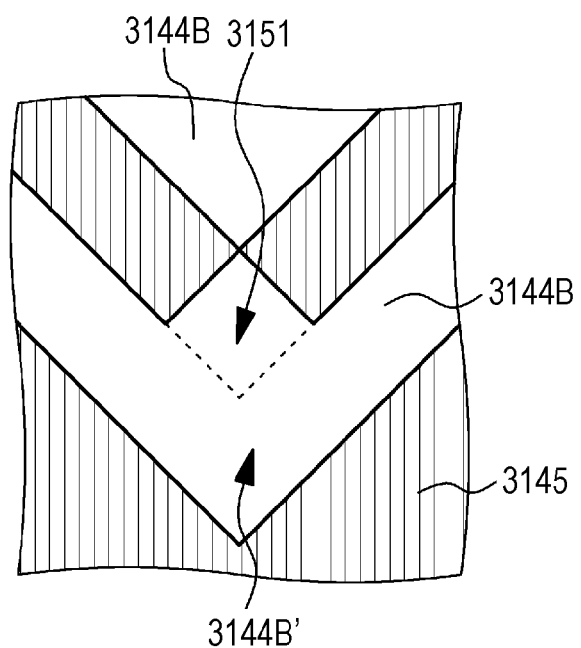
Figure 50A:
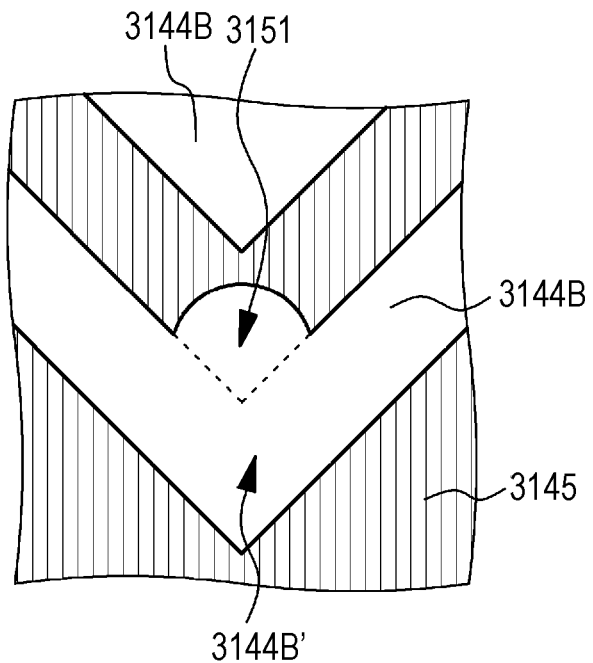
FIGS. 50A and 50B are enlarged schematic plan views of the first electrode in the encircled portion LA, LB in FIG. 47, which is a schematic plan view of the first electrode for one pixel making up the liquid crystal display device according to the twenty-third exemplary embodiment.
Figure 50B:
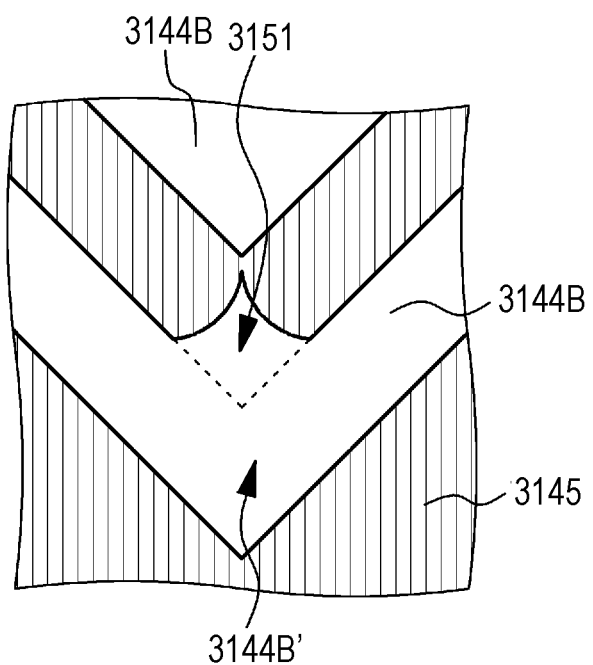

Protruding portions 3151 which extend in planar view toward the perimeter of the pixel 10 are provided at joining portions 3144B' where two ridges 3144B join in the liquid crystal display device according to the twenty-third exemplary embodiment. The protruding portions 3151 may each be defined by multiple line segments as illustrated in FIGS. 49A and 49B (two line segments in the examples illustrated here), or may be defined by a single curve as illustrated in FIG. 50A, or may be defined by multiple curves as illustrated in FIG. 50B (two curves in the example illustrated here). Moreover, an arrangement may be made where the protruding portions 3151 are each defined by a combination of one or more line segments and one or more curves. Note that in the example illustrated in FIG. 49A, the tip of the protruding portion 3151 is not in contact with the joining portion of the two ridges adjacent toward the perimeter of the pixel. On the other hand, in the example illustrated in FIG. 49B, the tip of the protruding portion 3151 is in contact with the joining portion of the two ridges adjacent toward the perimeter of the pixel.

According to this configuration as well, there are absolutely no ridges extending in parallel with the X axis and ridges extending in parallel with the Y axis, or even if there are, the length thereof is extremely minute. Moreover, the protruding portions 3151 provided on the inner side at the bottom of the V shape of the ridges act so that the alignment state of the liquid crystal molecules situated near the bottom at the inner side of the V shape is even closer to a desired state, as compared with a case where no protruding portions 3151 are provided on the inner side at the bottom of the V shape of the ridges.

25. Twenty-Fourth Exemplary Embodiment

Figure 51:
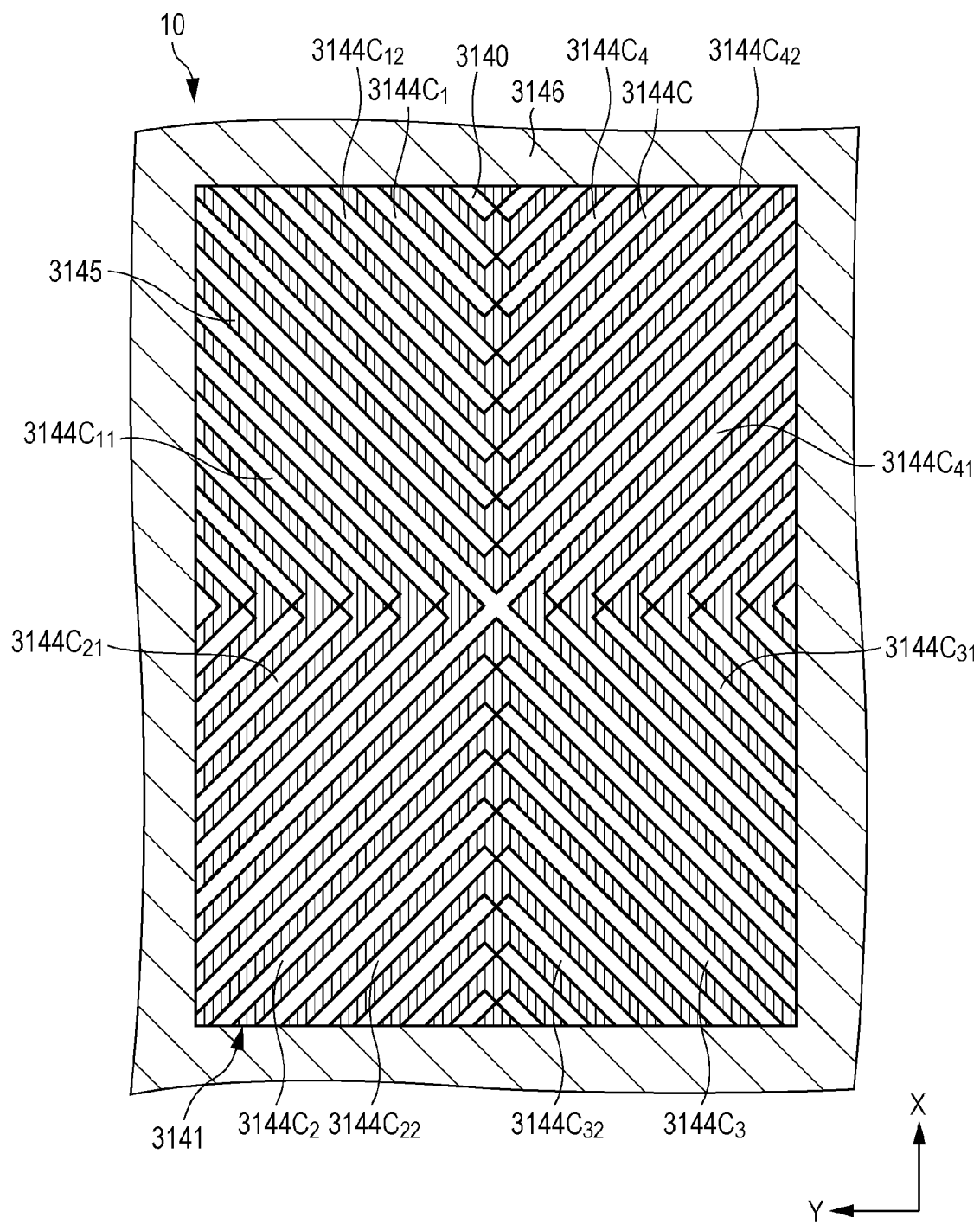
FIG. 51 is a schematic plan view of a first electrode for one pixel making up a liquid crystal display device according to a twenty-fourth exemplary embodiment.

The twenty-fourth exemplary embodiment also is a modification of the twenty-second exemplary embodiment. While description has been made regarding the twenty-second exemplary embodiment that the ridges 3144A are joined on the X axis or Y axis and the planar shape of the ridges 3144A is a V shape, ridges 3144C in the twenty-fourth exemplary embodiment are joined on neither the X axis nor the Y axis. Specifically, as illustrated in FIG. 51 which is a schematic plan view of a first electrode for one pixel making up the liquid crystal display device according to the twenty-fourth exemplary embodiment, ridges $3144C_{11}$ extending from the X axis or nearby the X axis and occupying the first quadrant do not connect to respective ridges $3144C_{41}$ extending from the X axis or nearby the X axis and occupying the fourth quadrant. Also, ridges $3144C_{12}$ extending from the Y axis or nearby the Y axis and occupying the first quadrant do not connect to respective ridges $3144C_{22}$ extending from the Y axis or nearby the Y axis and occupying the second quadrant. Further, ridges $3144C_{21}$ extending from the X axis or nearby the X axis and occupying the second quadrant do not connect to respective ridges $3144C_{31}$ extending from the X axis or nearby the X axis and occupying the third quadrant. Moreover, ridges $3144C_{32}$ extending from the Y axis or nearby the Y axis and occupying the third quadrant do not connect to respective ridges $3144C_{42}$ extending from the Y axis or nearby the Y axis and occupying the fourth quadrant.

While the ridges 3144C are not joined, these may be in contact. Here, the term "joined" refers to a state of the ridges meeting over a certain length, while "in contact" refers to a state of the ridges meeting over an extremely short distance (e.g., at a point).

According to this configuration as well, there are no ridges extending in parallel with the X axis and ridges extending in parallel with the Y axis, or even if there are, the length thereof is short. Thus, advantages the same as those described in the twenty-second exemplary embodiment can be obtained.

26. Twenty-Fifth Exemplary Embodiment

Figure 52:
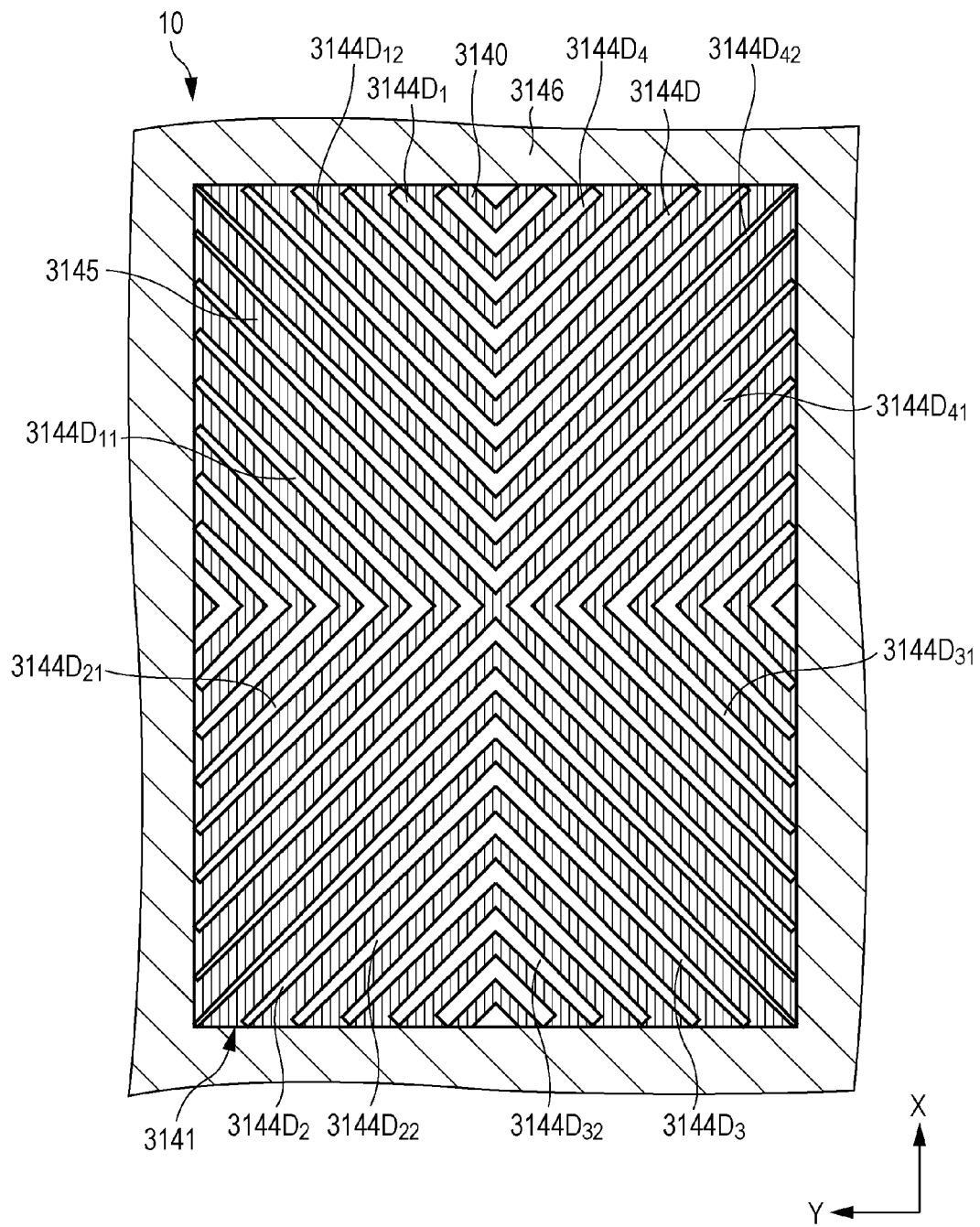
FIG. 52 is a schematic plan view of a first electrode for one pixel making up a liquid crystal display device according to a twenty-fifth exemplary embodiment.

The twenty-fifth exemplary embodiment is a modification of the twenty-second through twenty-fourth exemplary embodiments. As illustrated in FIG. 52 which is a schematic plan view of a first electrode for one pixel making up a liquid crystal display device according to the twenty-fifth exemplary embodiment, the width of ridges 3144D grow narrower toward the perimeter of the pixel 10. Specifically, the ridges 3144D are the widest at or near the X axis or Y axis, and grow narrower toward the perimeter of the pixel 10, being linearly narrowed to be more specific.

27. Twenty-Sixth Exemplary Embodiment

The twenty-sixth exemplary embodiment is a modification of the twenty-second through twenty-fifth exemplary embodiments, relates to a liquid crystal display device according to Embodiment 4A-1 of the present disclosure, and further relates to Embodiment 4C of the present disclosure. FIGS. 53A through 56C are schematic plan views of the first electrode of one pixel making up a liquid crystal display device according to the twenty-sixth exemplary embodiment.

As illustrated in FIGS. 53A through 56C, a slit portion 3152 is provided to the first electrode 3140, in addition to the ridge-and-groove portion 3141. The transparent electroconductive material layer making up the first electrode 3140 is not formed on the slit portion 3152. FIGS. 57A through 57D are schematic end views taken along arrow LVIIA-LVIIA in FIG. 53C, arrow LVIIB-LVIIB in FIG. 54C, arrow LVIIC-LVIIC in FIG. 55C, and arrow LVIID-LVIID in FIG. 56C, respectively.

Figure 53A:
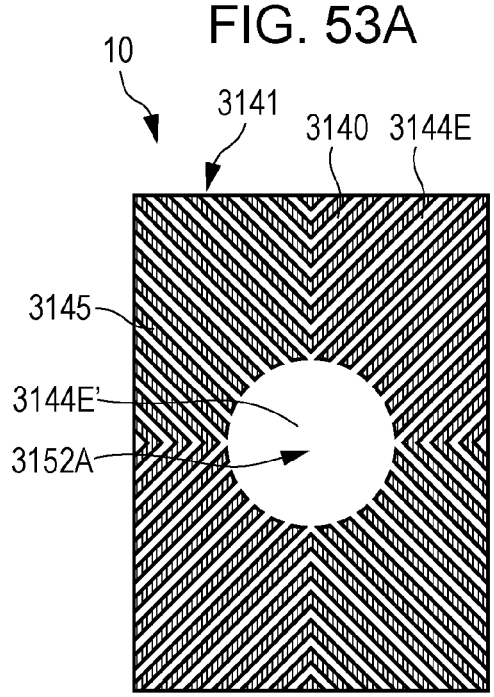
FIGS. 53A through 53C schematically illustrate a pixel making up a liquid crystal display device according to a twenty-sixth exemplary embodiment, where FIG. 53A schematically illustrates a state of layout of ridges, grooves, center region, and so forth, FIG. 53B schematically illustrates a state of layout of a slit portion provided to the first electrode.
Figure 53B:
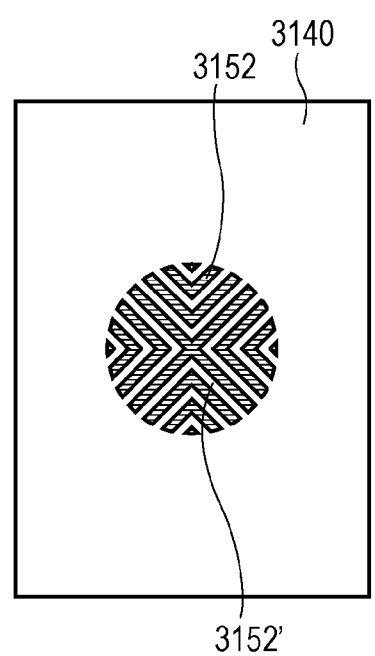
Figure 53C:
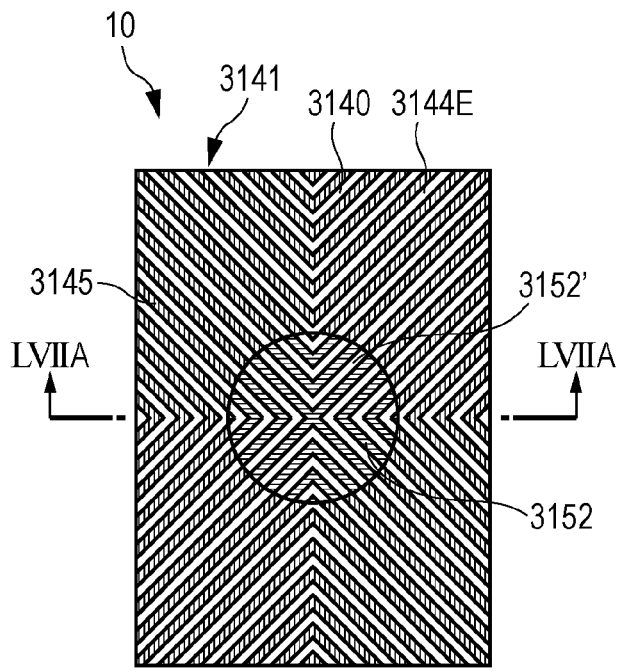

The slit portion 3152 in the twenty-sixth exemplary embodiment is formed in a ridge region 3144E'. As illustrated in FIGS. 53A through 53C, the slit portion 3152 is provided in a region including a center region (middle portion) 3152A of the pixel 10. Note that FIG. 53A schematically illustrates the layout state of ridges 3144E, the ridge region 3144E', grooves 3145, and the center region 3152A. FIG. 53B schematically illustrates the layout state of the slit portion 3152 provided to the first electrode 3140, and FIG. 53C schematically illustrates the ridge-and-groove portion 3141 and the slit portion 3152 overlaid.

Figure 54A:
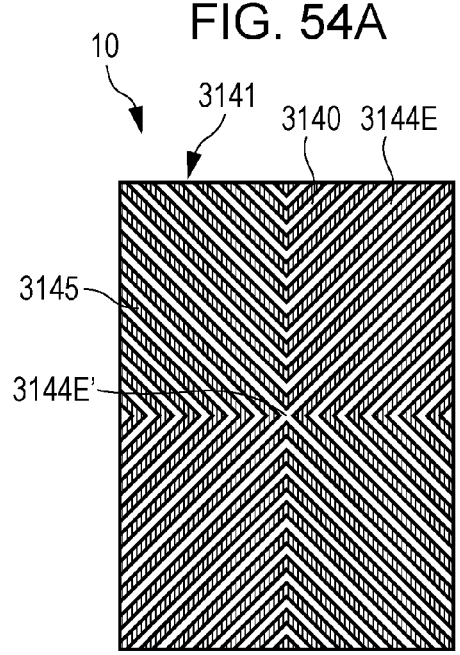
FIGS. 54A through 54C schematically illustrate a pixel making up a liquid crystal display device according to a modification of the twenty-sixth exemplary embodiment, where FIG. 53A schematically illustrates a state of layout of ridges, grooves, center region, and so forth, FIG. 53B schematically illustrates a state of layout of a slit portion provided to the first electrode.
Figure 54B:
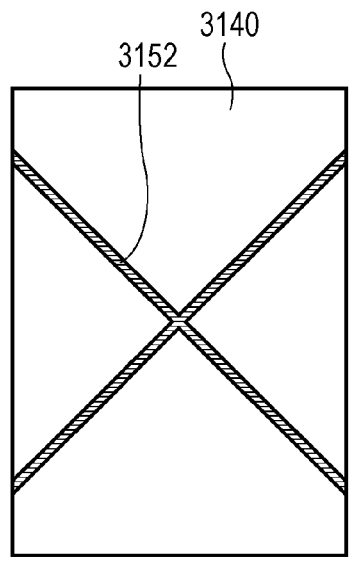
Figure 54C:
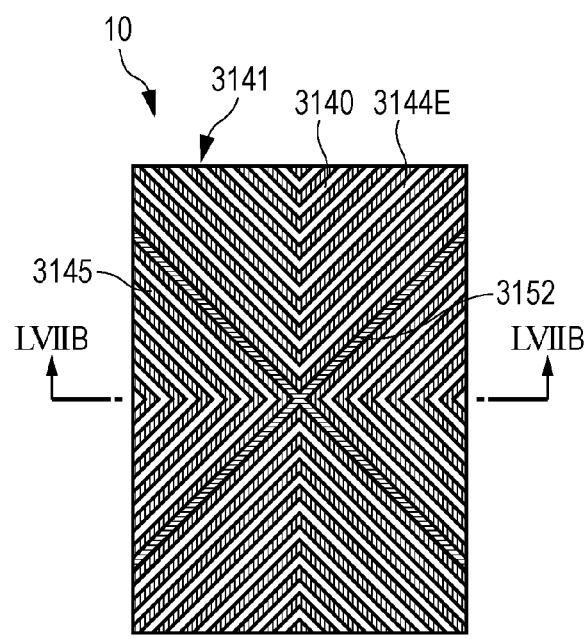

Alternatively, as illustrated in FIGS. 54A through 54C, the slit portion 3152 is formed as a single ridge region 3144E' extending toward the center region (middle portion) of the pixel 10 from each quadrant (specifically, on one ridge 3144). Note that FIG. 54A schematically illustrates the layout state of ridges 3144E, the ridge region 3144E', and the grooves 3145. FIG. 54B schematically illustrates the layout state of the slit portion 3152 provided to the first electrode 3140, and FIG. 54C schematically illustrates the ridge-and-groove portion 3141 and the slit portion 3152 overlaid.

Figure 55A:
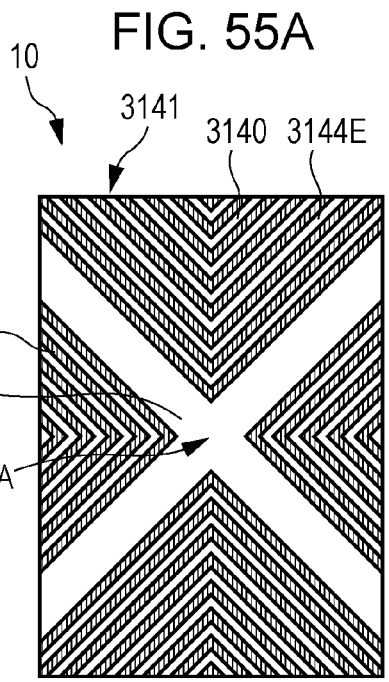
FIGS. 55A through 55C schematically illustrate a pixel making up a liquid crystal display device according to another modification of the twenty-sixth exemplary embodiment, where FIG. 53A schematically illustrates a state of layout of ridges, grooves, center region, and so forth, FIG. 53B schematically illustrates a state of layout of a slit portion provided to the first electrode.
Figure 55B:
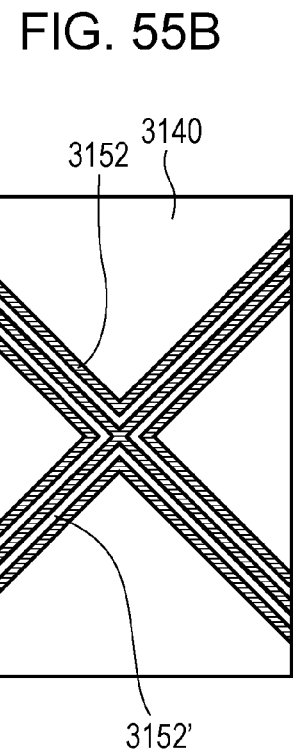
Figure 55C:
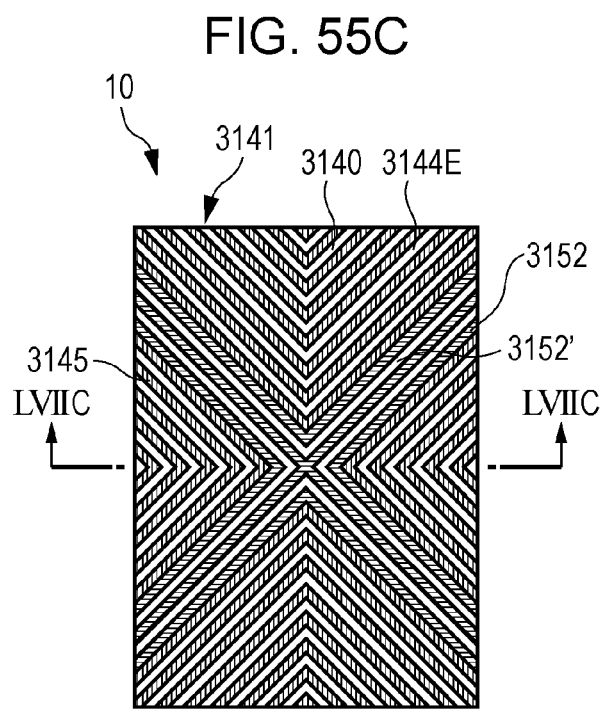

Alternatively, as illustrated in FIGS. 55A through 55C, the slit portion 3152 is formed as a ridge region 3144E' extending toward the center region (middle portion) 3152A of the pixel 10 from each quadrant. Note that FIG. 55A schematically illustrates the layout state of ridges 3144E, the ridge region 3144E', the grooves 3145, and the center region 3152A. FIG. 55B schematically illustrates the layout state of the slit portion 3152 provided to the first electrode 3140, and FIG. 55C schematically illustrates the ridge-and-groove portion 3141 and the slit portion 3152 overlaid.

Figure 56A:
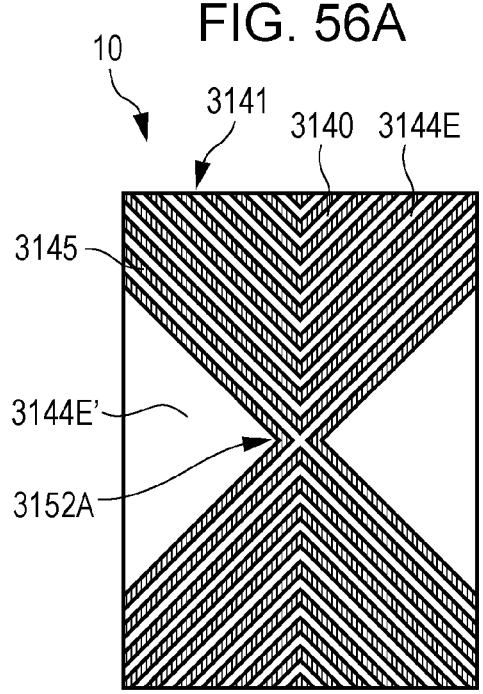
FIGS. 56A through 56C schematically illustrate a pixel making up a liquid crystal display device according to yet another modification of the twenty-sixth exemplary embodiment, where FIG. 53A schematically illustrates a state of layout of ridges, grooves, center region, and so forth, FIG. 53B schematically illustrates a state of layout of a slit portion provided to the first electrode.
Figure 56B:
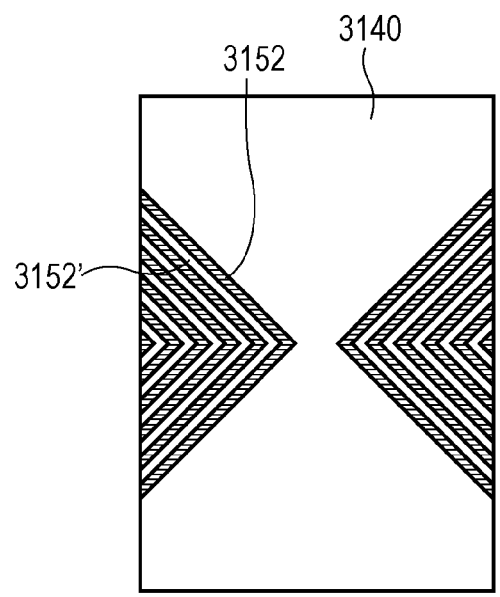
Figure 56C:
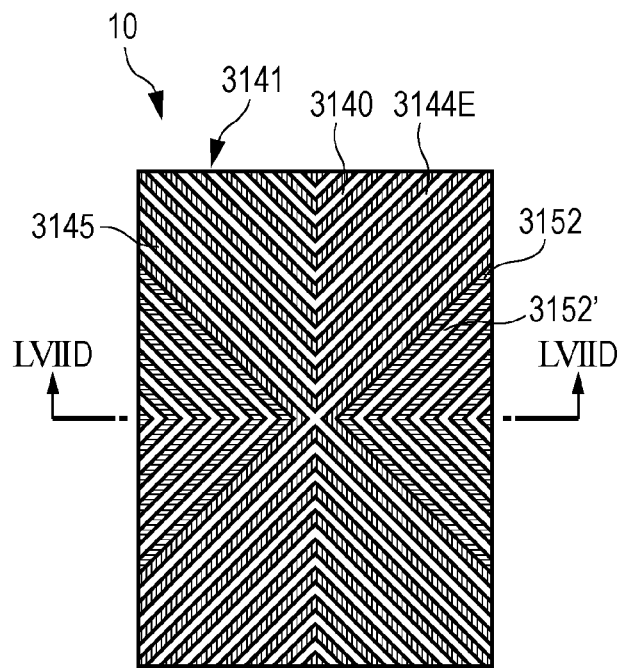
Figure 57A:
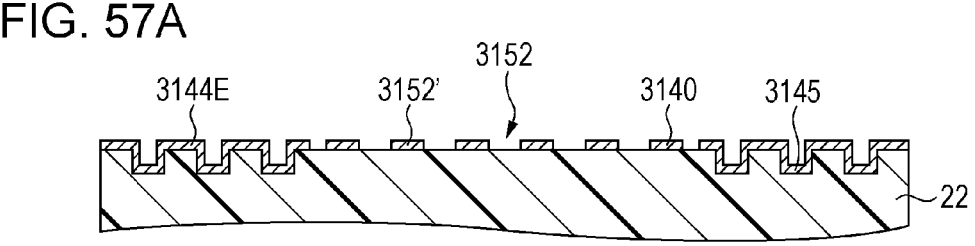
FIGS. 57A through 57D are schematic end views taken along arrow LVIIA-LVIIA in FIG. 53C, arrow LVIIB-LVIIB in FIG. 54C, arrow LVIIC-LVIIC in FIG. 55C, and arrow LVIID-LVIID in FIG. 56C, respectively.
Figure 57B:
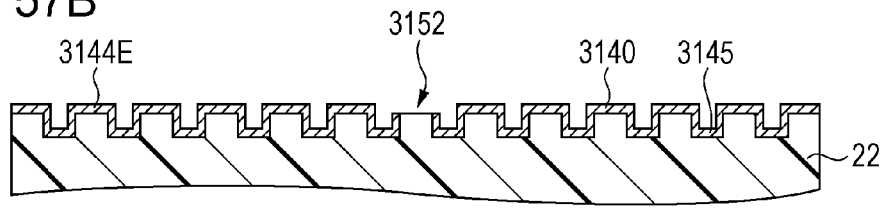
Figure 57C:
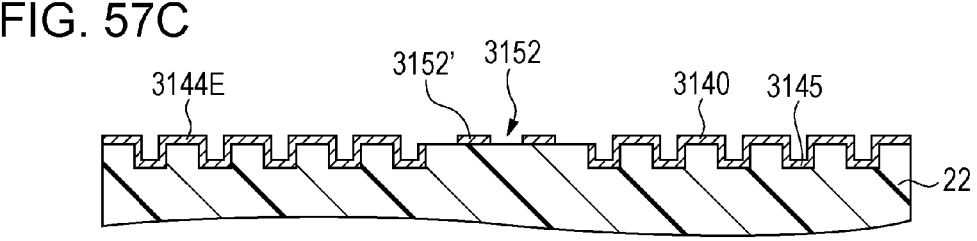
Figure 57D:
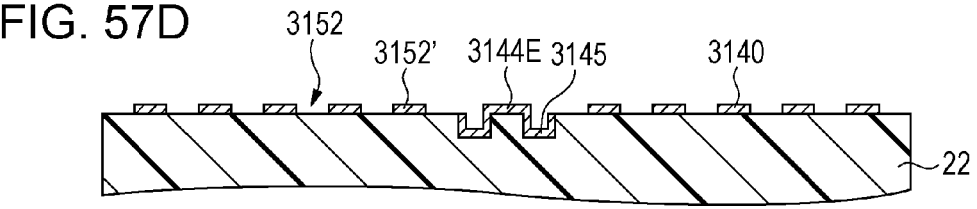

Alternatively, as illustrated in FIGS. 56A through 56C, the slit portion 3152 is formed as a ridge region 3144E' provided to a region between ridges extending toward the center region (middle portion) 3152A of the pixel 10 and the Y axis. Note that FIG. 56A schematically illustrates the layout state of ridges 3144E, the ridge region 3144E', the grooves 3145, and the center region 3152A. FIG. 56B schematically illustrates the layout state of the slit portion 3152 provided to the first electrode 3140, and FIG. 56C schematically illustrates the ridge-and-groove portion 3141 and the slit portion 3152 overlaid.

Note that in FIGS. 53A through 56C, grooves 3145 are indicated by vertical hatching. Also, in FIGS. 53B, 53C, 54B, 54C, 55B, 55C, 56B, 56C, and further in FIGS. 68 through 70, the slit portions 3152 and 3252 are indicated by horizontal hatching. No slit portion is provided to the region indicated by reference numeral 3152', but rather a transparent electroconductive material layer making up the first electrode 3140 is formed at this region. The planarization film 22 is exposed at the slit portion 3152.

Alternatively, an arrangement may be made where slit portions 3152 are formed on the top portion of ridges 3144E extending in parallel with the ridges 3144E, as yet another modification of a pixel making up the liquid crystal display device according to the twenty-sixth exemplary embodiment. This modification is illustrated in FIG. 58A which schematically illustrates a state of layout of ridges, grooves, slit portions, and so forth, and FIG. 58B which is a schematic cross-sectional view of the first electrode and other components taken along arrow LVIIIB-LVIIIB in FIG. 58A.

Alternatively, an arrangement may be made where slit portions 3152 are formed on the bottom portion of grooves 3145 extending in parallel with the grooves 3145, as yet another modification of a pixel making up the liquid crystal display device according to the twenty-sixth exemplary embodiment. This modification is illustrated in FIG. 59A which schematically illustrates a state of layout of ridges, grooves, slit portions, and so forth, and FIG. 59B which is a schematic cross-sectional view of the first electrode and other components taken along arrow LIXB-LIXB in FIG. 59A.

Figure 58A:
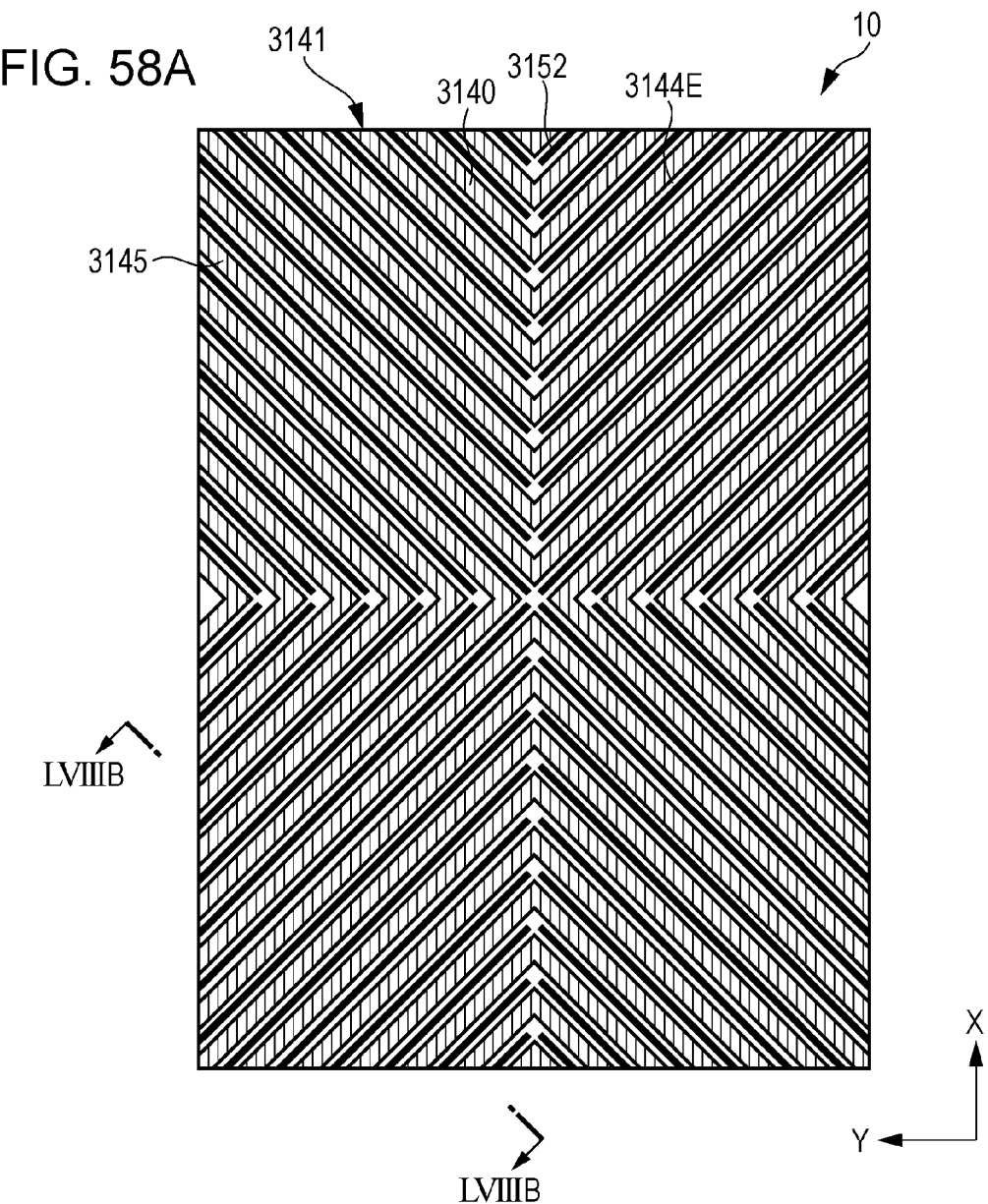
FIGS. 58A and 58B schematically illustrate a pixel making up a liquid crystal display device according to a further modification of the twenty-sixth exemplary embodiment, where FIG. 58A schematically illustrates a state of layout of ridges, grooves, slit portions, and so forth.
Figure 58B:
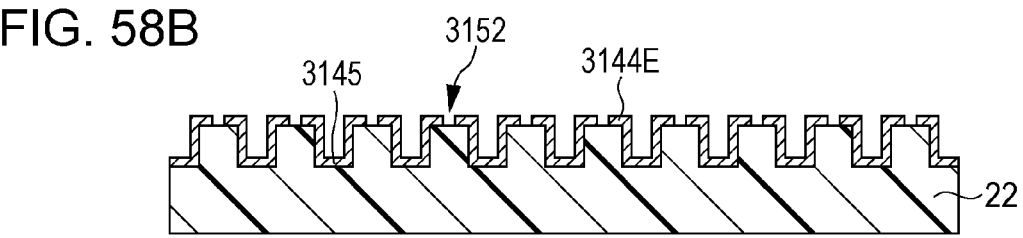
Figure 59A:
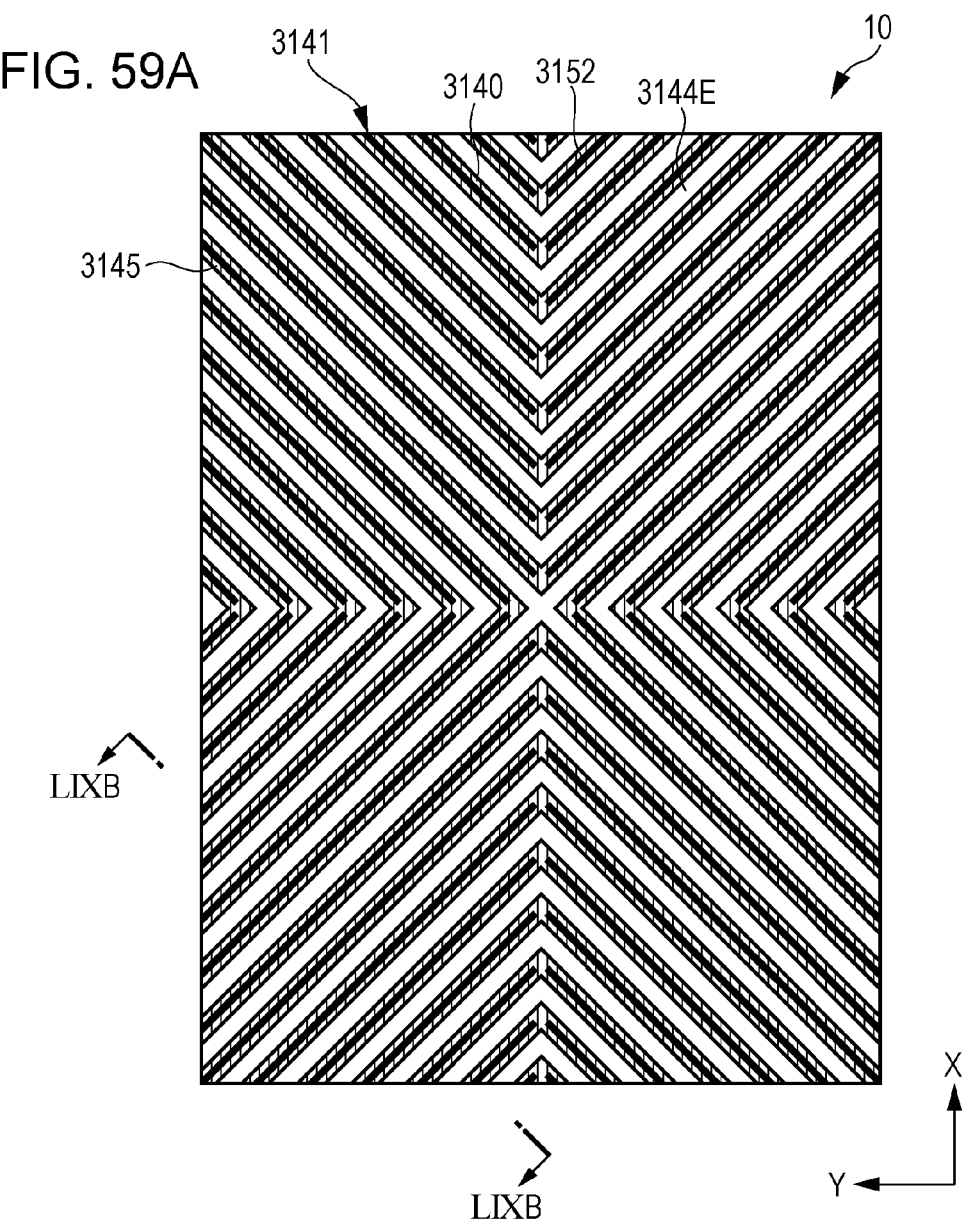
FIGS. 59A and 59B schematically illustrate a pixel making up a liquid crystal display device according to a further modification of the twenty-sixth exemplary embodiment, where FIG. 59A schematically illustrates a state of layout of ridges, grooves, slit portions, and so forth.
Figure 59B:
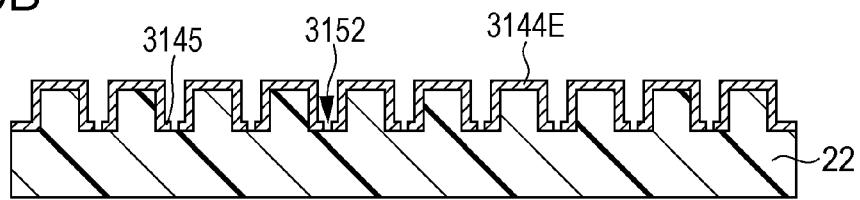
Figure 69:
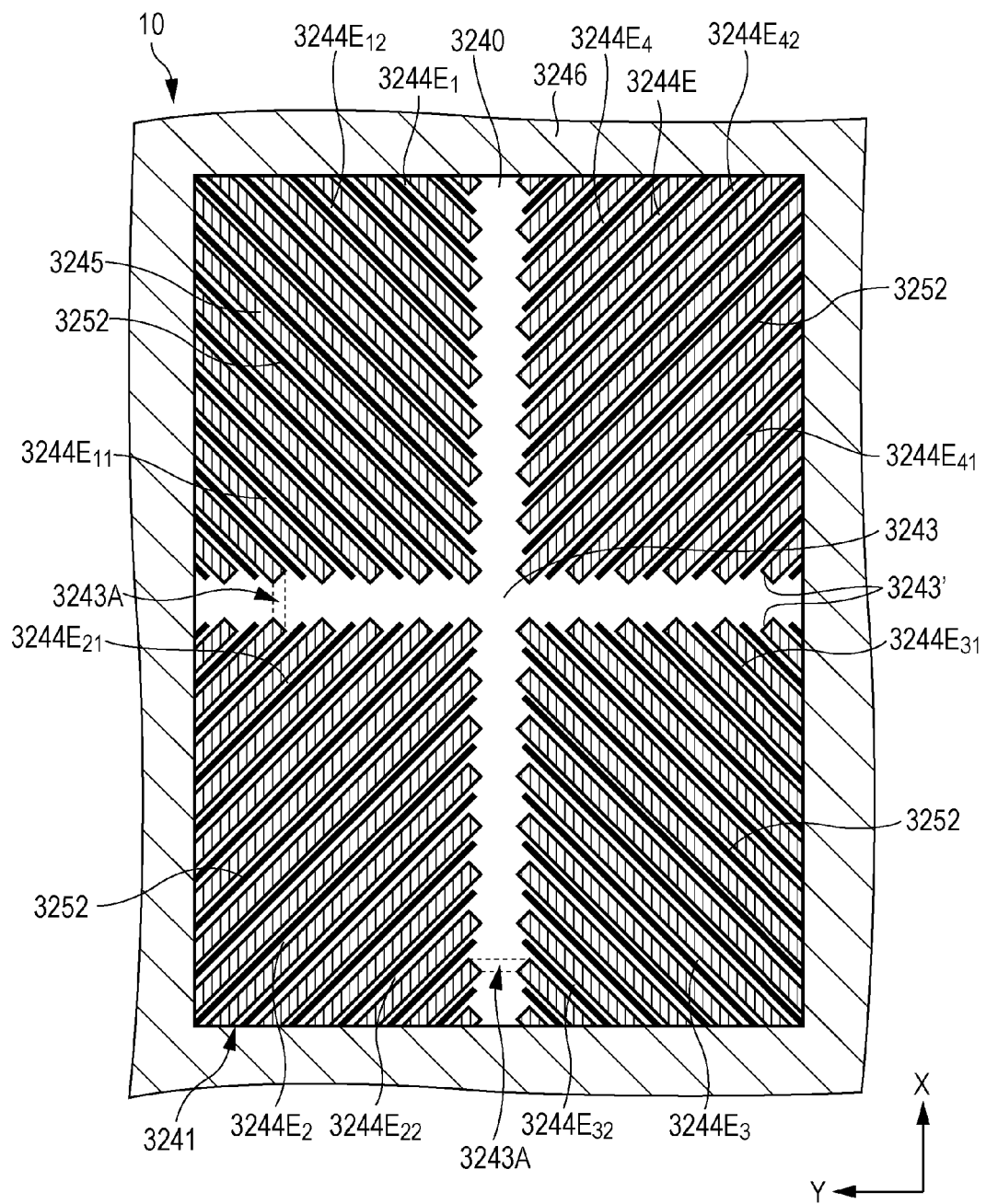
FIG. 69 is a schematic plan view of a first electrode for one pixel making up a liquid crystal display device according to a modification of the twenty-ninth exemplary embodiment (refer to the twenty-sixth exemplary embodiment)
Figure 70:
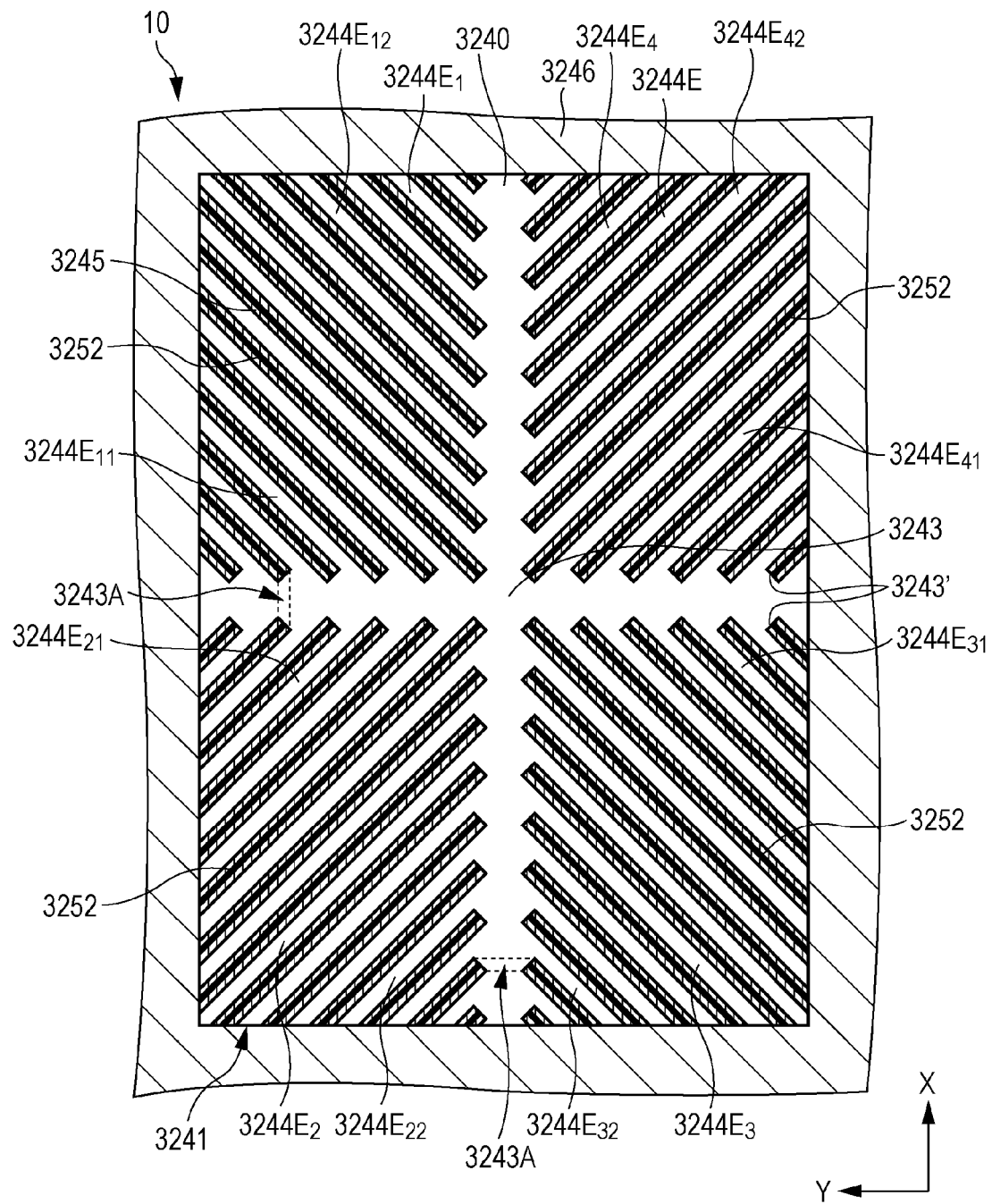
FIG. 70 is a schematic plan view of a first electrode for one pixel making up a liquid crystal display device according to a modification of the twenty-ninth exemplary embodiment (refer to the twenty-sixth exemplary embodiment)

In FIGS. 58A and 59A, and in the later-described FIGS. 69 and 70, slit portions 3152 and 3252 are indicated by heavy solid lines. In the example illustrated in FIGS. 58A and 58B for example, the width of ridges, the width of grooves, and the width of the slit portions are 7.0 μm, 3.0 μm, and 3.0 μm, respectively. In the example illustrated in FIGS. 59A and 59B for example, the width of ridges, the width of grooves, and the width of the slit portions are 3.0 μm, 7.0 μm, and 3.0 μm, respectively. Note that here, the slit portions 3152 are formed such that no ridges 3144E isolated from other ridges 3144E by slit portions 3152, or such that no grooves 3145 isolated from other grooves 3145 by slit portions 3152, i.e., such that all ridges and grooves are electrically connected. No slit portions 3152 are formed on the ridges or in the grooves on the X axis and Y axis in the examples illustrated in FIGS. 58A and 59A. Rather, the slit portions 3152 are notched at the ridges or in the grooves on the X axis and Y axis in these examples. Further, a configuration may be made where no slit portions are formed at ridges or grooves at the perimeter of the pixel 10.

Thus, slit portions 3152 are formed at the first electrode 3140 according to the twenty-sixth exemplary embodiment in addition to the ridge-and-groove portions 3141, so an electric field generated by the first electrode 3140 is distorted near the slit portions 3152, and the direction in which the liquid crystal molecules tilt is strongly restricted. This enables the force to restrict the alignment of the liquid crystal molecules near the slit portions 3152 to be increased, and accordingly restrict the tilted state of the liquid crystal molecules near the slit portions 3152 in a sure manner. The liquid crystal layer where the liquid crystal molecules are to be pretilted are exposed to a desired electric field for a predetermined amount of time when manufacturing the liquid crystal display device, and according to the above-described, the amount of time it takes for the alignment of the liquid crystal molecules exposed to the desired electric field to stabilize can be reduced. That is to say, the liquid crystal molecules can be pretilted in a short amount of time, and the manufacturing time of the liquid crystal display device can be reduced. Note that the ridge-and-groove portions are also provided besides the slit portions, so the problems with fine-slit structures according to the related art do not occur.

A liquid crystal display device having the structure of slit portions 3152 illustrated in FIGS. 55A through 55C and 57C, and a liquid crystal display device having the structure of the slit portions 3152 illustrated in FIGS. 58A and 59A, were fabricated. The widths of the ridges 3144E and grooves 3145 were 2.5 μm each, and the width of the slit portion 3152 was 2.5 μm. In either case, the time from the start of the pretilting processing to completion of alignment of the liquid crystal molecules was within ten seconds.

28. Twenty-Seventh Exemplary Embodiment

Figure 60:
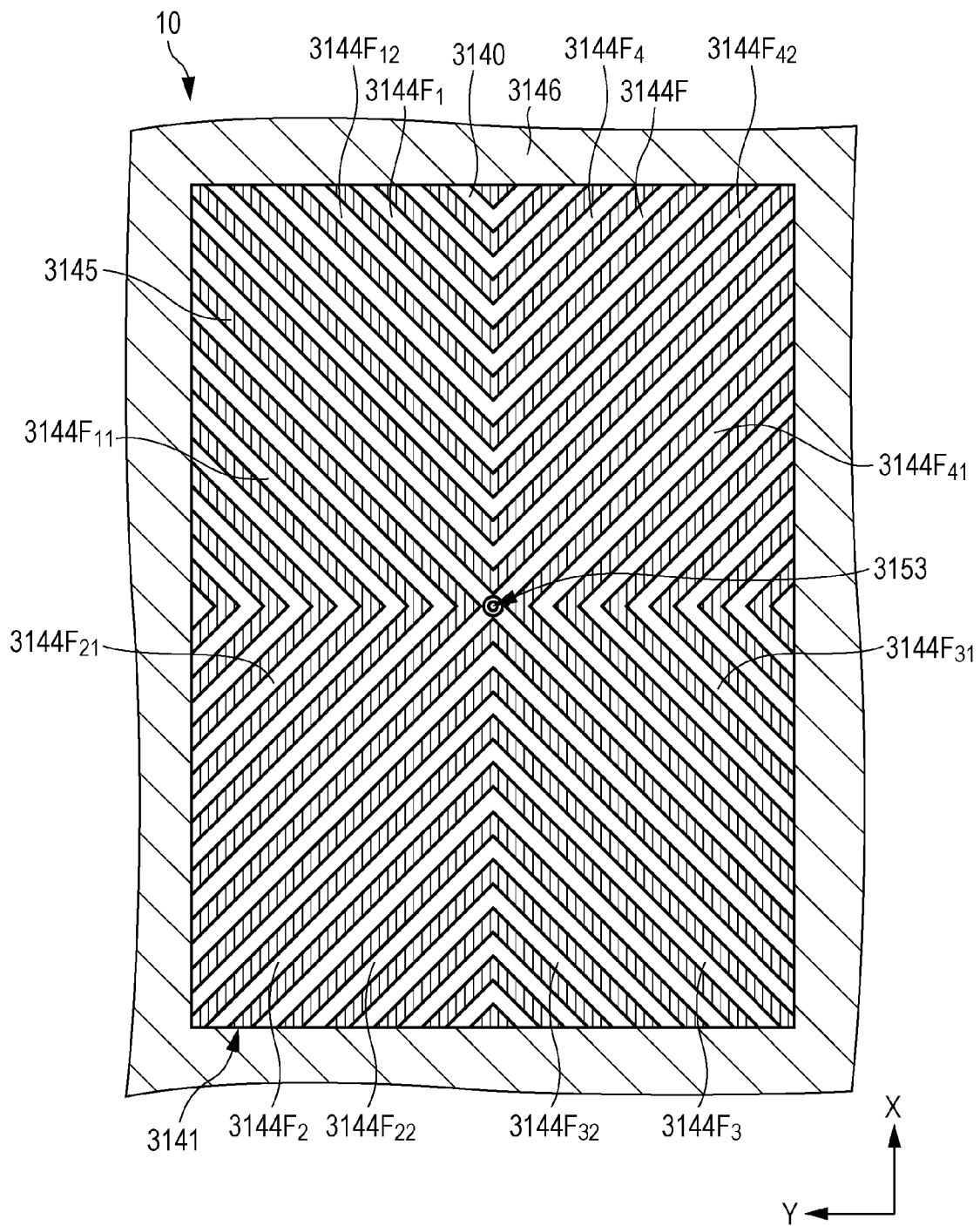
FIG. 60 is a schematic plan view of a first electrode for one pixel making up a liquid crystal display device according to a twenty-seventh exemplary embodiment.
Figure 61A:
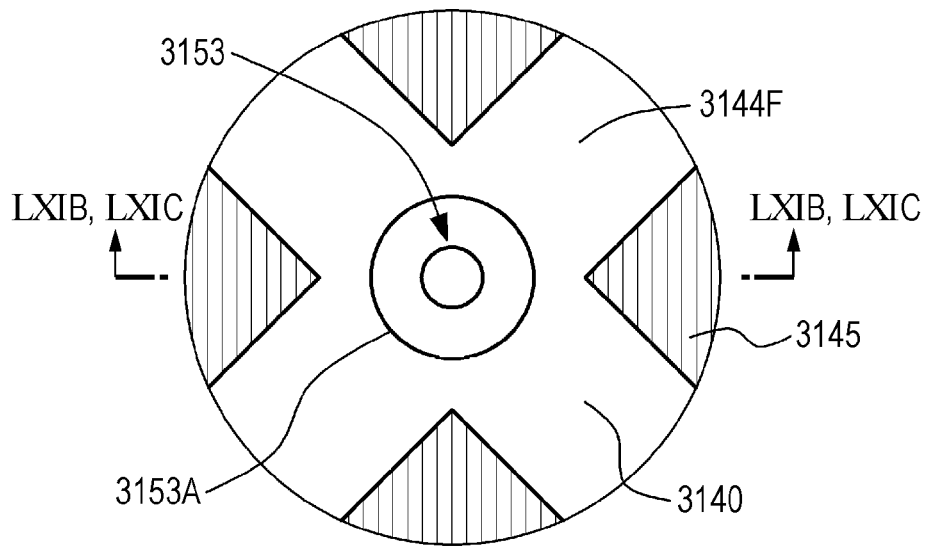
FIG. 61A is a partial schematic plan view of the first electrode at the center region of one pixel making up the liquid crystal display device according to the twenty-seventh exemplary embodiment.

The twenty-seventh exemplary embodiment is a modification of the twenty-second through twenty-sixth exemplary embodiments, and relates to a liquid crystal display device according to Embodiment 4D of the present disclosure, a liquid crystal display device according to Embodiment 4A-2 of the present disclosure, and a liquid crystal display device according to Embodiment 4C-2 of the present disclosure. FIG. 60 is a schematic plan view of a first electrode for one pixel making up a liquid crystal display device according to the twenty-seventh exemplary embodiment. FIGS. 61A, 62A, and 62B are partial schematic plan views of the first electrode at the center region of one pixel making up the liquid crystal display device according to the twenty-seventh exemplary embodiment, where an indentation 3153 is provided to the first electrode 3140 at the center region of the pixel 10, as illustrated in FIG. 61B which is a partial schematic cross-sectional view taken along LXIB-LXIB in FIG. 61A.

Figure 61B:
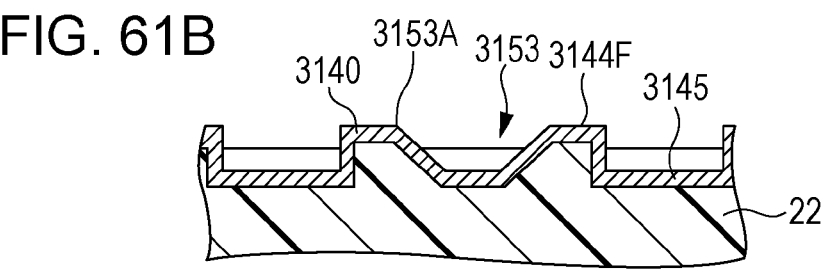
FIGS. 61B and 61C are partial schematic cross-sectional views of the first electrode at the center region of one pixel making up the liquid crystal display device according to the twenty-seventh exemplary embodiment, taken along arrow LXIB-LXIB and arrow LXIC-LXIC in FIG. 61A.
Figure 62A:
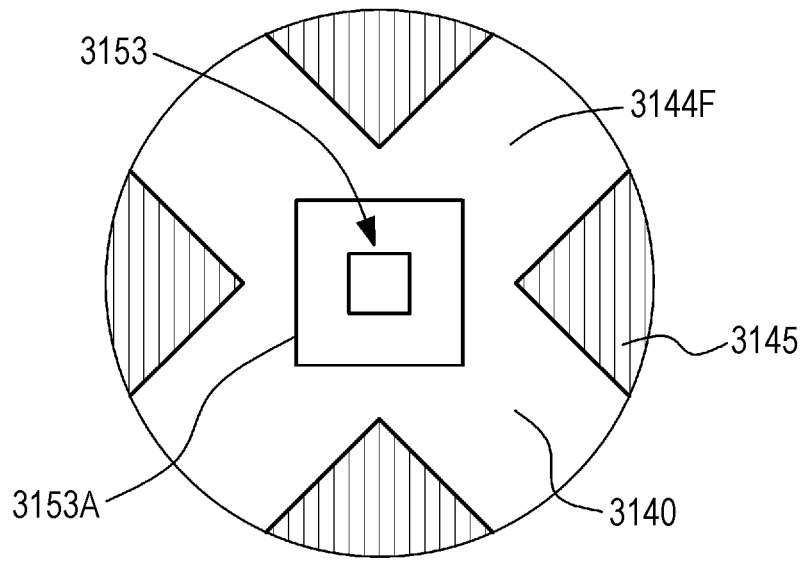
FIGS. 62A and 62B are schematic plan views of a first electrode at the center region of one pixel making up the liquid crystal display device according to the twenty-seventh exemplary embodiment.
Figure 62B:
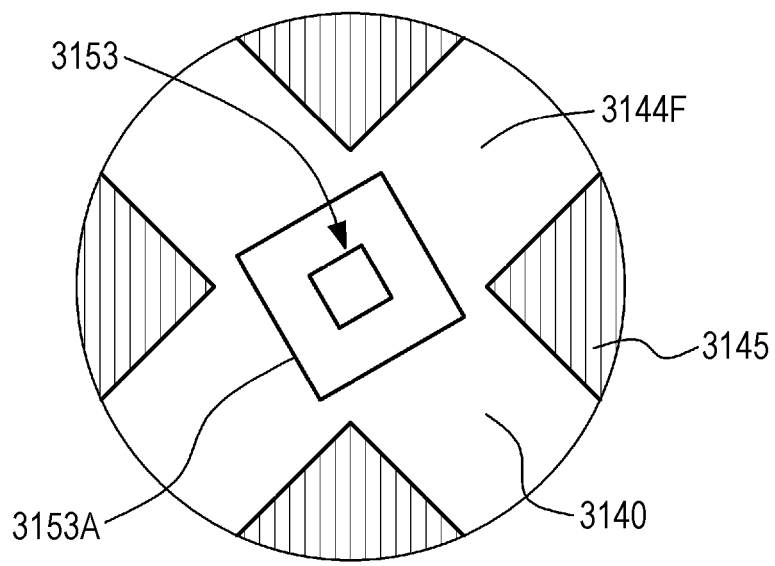

As illustrated in FIG. 61B, the indentation 3153 narrows down toward the first substrate. That is to say, the indentation 3153 has a forward-tapered inclined face. The inclination angle of the indentation 3153 is preferably 5 degrees to 60 degrees, more preferably 20 degrees to 30 degrees. This inclination angle can be obtained by etching the planarization film 22 back so that the planarization film 22 is inclined thus. The shape of the outer edge 3153A of the indentation 3153 may be made to be a circle (diameter of 15 μm or 7 μm, for example), as illustrated in FIG. 61A, or may be rectangular (a square with each side 12 μm long, for example), as illustrated in FIGS. 62A and 62B. The angle between the outer edge 3153A of the rectangular indentation 3153 and the direction in which ridges 3144F extend (the angle between the outer edge 3153A of the rectangular indentation 3153 and the direction in which ridges 3144F extend, where the outer edge 3153A comes into contact with the extension of a ridge 3144F) may be 90 degrees (see FIG. 62A), or may be an acute angle, 60 degrees for example (see FIG. 62B).

Thus, the liquid crystal display device according to the twenty-seventh exemplary embodiment has the indentation 3153 formed in the first electrode 3140 at the center region of the pixel, so liquid crystal molecules situated near the indentation 3153 are in a state tilted toward the center of the pixel. The liquid crystal layer where the liquid crystal molecules are to be pretilted are exposed to a desired electric field for a predetermined amount of time when manufacturing the liquid crystal display device, and according to the above-described, the amount of time it takes for the alignment of for the liquid crystal molecules exposed to the desired electric field to stabilize can be reduced. That is to say, the liquid crystal molecules can be pretilted in a short amount of time, and the manufacturing time of the liquid crystal display device can be reduced.

A liquid crystal display device having a structure where the outer edge 3153A of the indentation 3153 was shaped as illustrated in FIG. 61A, with the widths of the ridges 3144F and grooves 3145 being 2.5 µm each, and the inclination angle of the indentation 3153 being 30 degrees, was fabricated. In this case, the time from the start of the pretilting processing to completion of alignment of the liquid crystal molecules was within ten seconds.

Figure 61C:
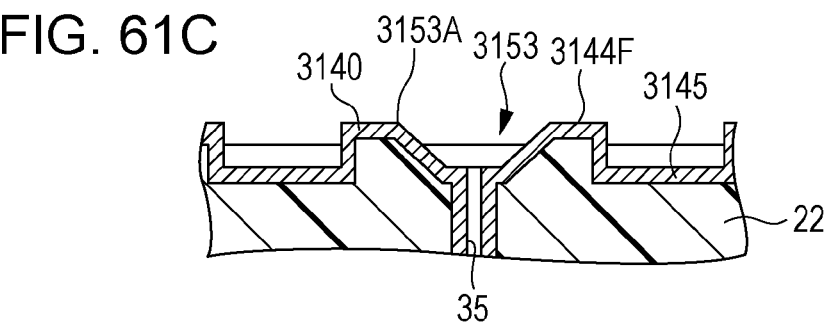

Further, the center portion of the indentation 3153 may make up part of a contact hole (contact hole 35), as illustrated in FIG. 61C.

29. Twenty-Eighth Exemplary Embodiment

Figure 63:
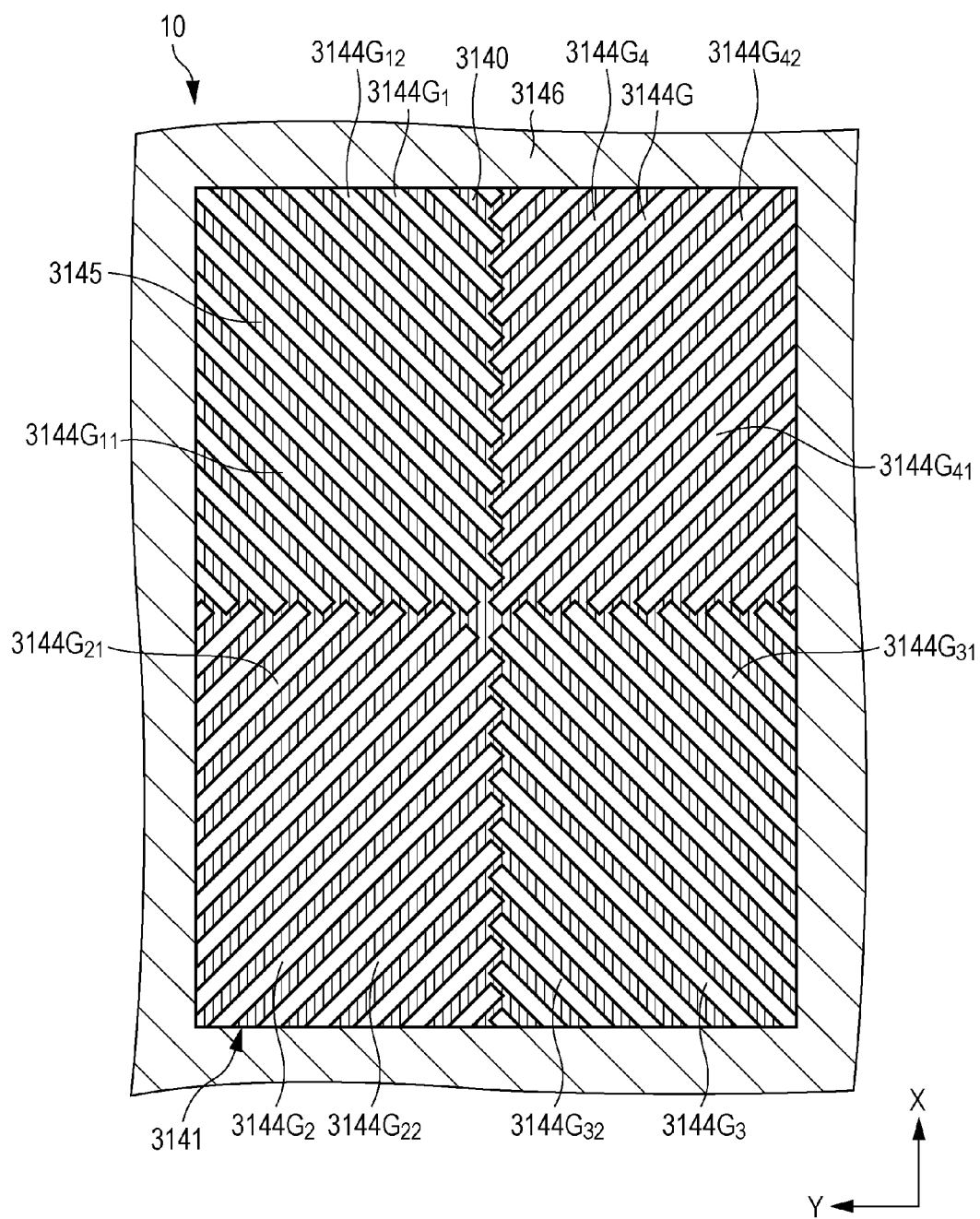
FIG. 63 is a schematic plan view of a first electrode for one pixel making up a liquid crystal display device according to a twenty-eighth exemplary embodiment.

The twenty-eighth exemplary embodiment is a modification of the twenty-second through twenty-seventh exemplary embodiments, and relates to a liquid crystal display device according to Embodiment 4E of the present disclosure, a liquid crystal display device according to Embodiment 4A-3 of the present disclosure, a liquid crystal display device according to Embodiment 4C-3 of the present disclosure, and a liquid crystal display device according to Embodiment 4D-3 of the present disclosure. FIG. 63 is a schematic plan view of a first electrode for one pixel making up the liquid crystal display device according to the twenty-eighth exemplary embodiment.

The liquid crystal display device according to the twenty-eighth exemplary embodiment was configured such that the width of ridges 3144G was $$P_Y/2 = P_X/2$$

and the width of the grooves 3145 was $$P_Y/2 = P_X/2$$

where $P_X$ represents the formation pitch of the ridges 3144G following the X axis, and $P_Y$ represents the formation pitch of the ridges 3144G following the Y axis, and where $P_X = P_Y$.

In the twenty-eighth exemplary embodiment, ridges $3144G_{11}$ extending from or nearby the X axis and occupying the first quadrant, and ridges $3144G_{41}$ extending from or nearby the X axis and occupying the fourth quadrant, are formed in a mutually offset state (preferably formed in a state mutually offset by $P_X/2$). Also, ridges $3144G_{12}$ extending from or nearby the Y axis and occupying the first quadrant, and ridges $3144G_{22}$ extending from or nearby the Y axis and occupying the second quadrant, are formed in a mutually offset state (preferably formed in a state mutually offset by $P_Y/2$). Further, ridges $3144G_{21}$ extending from or nearby the X axis and occupying the second quadrant, and ridges $3144G_{32}$ extending from or nearby the X axis and occupying the third quadrant, are formed in a mutually offset state (preferably formed in a state mutually offset by $P_X/2$). Moreover, ridges $3144G_{31}$ extending from or nearby the Y axis and occupying the third quadrant, and ridges $3144G_{41}$ extending from or nearby the Y axis and occupying the fourth quadrant, are formed in a mutually offset state (preferably formed in a state mutually offset by $P_Y/2$). Note that the ridges 3144G are in 180 degrees rotational symmetry (point symmetry) as to the center of the pixel, rather than being in line symmetry to the X axis and Y axis.

Forming ridges 3144G offset from each other by half a pitch causes an electric field generated by the first electrode 3140 to be distorted near the center of the pixel, and the direction in which the liquid crystal molecules tilt is restricted. As a result, the force to restrict the alignment of the liquid crystal molecules near the center of the pixel can be increased, and accordingly the tilted state of the liquid crystal molecules near the center of the pixel can be restricted in a sure manner. The liquid crystal layer where the liquid crystal molecules are to be pretilted are exposed to a desired electric field for a predetermined amount of time when manufacturing the liquid crystal display device, and according to the above-described, the amount of time it takes for the alignment of the liquid crystal molecules exposed to the desired electric field to stabilize can be reduced. That is to say, the liquid crystal molecules can be pretilted in a short amount of time, and the manufacturing time of the liquid crystal display device can be reduced.

A liquid crystal display device having a structure where the ridges 3144G were formed mutually offset by half a pitch, with the widths of the ridges 3144G and grooves 3145 being 2.5 µm each, was fabricated. In this case, the time from the start of the pretilting processing to completion of alignment of the liquid crystal molecules was within ten seconds.

30. Twenty-Ninth Exemplary Embodiment

Figure 64:
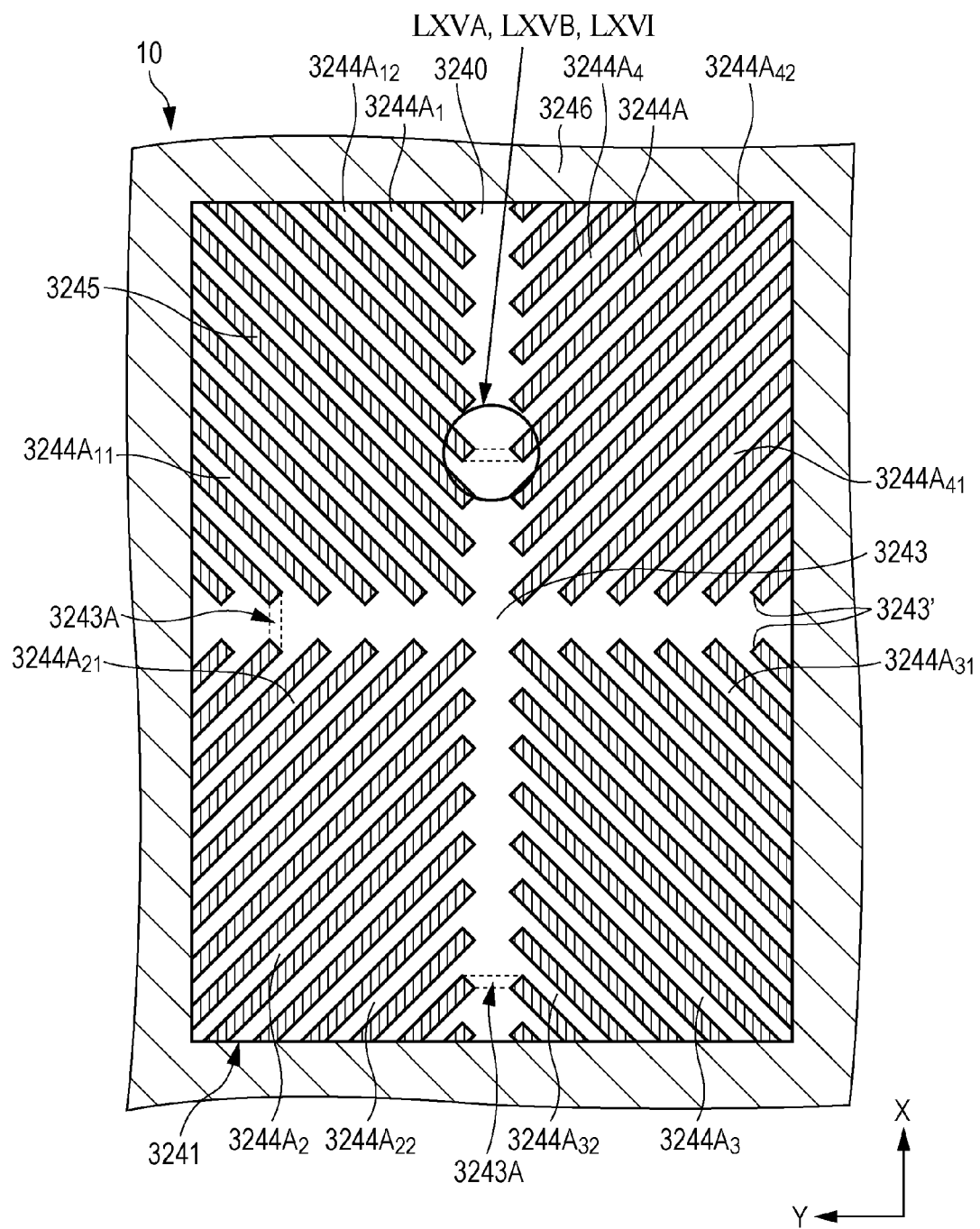
FIG. 64 is a schematic plan view of a first electrode for one pixel making up a liquid crystal display device according to a twenty-ninth exemplary embodiment.
Figure 65A:
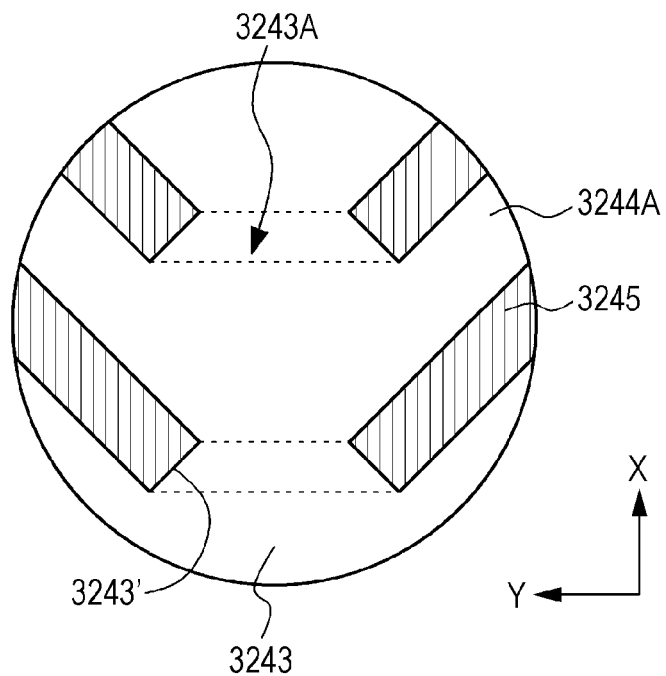
FIGS. 65A and 65B are schematic plan views illustrating the encircled portion LXVA, LXVB of the first electrode in the schematic plan view of the first electrode in FIG. 64 enlarged.

The twenty-ninth exemplary embodiment relates to a liquid crystal display device according to Embodiment 4B of the present disclosure. FIG. 64 is a schematic plan view of a first electrode for one pixel making up a liquid crystal display device according to the twenty-ninth exemplary embodiment. FIGS. 65A through 66 are schematic plan views illustrating the encircled portion LXVA, LXVB, LXVI in the schematic plan view of the first electrode in FIG. 64 enlarged.

Assuming an X-Y coordinate system in the liquid crystal display device according to the twenty-ninth exemplary embodiment in which straight lines passing through the center of the pixel 10 are parallel to the perimeters of the pixel are the X axis and Y axis, the multiple ridge-and-groove portions 3241 are formed of a trunk ridge 3243 extending along the X axis and Y axis, and multiple branch ridges 3244A extending from the sides of the trunk ridge 3243 towards the perimeter of the pixel 10. The direction in which side portions 3243' of the trunk ridge 3243 where branch ridges 3244A are not joined extend is parallel with neither the X axis nor the Y axis. That is to say, the direction in which the side portions 3243' of the trunk ridge 3243 where branch ridges 3244A are not joined extend is a direction different from the X-axial direction and a direction different from the Y-axial direction. The trunk ridge 3243 and branch ridges 3244A are in line symmetry across the X axis, and also in line symmetry across the Y axis, and further in 180 degrees rotational symmetry (point symmetry) as to the center of the pixel.

Figure 65B:
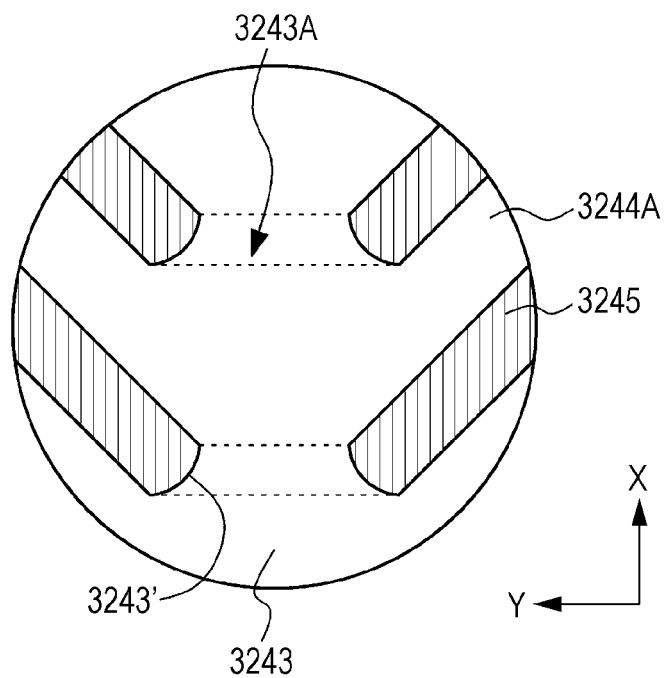
Figure 66:
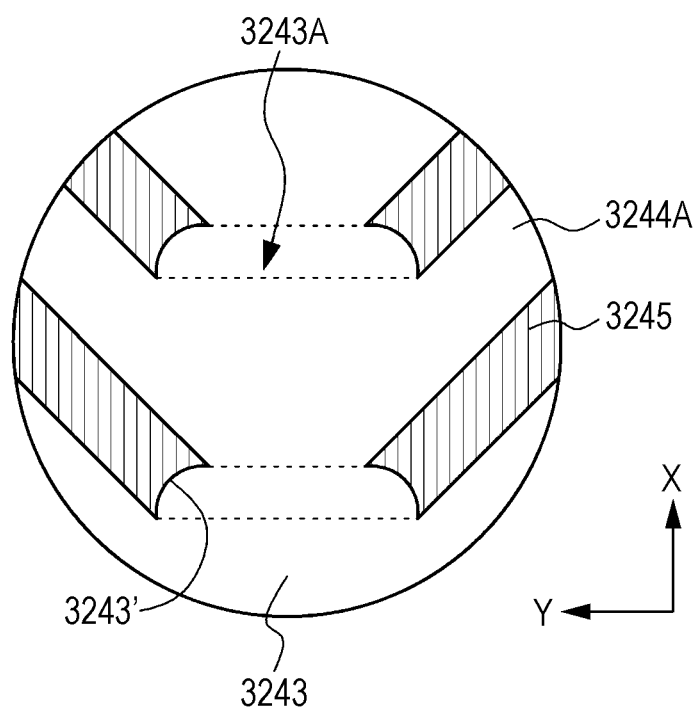
FIG. 66 is a schematic plan view illustrating the encircled portion LXVI of the first electrode in the schematic plan view of the first electrode in FIG. 64 enlarged.

Specifically, the side portions 3243' of the trunk ridge 3243 where branch ridges 3244A are not joined may be straight lines as illustrated in FIGS. 64 and 65A, or may be curved as illustrated in FIGS. 65B and 66. The shape of each region 3243A between the side portions 3243' of the trunk ridge 3243 where branch ridges 3244A are not joined is such that the side closer to the tip of the trunk ridge 3243 is shorter than the side closer to the base of the trunk ridge 3243, as illustrated in FIGS. 64 through 66.

The liquid crystal display device according to the twenty-ninth exemplary embodiment is configured such that the multiple branch ridges $3244A_1$ occupying the first quadrant extend in parallel in a direction where the value of the Y coordinate increases when the value of the X coordinates increases, and the multiple branch ridges $3244A_2$ occupying the second quadrant extend in parallel in a direction where the value of the Y coordinate increases when the value of the X coordinates decreases. Also, the multiple branch ridges $3244A_3$ occupying the third quadrant extend in parallel in a direction where the value of the Y coordinate decreases when the value of the X coordinates decreases, and the multiple branch ridges $3244A_4$ occupying the fourth quadrant extend in parallel in a direction where the value of the Y coordinate decreases when the value of the X coordinates increases.

In other words, the trunk ridge 3243 and the branch ridges 3244A are in line symmetry across the X axis, and also in line symmetry across the Y axis, and further in 180 degrees rotational symmetry (point symmetry) as to the center of the pixel.

Other than the above points, the configuration and structure of the liquid crystal display device according to the twenty-ninth exemplary embodiment can be made to be the same as the configuration and structure of the liquid crystal display device according to the twenty-second exemplary embodiment, so detailed description thereof will be omitted.

Thus, the liquid crystal display device according to the twenty-ninth exemplary embodiment has no portions of the trunk ridge extending in parallel with the X axis, and no portions of the trunk ridge extending in parallel with the Y axis. Accordingly, a liquid crystal display device can be provided which realizes even higher light transmittance. Also, a liquid crystal display device can be provided which has a configuration and structure enabling pretilting of liquid crystal molecules in a short time.

The specifications of the trunk ridge 3243, branch ridges 3244A, and grooves 3245 are as given in Table 9.

TABLE 9

| | |
|---|---|
| Average height of trunk ridge: | 0.2 μm |
| Width of trunk ridge: | 1.0 μm at narrowest point, 2.0 μm at widest point |
| Average height of branch ridges: | 0.2 μm |
| Pitch of branch ridges: | 5.0 μm |
| Width of branch ridges: | 2.5 μm |
| Width of grooves: | 2.5 μm |

Figure 67:
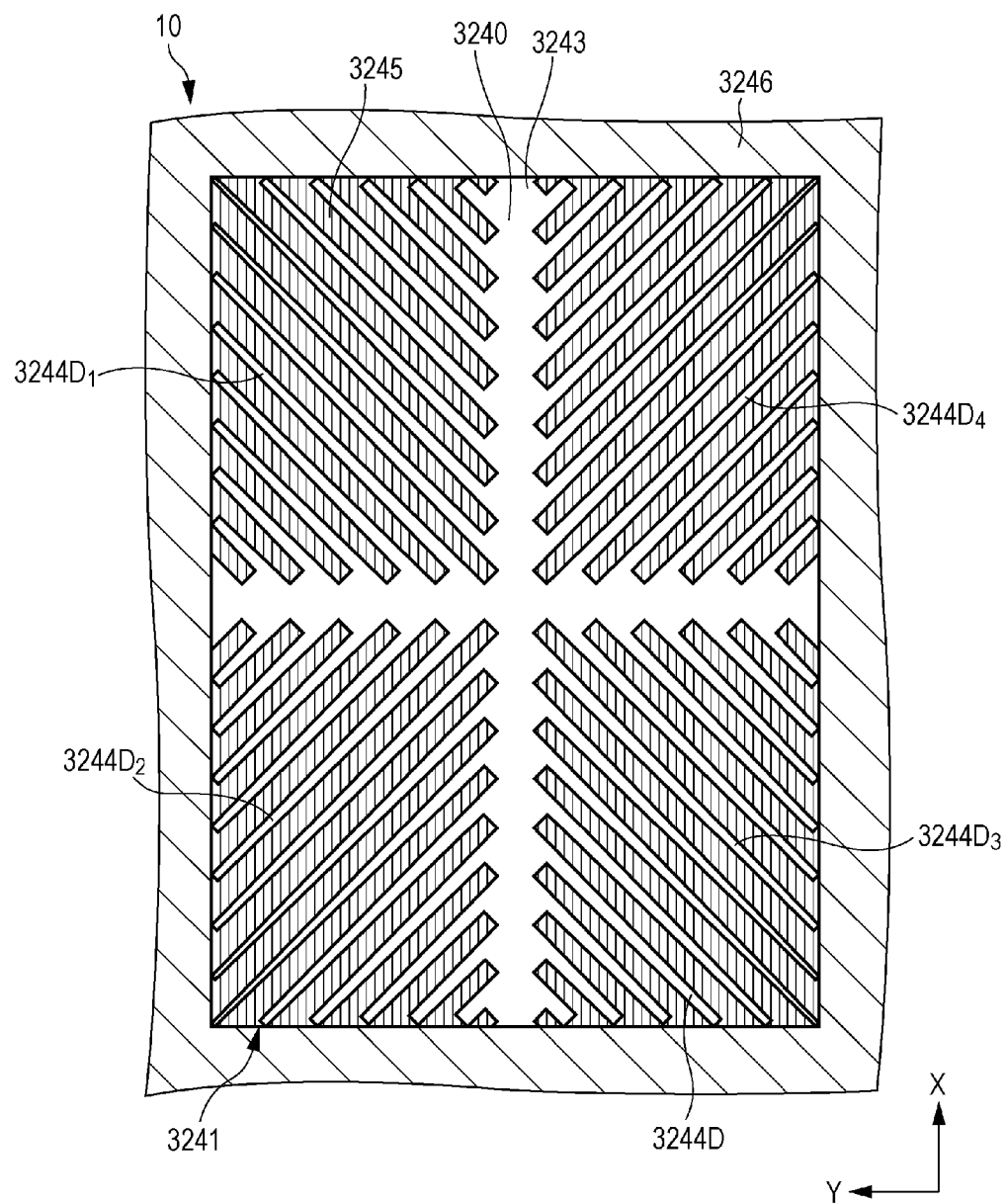
FIG. 67 is a schematic plan view of a first electrode for one pixel making up a liquid crystal display device according to a modification of the twenty-ninth exemplary embodiment (refer to the twenty-fifth exemplary embodiment)

The liquid crystal display device according to the twenty-ninth exemplary embodiment may be arranged such that the width of branch ridges 3244D narrow toward the perimeter of the pixel 10, in the same way as with the twenty-fifth exemplary embodiment (see FIG. 67). Alternatively, the liquid crystal display device according to the twenty-ninth exemplary embodiment may be arranged such that a slit portion 3152 is formed at the first electrode (liquid crystal display device according to Embodiment 4B-1 according to the present disclosure or liquid crystal display device according to Embodiment 4C according to the present disclosure), in the same way as with the twenty-sixth exemplary embodiment (see FIGS. 68 through 70).

Figure 68:
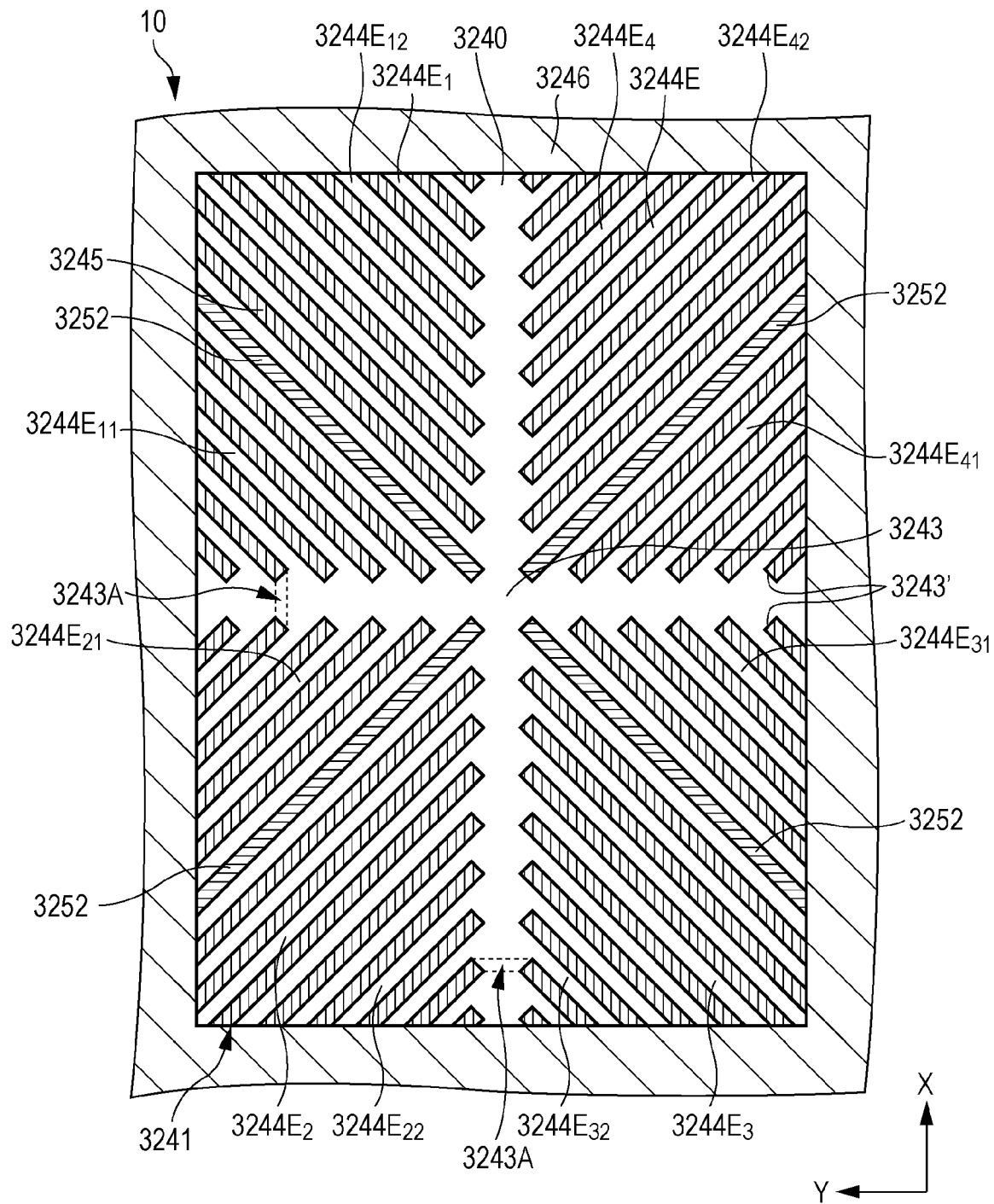
FIG. 68 is a schematic plan view of a first electrode for one pixel making up a liquid crystal display device according to a modification of the twenty-ninth exemplary embodiment (refer to the twenty-sixth exemplary embodiment)

FIG. 68 is a schematic plan view of a first electrode for one pixel making up a liquid crystal display device according to a modification of the twenty-ninth exemplary embodiment, and has the slit portions 3252 of the same configuration and structure as illustrated in FIGS. 54A through 54C. FIGS. 69 and 70 are schematic plan view of a first electrode for one pixel making up a liquid crystal display device according to a modification of the twenty-ninth exemplary embodiment, and have the slit portions 3252 of the same configuration and structure as illustrated in FIGS. 58A through 59B.

Figure 71:
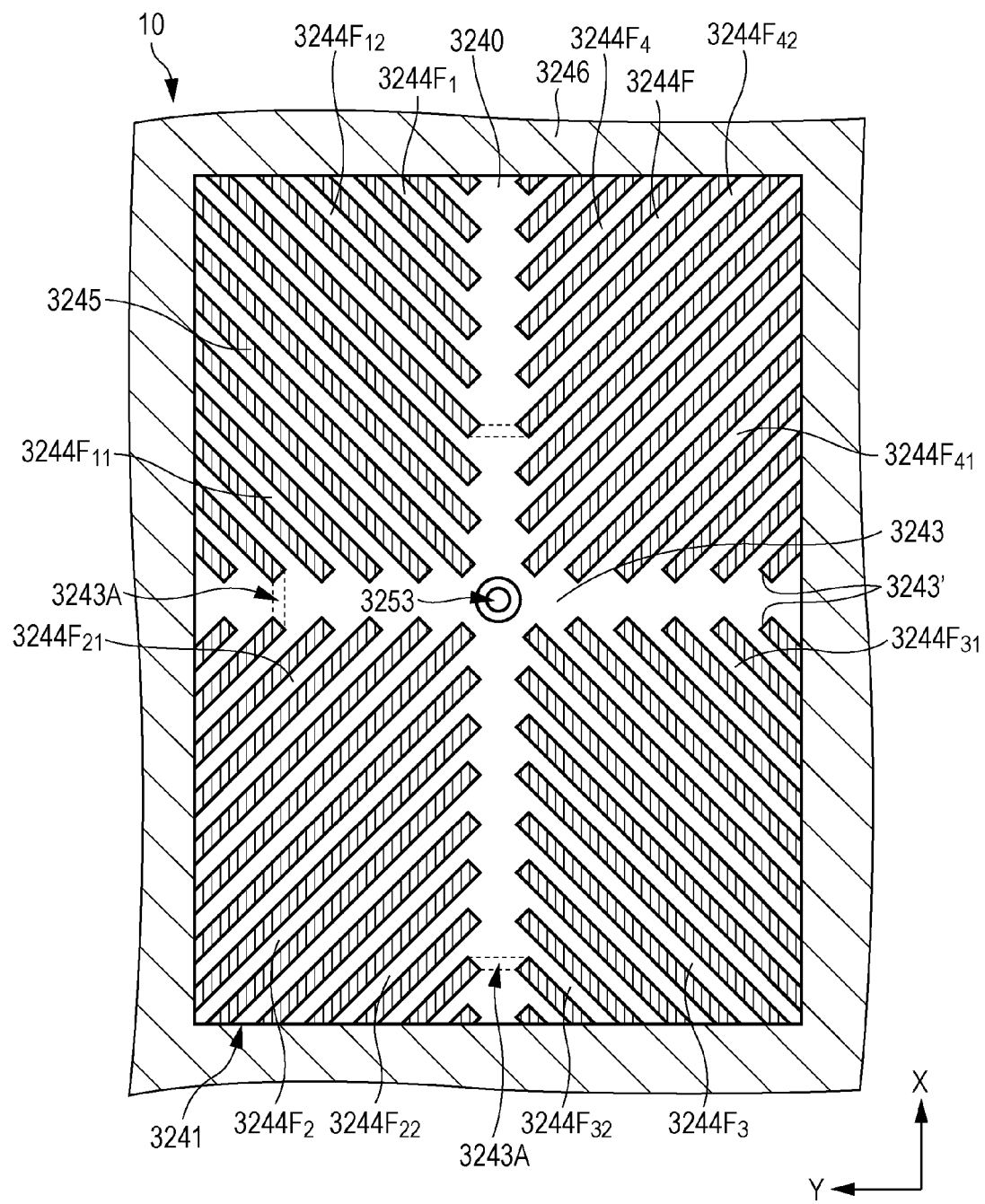
FIG. 71 is a schematic plan view of a first electrode for one pixel making up a liquid crystal display device according to another modification of the twenty-ninth exemplary embodiment (refer to the twenty-seventh exemplary embodiment)

Note that here, the slit portions 3252 are formed such that no branch ridges 3244D are isolated from other branch ridges 3244D by slit portions 3252, or such that no grooves 3245 are isolated from other grooves 3245 by slit portions 3252, i.e., such that all ridges and grooves are electrically connected. No slit portions 3252 are formed on the trunk ridge 3243 in the examples illustrated in FIGS. 69 and 70. Rather, the slit portions 3252 are notched at the trunk ridge 3243 in these examples. Further, a configuration may be made where no slit portions are formed at branch ridges or grooves at the perimeter of the pixel 10. Alternatively, the liquid crystal display device according to the twenty-second exemplary embodiment may be arranged including an indentation 3253 provided to the first electrode 3240 at the center region of the pixel (liquid crystal display device according to Embodiment 4B-2 of the present disclosure, liquid crystal display device according to Embodiment 4C-2 of the present disclosure, or liquid crystal display device according to Embodiment 4D of the present disclosure), in the same way as with the twenty-seventh exemplary embodiment (see FIG. 71).

Figure 72:
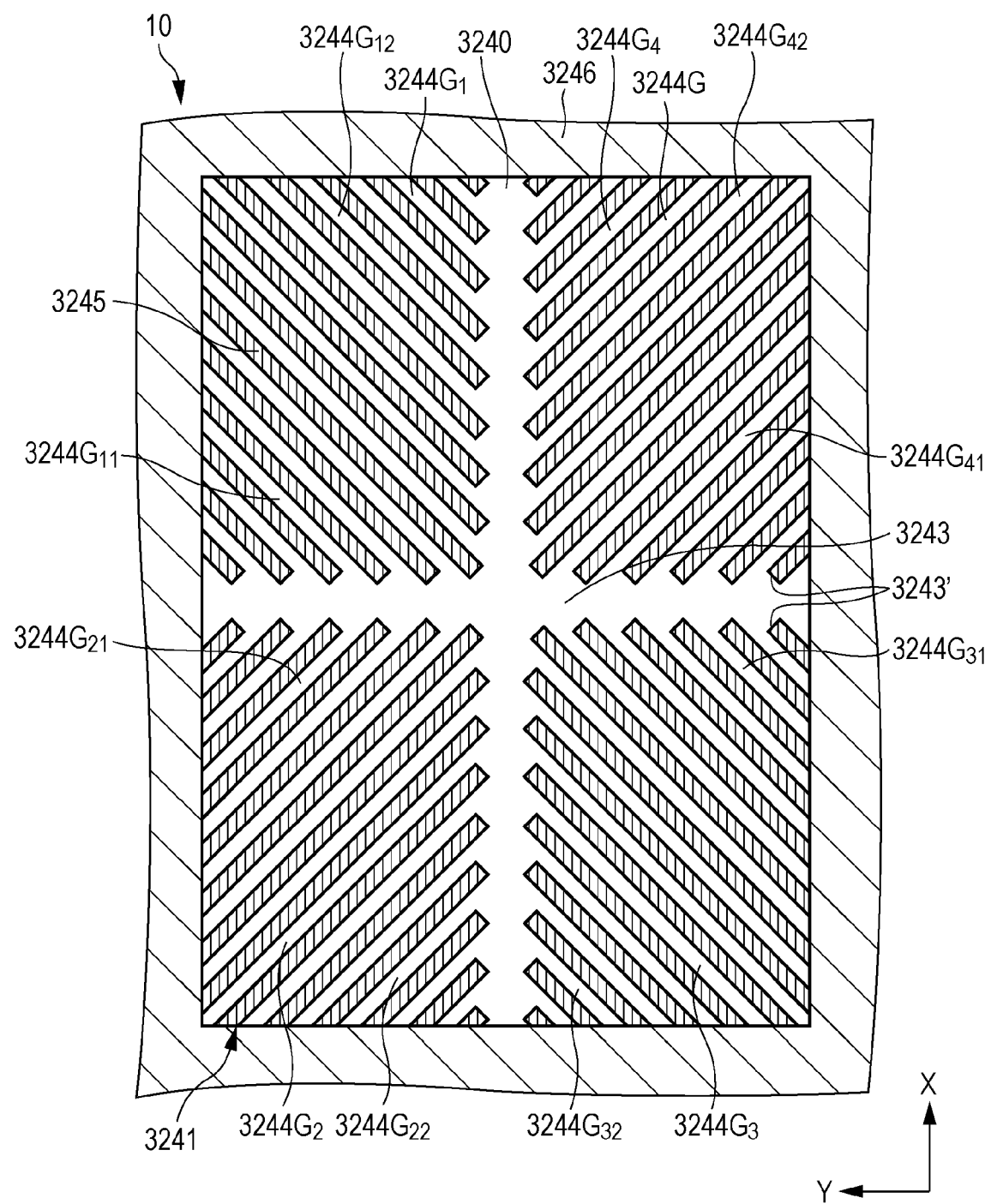
FIG. 72 is a schematic plan view of a first electrode for one pixel making up a liquid crystal display device according to another modification of the twenty-ninth exemplary embodiment (refer to the twenty-eighth exemplary embodiment)

Alternatively, the liquid crystal display device according to the twenty-ninth exemplary embodiment may be arranged such as illustrated in FIG. 72 which is a schematic plan view of a first electrode for one pixel, where $P_X$ represents the formation pitch of the branch ridges following the X axis, and $P_Y$ represents the formation pitch of the ridges following the Y axis, branch ridges extending from a trunk ridge on the X axis and occupying the first quadrant, and branch ridges extending from a trunk ridge on the X axis and occupying the fourth quadrant, are formed in a mutually offset state (preferably formed in a state mutually offset by $P_X/2$). Also, branch ridges extending from a trunk ridge on the Y axis and occupying the first quadrant, and branch ridges extending from a trunk ridge on the Y axis and occupying the second quadrant, are formed in a mutually offset state (preferably formed in a state mutually offset by $P_Y/2$). Further, branch ridges extending from a trunk ridge on the X axis and occupying the second quadrant, and branch ridges extending from a trunk ridge on the X axis and occupying the third quadrant, are formed in a mutually offset state (preferably formed in a state mutually offset by $P_X/2$). Moreover, branch ridges extending from a trunk ridge on the Y axis and occupying the third quadrant, and branch ridges extending from a trunk ridge on the Y axis and occupying the fourth quadrant, are formed in a mutually offset state (preferably formed in a state mutually offset by $P_Y/2$) (liquid crystal display device according to Embodiment 4B-3 of the present disclosure, liquid crystal display device according to Embodiment 4C-3 of the present disclosure, or liquid crystal display device according to Embodiment 4E of the present disclosure). Note that the trunk and branch ridges are in 180 degrees rotational symmetry (point symmetry) as to the center of the pixel, rather than being in line symmetry to the X axis and Y axis.

31. Thirtieth Exemplary Embodiment

Figure 73:
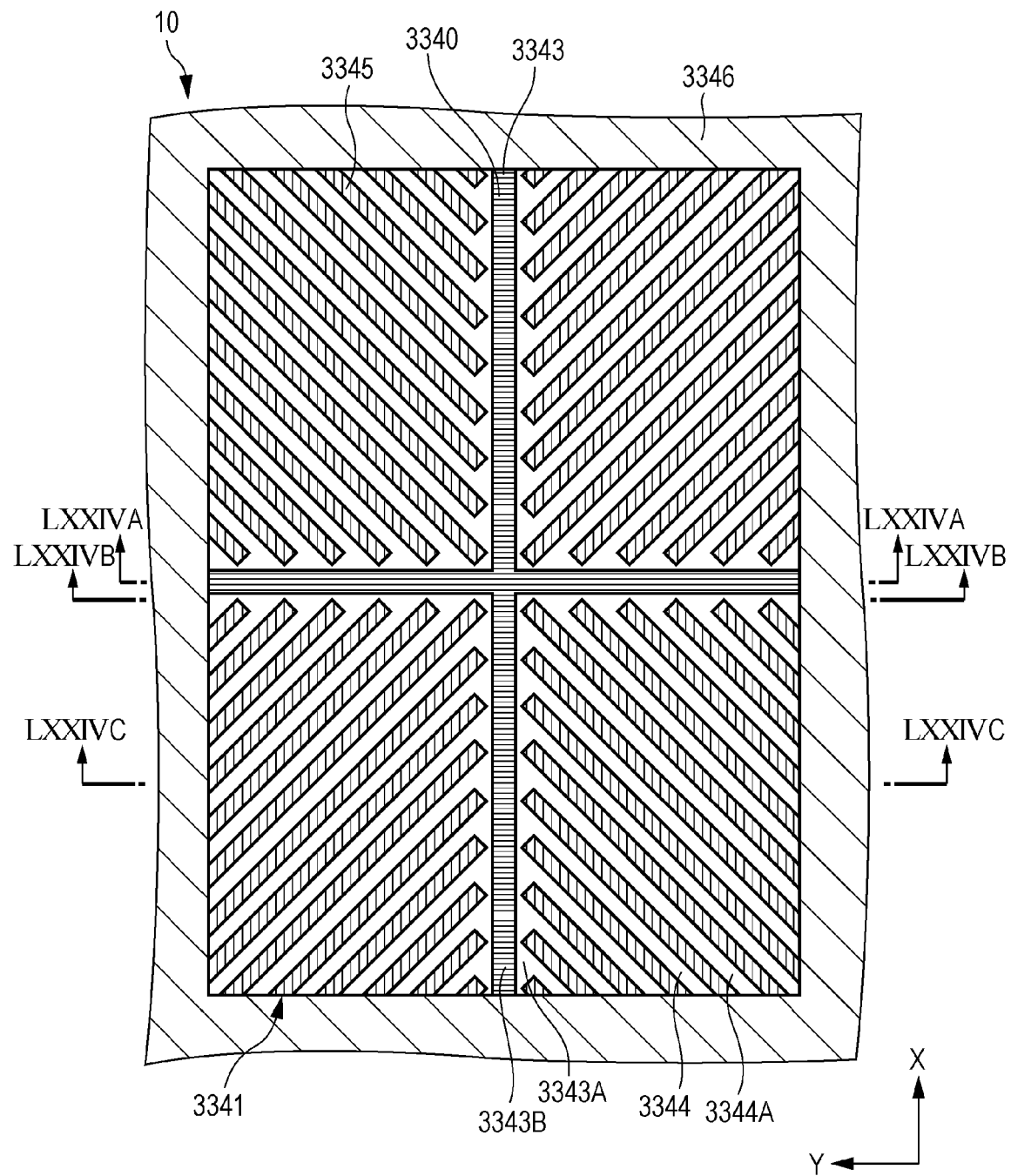
FIG. 73 is a schematic plan view of a first electrode for one pixel making up a liquid crystal display device according to a thirtieth exemplary embodiment.
Figure 74A:
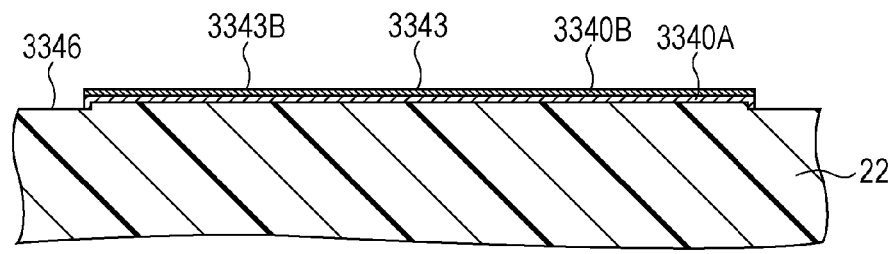
FIGS. 74A through 74C are schematic partial cross-sectional views of the first electrode and other components of the liquid crystal display device according to the thirtieth exemplary embodiment, taken in FIG. 73 along arrow LXXIVA-LXXIVA, arrow LXXIVB-LXXIVB, and arrow LXXIVC-LXXIVC, respectively.
Figure 74B:
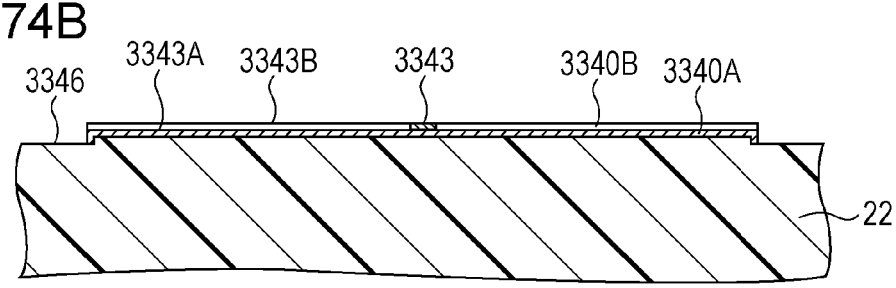
Figure 74C:
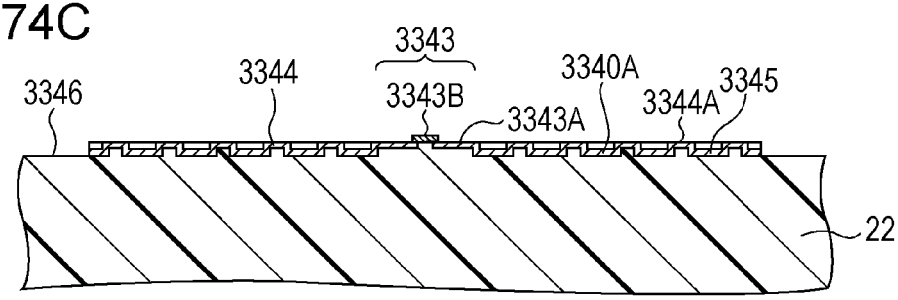
Figure 74D:
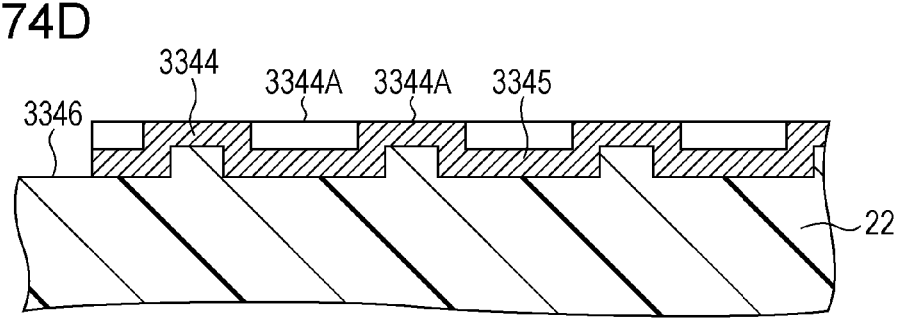
FIG. 74D is a schematic partial cross-sectional view where a portion of FIG. 73C has been enlarged.

The thirtieth exemplary embodiment is a modification of the twenty-ninth exemplary embodiment. FIG. 73 is a schematic plan view of a first electrode for one pixel making up a liquid crystal display device according to the thirtieth exemplary embodiment. FIGS. 74A through 74C are schematic partial cross-sectional views of the first electrode, taken in FIG. 73 along arrow LXXIVA-LXXIVA, arrow LXXIVB-LXXIVB, and arrow LXXIVC-LXXIVC, respectively, and FIG. 74D is a schematic partial cross-sectional view where a portion of FIG. 74C has been enlarged. The schematic partial end view of the liquid crystal display device according to the thirtieth exemplary embodiment is essentially the same as illustrated in FIGS. 1 through 3.

While the width of the branch ridges are illustrated as being constant in FIGS. 73, 75, 76, and 78, the branch ridges may be tapered in the same way as described with the twenty-fifth exemplary embodiment. That is, the branch ridges may be the widest at the portion of joining the trunk ridge, and grow narrower toward the tips thereof.

Multiple ridge-and-groove portions 3341 (trunk ridge 3343, branch ridges 3344, and grooves 3345) are formed at the first electrode 3340 in the liquid crystal display device according to the thirtieth exemplary embodiment. Multiple stepped portions are formed in the trunk ridges 3343 provided to the first electrode 3340. The ridge-and-groove portion 3341 is formed of a trunk ridge (primary ridge) 3343 passing through the center of a pixel and extending in a cross shape, and multiple branch ridges (sub ridges) 3344 extending toward the perimeter of the pixel from the trunk ridge 3343.

The cross-sectional shape of the trunk ridge 3343 when cut along an imaginary perpendicular plane orthogonal to the direction in which the trunk ridge 3343 extends is a shape stepping down from the center of the cross-sectional shape of the trunk ridge 3343 towards the edges thereof. Specifically, the top faces of the trunk ridge 3343 are made up of a top face 3343B at the middle of the trunk ridge 3343 and top faces 3343A situated on either side thereof. Thus, the trunk ridge 3343 has two stepped portions, with the top faces 3343A being higher than the grooves 3345, and the top face 3343B being higher than the top faces 3343A. Reference symbol 3344A denotes a top face of a branch ridge 3344, the top face 3343A of the trunk ridge 3343 being the same height as the top faces 3344A of the branch ridges 3344. In the drawings, the top face 3343B of the trunk ridge 3343 is indicated by horizontal hatching, and the grooves 3345 are indicated by vertical hatching.

32. Thirty-First Exemplary Embodiment

Figure 75:
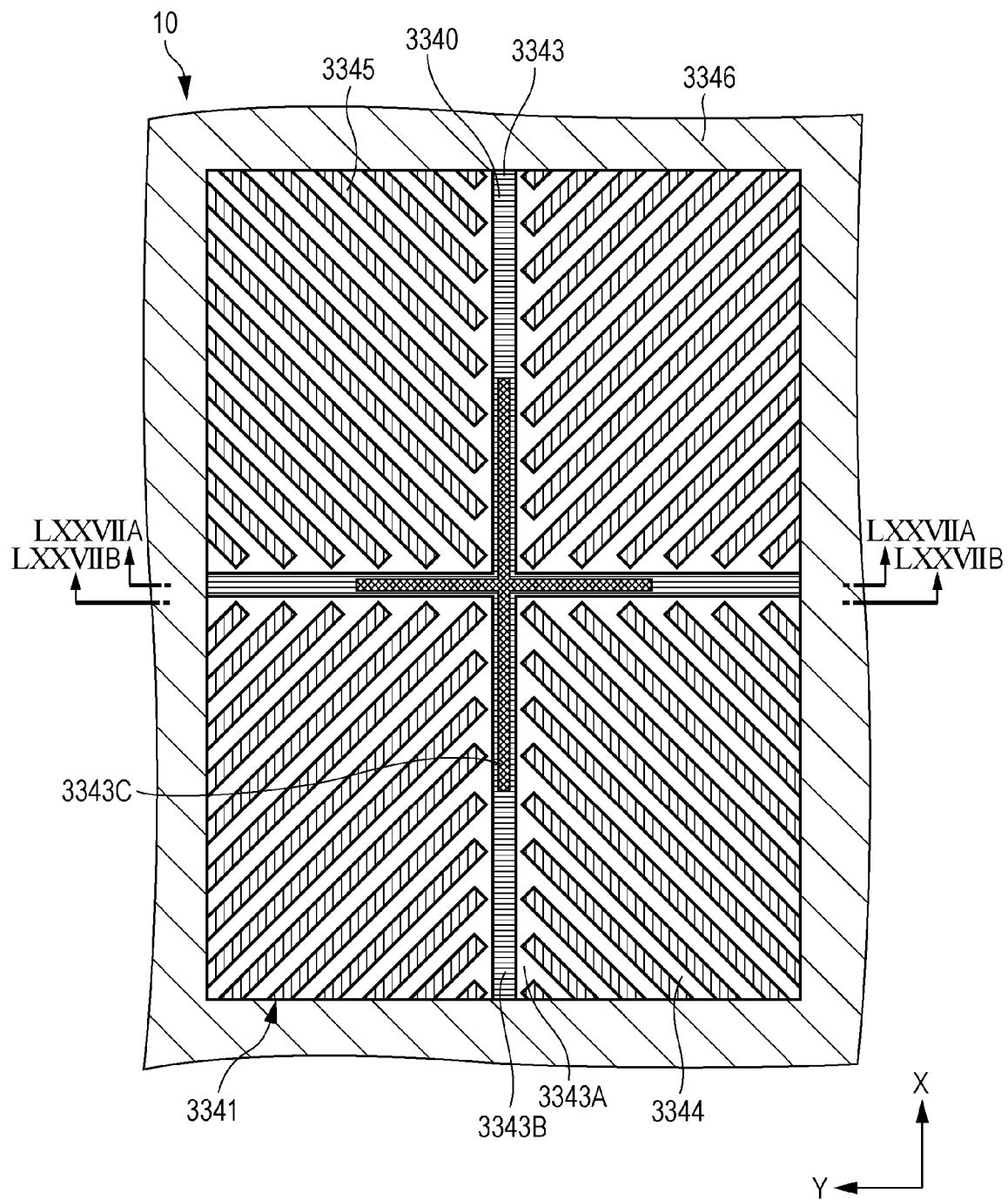
FIG. 75 is a schematic plan view of a first electrode for one pixel making up a liquid crystal display device according to a thirty-first exemplary embodiment.
Figure 77A:
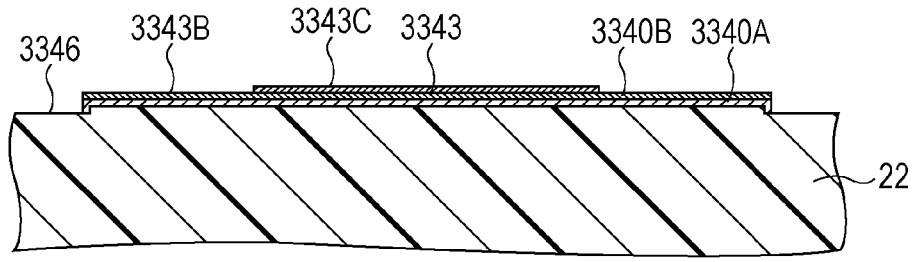
FIGS. 77A through 77C are schematic partial cross-sectional views of the first electrode and other components of the liquid crystal display device according to the thirty-first exemplary embodiment, taken in FIG. 75 along arrow LXXVIIA-LXXVIIA and arrow LXXVIIB-LXXVIIB, and in FIG. 76 along arrow LXXVIIC-LXXVIIC, respectively.
Figure 77B:
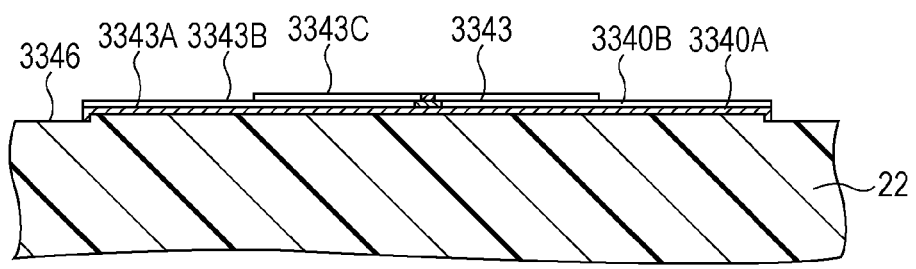

The thirty-first exemplary embodiment is a modification of the thirtieth exemplary embodiment. FIG. 75 is a schematic plan view of a first electrode for one pixel making up a liquid crystal display device according to the thirty-first exemplary embodiment. FIGS. 77A and 77B are schematic partial cross-sectional views of the first electrode, taken in FIG. 75 along arrow LXXVIIA-LXXVIIA and arrow LXXVIIB-LXXVIIB.

The top faces of the trunk ridge 3343 according to the thirty-first exemplary embodiment include a top face 3343C at the middle portion of the trunk ridge 3343, top faces 3343B situated on both sides of the top face 3343C, and top faces 3343A situated on the outer sides of the top faces 3343B. Thus, the trunk ridge 3343 has three stepped portions, the top faces 3343A are higher than the grooves 3345, the top faces 3343B are higher than the top faces 3343A, and the top face 3343C is higher than the top faces 3343B. The cross-sectional shape of the trunk ridge 3343 when cut along an imaginary perpendicular plane parallel to the direction in which the trunk ridge 3343 extends is a shape stepping down (top faces 3343B and top faces 3343A) from the center of the cross-sectional shape of the trunk ridge 3343 (top face 3343C) towards the edges thereof. The top face 3343C is indicated by cross-hatching in the drawings.

Other than the above points, the configuration and structure of the liquid crystal display device according to the thirty-first exemplary embodiment can be made to be the same as the configuration and structure of the liquid crystal display device according to the thirtieth exemplary embodiment, so detailed description thereof will be omitted.

33. Thirty-Second Exemplary Embodiment

Figure 76:
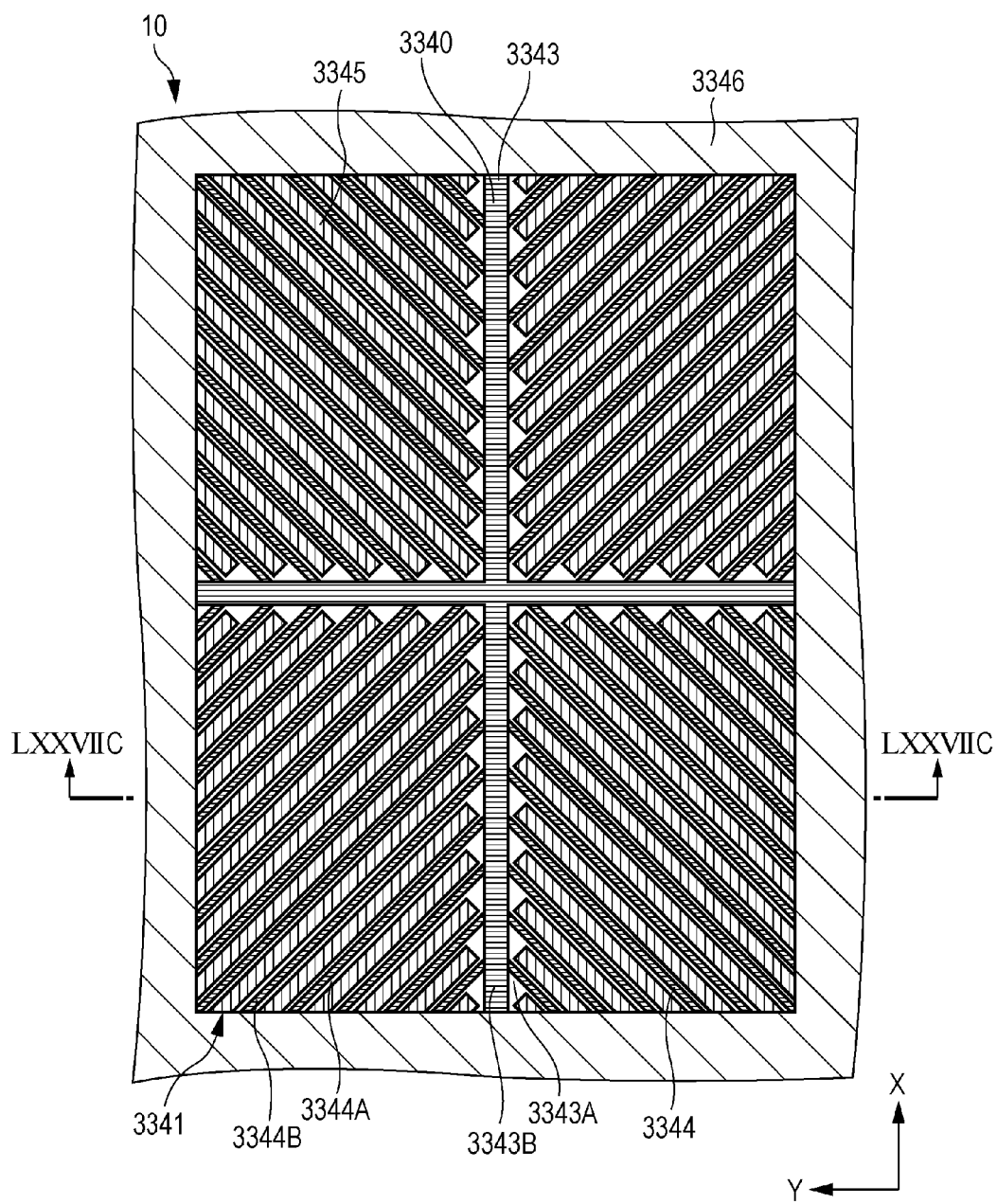
FIG. 76 is a schematic plan view of a first electrode for one pixel making up a liquid crystal display device according to a thirty-second exemplary embodiment.
Figure 77C:
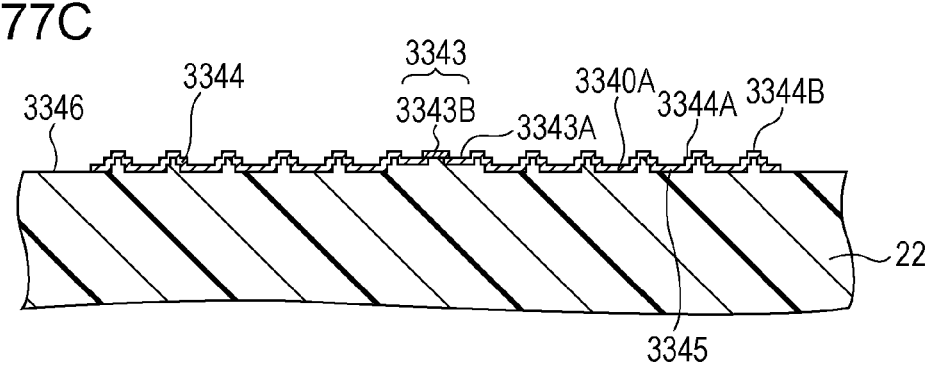
Figure 77D:
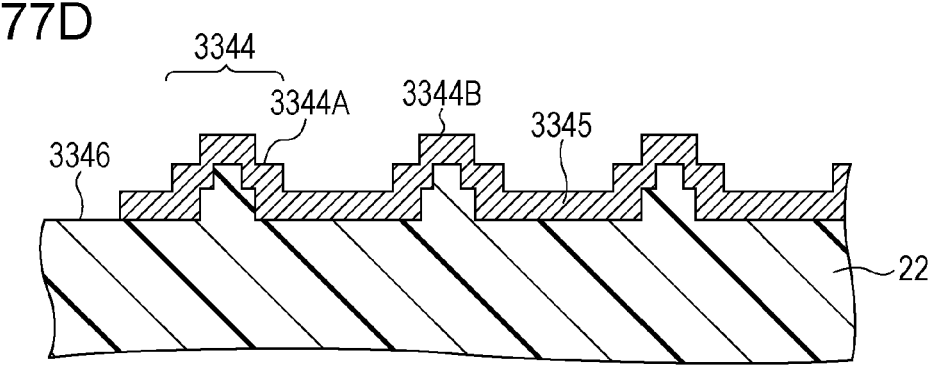
FIG. 77D is a schematic partial end view where a portion of FIG. 77C has been enlarged.

The thirty-second exemplary embodiment also is a modification of the thirtieth exemplary embodiment. FIG. 76 is a schematic plan view of a first electrode for one pixel making up a liquid crystal display device according to the thirty-second exemplary embodiment. FIG. 77C is a schematic partial end view of the first electrode and other components, taken in FIG. 76 along arrow LXXVIIC-LXXVIIC. FIG. 77D is a schematic partial end view where a portion of FIG. 77C has been enlarged.

The cross-sectional shape of the branch ridges 3344 when cut along an imaginary perpendicular plane orthogonal to the direction in which the branch ridges 3344 extend, separate from the above-described cross-sectional views, is a shape stepping down from the center of the cross-sectional shape of the branch ridges 3344 towards the edges thereof in the thirty-second exemplary embodiment. Specifically, the top faces of the branch ridge 3344 include a top face 3344B extending from the trunk ridge 3343, and top faces 3344A situated on either side thereof. Thus, the branch ridges 3344 have two stepped portions, with the top faces 3344A being higher than the grooves 3345, and the top face 3344B being higher than the top faces 3344A. The top face 3344B is indicated by horizontal hatching in the drawings. Also, the boundaries between the trunk ridge and branch ridges are indicated by solid lines in FIGS. 76 and 78. The difference in height between the top face 3344B and top faces 3343A of the branch ridges 3344 was made to be 0.20 μm on average. The top face 3343B of the trunk ridge 3343 and the top face 3344B of the branch ridges 3344 are at the same height.

Other than the above points, the configuration and structure of the liquid crystal display device according to the thirty-second exemplary embodiment can be made to be the same as the configuration and structure of the liquid crystal display device according to the thirtieth exemplary embodiment, so detailed description thereof will be omitted.

Figure 78:
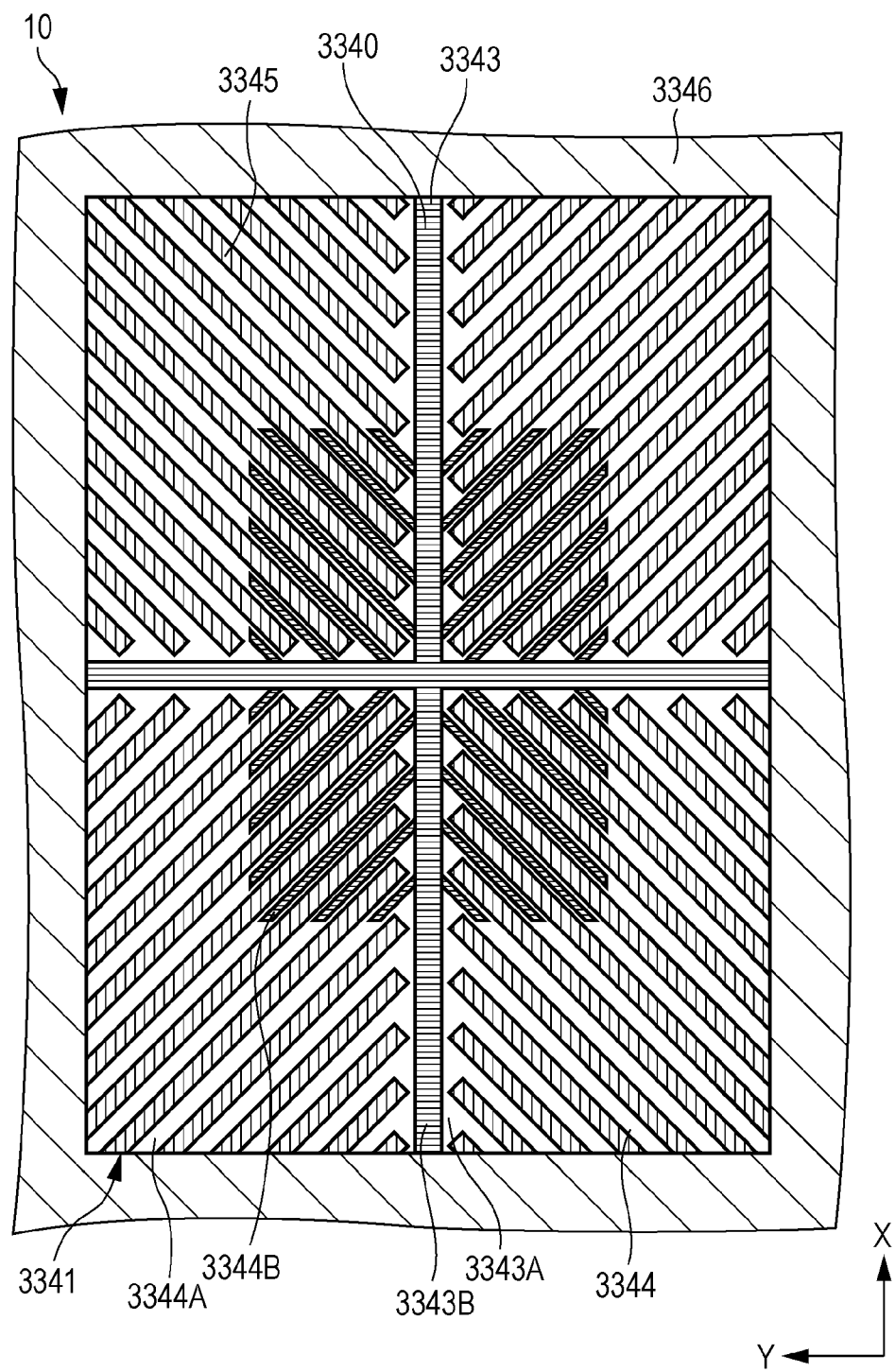
FIG. 78 is a schematic plan view of a first electrode for one pixel making up a liquid crystal display device according to a modification of the thirty-second exemplary embodiment.

Alternatively, the cross-sectional shape of the branch ridges 3344 when cut along an imaginary perpendicular plane parallel to the direction in which the branch ridges 3344 extend may be a shape stepping down from the portions of the branch ridges 3344 closer to the trunk ridge toward the ends of the branch ridges 3344. Such an arrangement is illustrated in FIG. 78, which is a schematic plan view of a first electrode for one pixel making up a liquid crystal display device. Moreover, this may be combined with the trunk ridge 3343 described in the thirty-first exemplary embodiment. Also, the configuration and structure of the branch ridges may be applied to the ridges in the liquid crystal display devices described in the twenty-second through twenty-eighth exemplary embodiments.

34. Thirty-Third Exemplary Embodiment

Figure 79:
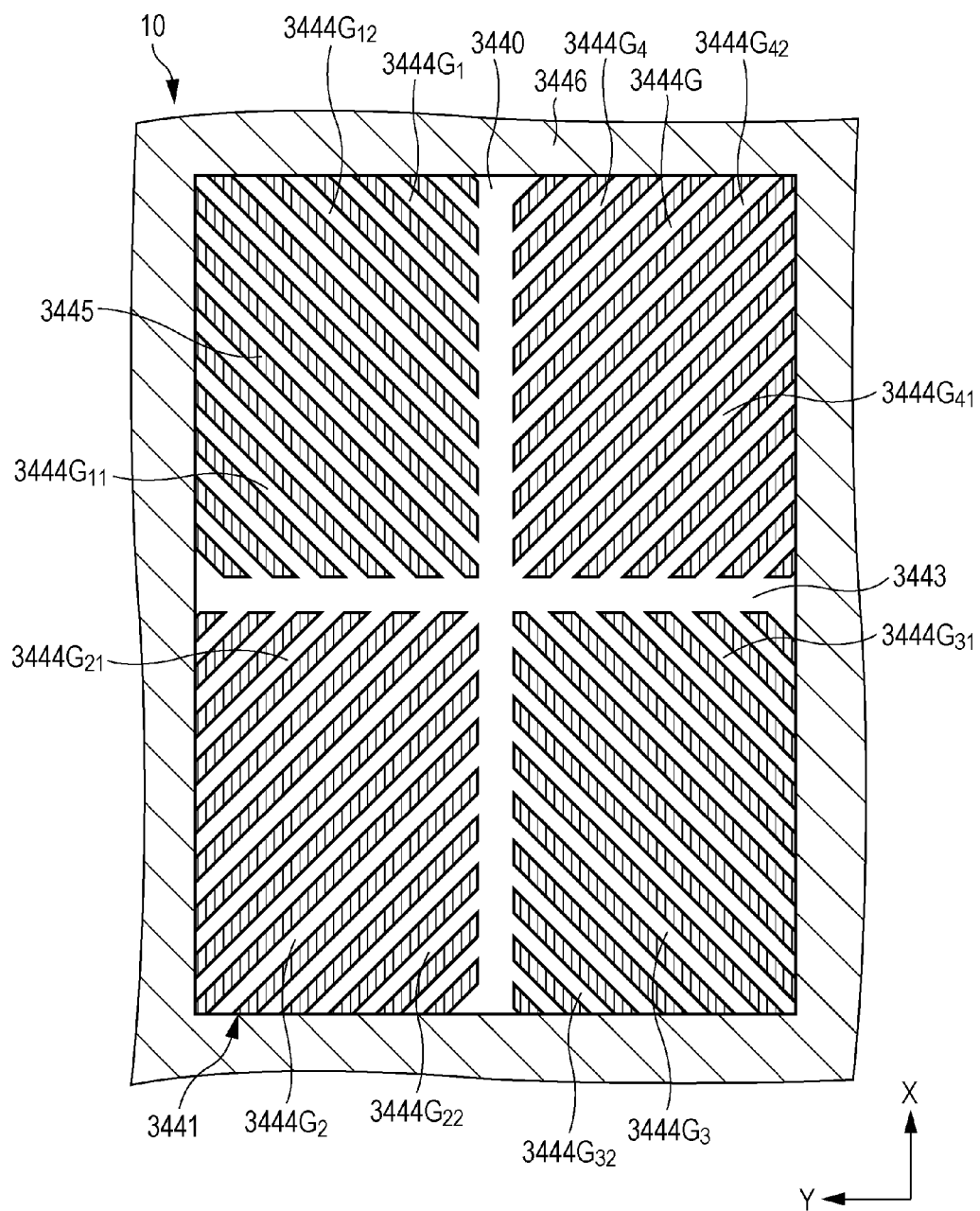
FIG. 79 is a schematic plan view of a first electrode for one pixel making up a liquid crystal display device according to a thirty-third exemplary embodiment.

The thirty-third exemplary embodiment relates to a liquid crystal display device according to Embodiment 4E of the present disclosure. FIG. 79 is a schematic plan view of a first electrode for one pixel making up a liquid crystal display device according to the thirty-third exemplary embodiment. Specifically, assuming a coordinate system in which straight lines passing through the center of the pixel and are parallel to the perimeters of the pixel 10 are the X axis and Y axis, multiple ridge-and-groove portions include a trunk ridge 3443 extending on the X axis and on the Y axis, and multiple branch ridges 3443G extending from the sides of the trunk ridge 3443 toward the perimeter of the pixel, multiple branch ridges 3444G$_1$ occupying the first quadrant extend in parallel in a direction where the value of the Y coordinate increases when the value of the X coordinates increases, and multiple branch ridges 3444G$_2$ occupying the second quadrant extend in parallel in a direction where the value of the Y coordinate increases when the value of the X coordinates decreases. Also, multiple branch ridges 3444G$_3$ occupying the third quadrant extend in parallel in a direction where the value of the Y coordinate decreases when the value of the X coordinates decreases, and multiple branch ridges 3444G$_4$ occupying the fourth quadrant extend in parallel in a direction where the value of the Y coordinate decreases when the value of the X coordinates increases. Branch ridges 3444G$_H$ extending from the trunk ridge 3443 on the X axis and occupying the first quadrant, and branch ridges 3444G$_{41}$ extending from the trunk ridge 3443 on the X axis and occupying the fourth quadrant, are formed in a mutually offset state (preferably formed in a state mutually offset by P$_X$/2). Also, branch ridges 3444G$_{12}$ extending from the trunk ridge 3443 on the Y axis and occupying the first quadrant, and branch ridges 3444G$_{22}$ extending from the trunk ridge 3443 on the Y axis and occupying the second quadrant, are formed in a mutually offset state (preferably formed in a state mutually offset by P$_Y$/2). Further, branch ridges 3444G$_{21}$ extending from the trunk ridge 3443 on the X axis and occupying the second quadrant, and branch ridges 3444G$_{31}$ extending from the trunk ridge 3443 on the X axis and occupying the third quadrant, are formed in a mutually offset state (preferably formed in a state mutually offset by P$_X$/2). Moreover, branch ridges 3444G$_{31}$ extending from the trunk ridge 3443 on the Y axis and occupying the third quadrant, and branch ridges 3444G$_{42}$ extending from the trunk ridge 3443 on the Y axis and occupying the fourth quadrant, are formed in a mutually offset state (preferably formed in a state mutually offset by P$_Y$/2). Note that P$_X$ represents the formation pitch of the ridges 3444G following the X axis, and P$_Y$ represents the formation pitch of the ridges 3444G following the Y axis. Note that the trunk ridge 3443 and branch ridges 3444 are in 180 degrees rotational symmetry (point symmetry) as to the center of the pixel, rather than being in line symmetry to the X axis and Y axis.

The liquid crystal display device according to the thirty-third exemplary embodiment was also configured such that the width of the branch ridges 3144G was $$P_Y/2 = P_X/2$$

and the width of the grooves 3145 was $$P_Y/2 = P_X/2$$

where P$_X$ represents the formation pitch of the branch ridges 3144G following the X axis, and P$_Y$ represents the formation pitch of the branch ridges 3144G following the Y axis, and where P$_X$=P$_Y$.

Other than the above points, the configuration and structure of the liquid crystal display device according to the thirty-third exemplary embodiment can be made to be the same as the configuration and structure of the liquid crystal display device according to the twenty-second exemplary embodiment, so detailed description thereof will be omitted.

While the present disclosure has been described by way of exemplary embodiments, the present disclosure is not restricted to these exemplary embodiment; rather, various modifications can be made. The planar shape of the ridges and branch ridges is not restricted to the V shape described in the exemplary embodiment, and various patterns where ridges and branch ridges extend in multiple directions can be used, such as for example stripes, lattice shapes, and so forth. The planar shape of the end portions of the ridges and branch ridges may be straight or may be stepped when viewed as a whole. Further, the planar shape of the end portions of the ridges and branch ridges may be straight, may be made up of a combination of line segments, or may be curved such as an arc or the like. A black matrix may be formed over the edge of the ridge-and-groove portion so that the projected image of the black matrix overlaps with the projected image of the portion of the first substrate which is situated between pixels.

While a VA mode liquid crystal display device (liquid crystal element) has been described in the exemplary embodiments, the present disclosure is not restricted to these, and may be applied to other display modes, such as the electrically controlled birefringence (ECB) mode which is a positive liquid crystal mode with horizontal alignment and no twisting, the in plane switching (IPS) mode, fringe field switching (FFS) mode, optically compensated bend (OCB) mode, and so forth, yielding similar advantages. However, in the present disclosure, the VA mode exhibits improvement in particularly high responsivity over the IPS mode and FFS mode, as compared to arrangements which have not been subjected to pretilting. Also, while description has been made regarding a transmitting liquid crystal display device (liquid crystal element) in the exemplary embodiments, the present disclosure is not restricted to transmitting liquid crystal display devices, and may be applied to reflecting type liquid crystal display devices as well, for example. In the case of a reflecting type, the pixel electrodes are formed of an electrode material having light-reflecting properties such as aluminum or the like.

The present disclosure may also assume the following configurations.

(1) A liquid crystal display device including:
 a plurality of pixels, at least one pixel of the plurality of pixels including
  a first substrate,
  a second substrate,
  a first electrode formed on a face of the first substrate oriented toward the second substrate, the first electrode having a plurality of ridge portions and a plurality of groove portions,
  a second electrode formed on a face of the second substrate oriented toward the first substrate,
  a liquid crystal layer situated between the first electrode and the second electrode, the liquid crystal layer comprising liquid crystal molecules, at least some of the liquid crystal molecules being pretilted, and
  a planarization layer disposed on the first electrode and filling at least the groove portions of the first electrode.

(2) The liquid crystal display device according to (1),
 wherein a ratio of a thickness of a thinnest portion of the planarization layer to a thickness of a thickest portion of the planarization layer is at least 0.5 and at most 1.

(3) The liquid crystal display device according to (2),
wherein a ratio of the thickness of the thickest portion of the planarization layer to a height of a ridge portion of the first electrode with respect to a groove portion of the first electrode is at least 0.5 and at most 5.

(4) The liquid crystal display device according to (1),
wherein the planarization layer covers the first electrode and is formed of an alignment film that contributes to pretilting the at least some of the liquid crystal molecules.

(5) The liquid crystal display device according to (1),
wherein the planarization layer covers the first electrode, and the liquid crystal display device further comprises an alignment film that covers the planarization layer and contributes to pretilting the at least some of the liquid crystal molecules.

(6) The liquid crystal display device according to (1),
further comprising an alignment film that covers the planarization layer and at least the ridge portions of the first electrode and contributes to pretilting the at least some of the liquid crystal molecules.

(7) The liquid crystal display device according to (4),
wherein the liquid crystal molecules are pretilted by an electric field applied to the liquid crystal layer.

(8) The liquid crystal display device according to (1),
further comprising a first alignment film at a side of the liquid crystal layer oriented toward the first substrate and a second alignment film at a side of the liquid crystal layer oriented toward the second substrate, wherein a ratio of an average thickness of the second alignment film to an average thickness of the first alignment film is at least 0.5 and at most 1.5.

(9) The liquid crystal display device according to (1),
wherein a ridge portion of the first electrode is formed of a plurality of stepped portions.

(10) The liquid crystal display device according to (1),
wherein the first substrate comprises a ridge structure situated between a perimeter of the at least one pixel and an adjacent pixel of the plurality of pixels, the ridge structure forming a perimeter of a ridge-and-groove portion of the first electrode comprising the ridge portions and groove portions.

(11) The liquid crystal display device according to (1),
wherein the ridge portions and groove portions are formed in a ridge-and-groove portion of the first electrode that includes
a trunk ridge passing through a center of the at least one pixel and extending in a cross shape, and
a plurality of branch ridges extending toward a perimeter of the at least one pixel from the trunk ridge;
and wherein the second electrode comprises an alignment restricting portion at a portion of the second electrode aligned with the trunk ridge on the first electrode.

(12) The liquid crystal display device according to (1),
wherein the ridge portions and groove portions are formed in a ridge-and-groove portion of the first electrode that includes
a trunk ridge formed on a perimeter portion of the at least one pixel in a frame shape, and
a plurality of branch ridges extending inward in the at least one pixel from the trunk ridge;
and wherein the first electrode comprises a slit portion or a protrusion, passing through a center of the at least one pixel in parallel to a perimeter of the at least one pixel.

(13) The liquid crystal display device according to (1),
wherein the ridge portions extend from at least one trunk ridge and end in tips, a width of the ridge portions being narrowed toward the tips.

(14) The liquid crystal display device according to (13),
wherein the ridge portions and groove portions are formed in a ridge-and-groove portion of the first electrode that includes
a trunk ridge passing through a center of the at least one pixel and extending in a cross shape, and
a plurality of branch ridges extending from the trunk ridge toward a perimeter of the at least one pixel and ending in tips;
and wherein a width of the branch ridges is widest at the trunk ridge and narrows toward the tips.

(15) The liquid crystal display device according to (13),
wherein the ridge portions and groove portions are formed in a ridge-and-groove portion of the first electrode that includes
a trunk ridge formed on a perimeter portion of the at least one pixel in a frame shape, and
a plurality of branch ridges extending inward in the at least one pixel from the trunk ridge and ending in tips;
and wherein a width of the branch ridges is widest at the trunk ridge and narrows toward the tips.

(16) The liquid crystal display device according to (1),
wherein the at least one pixel has an up-down axis and a left-right axis and comprises:
a quadrant in which ridge portions extend in parallel upward and leftward,
a quadrant in which ridge portions extend in parallel downward and leftward,
a quadrant in which ridge portions extend in parallel downward and rightward, and
a quadrant in which ridge portions extend in parallel upward and rightward.

(17) The liquid crystal display device according to (1),
wherein the ridge portions and groove portions are formed in a ridge-and-groove portion of the first electrode that includes
a trunk ridge extending along an up-down axis and left-right axis passing through a center of the at least one pixel, and
a plurality of branch ridges extending from longitudinal sides of the trunk ridge towards a perimeter of the at least one pixel,
and wherein the branch ridges joining the trunk ridge form ridge edges that are parallel with neither the up-down axis nor the left-right axis.

(18) The liquid crystal display device according to (1),
wherein the first electrode further comprises slit portions.

(19) The liquid crystal display device according to (1),
wherein the first electrode further comprises an indentation formed in a center region of the at least one pixel.

(20) The liquid crystal display device according to (1),
wherein the ridge portions and groove portions are formed in a ridge-and-groove portion of the first electrode that includes
a trunk ridge extending along an up-down axis and a left-right axis passing through a center of the at least one pixel, and
a plurality of branch ridges extending from longitudinal sides of the trunk ridge toward a perimeter of the at least one pixel;
wherein the at least one pixel comprises
a first quadrant in which the branch ridges extend in parallel upward and leftward,
a second quadrant in which the branch ridges extend in parallel downward and leftward,
a third quadrant in which the branch ridges extend in parallel downward and rightward, and a fourth quadrant in which the branch ridges extend in parallel upward and rightward;
and wherein
branch ridges extending from the trunk ridge on the up-down axis and occupying the first quadrant, and branch ridges extending from the trunk ridge on the up-down axis and occupying the fourth quadrant, are formed in a mutually offset state,
branch ridges extending from the trunk ridge on the left-right axis and occupying the first quadrant, and branch ridges extending from the trunk ridge on the left-right axis and occupying the second quadrant, are formed in a mutually offset state,
branch ridges extending from the trunk ridge on the up-down axis and occupying the second quadrant, and branch ridges extending from the trunk ridge on the up-down axis and occupying the third quadrant, are formed in a mutually offset state, and
branch ridges extending from the trunk ridge on the left-right axis and occupying the third quadrant, and branch ridges extending from the trunk ridge on the left-right axis and occupying the fourth quadrant, are formed in a mutually offset state.

What is claimed is:

1. A liquid crystal display device comprising:
a plurality of pixels, at least one pixel of the plurality of pixels including
a first substrate,
a second substrate,
a first electrode formed on a face of the first substrate oriented toward the second substrate, the first electrode having a plurality of ridge portions and a plurality of groove portions,
a second electrode formed on a face of the second substrate oriented toward the first substrate,
a liquid crystal layer situated between the first electrode and the second electrode, the liquid crystal layer comprising liquid crystal molecules, at least some of the liquid crystal molecules being pretilted, and
a planarization layer disposed on the first electrode and filling at least the groove portions of the first electrodes;
wherein a ratio of a height of a thinnest portion of the planarization layer to a height of a thickest portion of the planarization layer with respect to a face of a groove portion of the first electrode is at least 0.5 and at most 1.

2. The liquid crystal display device according to claim 1, wherein a ratio of the height of the thickest portion of the planarization layer to a height of a ridge portion of the first electrode with respect to a groove portion of the first electrode is at least 0.5 and at most 5.

3. The liquid crystal display device according to claim 1, wherein the planarization layer covers the first electrode and is formed of an alignment film that contributes to pretilting the at least some of the liquid crystal molecules.

4. The liquid crystal display device according to claim 1, wherein the planarization layer covers the first electrode, and the liquid crystal display device further comprises an alignment film that covers the planarization layer and contributes to pretilting the at least some of the liquid crystal molecules.

5. The liquid crystal display device according to claim 1, further comprising an alignment film that covers the planarization layer and at least the ridge portions of the first electrode and contributes to pretilting the at least some of the liquid crystal molecules.

6. The liquid crystal display device according to claim 3, wherein the liquid crystal molecules are pretilted by an electric field applied to the liquid crystal layer.

7. The liquid crystal display device according to claim 1, further comprising a first alignment film at a side of the liquid crystal layer oriented toward the first substrate and a second alignment film at a side of the liquid crystal layer oriented toward the second substrate, wherein a ratio of an average thickness of the second alignment film to an average thickness of the first alignment film is at least 0.5 and at most 1.5.

8. The liquid crystal display device according to claim 1, wherein a ridge portion of the first electrode is formed of a plurality of stepped portions.

9. The liquid crystal display device according to claim 1, wherein the first substrate comprises a ridge structure situated between a perimeter of the at least one pixel and an adjacent pixel of the plurality of pixels, the ridge structure forming a perimeter of a ridge-and-groove portion of the first electrode comprising the ridge portions and groove portions.

10. A liquid crystal display device comprising:
a plurality of pixels, at least one pixel of the plurality of pixels including
a first substrate,
a second substrate,
a first electrode formed on a face of the first substrate oriented toward the second substrate, the first electrode having a plurality of ridge portions and a plurality of groove portions,
a second electrode formed on a face of the second substrate oriented toward the first substrate,
a liquid crystal layer situated between the first electrode and the second electrode, the liquid crystal layer comprising liquid crystal molecules, at least some of the liquid crystal molecules being pretilted, and
a planarization layer disposed on the first electrode and filling at least the groove portions of the first electrode;
wherein the ridge portions and groove portions are formed in a ridge-and-groove portion of the first electrode that includes
a trunk ridge passing through a center of the at least one pixel and extending in a cross shape, and
a plurality of branch ridges extending toward a perimeter of the at least one pixel from the trunk ridge;
and wherein the second electrode comprises an alignment restricting portion at a portion of the second electrode aligned with the trunk ridge on the first electrode.

11. A liquid crystal display device comprising:
a plurality of pixels, at least one pixel of the plurality of pixels including
a first substrate,
a second substrate,
a first electrode formed on a face of the first substrate oriented toward the second substrate, the first electrode having a plurality of ridge portions and a plurality of groove portions,
a second electrode formed on a face of the second substrate oriented toward the first substrate,
a liquid crystal layer situated between the first electrode and the second electrode, the liquid crystal layer comprising liquid crystal molecules, at least some of the liquid crystal molecules being pretilted, and
a planarization layer disposed on the first electrode and filling at least the groove portions of the first electrode;

wherein the ridge portions and groove portions are formed in a ridge-and-groove portion of the first electrode that includes
- a trunk ridge formed on a perimeter portion of the at least one pixel in a frame shape, and
- a plurality of branch ridges extending inward in the at least one pixel from the trunk ridge;

and wherein the first electrode comprises a slit portion or a protrusion, passing through a center of the at least one pixel in parallel to a perimeter of the at least one pixel.

12. The liquid crystal display device according to claim 1, wherein the ridge portions extend from at least one trunk ridge and end in tips, a width of the ridge portions being narrowed toward the tips.

13. The liquid crystal display device according to claim 12, wherein the ridge portions and groove portions are formed in a ridge-and-groove portion of the first electrode that includes
- a trunk ridge passing through a center of the at least one pixel and extending in a cross shape, and
- a plurality of branch ridges extending from the trunk ridge toward a perimeter of the at least one pixel and ending in tips;

and wherein a width of the branch ridges is widest at the trunk ridge and narrows toward the tips.

14. The liquid crystal display device according to claim 12, wherein the ridge portions and groove portions are formed in a ridge-and-groove portion of the first electrode that includes
- a trunk ridge formed on a perimeter portion of the at least one pixel in a frame shape, and
- a plurality of branch ridges extending inward in the at least one pixel from the trunk ridge and ending in tips;

and wherein a width of the branch ridges is widest at the trunk ridge and narrows toward the tips.

15. The liquid crystal display device according to claim 1, wherein the at least one pixel has an up-down axis and a left-right axis and comprises:
- a quadrant in which ridge portions extend in parallel upward and leftward,
- a quadrant in which ridge portions extend in parallel downward and leftward,
- a quadrant in which ridge portions extend in parallel downward and rightward, and
- a quadrant in which ridge portions extend in parallel upward and rightward.

16. The liquid crystal display device according to claim 1, wherein the ridge portions and groove portions are formed in a ridge-and-groove portion of the first electrode that includes
- a trunk ridge extending along an up-down axis and left-right axis passing through a center of the at least one pixel, and
- a plurality of branch ridges extending from longitudinal sides of the trunk ridge towards a perimeter of the at least one pixel, and wherein the branch ridges joining the trunk ridge form ridge edges that are parallel with neither the up-down axis nor the left-right axis.

17. The liquid crystal display device according to claim 1, wherein the first electrode further comprises slit portions.

18. The liquid crystal display device according to claim 1, wherein the first electrode further comprises an indentation formed in a center region of the at least one pixel.

19. The liquid crystal display device according to claim 1, wherein the ridge portions and groove portions are formed in a ridge-and-groove portion of the first electrode that includes
- a trunk ridge extending along an up-down axis and a left-right axis passing through a center of the at least one pixel, and
- a plurality of branch ridges extending from longitudinal sides of the trunk ridge toward a perimeter of the at least one pixel;

wherein the at least one pixel comprises
- a first quadrant in which the branch ridges extend in parallel upward and leftward,
- a second quadrant in which the branch ridges extend in parallel downward and leftward,
- a third quadrant in which the branch ridges extend in parallel downward and rightward, and
- a fourth quadrant in which the branch ridges extend in parallel upward and rightward;

and wherein
- branch ridges extending from the trunk ridge on the up-down axis and occupying the first quadrant, and branch ridges extending from the trunk ridge on the up-down axis and occupying the fourth quadrant, are formed in a mutually offset state,
- branch ridges extending from the trunk ridge on the left-right axis and occupying the first quadrant, and branch ridges extending from the trunk ridge on the left-right axis and occupying the second quadrant, are formed in a mutually offset state,
- branch ridges extending from the trunk ridge on the up-down axis and occupying the second quadrant, and branch ridges extending from the trunk ridge on the up-down axis and occupying the third quadrant, are formed in a mutually offset state, and
- branch ridges extending from the trunk ridge on the left-right axis and occupying the third quadrant, and branch ridges extending from the trunk ridge on the left-right axis and occupying the fourth quadrant, are formed in a mutually offset state.

* * * * *